(12) United States Patent
Eberspach et al.

(10) Patent No.: US 11,698,435 B2
(45) Date of Patent: Jul. 11, 2023

(54) DETECTOR FOR OPTICALLY DETECTING AT LEAST ONE OBJECT

(71) Applicant: trinamix GmbH, Ludwigshafen am Rhein (DE)

(72) Inventors: Michael Eberspach, Ludwigshafen (DE); Thomas Ohmer, Ludwigshafen (DE); Robert Send, Ludwigshafen (DE); Christian Lennartz, Ludwigshafen (DE); Christopher Hahne, Ludwigshafen (DE); Stefan Hengen, Ludwigshafen (DE); Sebastian Valouch, Ludwigshafen (DE); Christoph Lungenschmied, Ludwigshafen (DE); Ingmar Bruder, Ludwigshafen (DE); Wilfried Hermes, Ludwigshafen (DE); Celal Mohan Oeguen, Ludwigshafen (DE); Christian Daniel Schildknecht, Ludwigshafen (DE); Peter Schillen, Ludwigshafen (DE); Patrick Schindler, Ludwigshafen (DE); Peter Fejes, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 17/812,033

(22) Filed: Jul. 12, 2022

(65) Prior Publication Data

US 2022/0373641 A1 Nov. 24, 2022

Related U.S. Application Data

(63) Continuation of application No. 16/461,670, filed as application No. PCT/EP2017/079564 on Nov. 17, 2017, now Pat. No. 11,415,661.

(30) Foreign Application Priority Data

Nov. 17, 2016 (EP) .................................... 16199397
Nov. 17, 2016 (EP) .................................... 16199398

(Continued)

(51) Int. Cl.
*G01J 1/04* (2006.01)
*G01S 5/16* (2006.01)
(Continued)

(52) U.S. Cl.
CPC ............... *G01S 5/16* (2013.01); *G01J 1/0411* (2013.01); *G01J 1/0422* (2013.01);
(Continued)

(58) Field of Classification Search
CPC .......... G01S 17/89; G01S 17/66; G01S 17/50; G01S 17/46; G01S 17/36; G01S 17/32;
(Continued)

(56) References Cited

U.S. PATENT DOCUMENTS 3,035,176 A 5/1962 Kis et al.
3,112,197 A 11/1963 Neugebauer et al.
(Continued)

FOREIGN PATENT DOCUMENTS

CA 1065054 10/1979
CA 2119330 9/1995
(Continued)

OTHER PUBLICATIONS

Extended Search Report dated Aug. 23, 2011 in Europe Application No. 11154531.5 (With English Translation of Category of Cited Documents).
(Continued)

*Primary Examiner* — John R Lee
(74) *Attorney, Agent, or Firm* — Armstrong Teasdale LLP

(57) ABSTRACT

A detector (110, 1110, 2110) for determining a position of at least one object (112) is proposed. The detector (110, 1110, 2110) comprises:
  at least one transfer device (128, 1128), wherein the transfer device (128, 1128) has at least one focal length in response to at least one incident light beam (116, 1116) propagating from the object (112, 1112) to the detector (110, 1110, 2110);
  at least two optical sensors (113, 1118, 1120), wherein each optical sensor (113, 1118, 1120) has at least one light sensitive area (121, 1122, 1124), wherein each optical sensor (113, 1118, 1120) is designed to generate at least one sensor signal in response to an illumination of its respective light-sensitive area by the light beam (116, 1116),
  at least one evaluation device (132, 1132) being configured for determining at least one longitudinal coordi-
(Continued)

nate z of the object (112, 1112) by evaluating a quotient signal Q from the sensor signals.

The detector is adapted to determine the longitudinal coordinate z of the object in at least one measurement range independent from the object size in an object plane.

44 Claims, 38 Drawing Sheets

(30) Foreign Application Priority Data

| Mar. 16, 2017 | (EP) | 17161334 |
|---|---|---|
| Oct. 9, 2017 | (EP) | 17195398 |
| Oct. 9, 2017 | (EP) | 17195427 |

(51) Int. Cl.

| G01S 7/481 | (2006.01) |
|---|---|
| G01S 11/12 | (2006.01) |
| G01S 17/36 | (2006.01) |
| G01J 1/42 | (2006.01) |
| G01S 7/48 | (2006.01) |
| G01S 7/493 | (2006.01) |
| G01S 17/32 | (2020.01) |
| G01S 17/50 | (2006.01) |
| G01S 17/66 | (2006.01) |
| G01S 17/89 | (2020.01) |
| G01S 17/46 | (2006.01) |

(52) U.S. Cl.
CPC ........... *G01J 1/4228* (2013.01); *G01S 7/4804* (2013.01); *G01S 7/4808* (2013.01); *G01S 7/4816* (2013.01); *G01S 7/493* (2013.01); *G01S 11/12* (2013.01); *G01S 17/32* (2013.01); *G01S 17/36* (2013.01); *G01S 17/46* (2013.01); *G01S 17/50* (2013.01); *G01S 17/66* (2013.01); *G01S 17/89* (2013.01)

(58) Field of Classification Search
CPC ........ G01S 11/12; G01S 7/493; G01S 7/4816; G01S 7/4811; G01S 7/4808; G01S 7/481; G01S 7/4806; G01S 3/783; G01S 7/4814; G01S 7/48; G01S 7/4804; G01S 5/16
See application file for complete search history.

(56) References Cited

U.S. PATENT DOCUMENTS

| 3,384,752 | A | 5/1968 | Odone |
|---|---|---|---|
| 3,562,785 | A | 2/1971 | Craig |
| 3,564,268 | A | 2/1971 | Bayne et al. |
| 3,873,823 | A | 3/1975 | Northrup et al. |
| 3,937,950 | A | 2/1976 | Hosoe et al. |
| 3,954,340 | A | 5/1976 | Blomqvist et al. |
| 4,023,033 | A | 5/1977 | Bricot et al. |
| 4,053,240 | A | 10/1977 | Aizawa et al. |
| 4,079,247 | A | 3/1978 | Briscot et al. |
| 4,256,513 | A | 3/1981 | Yoshida |
| 4,286,035 | A | 8/1981 | Nishizima et al. |
| 4,346,293 | A | 8/1982 | Fetzer |
| 4,469,945 | A | 9/1984 | Hoeberechts et al. |
| 4,524,276 | A | 6/1985 | Ohtombe |
| 4,565,761 | A | 1/1986 | Katagiri et al. |
| 4,584,704 | A | 4/1986 | Ferren |
| 4,593,187 | A | 6/1986 | Grotts et al. |
| 4,602,158 | A | 7/1986 | Barrett |
| 4,603,258 | A | 7/1986 | Sher et al. |
| 4,647,193 | A | 3/1987 | Rosenfeld |
| 4,653,905 | A | 3/1987 | Farrar et al. |
| 4,675,517 | A | 6/1987 | Shiomi |
| 4,675,535 | A | 6/1987 | Tsunekawa et al. |
| 4,694,172 | A | 9/1987 | Powell et al. |
| 4,760,004 | A | 7/1988 | Rochat et al. |
| 4,760,151 | A | 7/1988 | Rochat et al. |
| 4,767,211 | A | 8/1988 | Munakata et al. |
| 4,773,751 | A | 9/1988 | Matsuda et al. |
| 4,927,721 | A | 5/1990 | Gratzel et al. |
| 4,952,472 | A | 8/1990 | Baranyi et al. |
| 5,082,363 | A | 1/1992 | Nakanishi et al. |
| 5,216,476 | A | 6/1993 | Lanckton |
| 5,227,985 | A | 7/1993 | Dementhon et al. |
| 5,235,377 | A | 8/1993 | Ide et al. |
| 5,291,066 | A | 3/1994 | Neugebauer et al. |
| 5,323,222 | A | 6/1994 | Kunishige |
| 5,343,291 | A | 8/1994 | Ohwada et al. |
| 5,350,644 | A | 9/1994 | Graetzel et al. |
| 5,355,241 | A | 10/1994 | Kelley |
| 5,375,008 | A | 12/1994 | Guerreri |
| 5,512,997 | A | 4/1996 | Ogawa |
| 5,576,975 | A | 11/1996 | Sasaki et al. |
| 5,581,094 | A | 12/1996 | Hara et al. |
| 5,589,928 | A | 12/1996 | Babbitt et al. |
| 5,856,844 | A | 1/1999 | Batterman et al. |
| 6,061,122 | A | 5/2000 | Hoshino et al. |
| 6,118,119 | A | 9/2000 | Ruschin |
| 6,163,371 | A | 12/2000 | Kato |
| 6,191,881 | B1 | 2/2001 | Tajima |
| 6,229,913 | B1 | 5/2001 | Nayar et al. |
| 6,266,142 | B1 | 7/2001 | Junkins et al. |
| 6,359,211 | B1 | 3/2002 | Spitler et al. |
| 6,417,836 | B1 | 7/2002 | Kumar et al. |
| 6,507,392 | B1 | 1/2003 | Richards et al. |
| 6,512,233 | B1 | 1/2003 | Sato et al. |
| 6,785,028 | B1 | 8/2004 | Atsuumi et al. |
| 6,930,297 | B1 | 8/2005 | Nakamura |
| 6,947,459 | B2 | 9/2005 | Kurtz et al. |
| 6,995,445 | B2 | 2/2006 | Forrest et al. |
| 7,022,966 | B2 | 4/2006 | Gonzo et al. |
| 7,049,601 | B2 | 5/2006 | Agano |
| 7,196,317 | B1 | 3/2007 | Meissner et al. |
| 7,247,851 | B2 | 7/2007 | Okada et al. |
| 7,301,608 | B1 | 11/2007 | Mendenhall et al. |
| 7,417,716 | B2 | 8/2008 | Nagasaka et al. |
| 7,626,569 | B2 | 12/2009 | Lanier |
| 7,677,742 | B2 | 3/2010 | Hillmer et al. |
| 7,768,498 | B2 | 8/2010 | Wey |
| 7,773,070 | B2 | 8/2010 | Trisnadi et al. |
| 7,855,778 | B2 | 12/2010 | Yung et al. |
| 7,939,932 | B2 | 5/2011 | Martin |
| 8,013,901 | B2 | 9/2011 | Fukuhara et al. |
| 8,019,166 | B2 | 9/2011 | Cheng et al. |
| 8,107,056 | B1 | 1/2012 | Riza |
| 8,144,173 | B2 | 3/2012 | Baba |
| 8,228,299 | B1 | 7/2012 | Maloney et al. |
| 8,231,809 | B2 | 7/2012 | Pschirer et al. |
| 8,345,003 | B1 | 1/2013 | Trisnadi et al. |
| 8,363,526 | B2 | 1/2013 | Hotta et al. |
| 8,390,793 | B2 | 3/2013 | Yamaguchi et al. |
| 8,411,289 | B2 | 4/2013 | Takahashi |
| 8,477,580 | B2 | 7/2013 | Yamamoto et al. |
| 8,563,855 | B2 | 10/2013 | Pschirer et al. |
| 8,593,565 | B2 | 11/2013 | Shuster |
| 8,902,354 | B2 | 12/2014 | Shuster |
| 8,908,157 | B2 | 12/2014 | Eisele et al. |
| 9,104,910 | B2 | 8/2015 | Huang |
| 9,385,326 | B2 | 7/2016 | Wonneberger et al. |
| 9,389,315 | B2 | 7/2016 | Bruder et al. |
| 9,428,518 | B2 | 8/2016 | Wonneberger et al. |
| 9,557,856 | B2 | 1/2017 | Send et al. |
| 9,646,365 | B1 | 5/2017 | Hinkel et al. |
| 9,665,182 | B2 | 5/2017 | Send et al. |
| 9,741,954 | B2 | 8/2017 | Bruder et al. |
| 9,787,899 | B1 | 10/2017 | Hinkel et al. |
| 9,829,564 | B2 | 11/2017 | Bruder et al. |
| 9,919,999 | B2 | 3/2018 | Koenemann et al. |
| 9,958,535 | B2 | 5/2018 | Send et al. |
| 9,989,623 | B2 | 6/2018 | Send et al. |
| 10,012,532 | B2 | 7/2018 | Send et al. |
| 10,094,927 | B2 | 10/2018 | Send et al. |
| 10,120,078 | B2 | 11/2018 | Bruder et al. |

(56) References Cited

U.S. PATENT DOCUMENTS

| | | |
|---|---|---|
| 10,290,817 B2 | 5/2019 | Battagliarin et al. |
| 10,412,283 B2 | 9/2019 | Send et al. |
| 11,143,736 B2 | 10/2021 | Schindler et al. |
| 11,415,661 B2 * | 8/2022 | Eberspach ............ G01J 1/0422 |
| 2001/0025938 A1 | 10/2001 | Imai |
| 2002/0011576 A1 | 1/2002 | Cho et al. |
| 2002/0075471 A1 | 6/2002 | Holec |
| 2003/0017360 A1 | 1/2003 | Tai et al. |
| 2003/0094607 A1 | 5/2003 | Guenther et al. |
| 2003/0128351 A1 | 7/2003 | Schmidt |
| 2003/0132391 A1 | 7/2003 | Agano |
| 2003/0227635 A1 | 12/2003 | Muller |
| 2004/0178325 A1 | 9/2004 | Forrest et al. |
| 2004/0190117 A1 | 9/2004 | Kubaink |
| 2004/0216625 A1 | 11/2004 | Birnstock et al. |
| 2005/0052120 A1 | 3/2005 | Gupta et al. |
| 2005/0061957 A1 | 3/2005 | Kase |
| 2005/0122308 A1 | 6/2005 | Bell et al. |
| 2005/0184301 A1 | 8/2005 | Nagasaka et al. |
| 2005/0217720 A1 | 10/2005 | Rey-Mermet et al. |
| 2005/0227390 A1 | 10/2005 | Shtein et al. |
| 2005/0227406 A1 | 10/2005 | Shtein et al. |
| 2005/0268957 A1 | 12/2005 | Enomoto et al. |
| 2005/0269616 A1 | 12/2005 | Andriessen |
| 2006/0044546 A1 | 3/2006 | Lewin et al. |
| 2006/0049397 A1 | 3/2006 | Pfeiffer et al. |
| 2006/0065833 A1 | 3/2006 | Craig et al. |
| 2006/0075585 A1 | 4/2006 | Krieger et al. |
| 2006/0082546 A1 | 4/2006 | Wey |
| 2007/0008515 A1 | 1/2007 | Otani et al. |
| 2007/0010924 A1 | 1/2007 | Otani et al. |
| 2007/0046625 A1 | 3/2007 | Yee |
| 2007/0080925 A1 | 4/2007 | Radivojevic et al. |
| 2007/0109558 A1 | 5/2007 | Harding |
| 2007/0122927 A1 | 5/2007 | Li et al. |
| 2007/0176165 A1 | 8/2007 | Forrest et al. |
| 2007/0183047 A1 | 8/2007 | Phillips et al. |
| 2007/0206181 A1 | 9/2007 | Arenberg et al. |
| 2008/0013005 A1 | 1/2008 | Deane |
| 2008/0080789 A1 | 4/2008 | Marks |
| 2008/0106746 A1 | 5/2008 | Shpunt et al. |
| 2008/0118143 A1 | 5/2008 | Gordon et al. |
| 2008/0130005 A1 | 6/2008 | Waslowski et al. |
| 2008/0157965 A1 | 7/2008 | Shahar |
| 2008/0170750 A1 | 7/2008 | Gordon |
| 2008/0240502 A1 | 10/2008 | Freedman et al. |
| 2008/0259310 A1 | 10/2008 | Wada |
| 2008/0269482 A1 | 10/2008 | Pschirer et al. |
| 2008/0284925 A1 | 11/2008 | Han |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0066929 A1 | 3/2009 | Tropf |
| 2009/0097010 A1 | 4/2009 | Yamaguchi |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |
| 2009/0322677 A1 | 12/2009 | Lee et al. |
| 2010/0073462 A1 | 3/2010 | Lee et al. |
| 2010/0091263 A1 | 4/2010 | Kumagai et al. |
| 2010/0118123 A1 | 5/2010 | Freedman et al. |
| 2010/0141927 A1 | 6/2010 | Hashimoto et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0032365 A1 | 2/2011 | Yett |
| 2011/0055846 A1 | 3/2011 | Perez et al. |
| 2011/0096319 A1 | 4/2011 | Otani et al. |
| 2011/0099105 A1 | 4/2011 | Mennie et al. |
| 2011/0103215 A1 | 5/2011 | Hotta et al. |
| 2011/0122287 A1 | 5/2011 | Kunishige et al. |
| 2011/0123188 A1 | 5/2011 | Cardwell et al. |
| 2011/0127788 A1 | 6/2011 | Nakanishi |
| 2011/0181553 A1 | 7/2011 | Brown et al. |
| 2011/0194097 A1 | 8/2011 | Yamaguchi et al. |
| 2011/0248151 A1 | 10/2011 | Holcombe et al. |
| 2011/0284756 A1 | 11/2011 | Miko et al. |
| 2011/0286661 A1 | 11/2011 | Lee et al. |
| 2011/0297235 A1 | 12/2011 | Bergmann |
| 2011/0306413 A1 | 12/2011 | Bickerstaff et al. |
| 2011/0317146 A1 | 12/2011 | Gu et al. |
| 2012/0013885 A1 | 1/2012 | Yang et al. |
| 2012/0061587 A1 | 3/2012 | Wu |
| 2012/0062517 A1 | 3/2012 | Lai et al. |
| 2012/0063287 A1 | 3/2012 | Yamamoto et al. |
| 2012/0105690 A1 | 5/2012 | Waqas et al. |
| 2012/0160298 A1 | 6/2012 | Kanamoto et al. |
| 2012/0162410 A1 | 6/2012 | Vaillant |
| 2012/0206336 A1 | 8/2012 | Bruder |
| 2012/0242867 A1 | 9/2012 | Shuster |
| 2012/0249998 A1 | 10/2012 | Eisele et al. |
| 2012/0250137 A1 | 10/2012 | Maxik et al. |
| 2012/0262365 A1 | 10/2012 | Mallinson |
| 2012/0262696 A1 | 10/2012 | Eisele et al. |
| 2012/0289672 A1 | 11/2012 | Kastler et al. |
| 2012/0293651 A1 | 11/2012 | Kawamata et al. |
| 2012/0320160 A1 | 12/2012 | Drazic |
| 2013/0033579 A1 | 2/2013 | Wajs |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0242283 A1 | 9/2013 | Bailey et al. |
| 2013/0266210 A1 | 10/2013 | Morgan-Mar et al. |
| 2013/0271818 A1 | 10/2013 | Maxik et al. |
| 2014/0015242 A1 | 1/2014 | Forrest |
| 2014/0043610 A1 | 2/2014 | Engel et al. |
| 2014/0066656 A1 | 3/2014 | Bruder et al. |
| 2014/0078376 A1 | 3/2014 | Shuster |
| 2014/0124782 A1 | 5/2014 | Jung et al. |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0233028 A1 | 8/2014 | Englund |
| 2014/0291480 A1 | 10/2014 | Bruder et al. |
| 2014/0347442 A1 | 11/2014 | Wang et al. |
| 2014/0368726 A1 | 12/2014 | Gladnick |
| 2015/0029326 A1 | 1/2015 | Backman et al. |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0170400 A1 | 6/2015 | Seitz et al. |
| 2015/0286340 A1 | 10/2015 | Send et al. |
| 2015/0346911 A1 | 12/2015 | Christiansson |
| 2015/0372046 A1 | 12/2015 | Kim et al. |
| 2016/0084650 A1 | 3/2016 | Hsu et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0248021 A1 | 8/2016 | Sundarraj et al. |
| 2016/0255323 A1 | 9/2016 | Wajs |
| 2016/0266257 A1 | 9/2016 | Bruder et al. |
| 2016/0286199 A1 | 9/2016 | Wajs et al. |
| 2016/0320489 A1 | 11/2016 | Send et al. |
| 2016/0364015 A1 | 12/2016 | Send et al. |
| 2016/0377417 A1 | 12/2016 | Jovanovski et al. |
| 2017/0039793 A1 | 2/2017 | Send et al. |

(56) References Cited

U.S. PATENT DOCUMENTS

| | | | |
|---|---|---|---|
| 2017/0074652 A1 | 3/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0250334 A1 | 8/2017 | Hermes et al. |
| 2017/0263868 A1 | 9/2017 | Tanabe et al. |
| 2017/0309828 A1 | 10/2017 | Tanabe et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0044357 A1 | 2/2018 | Spielmann et al. |
| 2018/0067213 A1 | 3/2018 | Send et al. |
| 2018/0136319 A1 | 5/2018 | Send et al. |
| 2018/0182980 A1 | 6/2018 | Lennartz et al. |
| 2018/0210064 A1 | 7/2018 | Send et al. |
| 2018/0231376 A1 | 8/2018 | Send et al. |
| 2018/0238993 A1 | 8/2018 | Send et al. |
| 2018/0243045 A1 | 8/2018 | Franjic et al. |
| 2018/0249051 A1 | 8/2018 | Send et al. |
| 2018/0276843 A1 | 9/2018 | Send et al. |
| 2018/0329024 A1 | 11/2018 | Send et al. |
| 2018/0356501 A1 | 12/2018 | Send et al. |
| 2019/0129035 A1 | 5/2019 | Valouch et al. |
| 2019/0129036 A1 | 5/2019 | Valouch et al. |
| 2019/0140129 A1 | 5/2019 | Valouch et al. |
| 2019/0157470 A1 | 5/2019 | Send et al. |
| 2019/0170849 A1 | 6/2019 | Hermes et al. |
| 2019/0172964 A1 | 6/2019 | Hermes et al. |
| 2019/0198206 A1 | 6/2019 | Ter Maat et al. |
| 2019/0277703 A1 | 9/2019 | Valouch et al. |
| 2019/0339356 A1 | 11/2019 | Schildknecht et al. |
| 2019/0353767 A1 | 11/2019 | Eberspach et al. |
| 2020/0011995 A1 | 1/2020 | Send et al. |
| 2020/0348385 A1 | 11/2020 | Schindler et al. |
| 2020/0371237 A1 | 11/2020 | Schindler et al. |
| 2022/0357202 A1* | 11/2022 | Valouch | G01J 3/36 |
| 2022/0373641 A1* | 11/2022 | Eberspach | G01S 7/4804 |

FOREIGN PATENT DOCUMENTS

| | | |
|---|---|---|
| CA | 2196563 | 12/1996 |
| CN | 1270706 | 10/2000 |
| CN | 1677053 A | 10/2005 |
| CN | 1723564 A | 1/2006 |
| CN | 1777859 | 5/2006 |
| CN | 1809801 A | 7/2006 |
| CN | 1894976 | 1/2007 |
| CN | 1896686 A | 1/2007 |
| CN | 101129074 | 2/2008 |
| CN | 101290348 A | 10/2008 |
| CN | 101449181 | 6/2009 |
| CN | 101650173 A | 2/2010 |
| CN | 101655350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549380 | 7/2012 |
| CN | 102549381 A | 7/2012 |
| CN | 102737435 | 10/2012 |
| CN | 102833569 | 12/2012 |
| CN | 103106411 A | 5/2013 |
| CN | 103322910 A | 9/2013 |
| CN | 103403494 | 11/2013 |
| CN | 103492835 | 1/2014 |
| CN | 103649677 | 3/2014 |
| CN | 103650478 | 3/2014 |
| DE | 2 417 854 | 10/1974 |
| DE | 25 01 124 A1 | 8/1975 |
| DE | 32 03 613 | 8/1982 |
| DE | 32 25 372 A1 | 2/1983 |
| DE | 42 11 875 | 10/1993 |
| DE | 196 04 856 | 8/1997 |
| DE | 10146752 | 4/2002 |
| DE | 10 2005 043 627 A1 | 3/2007 |
| DE | 10 2005 053 995 | 5/2007 |
| DE | 10 2007 037 875 A1 | 2/2009 |
| DE | 10 2010 042 278 | 4/2012 |
| DE | 20 2012 009 070 | 1/2013 |
| DE | 10 2014 108 353 A1 | 12/2014 |
| EP | 0 112 169 A2 | 6/1984 |
| EP | 0 185 450 A2 | 6/1986 |
| EP | 0 309 631 | 4/1989 |
| EP | 0 754 930 A2 | 1/1997 |
| EP | WO 01/29576 A1 | 4/2001 |
| EP | 1 176 646 A1 | 1/2002 |
| EP | 1 191 819 | 3/2002 |
| EP | 1 330 117 | 7/2003 |
| EP | 1 373 272 | 1/2004 |
| EP | 1 667 246 A1 | 6/2006 |
| EP | 1 832 910 | 9/2007 |
| EP | 1 947 477 | 7/2008 |
| EP | 2 205 657 A1 | 7/2010 |
| EP | 2 220 141 A1 | 8/2010 |
| EP | 2 507 286 A2 | 10/2012 |
| EP | 2 527 866 A1 | 11/2012 |
| EP | 2 725 617 A1 | 4/2014 |
| EP | 2 781 931 | 9/2014 |
| EP | 2 813 324 | 12/2014 |
| EP | 2 818 493 A1 | 12/2014 |
| EP | 15 153 215 | 1/2015 |
| EP | 2 831 180 | 2/2015 |
| EP | 15 157 363 | 3/2015 |
| EP | 15 164 653 | 4/2015 |
| EP | 2 884 303 A1 | 6/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 008 421 | 4/2016 |
| EP | 3 008 757 | 4/2016 |
| EP | 3 036 503 | 6/2016 |
| EP | 3 045 935 | 7/2016 |
| GB | 2 432 723 | 5/2007 |
| JP | S59-50579 | 3/1984 |
| JP | 59-79805 | 5/1984 |
| JP | 61-89501 | 5/1986 |
| JP | S61-135280 | 6/1986 |
| JP | 61-186804 | 8/1986 |
| JP | 64-17485 | 1/1989 |
| JP | H02-170004 | 6/1990 |
| JP | 04-240817 | 8/1992 |
| JP | 5-48833 A | 2/1993 |
| JP | 05-240640 | 9/1993 |
| JP | 6-133321 | 5/1994 |
| JP | H06281452 A | 10/1994 |
| JP | 7-146113 | 6/1995 |
| JP | 7-318630 | 12/1995 |
| JP | 8-159714 | 6/1996 |
| JP | 8-292586 A | 11/1996 |
| JP | 10-26513 A | 1/1998 |
| JP | 10-221064 | 8/1998 |
| JP | H11-230860 | 8/1999 |
| JP | 11-257917 | 9/1999 |
| JP | 11-325825 | 11/1999 |
| JP | 3110095 | 11/2000 |
| JP | 2001-516150 | 9/2001 |
| JP | 2002-176191 | 6/2002 |

(56) References Cited

FOREIGN PATENT DOCUMENTS

| | | |
|---|---|---|
| JP | 2003-307407 | 10/2003 |
| JP | 2004-508691 | 3/2004 |
| JP | 2005-509909 | 4/2005 |
| JP | 2005-189087 | 7/2005 |
| JP | 2005-241340 A | 9/2005 |
| JP | 2005-296268 | 10/2005 |
| JP | 2006-514366 | 4/2006 |
| JP | 2006-337254 | 12/2006 |
| JP | 2007-521559 | 8/2007 |
| JP | 2007-530978 | 11/2007 |
| JP | 2008-522418 | 6/2008 |
| JP | 2008-164538 | 7/2008 |
| JP | 2009-257890 | 11/2009 |
| JP | 2010-081002 | 4/2010 |
| JP | 2010-218770 | 9/2010 |
| JP | 2010-531520 | 9/2010 |
| JP | 2011-503673 | 1/2011 |
| JP | 2011-027707 | 2/2011 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | 99-09603 | 2/1999 |
| WO | WO 02/076988 | 10/2002 |
| WO | WO 02/101838 A1 | 12/2002 |
| WO | 03/012371 A1 | 2/2003 |
| WO | WO 03/098617 | 11/2003 |
| WO | WO 2004/072909 | 8/2004 |
| WO | WO 2004/114112 A1 | 12/2004 |
| WO | WO 2005/106965 A1 | 11/2005 |
| WO | WO 2007/006717 | 1/2007 |
| WO | WO 2007/054470 A1 | 5/2007 |
| WO | WO 2008/122531 | 10/2008 |
| WO | WO 2008/145172 | 12/2008 |
| WO | WO 2009/013282 A1 | 1/2009 |
| WO | WO 2009/021859 | 2/2009 |
| WO | WO 2009/053291 A1 | 4/2009 |
| WO | WO 2009/058115 A1 | 5/2009 |
| WO | WO 2009/105801 | 9/2009 |
| WO | WO 2010-063521 | 6/2010 |
| WO | WO 2010/088032 A2 | 8/2010 |
| WO | WO 2010/094636 A1 | 8/2010 |
| WO | WO 2010/118409 | 10/2010 |
| WO | WO 2010/118450 | 10/2010 |
| WO | WO 2011/067192 A2 | 6/2011 |
| WO | WO 2011/083722 | 7/2011 |
| WO | WO 2011/091967 A2 | 8/2011 |
| WO | WO 2012/001628 A1 | 1/2012 |
| WO | WO 2012/046181 A1 | 4/2012 |
| WO | WO 2012/049038 A1 | 4/2012 |
| WO | WO 2012/085803 A1 | 6/2012 |
| WO | WO 2012/091814 | 7/2012 |
| WO | WO 2012/110924 A1 | 8/2012 |
| WO | WO 2012/115593 | 8/2012 |
| WO | WO 2012/139354 | 10/2012 |
| WO | 2012/152812 A1 | 11/2012 |
| WO | 2012/168395 A1 | 12/2012 |
| WO | WO 2006/134370 | 12/2012 |
| WO | WO 2013/009676 | 1/2013 |
| WO | WO 2013/090960 | 6/2013 |
| WO | WO 2013/091016 A1 | 6/2013 |
| WO | 2013/118037 A1 | 8/2013 |
| WO | WO 2013/116883 | 8/2013 |
| WO | WO 2013/144177 A1 | 10/2013 |
| WO | WO 2013/156101 A1 | 10/2013 |
| WO | 2013/170982 A1 | 11/2013 |
| WO | 2014/086722 A1 | 6/2014 |
| WO | 2014/097489 A1 | 6/2014 |
| WO | WO 2014/097181 A1 | 6/2014 |
| WO | WO 2014/123522 | 8/2014 |
| WO | 2014/178923 A2 | 11/2014 |
| WO | 2014/198623 A1 | 12/2014 |
| WO | 2014/198625 A1 | 12/2014 |
| WO | 2014/198626 A1 | 12/2014 |
| WO | 2014/198629 A1 | 12/2014 |
| WO | 2015/024871 A1 | 2/2015 |
| WO | WO 2015/081362 | 6/2015 |
| WO | WO 2015/091607 | 6/2015 |
| WO | WO 2015/150203 | 10/2015 |
| WO | WO 2015/150324 | 10/2015 |
| WO | WO 2015/150989 | 10/2015 |
| WO | WO 2015/159192 | 10/2015 |
| WO | WO 2015/161989 | 10/2015 |
| WO | WO 2015/162528 | 10/2015 |
| WO | WO 2015/176981 | 11/2015 |
| WO | WO 2015/177784 A2 | 11/2015 |
| WO | 2015/193804 A2 | 12/2015 |
| WO | 2016/005893 A1 | 1/2016 |
| WO | WO 2016/012274 | 1/2016 |
| WO | WO 2016/046034 | 3/2016 |
| WO | WO 2016/046350 | 3/2016 |
| WO | 2016/051323 A1 | 4/2016 |
| WO | WO 2016/066494 | 5/2016 |
| WO | 2016/092449 A1 | 6/2016 |
| WO | 2016/092454 A1 | 6/2016 |
| WO | WO 2016/083914 | 6/2016 |
| WO | WO 2016/120392 | 8/2016 |
| WO | WO 2016/146725 | 9/2016 |
| WO | WO 2017/089553 | 6/2017 |
| WO | WO 2017/144401 | 8/2017 |
| WO | WO 2018/077868 | 5/2018 |
| WO | WO 2018/091640 | 5/2018 |
| WO | WO 2018/096083 | 5/2018 |
| WO | WO 2018/115073 | 6/2018 |
| WO | WO 2018/146138 | 8/2018 |
| WO | WO 2018/146146 | 8/2018 |
| WO | WO 2018/167215 | 9/2018 |
| WO | WO 2018/193045 | 10/2018 |
| WO | WO 2019/002199 | 1/2019 |
| WO | WO 2019/011803 | 1/2019 |
| WO | WO 2019/038354 | 2/2019 |
| WO | WO 2019/042956 | 3/2019 |
| WO | WO 2019/042959 | 3/2019 |
| WO | WO 2019/072965 | 4/2019 |
| WO | WO 2019/096986 | 5/2019 |
| WO | WO 2019/115594 | 6/2019 |
| WO | WO 2019/115595 | 6/2019 |
| WO | WO 2019/115596 | 6/2019 |

OTHER PUBLICATIONS

Erwin Bacher, et al., "Synthesis and Characterization of Photo-Cross-Linkable Hole-Conducting Polymers", Macromolecules, vol. 38, 2005, pp. 1640-1647.

H. Bruce Goodbrand, et al., "Ligand-Accelerated Catalysis of the Ullmann Condensation: Application to Hole Conducting Triarylamines", J. Org. Chem., vol. 64, 1999, pp. 670-674.

Felix E. Goodson, et al., "Palladium-Catalyzed Synthesis of Pure, Regiodefined Polymeric Triarylamines", J. Am. Chem. Soc., vol. 121, 1999, pp. 7527-7539.

John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.

Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.

Ping-Hsin Huang, et al., "Synthesis and Characterization of new fluorescent two-photon absorption chromophores", J. Mater. Chem., vol. 16, 2006, pp. 850-857.

Qinglan Huang, et al., "Molecularly 'Engineered' Anode Adsorbates for Probing OLED Interfacial Structure-Charge Injection/Luminance Relationships: Large, Structure-Dependent Effects", J. Am. Chem. Soc., vol. 125, 2003, pp. 14704-14705.

A. Balionyte, et al., "Carbazolyl-substituted triphenyldiamine derivatives as novel photoconductive amorphous molecular materials", Journal of Photochemistry and Photobiology A: Chemistry, vol. 162, 2004, pp. 249-252.

G. R. A. Kumara, et al., "Fabrication of Dye-Sensitized Solar Cells Using Triethylamine Hydrothiocyanate as a CuI Crystal Growth Inhibitor", Langmuir, vol. 18, 2002, pp. 10493-10495.

(56) References Cited

OTHER PUBLICATIONS

Lukas Schmidt-Mende, et al., "Organic Dye for Highly Efficient Solid-State Dye-Sensitized Solar Cells", Adv. Mater., vol. 17, No. 7, 2005, pp. 813-815.
James Lindley, "Copper Assisted Nucleophilic Substitution of Aryl Halogen", Tetrahedron, vol. 40, No. 9, 1984, pp. 1433-1456.
Yunqi Liu, et al., "Synthesis and characterization of a novel bipolar polymer for light-emitting diodes", Chem. Commun., vol. 24, 1998, pp. 2747-2748.
Narukuni Hirata, et al., "Interface engineering for solid-state dye-sensitised nanocrystalline solar cells: the use of an organic redox cascade", Chem. Commun., vol. 5, 2006, pp. 535-537.
Qingjiang Yu, et al., "High-Efficiency Dye-Sensitized Solar Cells: the Influence of Lithium Ions on Exciton Dissociation, Charge Recombination, and Surface States", ACS Nano, vol. 4, No. 10, 2010, pp. 6032-6038.
Bin Peng, et al., "Systematic investigation of the role of compact $TiO_2$ solar cells", Coordination Chemistry Reviews, vol. 248, 2004, pp. 1479-1489.
Jiun Yi Shen, et al., "High $T_g$ blue emitting materials for electroluminescent devices", J. Mater. Chem., vol. 15, 2005, pp. 2455-2463.
Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.
V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.
U. Bach, et al., "Solid-state dye-sensitized mesoporous $TiO_2$ solar cells with high photon-to-electron conversion efficiencies", Nature, vol. 395, 1998, pp. 583-585.
John P. Wolfe, et al., "Rational Development of Practical Catalysts for Aromatic Carbon-Nitrogen Bond Formation", Acc. Chem. Res. vol. 31, 1998, pp. 805-818.
Bryant H. Yang, et al., "Palladium-Catalyzed amination of aryl halides and sulfonates", Journal of Organometallic Chemistry, vol. 576, 1999, pp. 125-146.
Zhong Hui Li, et al., "Synthesis and Functional Properties of Strongly Luminescent Diphenylamino End-Capped Oligophenylenes", J. Org. Chem., vol. 69, 2004, pp. 921-927.
Brian O'Regan, et al., "A low-cost, high-efficiency solar cell based on dye-sensitized colloidal $TiO_2$ films", Letters to Nature, vol. 353, 1991, pp. 737-740.
International Search Report dated Sep. 24, 2014 in PCT/EP2014/061682.
International Preliminary Report on Patentability and Written Opinion dated Dec. 15, 2015 in PCT/EP2014/061682.
International Preliminary Report on Patentability and Written Opinion dated Dec. 23, 2015 in PCT/EP2014/061695.
International Search Report and Written Opinion dated May 31, 2012 in PCT/IB2012/050592 filed on Feb. 9, 2012.
Supplementary European Search Report dated Nov. 19, 2014, issued in corresponding European Patent Application No. EP 12 74 6808.
Volker Viereck, et al., Large-area applications of optical MEMS: micromirror arrays guide daylight, optimize indoor illumination, Optical Components, Photonik International 2, 2009, pp. 48-49.
C.U. Murade, et al., "High speed adaptive liquid microlens array", Optics Express, vol. 20, No. 16, Jul. 30, 2012, pp. 18180-18187.
Jason Heikenfeld, et al., "Recent Progress in Arrayed Electrowetting Optics", Optics & Photonics News, vol. 20, No. 1, Jan. 1, 2009, pp. 20-26.
Tao Peng, "Algorithms and models for 3-D shape measurement using digital fringe projections", Dissertation, University of Maryland (College Park, Md.), Jan. 16, 2007, 268 pages (http://drum.lib.umd.edu//handle/1903/6654; http://en.wikipedia.org/wiki/Gray_code; http://en.wikipedia.org/wiki/Structured-light_3D_scanner).
Jie-Ci Yang et al., "An Intelligent Automated Door Control System Based on a Smart", Sensors, 2013, 13(5), pp. 5923-5936; doi: 10.3390/s130505923 www.mdpi.com/journal/sensors.

Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462 www.acsnano.org.
International Search Report and Written Opinion dated Oct. 31, 2014 in PCT/EP2014/067466 filed Aug. 15, 2014.
Paul Pargas, "Phenomena of Image Sharpness Recognition of CdS and CdSe Photoconductors" Journal of the Optical Society of America, vol. 54, No. 4, Apr. 1964, pp. 516-519.
Paul Pargas, "A Lens Measuring Method Using Photoconductive Cells" Journal of the SMPTE, vol. 74, Jun. 1965, pp. 501-504.
Jack T. Billings, "An Improved Method for Critical Focus of Motion-Picture Optical Printers" Journal of the SMPTE, vol. 80, Aug. 1971, pp. 624-628.
International Search Report dated Sep. 9, 2014 in PCT/EP2014/061688 filed Jun. 5, 2014.
Written Opinion of the International Searching Authority dated Sep. 9, 2014 in PCT/EP2014/061688 filed Jun. 5, 2014.
International Search Report and Written Opinion of the International Searching Authority dated Mar. 12, 2015 in PCT/EP2014/078155 Filed Dec. 17, 2014.
International Search Report and Written Opinion of the International Searching Authority dated May 16, 2014 in PCT/IB2013/061095.
Seigo Ito, et al., "High-Efficiency Organic-Dye-Sensitized Solar Cells Controlled by Nanocrystalline-$TiO_2$ Electrode Thickness", Adv. Mater., vol. 18, 2006, pp. 1202-1205.
Atte Haapalinna, et al., "Measurement of the Absolute Linearity of Photodetectors with a Diode Laser," Meas. Sci. Technol., 10, (1999) 1075-1078.
M. R. Andersen, et al., "Kinect Depth Sensor Evaluation for Computer Vision Applications",Electrical and Computer Engineering, Technical Report ECE-TR-6, Aarhus University, 2012, 39 pages.
Takumi Kinoshita, et al., "Wideband dye-sensitized solar cells employing a phosphine-coordinated ruthenium sensitizer", Nature Photonics, vol. 7, 2013, pp. 535-239.
Office Action dated Apr. 22, 2015 in Chinese Patent Application No. 201280018328.5 (submitting English translation only).
International Search Report and Written Opinion dated Sep. 3, 2014 in PCT/EP2014/061691.
International Preliminary Report on Patentability dated Sep. 25, 2015 in PCT/EP2014/061691.
Kuthirumal, S., et al., "Flexible Depth of Field Photography," IEEE Transactions on Pattern Analysis and Machine Intelligence, vol. 33, No. 1 (2011), pp. 58-71.
Hiura Shinsaku et al., "Depth Measurement by the Multi-Focus Camera," Computer Vision and Pattern Recognition, 1998. Proceedings. 1998 IEEE Computer Society Conference on Santa Barbara, CA, USA, Jun. 23-25, 1998, pp. 953-959.
International Preliminary Report on Patentability and Written Opinion dated Dec. 23, 2015 in PCT/EP2014/061688.
Denis Klimentjew, et al., "Multi Sensor Fusion of Camera and 3D Laser Range Finder for Object Recognition" 2010 IEEE International Conference on Multisensor Fusion and Integration for Intelligent Systems, 2010, pp. 236-241.
International Search Report and Written Opinion dated Nov. 21, 2014 in PCT/EP2014/067465.
"So funktioniert die DLP-Technologie" DLP-Technologie—www.dlp.com/de/technology/how-dlp-works, 2014, 2 Pages.
"NEW—Ultra-Compact Pockels Cells with Brewster Polarizer and Waveplate for Laser Q-Switching" Leysop Ltd, Manfacturers and Suppliers of Electro-Optic Components—http://www.leysop.com/integrated_pockels_cell.htm, Aug. 4, 2013, 2 Pages.
D. Scaramuzza, et al., "Extrinsic Self Calibration of a Camera and a 3D Laser Range Finder from Natural Scenes" 2007 IEEE/RSJ International Conference on Intelligent Robots and Systems, 2007, (4164-4169) 8 pages.
International Search Report dated Aug. 28, 2015, in PCT/IB2015/052769, filed Apr. 16, 2015.
International Search Report and Written Opinion dated Jun. 30, 2015 in PCT/IB15/052233 Filed Mar. 26, 2015.

(56) References Cited

OTHER PUBLICATIONS

International Search Report dated Sep. 22, 2015, in Application No. PCT/IB2015/052785, filed on Apr. 16, 2015.
International Search Report dated Nov. 27, 2015, in PCT/IB2015/055121, filed Jul. 7, 2015.
International Search Report and Written Opinion dated Mar. 29, 2016, in PCT/IB2015/054536, filed Jun. 16, 2015.
International Search Report and Written Opinion dated Jan. 18, 2016 in PCT/IB2015/057412 filed Sep. 28, 2015.
Wang, Feng-Peng et al., "Distance Measurement using Digital Cameras Based on Laser Spot Detection", published on Jun. 30, 2011, School of Physicsand Electronic Information, Gannan Normal University, Ganzhou 341000, China (with English Abstract).
Bahaa E. A. Saleh, et al., "Fundamentals of Photonics" John Wiley & Sons, INC., Chapter 3, 1991, pp. 80-107 (with Cover Page).
International Search Report dated Mar. 21, 2016, in PCT/IB2015/059406.
International Search Report and Written Opinion in PCT/IB2015/059411 dated Mar. 16, 2016 filed Dec. 7, 2015.
Nam-Trung Nguyen, "Micro-optofluidic Lenses: A review", Biomicrofluidics, 2010, vol. 4, 031501-15.
Uriel Levy et al., "Tunable optofluidic devices", Microfluid Nanofluid, 2008, vol. 4, pp. 97-105.
International Search Report dated Mar. 22, 2016 in PCT/IB2015/059408 filed Dec. 7, 2015.
International Search Report dated Mar. 15, 2016 in PCT/IB2015/059404 filed Dec. 7, 2015.
International Search Report and Written Opinion dated Mar. 21, 2016, in PCT/IB2015/059403, filed Dec. 7, 2015.
International Preliminary Report and Written Opinion dated Mar. 10, 2016, in PCT/IB2015/059404.
International Search Report and Written Opinion dated May 27, 2016, in PCT/EP2016/051817, filed Jan. 28, 2016.
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for High-Efficiency Organic Solar Cells", Progress in Polymer Science, vol. 37, 2012, pp. 1292-1331.
Antonio Facchetti, "Polymer donor-polymer acceptor (all-polymer) solar Cells", Materials Today, vol. 16 No. 4, Apr. 2013, pp. 123-132.
Graham H. Carey, et al., "Colloidal Quantum Dot Solar Cells", Chemical Reviews, vol. 115 No. 23, 2015, pp. 12732-12763.
Jason P. Clifford, et al., "Fast, Sensitive and Spectrally Tunable Colloidal Quantum-Dot Photodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Güunes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry and Physics, vol. 65, 2000, pp. 1-31.
Wilfried Hermes, "Emerging Thin-Film Photovoltaic Technologies", Chemie Ingenieur Technik, 2015, vol. 87 No. 4, pp. 376-389.
Paul H. Keck, "Photoconductivity in Vacuum Coated Selenium Films", Journal Optical Society of America, vol. 42 No. 4, Apr. 1952, pp. 221-225, with cover page.
Frank H. Moser, et al., "Phthalocyanine Compounds", Reinhold Publishing Corporation, 1963, p. 69-76 with cover pages.
M. Popescu, "Disordered Chalcogenide Optoelectronic Materials: Phenomena and Applications", Journal of Optoelectronics and Advanced Materials, vol. 7 No. 4, Aug. 2005, pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1-127.
F. Stöckmann, "Superlinear Photoconductivity", Physica Status Solidi, vol. 34, 1969, pp. 751-757.
Evangelos Theocharous, "Absolute Linearity Measurements on a PbS Detector in the Infrared", Applied Optics, vol. 45 No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20, 2004, pp. 4182-4188.
Arthur L.Thomas, "Phthalocyanine Research and Applications", CRC Press, 1990, pp. 253-271 with cover pages.
International Search Report and Written Opinion dated Jul. 19, 2016 in PCT/EP2016/058487 filed Apr. 18, 2016.
International Preliminary Report on Patentability and Written Opinion dated Feb. 1, 2018, in PCT/EP2016/066783.
http://www.plenoptic.info/pages/refocusing.html.
C. Hahne, A. Aggoun, S. Haxha, V. Velisavljevic, and J. Fernández, "Light field geometry of a standard plenoptic camera," Opt. Express 22, 26659-26673 (2014).
C. Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission and Display of 3D Video (3DTV-CON), Jul. 2-4, 2014.
C. Hahne, A. Aggoun, and V. Velisavljevic, "The refocusing distance of a standard plenoptic photograph," in 3D-TV-Conference: The True Vision—Capture, Transmission and Display of 3D Video (3DTV-CON), Jul. 8-10, 2015.
C. Hahne and A. Aggoun, "Embedded FIR filter design for real-time refocusing using a standard plenoptic video camera," Proc. SPIE 9023, in Digital Photograghy X, 902305 (Mar. 7, 2014).
Baeg et al., "Organic Light Detectors: Photodiodes and Phototransistors", Advanced Materials, vol. 25, No. 31, Mar. 11, 2013, pp. 4267-4295.
Office Action dated Jan. 3, 2018, in Chinese Patent Application No. 201610552144.7 parallel to U.S. Appl. No. 15/364,680.
International Preliminary Report on Patentability and Written Opinion dated Feb. 22, 2018 in PCT/EP2016/069049).
Office Action dated Mar. 5, 2018, in corresponding Chinese Patent Application No. 201480056299.0.
R. M. Schaffert, "A New High-Sensitivity Organic Photoconductor for Electrophotography", IBM J. Res. Develop., 1971, p. 75-89.
P. Gregory, Ed., Chemistry and Technology of printing and imaging systems, Chapman & Hall, 1996, Chap. 4, R.S. Gairns, Electrophotography, p. 76-112.
International Search Report and Written Opinion dated Nov. 17, 2016, in PCT/EP2016/071628, filed Sep. 14, 2016.
"Telezentrisches Objektiv" Retrieved from the Internet: https://de.wikipedia.org/wiki/Telezentrisches_Objektiv. Date of retrieval: Sep. 11, 2015, 3 Pages. (Cited on p. 53, line No. 40 in the Specification of related case U.S. Appl. No. 15/758,135).
Benjamin F. Grewe, et al., "Fast Two-Layer Two-Photon Imaging of Neuronal Cell Populations Using an Electrically Tunable Lens," Biomedical Optics Express, vol. 2, No. 7, Jul. 1, 2011 (pp. 2035-2046).
Petr Bartu et al., "Conformable Large-AreaPposition-Sensitive Photodetectors Based on Luminescence-Collecting Silicone Waveguides, "Journal of Applied Physics, 107, 123101 (2010).
Roland Stolarski, "Fluorescent Naphthalimide Dyes for Polyester Fibres," Fibres & Textiles in Eastern Europe, vol. 17, No. 2 (73) pp. 91-95 (2009).
Ayse Aktas et al., "Synthesis, Characterization, Electrochemical and Spectroelectrochemical Properties of Peripherally Tetra-Substituted Metal-Free and Metallophthalocyanines," Dyes and Pigments, 99, (2013) 613-619.
Hairong Li, et al., "Syntheses and Properties of Octa-, Tetra-, and Di-Hydroxy-Substituted Phthalocyanines," Tetrahedron, 65 (2009) 3357-3363.
"Methine Dyes and Pigments," Ullmann's Encyclopedia of Industrial Chemistry, vol. 23 (2012).
Jing Liu, et al., "Sulfone-Rhodamines: A New Class of Near-Infrared Fluorescent Dyes for Bioimagin," ACS Applied Materials& Interfaces, 8, 22953-22962 (2016).

(56) References Cited

OTHER PUBLICATIONS

E. Noelting et al., "Berichte derdeutschen chemischen Gesellschaft", *Band*, 38, S. 3516-3527 (1905).
T. Nedelcev et al., "Preparation and Characterization of a New Derivative of Rhodamine B with an Alkoxysilane Moiety," *Dyes and Pigments*, 76 (2008), 550-556.
Aurore Loudet et al., "BODIPY Dyes and Their Derivatives: Syntheses and Spectroscopic Properties," *Chem.Rev.*, 107 (2007) 4981-4932.
Weili Zhao, et al., "Conformationally Restricted Aza-Bodipy: A Highly fluorescent, Stable, Near-Infrared-Absorbing Dye", *Angew. Chem. Int. Ed.*, 44 (2005) 1677-1679.
Georg M. Fischer, et al., "Near-Infrared Dyesand Fluorophores Based on Diketopyrrolopyrroles," *Angew. Chem. Int. Ed.* 46 (2007) 3750-3753.
Amaresh Mishra et al., "Small Molecule Organic Semiconductors on the Move: Promises for Future Solar Energy Technology," *Angew. Chem. Int. Ed.*, 51, (2012), 2020-2067.
G. Seybold et al., "New Perylene and Violanthrone Dyestuffs for Fluorescent Collectors," *Dyes and Pigments*, 11 (1989) 303-317.
Nam-Trung Nguyen, "Micro-Optofluidic Lenses: A Review", *Biomicrofluidics*, 4, (2010) 031501.
Uriel Levy et al., "Tunable Optofluidic Devices," *Microfluid Nanofluid* (2008) 4: 97-105.
Robert Koeppe et al., "Video-Speed Detection of the Absolute Position of a Light Point on a Large-Area Photodetector Based on Luminescent Waveguides," *Optics Express*, vol. 18, No. 3, (Feb. 1, 2010), 2209.
Office Action dated Jul. 9, 2018, in Japanese Patent Application No. 2017-007544.
Xing Lin, et al., "Coded focal stack photography", Computational Photography (ICCP), 2013 IEEE International Conference On, Apr. 19, 2013, XP032424246, pp. 1-9.
Nabeel A. Riza, et al., "Noncontact distance sensor using spatial signal processing", Optics Letters, Optical Society of America, vol. 34, No. 4, Feb. 15, 2009, XP001522006, pp. 434-436.
Nabeel A. Riza, et al., "Smart agile lens remote optical sensor for three-dimensional object shape measurements", Applied Optics, Optical Society of America, vol. 49, No. 7, Mar. 1, 2010, XP001552714, pp. 1139-1150.
International Search Report dated Nov. 7, 2017, in corresponding PCT/EP2017/057867.
International Search Report dated Jul. 7, 2017, in corresponding PCT/EP2017/057825.
Street (Ed.): Technology and Applications of Amorphous Silicon, Springer-Verlag Heidelberg, 2010, pp. 346-349.
International Search Report dated Aug. 17, 2017, in corresponding PCT/EP2017/060057.
International Search Report dated Aug. 1, 2017, in corresponding PCT/EP2017/060058.
Walter Fuhs, "Hydrogenated Amorphous Silicon—Material Properties and Device Applications", in S. Baranovski, Charge Transport in Disordered Solids, Wiley, p. 97-147, 2006.
Office Action dated Dec. 18, 2018, in Japanese Patent Application No. 2016-518930.
A.G. Pattantyus-Abraham, I.J. Kramer, A.R. Barkhouse, X. Wang, G. Konstantatos, R. Debnath, L. Levina, I. Raabe, M.K. Nazeeruddin, M. Grätzel, and E.H. Sargent, *Depleted-Heterojunction Colloidal Quantum Dot Solar Cells*, ACS Nano 4 (6), May 24, 2010.
R. Martins and E. Fortunato, *Thin Film Position Sensitive Detectors: from 1D to 3D Applications*, Chap. 8 in R. A. Street (Ed.), *Technology and Applications of Amorphous Silicon*, Springer, 2010.
International Search Report dated Oct. 20, 2017 in PCT/EP2017/068956 filed on Jul. 27, 2017.
Leskela, M. et al., "Preparation of lead sulfide thin films by the atomic layer epitaxy process," Pergamon Press plc, Vacuum/vol. 41/Nos. 4-6, pp. 1457-1459 (1990).

Dasgupta, N. et al., "Fabrication and Characterization of Lead Sulfide Thin Films by Atomic Layer Deposition," The Electrochemical Society, ECS Transactions, 16 (4) 29-36 (2008), Total 8 pages.
Dasgupta, N. et al., "Design of an atomic layer deposition reactor for hydrogen sulfide compatibility," Review of Scientific Instruments 81, 044102 (2010), Total 6 pages.
Xu, J. et al., "Atomic layer deposition of absorbing thin films on nanostructured electrodes for short-wavelength infrared photosensing," AIP Publishing, Applied Physics Letters 107, 153105 (2015), Total 5 pages.
Blount, G., et al., "Photoconductive properties of chemically deposited PbS with dielectric overcoatings," AIP Publishing, Journal of Applied Physics 46, 3489 (1975), Total 12 pages.
Groner, M. et al., "Low-Temperature Al2O3 Atomic Layer Deposition," American Chemical Society, Chem. Mater., vol. 16, No. 4, 2004, pp. 639-645.
Yoon, W. et al., "Electrical Measurement Under Atmospheric Conditions of PbSe Nanocrystal Thin Films Passivated by Remote Plasma Atomic Layer Deposition of Al2O3," IEEE Transactions on Nanotechnology, vol. 12, No. 2, Mar. 2013, pp. 146-151.
Hu, C., et al., "Air-stable short-wave infrared PbS colloidal quantum dot photoconductors passivated with Al2O3 atomic layer deposition," AIP Publishing, Applied Physics Letters 105, 171110 (2014), Total 5 pages.
Liu, Y., et al., "Robust, Functional Nanocrystal Solids by Infilling with Atomic Layer Deposition," ACS Publications, American Chemical Society, Nano Letters 2011, 11, pp. 5349-5355.
Liu, Y., et al., "PbSe Quantum Dot Field-Effect Transistors with Air-Stable Electron Mobilities above 7 $cm^2$ $V^{-1}$ $s^{-1}$," ACS Publications, American Chemical Society, Nano Letters 2013, 13, pp. 1578-1587.
George, S., "Atomic Layer Deposition: An Overview," American Chemical Society, Chem. Rev. 2010, 110, pp. 111-131.
Konstantatos, G., et al., "Engineering the Temporal Response of Photoconductive Photodetectors via Selective Introduction of Surface Trap States," American Chemical Society, Nano Letters 2008, vol. 8, No. 5, pp. 1446-1450.
Soci, C., et al., "ZnO Nanowire UV Photodetectors with High Internal Gain," American Chemical Society, Nano Letters 2007, vol. 7, No. 4, pp. 1003-1009.
List of integrated circuit packaging types (Wikipedia article, downloaded Jan. 15, 2019 from https://en.wikipedia.org/wiki/List_of_integrated_circuit_packaging_types).
List of integrated circuit packaging types, Dimension Reference (Wikipedia article, downloaded Jan. 15, 2019 from https://en.wikipedia.org/wiki/List_of_integrated_circuit_packaging_types#PIN-PITCH).
*Wikipedia*, Article denoted, "Thermocouple", retrieved Jul. 20, 2016.
Chinese Office Action dated Jan. 29, 2019, in Chinese Patent Application No. 201580036919.9.
Pekkola et al., "Focus-Induced Photoresponse: a novel way to measure distances with photodetectors", *Scientific Reports* (2018) 8:9208, 8 pages.
L. Pintilie, et al., "Field-effect-assisted photoconductivity in PbS films deposited on silicon dioxide", *J. Appl. Phys.* 91, p. 5782, 2002.
Kurt Konolige et al., "A Low-Cost Laser Distance Sensor", *2008 IEEE International Conference on Robotics and Automation*, Pasadena, CA, May 19-23, 2008.
X. Jiang et al., Dreidimensionales Computersehen, Chapter 2, Springer, Berlin Heidelberg (1997).
Ikeoka, et al., "Real-Time Depth Estimation with Wide Detectable Range Using Horizontal Planes of Sharp Focus Proceedings", ACIVS 2011: Advanced Concepts for Intelligent Vision Systems, pp. 669-680 (with partial English translation) (https://link.springer.com/chapter/10.1007/978-3-642-23687-7_60).

\* cited by examiner

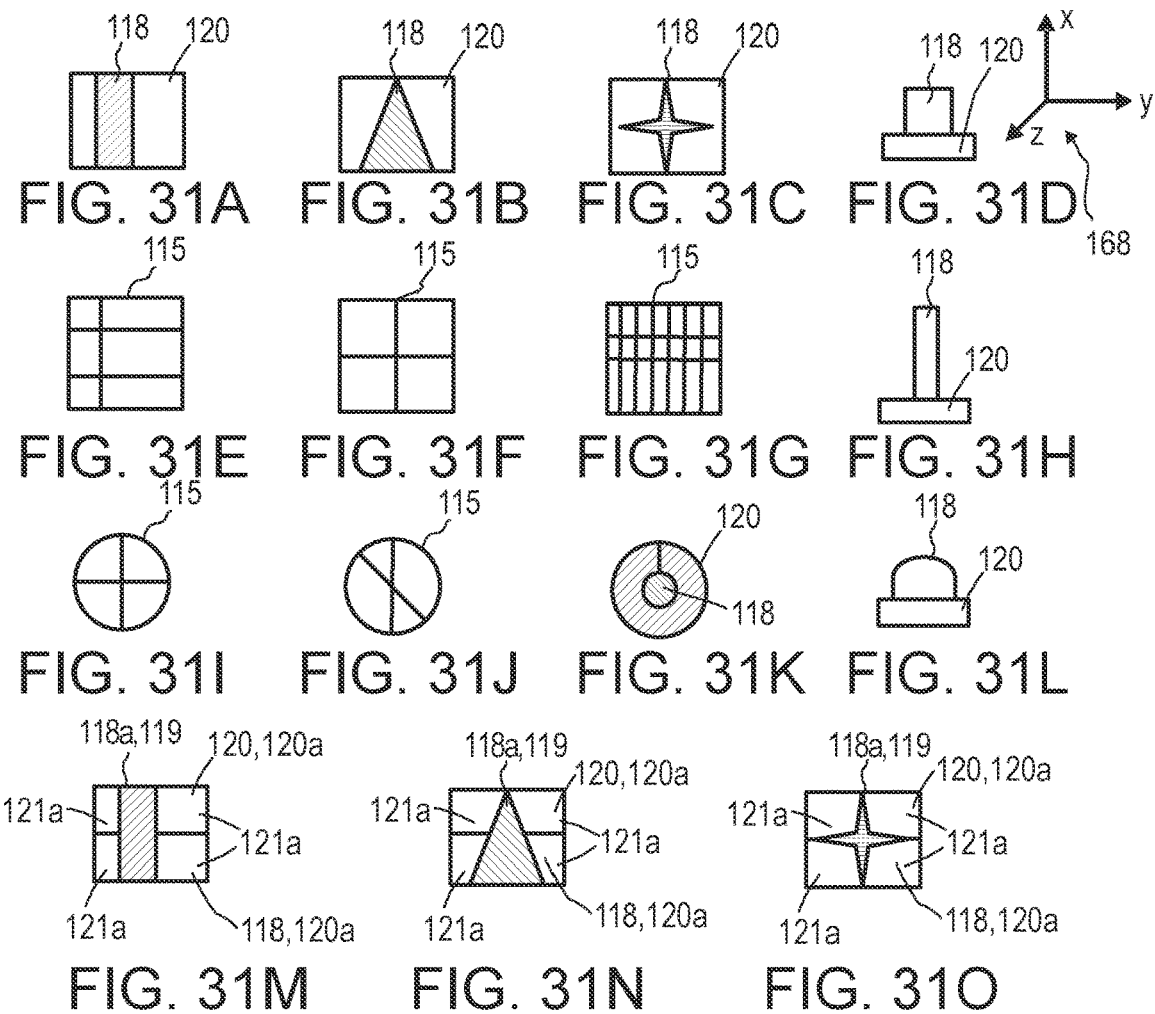
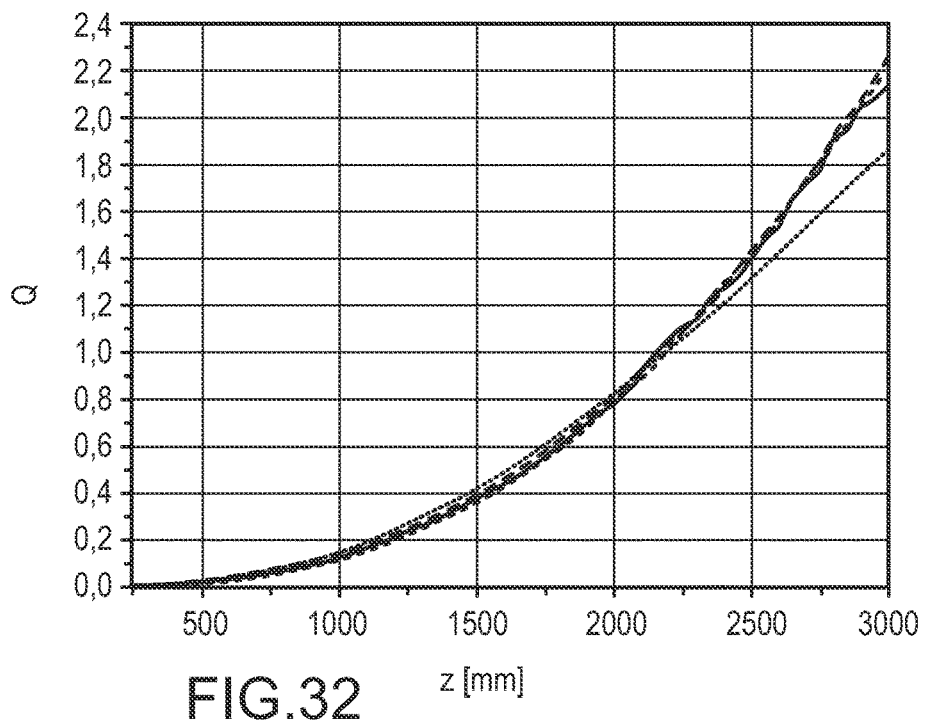
FIG.32

DETECTOR FOR OPTICALLY DETECTING AT LEAST ONE OBJECT

CROSS-REFERENCE TO RELATED APPLICATIONS

The present application is a continuation of U.S. application Ser. No. 16/461,670, filed May 16, 2019, which is a national phase application of PCT Application No. PCT/EP2017/079564, filed on Nov. 17, 2017, which claims the benefit of the filing date of EP Application No. EP16199397.7, filed Nov. 17, 2016, EP Application No. 16199398.5, filed Nov. 17, 2016, EP Application No. 16199399.3, filed Nov. 17, 2016, EP Application No. 17161334.2, filed on Mar. 16, 2017, EP Application No. EP17195398.7, filed Oct. 9, 2017, and EP Application No. EP17195427.4, filed Oct. 9, 2017, the disclosures of which are hereby incorporated by reference in their entirety herein.

FIELD OF THE INVENTION

The invention relates to a detector, a detector system and a method for determining a position of at least one object. The invention further relates to a human-machine interface for exchanging at least one item of information between a user and a machine, an entertainment device, a tracking system, a camera, a scanning system and various uses of the detector device. The devices, systems, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

A large number of optical sensors and photovoltaic devices are known from the prior art. While photovoltaic devices are generally used to convert electromagnetic radiation, for example, ultraviolet, visible or infrared light, into electrical signals or electrical energy, optical detectors are generally used for picking up image information and/or for detecting at least one optical parameter, for example, a brightness.

A large number of optical sensors which can be based generally on the use of inorganic and/or organic sensor materials are known from the prior art. Examples of such sensors are disclosed in US 2007/0176165 A1, U.S. Pat. No. 6,995,445 B2, DE 2501124 A1, DE 3225372 A1, US 2007/0176165 A1, WO 2009/013282 A1, WO 2012/110924 A1, WO 2014/097181 A1, WO 2015/024871 A1, U.S. Pat. No. 4,767,211, WO 2014/198629 A1, WO 2014/198626 A1, WO 2014/198629 A1 and WO 2014/198625 A1, the full content of which is herewith included by reference. Further, referring to potential materials and optical sensors which may also be employed in the context of the present invention, reference may be made to European patent applications EP 15 153 215.7, filed on Jan. 30, 2015, EP 15 157 363.1, filed on Mar. 3, 2015, EP 15 164 653.6, filed on Apr. 22, 2015, EP 15177275.3, filed on Jul. 17, 2015, EP 15180354.1 and EP 15180353.3, both filed on Aug. 10, 2015, and EP 15 185 005.4, filed on Sep. 14, 2015, EP 15 196 238.8 and EP 15 196 239.6, both filed on Nov. 25, 2015, EP 15 197 744.4, filed on Dec. 3, 2015, the full content of all of which is herewith also included by reference.

Further, reference may be made to detector concepts comparing signals of at least two different sources for determining a position of an object. Thus, as an example, reference may be made to EP 16155834.1, EP 16155835.8 or EP 16155845.7, all filed on Feb. 16, 2016, the full disclosure of which is herewith included by reference. Further, P. Bartu, R. Koeppe, N. Arnold, A. Neulinger, L. Fallon, and S. Bauer, Conformable large-area position-sensitive photodetectors based on luminescence collecting silicone waveguides, J. Appl. Phys. 107, 123101 (2010), describe a kind of position sensitive detector (PSD) device which might be suitable for large areas and on curved surfaces.

For example, U.S. Pat. No. 5,323,222 A describes a distance measuring device contains a light-projecting section for projecting luminous flux onto a subject. A light-receiving section is placed the base length away from the light-projecting section, receives the reflected rays of light from the subject, and produces a photoelectric current according to the amount of light received. The light-receiving section is divided into at least four light-receiving elements by a first dividing line that crosses the base length at right angles and by a second dividing line that crosses the first dividing line obliquely. A first ratio calculating section calculates the ratio of the sum of the photoelectric currents generated by the light-receiving elements on one side of the first dividing line to the sum of the photoelectric currents produced by the light-receiving elements on the other side. A second ratio calculating section calculates the ratio of the sum of the photoelectric currents generated by the light-receiving elements on one side of the second dividing line to the sum of the photoelectric currents produced by the light-receiving elements on the other side. A distance-determining section calculates the sum of the outputs of the first and second ratio calculating sections, and based on the resulting value, determines the distance from the device to the subject.

U.S. Pat. No. 4,675,517 A describes a photosensitive element having first and second sensitive regions arranged to receive a light spot in such a way that as the light spot lies astride the boundary there between, the ratio of the areas of the two parts of the spot light which are received by the first and second sensitive regions, respectively, varies depending on the received position of the light spot, whereby the received position of the light spot is detected from the variation of the ratio of the outputs of the first and second sensitive regions, wherein an error of variation of the ratio of the outputs of the first and second sensitive regions for the received position of the light spot, which takes place when the diameter of the received spot light is so large as to overrun the first and second sensitive regions, is corrected by providing a supplementary sensitive region surrounding the first or second sensitive region.

WO 2015/024871 A1 describes an optical detector. The optical detector comprising:—at least one spatial light modulator being adapted to modify at least one property of a light beam in a spatially resolved fashion, having a matrix of pixels, each pixel being controllable to individually modify the at least one optical property of a portion of the light beam passing the pixel;—at least one optical sensor adapted to detect the light beam after passing the matrix of pixels of the spatial light modulator and to generate at least one sensor signal;—at least one modulator device adapted for periodically controlling at least two of the pixels with different modulation frequencies; and—at least one evaluation device adapted for performing a frequency analysis in order to determine signal components of the sensor signal for the modulation frequencies.

However, determination of distance to an object using these known methods and devices depends on the object size. In particular, the optical sensors may show a luminance dependency which renders the evaluation of the measurement result more difficult, and, additionally, may dependent on a target spot size. Dependency on object size may result in susceptibility of distance determination on manufacturing tolerances and environmental conditions. Furthermore, these methods and devices require a large baseline, and thus, large dimensions in order to reach a reliable distance value.

Problem Addressed by the Invention

It is therefore an object of the present invention to provide devices and methods facing the above-mentioned technical challenges of known devices and methods. Specifically, it is an object of the present invention to provide devices and methods which reliably may determine a position of an object in space, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a detector for determining a position of at least one object is disclosed. As used herein, the term "object" refers to a point or region emitting at least one light beam. The light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object. As used herein, the term "position" refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
- at least one transfer device, wherein the transfer device has at least one focal length in response to at least one incident light beam propagating from the object to the detector;
- at least two optical sensors, wherein each optical sensor has at least one light sensitive area, wherein each optical sensor is designed to generate at least one sensor signal in response to an illumination of its respective light-sensitive area by the light beam,
- at least one evaluation device being configured for determining at least one longitudinal coordinate z of the object by evaluating a quotient signal Q from the sensor signals.

The detector may be adapted to determine the longitudinal coordinate z of the object in at least one measurement range independent from the object size in an object plane.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. As used herein, the term "at least two optical sensors each having at least one light sensitive area" refers to configurations with two single optical sensors each having one light sensitive area and to configurations with one combined optical sensor having at least two light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the set-up. Other embodiments, however, are feasible. Thus, as an example, an optical device comprising two, three, four or more than four light-sensitive areas may be used which is regarded as two, three, four or more than four optical sensors in the context of the present invention. As an example, the optical device may comprise a matrix of light-sensitive areas. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to an optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

The light beam may propagate from the object towards the detector. As will be outlined in further detail below, the light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object and, thereby, is at least partially directed towards the detector. The illumination source, as an example, may be or may comprise one or more of an external illumination source, an illumination source integrated into the detector or an illumination source integrated into a beacon device being one or more of attached to the object, integrated into the object or held by the object. Thus, the detector may be used in active and/or passive illumination scenarios. For example, the illumination source may be adapted to illuminate the object, for example, by directing a light beam towards the object, which reflects the light beam. Additionally or alternatively, the object may be adapted to generate and/or to emit the at least one light beam. The light source may be or may comprise at least one multiple beam light source. For example, the light source may comprise at least one laser source and one or more diffractive optical elements (DOEs).

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. As used herein, the term "beam profile" generally refers to a transverse intensity profile of the light beam. The light beam specifically may be a Gaussian light beam or a linear combination of Gaussian light beams, as will be outlined in further detail below. Other embodiments are feasible, however. The transfer device may be configured for one or more of adjusting, defining and determining the beam profile, in particular a shape of the beam profile.

The light beam may be a monochromatic light beam. The light beam may comprise a narrow band of wavelengths, preferably the light beam may comprise a single wavelength. The at least one light source may be adapted to generate at least one monochromatic light beam and/or the detector may comprise at least one filter element adapted to filter a narrow band of wavelength, such as a monochromator.

The illumination source may be adapted to generate at least one illumination pattern for illuminating the object. Additionally or alternatively, the illumination pattern may be generated by at least one ambient light source. The detector may be configured such that the illumination pattern propagates from the detector, in particular from at least one opening of the housing, towards the object along and/or parallel to an optical axis of the detector. For this purpose, the detector may comprise at least one reflective element, preferably at least one prism, for deflecting the illumination pattern such that it propagates along or parallel to the optical axis. Specifically, the illumination source may comprise at least one laser and/or laser source. Various types of lasers may be employed, such as semiconductor lasers. Additionally or alternatively, non-laser light sources may be used, such as LEDs and/or light bulbs. As used herein, the term "pattern" refers to an arbitrary known or pre-determined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "illumination pattern" refers to a pattern which illuminates the object. The illumination pattern may be generated by ambient light, such as by at least one ambient light source, or by the at least one illumination source. The illumination pattern may comprise at least one pattern selected from the group consisting of: at least one point pattern, in particular a pseudo-random point pattern, a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines; at least one fringe pattern. For example, the illumination source may be adapted to generate and/or to project a cloud of points. The illumination pattern may comprise regular and/or constant and/or periodic pattern such as a triangular pattern, a rectangular pattern, a hexagonal pattern, or a pattern comprising further convex tilings. The illumination pattern may comprise as much as possible features per area such that a hexagonal pattern may be preferred. A distance between two features of the illumination pattern and/or an area of the at least one illumination feature may depend on the circle of confusion in the image.

The illumination source may comprise one or more of at least one light projector; at least one digital light processing (DLP) projector, at least one LCoS projector, at least one spatial light modulator; at least one diffractive optical element; at least one array of light emitting diodes; at least one array of laser light sources. The illumination source may comprise at least one light source adapted to generate the illumination pattern directly. For example, the illumination source may comprise at least one laser source. For example, the illumination source may comprise at least one line laser. The line laser may be adapted to send a laser line to the object, for example a horizontal or vertical laser line. The illumination source may comprise a plurality of line lasers. For example, the illumination source may comprise at least two line lasers which may be arranged such that the illumination pattern comprises at least two parallel or crossing lines. The illumination source may comprise the at least one light projector adapted to generate a cloud of points such that the illumination pattern may comprise a plurality of point pattern. The illumination source may comprise at least one mask adapted to generate the illumination pattern from at least one light beam generated by the illumination source. The illumination source may be one of attached to or integrated into a mobile device such as a smartphone. The illumination source may be used for further functions that may be used in determining an image such as for an autofocus function. The illumination source may be attached to a mobile device such as by using a connector such as a USB- or phone-connector such as the headphone jack.

The illumination source may be adapted to generate pulsed illumination. The illumination source may be adapted to generate at least one light pulse. As used herein, the term "light pulse" or "pulsed illumination" refers to a light beam limited in time. The light pulse may have a pre-defined length or time duration, for example in the nanoseconds range. For example, the illumination source may be adapted to generate pulses with a pulse length of less than a nanosecond, such as a tenth of a nanosecond, up to a tenth of a second. The illumination source may be adapted to periodically generate the light pulse. For example, the illumination source may be adapted to generate the light pulse with a frequency of 10 Hz to 10 GHz.

The illumination source may be adapted to generate a pulsed light beam. For example, the illumination source may be adapted to generate a continuous illumination light beam and the detector may comprise at least one interruption device adapted to interrupt the illumination, in particular periodically. The interruption device may comprise at least one shutter and/or a beam chopper or some other type of mechanical or electronical periodic beam interrupting device, for example comprising at least one interrupter blade or interrupter wheel, which preferably rotates at constant speed and which can thus periodically interrupt the illumination. By way of example, the at least one interruption device can also be wholly or partly integrated into the illumination source. Various possibilities are conceivable.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes. As further used herein, the term "photosensitive element" generally refers to an element which is sensitive against illumination in one or more of the ultraviolet, the visible or the infrared spectral range. Specifically, the photosensitive element may be or may comprise at least one element selected from the group consisting of a photodiode, a photocell, a photoconductor, a phototransistor or any combination thereof. Any other type of photosensitive element may be used.

In view of the technical challenges involved in the prior art documents discussed above, specifically in view of the technical effort which is required for generating the so called FiP effect as described in WO 2015/024871 it has to be noted that the present invention specifically may be realized by using non-FiP optical sensors. In fact, since optical sensors having the FiP characteristic typically exhibit a strong peak in the respective sensor signals at a focal point, the range of measurement of a detector according to the present invention using FiP sensors as optical sensors may be limited to a range in between the two positions and which the first and second optical sensors are in focus of the light beam. When using linear optical sensors, however, i.e. optical sensors not exhibiting the FiP effect, this problem, with the setup of the present invention, generally may be avoided. Consequently, the first and second optical sensor may each have, at least within a range of measurement, a linear signal characteristic such that the respective first and second sensor signals may be dependent on the total power of illumination of the respective optical sensor and may be independent from a diameter of a light spot of the illumination. It shall be noted, however, that other embodiments are feasible, too.

The first and second optical sensors each specifically may be semiconductor sensors, preferably inorganic semiconductor sensors, more preferably photodiodes and most preferably silicon photodiodes. Thus, as opposed to complex and expensive FiP sensors, the present invention simply may be realized by using commercially available inorganic photodiodes, i.e. one small photodiode and one large area photodiode. Thus, the setup of the present invention may be realized in a cheap and inexpensive fashion.

However, embodiments are feasible in which the detector may comprise at least one FiP sensor adapted for generating the so called FiP effect as described in WO 2015/024871, as will be outlined in detail below.

The detector may further comprise at least one illumination source for illuminating the object. As an example, the illumination source may be configured for generating an illuminating light beam for illuminating the object. The detector may be configured such that the illuminating light beam propagates from the detector towards the object along an optical axis of the detector. For this purpose, the detector may comprise at least one reflective element, preferably at least one prism, for deflecting the illuminating light beam onto the optical axis.

The illumination source, specifically, may be configured for emitting light in the infrared spectral range. It shall be noted, however, that other spectral ranges are feasible, additionally or alternatively. Further, the illumination source, as outlined above, specifically may be configured for emitting modulated or non-modulated light. In case a plurality of illumination sources is used, the different illumination sources may have different modulation frequencies which, as outlined in further detail below, later on may be used for distinguishing the light beams. The illumination source may be adapted to generate and/or to project a cloud of points, for example the illumination source may comprise one or more of at least one digital light processing (DLP) projector, at least one LCoS projector, at least one spatial light modulator; at least one diffractive optical element; at least one array of light emitting diodes; at least one array of laser light sources.

Specifically, the illumination source may comprise at least one laser and/or laser source. Various types of lasers may be employed, such as semiconductor lasers. Additionally or alternatively, non-laser light sources may be used, such as LEDs and/or light bulbs. The illumination source may be adapted to generate and/or to project a cloud of points, for example the illumination source may comprise one or more of at least one digital light processing (DLP) projector, at least one LCoS projector, at least one spatial light modulator; at least one diffractive optical element; at least one array of light emitting diodes; at least one array of laser light sources. The illumination source and the optical sensors may be arranged in a common plane or in different planes. The illumination source and the optical sensors may have different spatial orientation. In particular, the illumination source and the optical sensors may be arranged in a twisted arrangement.

The illuminating light beam generally may be parallel to the optical axis or tilted with respect to the optical axis, e.g. including an angle with the optical axis. As an example, the illuminating light beam, such as the laser light beam, and the optical axis may include an angle of less than 10°, preferably less than 5° or even less than 2°. Other embodiments, however, are feasible. Further, the illuminating light beam may be on the optical axis or off the optical axis. As an example, the illuminating light beam may be parallel to the optical axis having a distance of less than 10 mm to the optical axis, preferably less than 5 mm to the optical axis or even less than 1 mm to the optical axis or may even coincide with the optical axis.

The detector comprises at least one transfer device. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensors. The transfer device specifically may comprise one or more of: at least one lens, for example at least one lens selected from the group consisting of at least one focus-tunable lens, at least one aspheric lens, at least one spheric lens, at least one Fresnel lens; at least one aspheric lens; at least one diffractive optical element; at least one concave mirror; at least one beam deflection element, preferably at least one mirror; at least one beam splitting element, preferably at least one of a beam splitting cube or a beam splitting mirror; at least one multi-lens system.

As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The detector comprises at least one transfer device, preferably at least one transfer system having at least one lens. The transfer system, as an example, may comprise at least one beam path, with the elements of the transfer system being located in a rotationally symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis and the condition noted above generally may refer to each beam path independently. The optical sensors may be located in one and the same beam path or partial beam path. Alternatively, however, the optical sensors may also be located in different partial beam paths. In case the optical sensors are distributed over different partial beam paths, the above-mentioned condition may be described such that at least one first optical sensor is located in at least one first partial beam path, being offset from the optical axis of the first partial beam path by a first spatial offset, and at least one second optical sensor is located in at least one second partial beam path, being offset from the optical axis of the second partial beam path by at least one second spatial offset, wherein the first spatial offset and the second spatial offset are different.

The transfer device may constitute a coordinate system, wherein a longitudinal coordinate I is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate I. Any direction perpendicular to the z-axis may be considered a transversal direction, and the polar coordinate and/or the polar angle may be considered a transversal coordinate.

The optical sensors may be positioned off focus. As used herein, the term "focus" generally refers to one or both of a minimum extend of a circle of confusion of the light beam, in particular of at least one light beam emitted from one point of the object, caused by the transfer device or a focal length of the transfer device. As used herein, the term "circle of confusion" refers to a light spot caused by a cone of light rays of the light beam focused by the transfer device. The circle of confusion may depend on a focal length f of the transfer device, a longitudinal distance from the object to the transfer device, a diameter of an exit pupil of the transfer device, a longitudinal distance from the transfer device to the light sensitive area, a distance from the transfer device to an image of the object. For example, for Gaussian beams, a diameter of the circle of confusion may be a width of the Gaussian beam. In particular, for a point like object situated or placed at infinite distance from the detector the transfer device may be adapted to focus the light beam from the object into a focus point at the focal length of the transfer device. For non-point like objects situated or placed at infinite distance from the detector the transfer device may be adapted to focus the light beam from at least one point of the object into a focus plane at the focal length of the transfer device. For point like objects not situated or placed at infinite distance from the detector, the circle of confusion may have a minimum extend at least at one longitudinal coordinate. For non-point like objects not situated or placed at infinite distance from the detector, the circle of confusion of the light beam from at least one point of the object may have a minimum extend at least at one longitudinal coordinate. As used herein, the term "positioned off focus" generally refers to a position other than the minimum extent of a circle of confusion of the light beam caused by the transfer device or a focal length of the transfer device. In particular, the focal point or minimum extend of the circle of confusion may be at a longitudinal coordinate $I_{focus}$, whereas the position of each of the optical sensors may have a longitudinal coordinate $I_{sensor}$ different from $I_{focus}$. For example, the longitudinal coordinate $I_{sensor}$ may be, in a longitudinal direction, arranged closer to the position of the transfer device than the longitudinal coordinate $I_{focus}$ or may be arranged further away from the position of the transfer device than the longitudinal coordinate $I_{focus}$. Thus, the longitudinal coordinate $I_{sensor}$ and the longitudinal coordinate $I_{focus}$ may be situated at different distances from the transfer device. For example, the optical sensors may be spaced apart from the minimum extend of the circle of confusion in longitudinal direction by ±2% of focal length, preferably by ±10% of focal length, most preferably ±20% of focal length. For example, at a focal length of the transfer device may be 20 mm and the longitudinal coordinate $I_{sensor}$ may be 19.5 mm, i.e. the sensors may be positioned at 97.5% focal length, such that $I_{sensor}$ is spaced apart from the focus by 2.5% of focal length.

The optical sensors may be arranged such that the light-sensitive areas of the optical sensors differ in at least one of: their longitudinal coordinate, their spatial offset, or their surface areas.

Each light-sensitive area may have a geometrical center. As used herein, the term "geometrical center" of an area generally may refer to a center of gravity of the area. As an example, if an arbitrary point inside or outside the area is chosen, and if an integral is formed over the vectors interconnecting this arbitrary point with each and every point of the area, the integral is a function of the position of the arbitrary point. When the arbitrary point is located in the geometrical center of the area, the integral of the absolute value of the integral is minimized. Thus, in other words, the geometrical center may be a point inside or outside the area with a minimum overall or sum distance from all points of the area.

For example, each geometrical center of each light-sensitive area may be arranged at a longitudinal coordinate $I_{center,i}$, wherein i denotes the number of the respective optical sensor. In the case of the detector comprising precisely two optical sensors and in the case of the detector comprising more than two optical sensors, the optical sensors may comprise at least one first optical sensor, wherein the first optical sensor, in particular the geometrical center, being arranged at a first longitudinal coordinate $I_{center,1}$ and at least one second optical sensor, wherein the second optical sensor, in particular the geometrical center, being at a second longitudinal coordinate $I_{center,2}$, wherein the first longitudinal coordinate and the second longitudinal coordinate differ. For example, the first optical sensor and the second optical sensor may be located in different planes which are offset in a direction of the optical axis. The first optical sensor may be arranged in front of the second optical sensor. Thus, as an example, the first optical sensor may simply be placed on the surface of the second optical sensor. Additionally or alternatively, the first optical sensor may be spaced apart from the second optical sensor, for example, by no more than five times the square root of a surface area of the first light-sensitive area. Additionally or alternatively, the first optical sensor may be arranged in front of the second optical sensor and may be spaced apart from the second optical sensor by no more than 50 mm, preferably by no more than 15 mm. Relative distance of the first optical sensor and second optical sensor may depend, for example, on focal length or object distance.

The longitudinal coordinates of the optical sensors may also be identical, as long as one of the above-mentioned conditions is fulfilled. For example, the longitudinal coordinates of the optical sensors may be identical, but the light-sensitive areas may be spaced apart from the optical axis and/or the surface areas differ.

Each geometrical center of each light-sensitive area may be spaced apart from the optical axis of the transfer device, such as the optical axis of the beam path or the respective beam path in which the respective optical sensor is located. The distance, in particular in transversal direction, between the geometrical center and the optical axis is denoted by the term "spatial offset" In the case of the detector comprising precisely two optical sensors and in the case of the detector comprising more than two optical sensors, the optical sensors may comprise at least one first optical sensor being spaced apart from the optical axis by a first spatial offset and at least one second optical sensor being spaced apart from the optical axis by a second spatial offset, wherein the first spatial offset and the second spatial offset differ. The first and second spatial offsets, as an example, may differ by at least a factor of 1.2, more preferably by at least a factor of 1.5, more preferably by at least a factor of two. The spatial offsets may also be zero or may assume negative values, as long as one of the above-mentioned conditions is fulfilled.

As used herein, the term "surface area" generally refers to both of a shape and a content of at least one light-sensitive area. In the case of the detector comprising precisely two optical sensors and in the case of the detector comprising more than two optical sensors, the optical sensors may comprise at least one first optical sensor having a first surface area and at least one second optical sensor having a second surface area. In the case of the detector comprising more than two optical sensors, e.g. a sensor element comprising a matrix of optical sensors, a first group of optical sensors or at least one of the optical sensors of the matrix may form a first surface area, wherein a second group of optical sensors or at least one other optical sensor of the matrix may form a second surface area. The first surface area and the second surface area may differ. In particular, the first surface area and the second surface area are not congruent. Thus, the surface area of the first optical sensor and the second optical sensor may differ in one or more of the shape or content. For example, the first surface area may be smaller than the second surface area. As an example, both the first surface area and the second surface area may have the shape of a square or of a rectangle, wherein side lengths of the square or rectangle of the first surface area are smaller than corresponding side lengths of the square or rectangle of the second surface area. Alternatively, as an example, both the first surface area and the second surface area may have the shape of a circle, wherein a diameter of the first surface area is smaller than a diameter of the second surface area. Again, alternatively, as an example, the first surface area may have a first equivalent diameter, and the second surface area may have a second equivalent diameter, wherein the first equivalent diameter is smaller than the second equivalent diameter. The surface areas may be congruent, as long as one of the above-mentioned conditions is fulfilled.

The optical sensors, in particular the light-sensitive areas, may overlap or may be arranged such that no overlap between the optical sensors is given.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The above-mentioned operations, including determining the at least one longitudinal coordinate of the object, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Field Programmable Gate Arrays (FPGAs), or digital signal processors (DSPs) which are configured to perform the above-mentioned evaluation, in order to determine the at least one longitudinal coordinate of the object. Additionally or alternatively, however, the evaluation device may also fully or partially be embodied by hardware.

The evaluation device is configured for determining at least one longitudinal coordinate z of the object by evaluating a quotient signal Q of the sensor signals As used herein, the term "quotient signal Q" refers to a signal which is generated by combining the sensor signals, in particular by one or more of dividing the sensor signals, dividing multiples of the sensor signals or dividing linear combinations of the sensor signals. In the following, the quotient signal is also denoted as combined signal or combined sensor signal.

The object size may be a priori unknown. An object image size, i.e. the size of the object in the image plane, may be distance dependent. However, different materials may have different scattering properties such that deviations from Lambertian distribution may occur. In particular, a luminance dependence may deviate significantly from a $1/z^2$. In addition, due type of scattering and/or due to reflective properties and/or scattering properties of the object, for example depending on a material of the object, the object image size, in particular diameter of the spot, may vary. Thus, methods and devices using the spot size, for example by counting pixels, or absolute photon numbers for distance determination may be not suitable and may require calibrations depending on the material of the object. Methods and devices adapted for determination of the distance independently from the object size are necessary in order to allow robust distance determination for any materials with one calibration, only. Further, the object size may be altered by the light source itself. For example, the properties of the optics may be altered by one or more of dirt, raindrops, scratches or manufacturing precision of the light source and/or its optics. Thus, the light beam emitted by the light source may be changed in one or more of its properties such as diameter, beam profile, divergence or the like. Thus, methods and devices adapted for determination of the distance independently from the object size are necessary in order to allow robust distance determination for higher manufacturing tolerances or harsher environmental conditions or the like with one calibration, only. Further, object size may be altered depending on temperature as the optical properties of the detector and or the light source may change such as due to a temperature dependent change of the distance between emitter and optics of the light source or due to a temperature dependent change of the distance between sensor and optics of the detector or due to a temperature dependent change of the refracting properties of the lens or the like. Object size independence is, thus, important for measurements with little or no a priori knowledge on one or more of the measured object, the measurement environment, the temperature of the detector and its environment, the manufacturing quality of the sensor and/or the light source. Further, object size independence is, thus, important for measurements that require high flexibility concerning one or more of the measured object, the measurement environment, the temperature of the detector and its environment, the manufacturing quality of the sensor and/or the light source. Further, object size independence is important, when diverging or converging illumination light beams shall be used, such as when diverging or converging laser light beams are used where the size of the illuminated spot changes with distance. Further, object size independence is, thus, important for measurements that require a high robustness in one or more of measurement quality independent of the measured object, the measurement environment, the temperature of the detector and its environment, the manufacturing quality of the sensor and/or the light source.

Known 3D sensing methods are dependent on the object size. For example U.S. Pat. Nos. 4,675,517 and 5,323,222 describe devices and methods exhibiting dependence on object size. Specifically, U.S. Pat. No. 4,675,517 describes with respect to FIGS. 3A to 3C, column 2, line 16 that the distance information changes with spot size. In particular, it is described that in actual practice, with the use of such a system, as the diameter of the image of the reflection of the projected image spot P changes at random, or the optical position deviates, the defined object distance boundaries are caused to shift largely. In particular, problems due to too large spot sizes are addressed. In case the spot size is too large, the sensor is outshined and the resulting ratio is wrong. U.S. Pat. No. 4,675,517 describes to correct this spot size dependence by enlarging the sensor area. However, the spot size dependence is not eliminated. In particular, problems due to too small spot sizes are not addressed. Furthermore, specifically, U.S. Pat. No. 5,323,222 describes that the ratio used for determining the distance depends on a chip size of the light source. In particular, in column 2, line 11 it is outlined that solid lines 11 and 12 in FIG. 14A show the relationship between the reciprocal of the distance a and the calculation output l1/(l1+l2) for the light-projecting chip sizes t1 and t2 (t1<t2), respectively. Furthermore, it is described that if the distance between the projection lens and light emitting element is fT, the base length L, and the chip size of the light emitting element t, then the distance measuring range S will be: S=∞ through fT*L/t. However, U.S. Pat. No. 5,323,222 does not further address eliminating impact of object size dependence.

As used herein, the term "object size", generally refers to a size of the object in an object plane, in particular to the size of a spot and/or region and/or the entire object emitting the at least one light beam. As further used herein, the terms "independent from the object size" and "object size independence" refer to the fact that variations of the object size do not influence the determination of the longitudinal coordinate z. As will be outlined in detail below, the quotient signal Q may be used for determining the longitudinal coordinate. Thus, object size independence furthermore refers to the fact that the quotient signal is essentially independent from the object size such that, in case of identical object distance, a first quotient signal determined at a first object size and a second quotient signal determined at a different object size are identical, with a tolerance of ±20% or less, preferably a tolerance of ±10% or less, more preferably a tolerance of ±5% or less. Requirement or condition of object size independence can be stated as follows: the circle of confusion of at least one light beam emitted from at least one point of the object is greater than an image size of the object, i.e. a size of the object in an image plane. The detector may be adapted to determine the longitudinal coordinate z of the object independent from the object size if the circle of confusion of the at least one light beam emitted from the at least one point of the object is greater than an image size of the object. This condition may be calculated by $$O_{size} < \frac{z_0 E_x}{z_i^2} |z_s - z_i|,$$

wherein $z_0$ is a longitudinal distance from the object to the transfer device; $E_x$ is a diameter of an exit pupil of the transfer device; $z_s$ is a longitudinal distance from the transfer device to the light sensitive area, $z_i$ is a distance from the transfer device to an image of the object; $O_{size}$ is an object size of the object in the object plane. As used herein, the term "diameter of an exit pupil" refers to an aperture of the transfer device. Given a measurement range the condition can be fulfilled by for example varying the sensor position, the diameter of the exit pupil or the image of the object, for example by varying the focal length. The detector may be adapted to determine the longitudinal coordinate z of the object independent from the object size if $$O_{size} < \frac{z_0 E_x}{z_i^2} |z_s - z_i|$$

holds true for at least one distance $z_0$. For example, the detector may be adapted to determine the longitudinal coordinate z at the at least one distance $z_0$ if the object size varies and/or changes within a large range, e.g. by more than 100% of the object size. The detector may be adapted to determine the longitudinal coordinate z at distances, at which the above-mentioned condition $$O_{size} < \frac{z_0 E_x}{z_i^2} |z_s - z_i|$$

is fulfilled only weakly, if the object size varies and/or changes within a smaller range, in particular if the object size varies and/or changes by ±20% or less, preferably by ±10% or less, more preferably by ±5% or less. The detector may be adapted to determine the longitudinal coordinate z over the whole measurement range if $$O_{size} < \frac{z_0 E_x}{z_i^2}|z_s - z_i|$$

holds true for the at least one distance $z_0$ and if the object size and if the object size varies and/or changes by ±20% or less, preferably by ±10% or less, more preferably by ±5% or less. As used herein, the term "holds true for at least one distance" refers to that at the at least one distance the longitudinal coordinate z may be determined independent from the object size and that the detector is adapted to determine the longitudinal coordinate z at other distances, in particular within the whole or entire measurement range, if the object size varies and/or changes by ±20% or less, preferably by ±10% or less, more preferably by ±5% or less.

As used herein, the term "measurement range" generally refers to an arbitrary range in which the determination of the longitudinal coordinate z is performed. The measurement range may be adjustable by adjusting one or more parameters selected from the group consisting of: the longitudinal distance from the object to the transfer device $z_0$; the focal length of the transfer device f; the diameter of the exit pupil of the transfer device $E_x$; the longitudinal distance from the transfer device to the light sensitive area $z_s$, the distance from the transfer device to an image of the object $z_i$; the object size $O_{size}$ of the object in the object plane. For example, if the object size does not exceed an object-size limit, a unique relation of the quotient signal Q to the longitudinal distance from the object to the transfer device exists. The object-size limit may depend on the longitudinal distance from the transfer device to the light sensitive area, the longitudinal distance from the object to the transfer device, and an F-number of the transfer device F #, i.e. a ratio of the focal length of the transfer device and the diameter of an exit pupil of the transfer device. For example, the measurement range may be adapted by selecting and/or choosing one or more of the longitudinal distance from the transfer device to the light sensitive area $z_s$, the distance from the transfer device to an image of the object $z_i$, the longitudinal distance from the transfer device to the light sensitive area, the focal length and the F-number of the transfer device. For example, the focal length and/or F-number may be adjusted by using a zoom objective. In particular, the focal length may be between 10 and 200 mm, preferably between 20 and 150 mm. The F-number may be between 1 and 10, preferably between 1.5 and 6. The longitudinal distance from the transfer device may be as short as possible. The longitudinal distance from the transfer device to the light sensitive area may be between 0 and 200 mm, preferably between 20 and 50 mm. For a given system setup (f, F #, $z_s$) a unique value of the object-size limit can be calculated. For example, in case the focal length is 3.5 mm and the F-number is 2.0, the object size may be smaller than 1.75 mm. Preferably a lower object size limit may be 0.5 µm or more, more preferably 1 µm or more and most preferably 10 µm or more. The lower object size limit refers to a minimum object size using an active measurement system, in particular to a laser spot size.

The evaluation device may be configured for deriving the quotient signal Q by one or more of dividing the sensor signals, dividing multiples of the sensor signals, dividing linear combinations of the sensor signals. The evaluation device may be configured for using at least one predetermined relationship between the quotient signal Q and the longitudinal coordinate for determining the longitudinal coordinate. For example, the evaluation device is configured for deriving the quotient signal Q by $$Q(z_O) = \frac{\iint_{A_1} E(x, y; z_O)dxdy}{\iint_{A_2} E(x, y; z_O)dxdy}$$

wherein x and y are transversal coordinates, A1 and A2 are areas of the beam profile at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. As used herein, the term "beam profile" relates to a spatial distribution, in particular in at least one plane perpendicular to the propagation of the light beam, of an intensity of the light beam. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y;z_o)$, $E(x,y;zo)=L \cdot S$. Thus, by deriving the quotient signal it may allow determining the longitudinal coordinate independent from luminance. In addition, using the quotient signal allows determination of the distance $z_0$ independent from the object size. Thus, the quotient signal allows determination of the distance $z_0$ independent from the material properties and/or reflective properties and/or scattering properties of the object and independent from alterations of the light source such as by manufacturing precision, heat, water, dirt, damages on the lens, or the like. Furthermore, even at very large spot sizes, for example at an outshining, reliable determination of the longitudinal coordinate of the object may be possible.

Each of the sensor signals may comprise at least one information of at least one area of the beam profile of the light beam. As used herein, the term "area of the beam profile" generally refers to an arbitrary region of the beam profile at the sensor position used for determining the quotient signal Q. The light-sensitive regions may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

Other selections of the first area A1 and second area A2 may be feasible. For example, the first area may comprise essentially outer regions of the beam profile and the second area may comprise essentially inner regions of the beam profile. For example, the center signal may be a signal corresponding to a rectangular stripe comprising the center of the light spot. The evaluation device may be adapted to form a quotient of a first linear combination of the center signal and the sum signal and a second linear combination of the center signal and the sum signal. In particular, in case of a two-dimensional beam profile, the beam profile may be divided in a left part and a right part, wherein the first area may comprise essentially areas of the left part of the beam profile and the second area may comprise essentially areas of the right part of the beam profile. The first and the second area, as an example, may be adjacent, with a minimum separation from one another. However, the separation between adjacent areas may also be varied such as enlarged to improve the dynamic range of the quotient signal. As an example, the separation between two adjacent areas may be increased by not evaluating the area between the first and the second area. This may reduce the light on one of the areas relative and/or absolute as compared to the adjacent area which will may increase a quotient of the signal of the two areas. Further, one or both of the areas may consist of separated subareas which may be adjacent to each other and/or which may be separated by areas that are not evaluated and/or which may be evaluated as part of a different quotient. Further, the first and the second area may consist of a linear combination of subareas, whereas the signal contributed by each subarea may be weighted differently when forming the center signal and/or the sum signal. This may further be beneficial for increasing the dynamic range of the quotient system.

The extent of the circle of confusion may be larger than the extent of the optical sensor. For example, the optical sensor may be positioned as such that the circle of confusion extends beyond the optical sensor. The optical sensor may thus only partially evaluate the beam profile of the light beam. The evaluation device may be adapted to extrapolate a beam profile such as due to symmetry considerations or due to comparing the partial beam profile to prerecorded beam profiles or the like. Further, the evaluation device may be adapted to evaluate a partial sum signal and a partial center signal of a partial beam profile and convert it into a sum signal and a center signal of an extrapolated and/or fitted and/or prerecorded beam profile or the like.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the quotient signal Q by a line integrals along the slice or cut. For improved accuracy, several slices or cuts through the light spot may be used and averaged. In case of an elliptical spot profile, averaging over several slices or cuts may result in an improved distance information.

The evaluation device may be configured to derive the quotient signal Q by one or more of dividing the edge information and the center information, dividing multiples of the edge information and the center information, dividing linear combinations of the edge information and the center information. Thus, essentially, photon ratios may be used as the physical basis of the method.

The detector may be adapted to determine depth information, in particular absolute depth information, from a radiance ratio of at least two asymmetric regions of a light beam profile on the at least two optical sensors. For example, the detector may comprise a plurality of optical sensors arranged in a matrix. The detector may be adapted to determine depth information from a radiance ratio of at least two asymmetric regions within an enclosed, in particular, a defocused beam profile captured by a single matrix of optical sensors such as a CMOS detector. In particular, the detector may be adapted to determine the depth information using the radiance ratio independent of a certain object size range. This principle is called Distance by Photon Ratio (DPR).

The DPR principle can be applied, for example, to many sub-regions within a segmented image profile, such as a segmented image of at least one feature generated by the at least one light beam on the matrix of optical sensors, which is demonstrated hereafter. The quotient $Q_A(z)$ in the two-dimensional case can be written as $$Q_A(z) = \frac{\int\int_{-r_{out}}^{r_{out}} P(x, y, z) dx dy}{\int\int_{-r_{in}}^{r_{in}} P(x, y, z) dx dy},$$

where P(x,y,z) is a two-dimensional beam profile and $r_{in}$ and $r_{out}$ are inner and outer circle radii, respectively. For line-segmented quotients $Q_y(z)$ along the y-dimension, this can be rewritten as $$Q_y(z) = \frac{\int_{-r_{out}}^{r_{out}} P(x,z)dx}{\int_{-r_{in}}^{r_{in}} P(x,z)dx}.$$

Without wishing to be bound by this theory, the overall defocused beam profile P(x,z) can be regarded as a superposition of defocused image point profiles p(x,z) along the image width b(x,z). This relationship can be modelled as a convolution given by $$P(x,z) = b(x,z) * p(x,z),$$

wherein p(x,z) represents the Point-Spread-Function (PSF) of a lens in defocus, which in the field of paraxial optics is also known as Circle of Confusion (CoC). By inserting P(x,z) into $Q_y(z)$ the above described quotient $Q_y(z)$ can be rewritten as $$Q_y(z) = \frac{\int_{-r_{out}}^{r_{out}} b(x,z)*p(x,z)dx}{\int_{-r_{in}}^{r_{in}} b(x,z)*p(x,z)dx} = \frac{\int_{-r_{out}}^{r_{out}} b(x,z)dx \cdot \int_{-r_{out}}^{r_{out}} p(x,z)dx}{\int_{-r_{in}}^{r_{in}} b(x,z)dx \cdot \int_{-r_{in}}^{r_{in}} p(x,z)dx}.$$

The CoC radius may be $r_c$ and $r_o$ may be an image spot radius of the feature on the matrix of optical sensors, then $r_{out} = r_c + r_o \Rightarrow r_{out} \geq r_c$ and $r_{out} \geq r_o$, which yields to $$Q_y(z) = \frac{\int_{-r_o}^{r_o} b(x,z)dx \cdot \int_{-r_c}^{r_c} p(x,z)dx}{\int_{-r_{in}}^{r_{in}} b(x,z)dx \cdot \int_{-r_{in}}^{r_{in}} p(x,z)dx}.$$

In case of $r_o \leq r_{in} < r_c$, $$Q_y(z) = \frac{\int_{-r_o}^{r_o} b(x,z)dx \cdot \int_{-r_c}^{r_c} p(x,z)dx}{\int_{-r_o}^{r_o} b(x,z)dx \cdot \int_{-r_{in}}^{r_{in}} p(x,z)dx} = \frac{\int_{-r_c}^{r_c} p(x,z)dx}{\int_{-r_{in}}^{r_{in}} p(x,z)dx},$$

which indicates that the quotient is independent of the object size on condition that $r_o < r_c$.

The Object Size Independence (OSI) in DPR applies as long as the image width i remains below the Circle of Confusion (CoC) width denoted as c. In the one-dimensional case, this is represented by diameters $d_o < d_c$. Using paraxial optics, these diameters can be substituted, such that $$\frac{i}{a} o_s < \frac{D_x}{i} |d - i|,$$

with a as the object distance, i as the image distance, $o_s$ as the object size, $D_x$ as the lens exit pupil diameter and d as the sensor position with respect to image-side principal plane. After re-arranging, this can be written as $$o_s < \frac{aD_x}{i^2}|d - i|.$$

When focusing a single lens to infinity, this simplifies to $$o_s < \frac{f}{F\#}\left|1 - \frac{f}{a}\right|,$$

where f is the focal length and F # the F-number of the lens.

Furthermore, with a matrix of optical sensors a defocused beam profile may be subdivided into cross-sections along lines of a certain angle θ and with a distance co from the origin of ordinates. Accordingly, the parameterization of a single line may be given by $$\omega = x\cos(\theta) + y\sin(\theta).$$

The integration of the intensity along parallel lines can be mathematically described by an integral projection $\Re$ TH of the well-known Radon transform which reads $$\Re_{(\omega,\theta)}\{f(x,y)\} = \iint_{-\infty}^{\infty} f(x,y)\delta(x\cos(\theta) + y\sin(\theta) - \omega)dx\,dy,$$

where δ denotes the Dirac delta function and f(x, y) is the intensity of an enclosed defocused beam profile. The photon ratio R for a given angle θ and projection width co is given by $$R = \frac{\Re_{(\omega,\theta)}\{f'(x,y)\}}{\Re_{(\omega,\theta)}\{f(x,y)\}},$$

with f'(x,y) as the inner region. The variation of θ may yield different ratios R for skewed object surfaces at a certain distance. It is sufficient to let θ vary in the following interval $\{\theta \in \mathbb{R} < \pi\}$.

In one embodiment, the light beam propagating from the object to the detector may illuminate the sensor element with at least one pattern comprising at least one feature point. As used herein, the term "feature point" refers to at least one at least partially extended feature of the pattern. The feature point may be selected from the group consisting of: at least one point, at least one line, at least one edge. The pattern may be generated by the object, for example, in response to an illumination by the at least one light source with an illumination pattern comprising the at least one pattern. A1 may correspond to a full or complete area of a feature point on the optical sensors. A2 may be a central area of the feature point on the optical sensors. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

For example, the light beam propagating from the object to the detector may illuminate the optical sensors with at least one line pattern. The line pattern may be generated by the object, for example in response to an illumination by the at least one illumination source with an illumination pattern comprising the at least one line pattern. A1 may correspond to an area with a full line width of the line pattern on the optical sensors, in particular on the light sensitive area of the optical sensors. The line pattern on the optical sensors may be widened and/or displaced compared to the line pattern of the illumination pattern such that the line width on the optical sensors is increased. In particular, in case of a matrix of optical sensors, the line width of the line pattern on the optical sensors may change from one column to another column. A2 may be a central area of the line pattern on the optical sensors. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern may be segmented on the optical sensors. Each column of the matrix of optical sensors may comprise center information of intensity in the central area of the line pattern and edge information of intensity from regions extending further outwards from the central area to edge regions of the line pattern.

For example, the light beam propagating from the object to the detector may illuminate the sensor element with at least one point pattern. The point pattern may be generated by the object, for example in response to an illumination by the at least one light source with an illumination pattern comprising the at least one point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The light beam propagating from the object to the detector may illuminate the sensor element with a reflection pattern comprising both point patterns and line patterns. Other embodiments in addition or alternatively to line pattern and point pattern are feasible.

For example, the optical sensors may comprise a first optical sensor having a first light sensitive area and a second optical sensor having a second light sensitive area, wherein the first and the second light sensitive areas are arranged such that a condition $$\frac{a}{c} \neq \frac{b}{d}$$

is satisfied, wherein "a" is a ratio of photons hitting both an inner region of a plane perpendicular to the optical axis intersecting the optical axis at a distance equal to half of a focal length of the transfer device and the first light sensitive area, "b" is a ratio of photons hitting both the inner region of the plane and the second light sensitive area, "c" is a ratio of photons hitting both an outer region of the plane and the first light-sensitive area, "d" is a ratio of the photons hitting both the outer region of the plane and the second light sensitive area. The first light sensitive area and the second light sensitive areas may be arranged such that the inner region may have an area with a geometrical center point on the optical axis and an extension such that half of the photons hit the plane within the inner region and the other half hit the plane outside the inner region. The first light sensitive area and the second light sensitive areas may be arranged such that the inner region may be designed as a circle with a center point on the optical axis and a radius r which is chosen such that half of the photons hit the plane within the circle and the other half hit the plane outside the circle.

As outlined above, the detector may comprise at least one illumination source. A distance perpendicular to an optical axis of the detector between the illumination source and the optical sensors may be small. The distance perpendicular to the optical axis of the detector between the illumination source and the optical sensors may be less than 0.1 m, preferably less than 0.05 m, more preferably less than 0.025 m. The illumination source and the optical axis may be separated by a small baseline. As used herein, the term "baseline", also denoted as basis line, refers to a distance, for example in a xy-plane, between the optical axis and the illumination source, in particular a distance between the optical axis and a z-component of the illumination light beam. The illumination source may be spaced apart from the optical axis by a minimum distance. The minimum distance from the optical axis may be defined by further detector elements such as size and position of the optical sensors and of the at least one optional transfer device, which will be described in detail below. The baseline may be less than 0.1 m, preferably less than 0.05 m, more preferably less than 0.025 m. For example, the baseline may be 21 mm. Preferably, the illumination source may be arranged right next to the transfer device. For example, the transfer device may be flattened such that the illumination source can be positioned even closer to the optical axis. The illumination source may be arranged behind the transfer device.

At least one of the optical sensors may be adapted to generate at least one sensor signal dependent on a time-of-flight (TOF) the illumination light beam has traveled from the illumination source to the object and the reflection light beam has traveled from the object to the light sensitive area of the optical sensor. The evaluation device may be configured for determining at least one TOF-longitudinal coordinate $z_{TOF}$ of the object by evaluating the TOF sensor signal. The optical sensor adapted to generate the TOF sensor signal may be designed as time-of-flight detector. The time-of-flight detector may be selected from the group consisting of: at least one pulsed time-of-flight detector; at least one phase modulated time-of-flight detector; at least one direct time-of-flight detector; at least one indirect time-of-flight detector. For example, the pulsed time-of-flight detector may be at least one range gated imager and/or at least one direct time-of-flight imager. For example the phase modulated time-of-flight detector may be at least one RF-modulated light source with at least one phase detector. The optical sensor may be adapted to determine a time delay between emission of the illumination light beam by the illumination source and receipt of the reflection light beam.

For example, the optical sensor adapted to generate the TOF sensor signal may be designed as pulsed time-of-flight detector. The detector may comprise the at least one interruption device, such as at least one shutter element, adapted to generate a pulsed light beam. The optical sen-sor may be adapted to store the TOF sensor signal dependent on the receiving time of the reflection light beam in a plurality of time windows, in particular subsequent time windows. The optical sensor may be adapted to store dependent on receiving time of the reflection light beam the generated TOF sensor signal in at least one first time window and/or in at least one second time window. The first and second time windows may be correlated with the opening and closure of the interruption device. Duration of first and second time windows may be pre-defined. For example, the TOF sensor signal may be stored in the first time window during opening of the interruption device, whereas during closure of the interruption device the TOF sensor signal may be stored in the second time window. Other durations of time windows are thinkable. The first and the second time window may comprise information about background, signal height and signal shift.

For example, the optical sensor adapted to generate the TOF sensor signal may be designed as direct time-of-flight imager. The direct time-of-flight imager may comprise the at least one illumination source adapted to generate at least one single laser pulse. The single laser pulse may be reflected back from the object onto the optical sensor. The optical sensor may comprise at least one photodiode, for example at least one Avalanche Photo Diode (APD), such as at least one Si APD, or such as at least one InGaAs APD, or at least one PIN photo detector array, or at least one Single-Photon Avalanche Photodiode (SPAD), adapted to image the reflection light beam. The direct time-of flight imager may be adapted to image at least one image comprising spatial and temporal data.

For example, the optical sensor adapted to generate the TOF sensor signal may be designed as phase modulated time-of-flight modulator. The phase modulated time-of-flight modulator may be adapted to measure a difference in phase, in particular a phase shift, by determining a correlated signal, for example by multiplying a received signal, i.e. of the reflection light beam, with the emitted signal, i.e. the illumination light beam. A DC component of the correlated signal may comprise an information about the difference in phase. The evaluation device may be adapted to determine the second longitudinal coordinate of the object from the phase difference. For example, the illumination source and the optical sensor adapted to generate the TOF sensor signal may be designed as RF-modulated light source with at least one phase detector. The illumination source may comprise, for example, at least one LED and/or at least one laser. The illumination source may comprise at least one modulation device adapted to modulate the light beam having a predefined phase shift. For example, the modulation device may comprise at least one radio frequency module. The radio frequency module may be adapted to modulate the illumination beam with an RF carrier. The optical sensor may be adapted to determine a phase shift of the reflective light beam impinging on the optical sensor.

The optical sensor may be designed as and/or may comprise at least one time-of-flight pixel. Preferably, the detector may comprise at least two optical sensors, wherein each optical sensor is designed as and/or comprises at least one TOF pixel. For example, the detector, in particular the optical sensor may comprise a quadrant diode adapted to generate the TOF sensor signal. For example, the detector, in particular the optical sensor, may comprise at least one pixelated TOF-imager.

The evaluation device may be configured for determining the at least one TOF longitudinal coordinate $z_{TOF}$ of the object by evaluating the TOF sensor signal. As used herein, the term "TOF longitudinal coordinate" refers to a longitudinal coordinate derived from the TOF sensor signal. As described above, the illumination light source may be adapted to periodically generate at least one light pulse. The detector may be adapted to generate the first longitudinal sensor signal for each period. The evaluation device may be adapted to determine in which pulse period the TOF sensor signal was generated using the second longitudinal coordinate. The detector may be adapted to uniquely assign to which period the ToF-signal refers to by using the combined sensor signal. Both, the TOF sensor signal and the combined sensor signal, may be non-monotonous functions of the longitudinal coordinate $z_{real}$. Thus, the longitudinal coordinate may not be uniquely deter-mined from one of the TOF sensor signal or the combined sensor signal alone and a measurement range may not be restricted to a longitudinal range in which the signals are unique functions of $z_{real}$. The term "measurement range" generally refers to a range from the object to the detector in which determination of the longitudinal coordinate is possible. The term "longitudinal range" generally refers to a range from the object to the detector in which unique determination of the longitudinal coordinate is possible. Below and/or above certain distances from the object to the detector a determination of the longitudinal coordinate may not be possible. For example, time-of-flight measurements are not possible below a certain distance from the object to the detector, possibly due to the minimum measurement time of the internal clock. Furthermore, in time-of-flight measurements the sensor signal may be unique within a longitudinal period, but the sensor signal may be the same in case integer multiples of the longitudinal period are added such that the determined longitudinal coordinate may be non-unique. Thus, the same TOF sensor signal will be obtained for a distance $z_1$ and a distance $z_1+n\cdot z_{1p}$, where n is an integer denoting the longitudinal period and $z_{1p}$ is the longitudinal period of the TOF sensor signal, wherein the distances $z_1$ and $z_1+n\cdot z_{1p}$ are within the measurement range. As used herein, the term "longitudinal period" refers to partitions of a period, in particular a distance range, in which the longitudinal coordinate can be unambiguously determined from the TOF sensor signal. Non-unique longitudinal coordinates may be denoted as relative longitudinal coordinates and the unique longitudinal coordinates may be denoted as absolute longitudinal coordinates.

If both the TOF sensor signal F1 and the combined sensor signals F2 are available, it may be possible to uniquely determine the longitudinal coordinate and to extend the longitudinal range, as long as each signal pair (F1,F2) corresponds to a unique distance and vice versa. In particular, if a unique signal pair (F1,F2) exists for each longitudinal coordinate and vice versa, the evaluation device may be adapted to determine the unique combined longitudinal coordinate by (1) selecting at least one first selected signal such as the TOF sensor signal and/or the combined sensor signal and determining non-unique first longitudinal coordinates;
(2) selecting a second selected signal such as the combined signal Q and/or the TOF sensor signal, which was not selected in step (1), and determining non-unique second longitudinal coordinates;
(3) determining whether one of the non-unique first longitudinal coordinates and the non-unique second longitudinal coordinates match up to a predetermined tolerance threshold;
(4) setting a combined unique longitudinal coordinate to be a matching longitudinal coordinate.

In step (1) and step (2), signals may be selected in the given order or may be performed in a different order. For example, in step (1) the TOF sensor signal may be selected and in step (2) the combined signal Q may be selected. In another example, in step (1) the combined sensor signal may be selected, and the non-unique first longitudinal sensor signal may be determined therefrom. In step (2), the TOF sensor signal may be selected.

Additionally or alternatively to step (4), the evaluation device may be adapted to output an error signal in case no matching coordinates are found and/or to output an error signal in case more than one matching coordinates are found. Additionally or alternatively, the signal pairs and their corresponding longitudinal coordinates may be stored in a look-up table. Additionally or alternatively, the signal pairs and their corresponding longitudinal coordinates may be approximated or described by an analytical function which is evaluated to find the longitudinal coordinate corresponding to a given signal pair.

The evaluation device may comprise at least two memory elements. As used herein, the term "memory element" refers to a device adapted to store information. The evaluation device may be adapted to receive and to store information provided by the optical sensors, for example the at least one first sensor signal. Such information may comprise raw sensor data and/or processed sensor data. For example, the memory element may be adapted to store information for further evaluation by the evaluation device. The memory element may be a volatile or non-volatile memory element.

As described above, the optical sensor may be designed as and/or may comprise at least one ToF pixel. The detector may comprise at least two switches. Each of the switches may be connected to the optical sensor adapted to generate the first sensor signal, for example by at least one connector. In particular, each of the switches may be connected to the ToF pixel. The switches are adapted to provide the TOF sensor signal to one of the memory elements. In particular, the switches may be adapted to let, dependent on receiving time of the reflection light beam, the generated TOF sensor signal pass through one of the switches. For example, the TOF sensor signal may pass one of the switches during opening of the interruption device, whereas during closure of the interruption device the TOF sensor signal may pass the other switch. Each of the switches may be controlled by a control signal having a pulse length identical to a pulse length of a light pulse generated by the illumination source. The control signal of one of the switches may be delayed. For example, the delay may correspond to the pulse length of the light pulse. The evaluation device may be adapted to sample and/or store depending on the delay a first part, or fraction, of the TOF sensor signal through a first switch in a first memory element and the other, second part, or fraction, of the TOF sensor signal through a second switch in a second memory element. The evaluation device may be adapted to determine the first longitudinal coordinate by evaluating the first part and second part of the TOF sensor signal. The evaluation device may be adapted to determine the first longitudinal coordinate $z_1$ by $$z_1 = \frac{1}{2} \cdot c \cdot t_0 \cdot \frac{S1_2}{S1_1 + S1_2} + z_0;$$

wherein c is the speed of light, $t_0$ is the pulse length of the illumination light beam, $z_0$ is a distance offset often determined by the resolution of the time measurement, and $S1_1$ and $S1_2$ are the first part and second part of the TOF sensor signal, respectively.

As outlined above, the detector may further comprise one or more additional elements such as one or more additional optical elements. Further, the detector may fully or partially be integrated into at least one housing.

In a first preferred embodiment of the present invention, the detector may comprise:
  at least one first optical sensor having a first light-sensitive area, wherein the first optical sensor may be configured to generate at least one first sensor signal in response to an illumination of the first light-sensitive area by a light beam propagating from the object to the detector;
  at least one second optical sensor having a second light-sensitive area, wherein the second optical sensor may be configured to generate at least one second sensor signal in response to an illumination of the second light-sensitive area by the light beam, wherein the first light-sensitive area may be smaller than the second light-sensitive area; and
  at least one evaluation device being configured for determining at least one longitudinal coordinate z of the object by evaluating the first and second sensor signals.

In this first preferred embodiment the optical sensors may be arranged such that the light-sensitive areas of the optical sensors differ in their longitudinal coordinate and/or their surface areas.

As will further be outlined in detail below, each optical sensor, preferably, may be embodied such that precisely one light-sensitive area is present in the respective optical sensor, such as by providing precisely one light-sensitive area which may be illuminated, in response to which illumination precisely one uniform sensor signal is created for the whole optical sensor. Thus, preferably, each optical sensor is a single area optical sensor rather than a pixelated optical sensor like e.g. a sensor matrix. Other embodiments, however, are feasible. The use of the single area optical sensors, however, renders the setup of the detector specifically simple and efficient. Thus, as an example, commercially available photo-sensors, such as commercially available silicon photodiodes, each having precisely one sensitive area, may be used in the setup, one with a small light-sensitive area and one with a larger light-sensitive area, as will be explained in further detail below.

The first and second light-sensitive areas specifically may be oriented towards the object.

The light beam propagating from the object to the detector specifically may fully illuminate the first light-sensitive area, such that the first light-sensitive area is fully located within the light beam, with a width of the light beam being larger than the light-sensitive area of the first optical sensor. Contrarily, preferably, the light beam propagating from the object to the detector specifically may create a light spot on the second light-sensitive area, which is smaller than the second light-sensitive area, such that the light spot is fully located within the second light-sensitive area. Within the light spot on the second light-sensitive area, a shadow created by the first optical sensor may be located. Thus, generally, the first optical sensor, having the smaller first light-sensitive area, may be located in front of the second optical sensor, as seen from the object, with the first light-sensitive area being fully located within the light beam and with the light beam generating a light spot on the second light-sensitive area being smaller than the second light-sensitive area, and with further a shadow created by the first optical sensor within the light spot. The situation may easily be adjusted by a person skilled in the art of optics by choosing one or more appropriate lenses or elements having a focusing or defocusing effect on the light beam, such as by using an appropriate transfer device as will be outlined in further detail below. As further used herein, a light spot generally refers to a visible or detectable round or non-round illumination of an article, an area or object by a light beam.

As outlined above, the first light-sensitive area is smaller than the second light-sensitive area. As used therein, the term "is smaller than" refers to the fact that the surface area of the first light-sensitive area is smaller than the surface area of the second light-sensitive area, such as by at least a factor of 0.9, e.g. at least a factor of 0.7 or even by at least a factor of 0.5. As an example, both the first light-sensitive area and the second light-sensitive area may have the shape of a square or of a rectangle, wherein side lengths of the square or rectangle of the first light-sensitive area are smaller than corresponding side lengths of the square or rectangle of the second light-sensitive area. Alternatively, as an example, both the first light-sensitive area and the second light-sensitive area may have the shape of a circle, wherein a diameter of the first light-sensitive area is smaller than a diameter of the second light-sensitive area. Again, alternatively, as an example, the first light-sensitive area may have a first equivalent diameter, and the second light-sensitive area may have a second equivalent diameter, wherein the first equivalent diameter is smaller than the second equivalent diameter.

The first light-sensitive area specifically may overlap with the second light-sensitive area in a direction of propagation of the light beam. The light beam may illuminate both the first light-sensitive area and, fully or partially, the second light-sensitive area. Thus, as an example, as seen from an object located on an optical axis of the detector, the first light-sensitive area may be located in front of the second light-sensitive area, such that the first light-sensitive area, as seen from the object, is fully located within the second light-sensitive area. When the light beam from this object propagates towards the first and second light-sensitive areas, as outlined above, the light beam may fully illuminate the first light-sensitive area and may create a light spot on the second light-sensitive area, wherein a shadow created by the first optical sensor is located within the light spot. It shall be noted, however, that other embodiments are feasible.

Specifically, as will be outlined in further detail below, the evaluation device may be configured to determine the at least one longitudinal coordinate z of the object by using at least one known, determinable or predetermined relationship between first and second sensor signals. In particular, the evaluation device is configured to determine the at least one coordinate z of the object by using at least one known, determinable or predetermined relationship between the quotient signal derived from the first and second sensor signals and the longitudinal coordinate.

Thus, the evaluation device specifically may be configured for deriving the quotient signal Q by dividing the first and second sensor signals, by dividing multiples of the first and second sensor signals or by dividing linear combinations of the first and second sensor signals. As an example, Q may simply be determined as $$Q = s_1/s_2$$

or $$Q = s_2/s_1,$$

with $s_1$ denoting the first sensor signal and $s_2$ denoting the second sensor signal. Additionally or alternatively, Q may be determined as $$Q = a \cdot s_1 / b \cdot s_2$$

or $$Q = b \cdot s_2 / a \cdot s_1,$$

with a and b being real numbers which, as an example, may be predetermined or determinable. Additionally or alternatively, Q may be determined as $$Q = (a \cdot s_1 + b \cdot s_2)/(c \cdot s_1 + d \cdot s_2),$$

with a, b, c and d being real numbers which, as an example, may be predetermined or determinable. As a simple example for the latter, Q may be determined as $$Q = s_1/(s_1 + s_2).$$

Other quotient signals are feasible.

Typically, in the setup described above, Q is a monotonous function of the longitudinal coordinate of the object and/or of the size of the light spot such as the diameter or equivalent diameter of the light spot. Thus, as an example, specifically in case linear optical sensors are used, the quotient $Q = s_1/s_2$ is a monotonously decreasing function of the size of the light spot. Without wishing to be bound by this theory, it is believed that this is due to the fact that, in the preferred setup described above, both the first signal $s_1$ and the second signal $s_2$ decrease as a square function with increasing distance to the light source, since the amount of light reaching the detector decreases. Therein, however, the first signal $s_1$ decreases more rapidly than the second signal $s_2$, since, in the optical setup as used in the experiments, the light spot in the image plane grows and, thus, is spread over a larger area. The quotient of the first and second sensor signals, thus, continuously decreases with increasing diameter of the light beam or diameter of the light spot on the first and second light-sensitive areas. The quotient, further, is mainly independent from the total power of the light beam, since the total power of the light beam forms a factor both in the first sensor signal and in the second sensor signal. Consequently, the quotient Q may form a secondary signal which provides a unique and unambiguous relationship between the first and second sensor signals and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the first and second sensor signals and the longitudinal coordinate may exist. For the latter, reference e.g. may be made to WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate of the object, or both.

The evaluation device is configured for determining the longitudinal coordinate by evaluating the quotient signal Q. The evaluation device may be configured for using at least one predetermined relationship between the quotient signal Q and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The quotient signal Q may be determined by using various means. As an example, a software means for deriving the quotient signal, a hardware means for deriving the quotient signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider.

The first and second optical sensors specifically may be arranged linearly in one and the same beam path of the detector. As used herein, the term "linearly" generally refers to that the sensors are arranged along one axis. Thus, as an example, the first and second optical sensors both may be located on an optical axis of the detector. Specifically, the first and second optical sensors may be arranged concentrically with respect to an optical axis of the detector.

The first optical sensor may be arranged in front of the second optical sensor. Thus, as an example, the first optical sensor may simply be placed on the surface of the second optical sensor. Additionally or alternatively, the first optical sensor may be spaced apart from the second optical sensor by no more than five times the square root of a surface area of the first light-sensitive area. Additionally or alternatively, the first optical sensor may be arranged in front of the second optical sensor and may be spaced apart from the second optical sensor by no more than 50 mm, preferably by no more than 15 mm.

As outlined above, the second light-sensitive area is larger than the first light-sensitive area. Thus, as an example, the second light-sensitive area may be larger by at least a factor of two, more preferably by at least a factor of three and most preferably by at least a factor of five and the first light-sensitive area.

The first light-sensitive area specifically may be a small light-sensitive area, such that, preferably, the light beam fully illuminates this light-sensitive area. Thus, as an example which may be applicable to typical optical configurations, the first light-sensitive area may have a surface area of 1 $mm^2$ to 150 $mm^2$, more preferably a surface area of 10 $mm^2$ to 100 $mm^2$.

The second light-sensitive area specifically may be a large area. Thus, preferably, within a measurement range of the detector, light spots generated by a light beam propagating from the object of the detector may fully be located within the second light-sensitive area, such that the light spot is fully located within the borders of the second light-sensitive area. As an example, which is applicable e.g. in typical optical setups, the second light-sensitive area may have a surface area of 160 $mm^2$ to 1000 $mm^2$, more preferably a surface area of 200 $mm^2$ to 600 $mm^2$.

Infrared optical sensors which may be used for the first optical sensor, for the second optical sensor or for both the first and second optical sensors may be commercially available infrared optical sensors, such as infrared optical sensors commercially available from Hamamatsu Photonics Deutschland GmbH, D-82211 Herrsching am Ammersee, Germany. Thus, as an example, the first optical sensor, the second optical sensor or both the first and the second optical sensor may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the first optical sensor, the second optical sensor or both the first and the second optical sensor may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the first optical sensor, the second optical sensor or both the first and the second optical sensor may comprise at least one bolometer, preferably a bolometer selected from the group consisting of a VO bolometer and an amorphous Si bolometer.

The first and second optical sensors each, independently, may be opaque, transparent or semitransparent. For the sake of simplicity, however, opaque sensors which are not transparent for the light beam, may be used, since these opaque sensors generally are widely commercially available.

The first and second optical sensors each specifically may be uniform sensors having a single light-sensitive area each. Thus, the first and second optical sensors specifically may be non-pixelated optical sensors.

As outlined above, by evaluating the first and second sensor signals, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more additional transversal sensors may be used for determining at least one transversal coordinate of the object. Various transversal sensors are generally known in the art, such as the transversal sensors disclosed in WO 2014/097181 A1 and/or other position-sensitive devices (PSDs), such as quadrant diodes, CCD or CMOS chips or the like. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object.

In a further embodiment, the detector may comprise:

- at least one first optical sensor having a first light-sensitive area, wherein the first optical sensor may be configured to generate at least one first sensor signal in response to an illumination of the first light-sensitive area by a light beam propagating from the object to the detector;
- at least one second optical sensor having a second light-sensitive area, wherein the second optical sensor may be configured to generate at least one second sensor signal in response to an illumination of the second light-sensitive area by the light beam, wherein the first light-sensitive area and the second light sensitive area may be arranged such that the light-sensitive areas differ in their longitudinal coordinate; and
- at least one evaluation device being configured for determining at least one longitudinal coordinate z of the object by evaluating the first and second sensor signals.

With respect to definitions and embodiments reference can be made to the description of the first preferred embodiment. In particular, the first light-sensitive area may be smaller than the second light-sensitive area.

In a further preferred embodiment of the present invention, the detector may comprise:

- at least one sensor element having a matrix of optical sensors, the optical sensors each having a light-sensitive area, wherein each optical sensor may be configured to generate at least one sensor signal in response to an illumination of the light-sensitive area by at least one light beam propagating from the object to the detector;
- at least one evaluation device may be configured for evaluating the sensor signals, by
  - a) determining at least one optical sensor having the highest sensor signal and forming at least one center signal;
  - b) evaluating the sensor signals of the optical sensors of the matrix and forming at least one sum signal;
  - c) determining at least one combined signal by combining the center signal and the sum signal; and
  - d) determining at least one longitudinal coordinate z of the object by evaluating the combined signal.

In this further preferred embodiment the optical sensors may be arranged such that the light-sensitive areas of the optical sensors differ in spatial offset and/or surface areas.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

As explained in more detail in e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the detector. Without wishing to be bound by this theory, the light spot, may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the detector. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the object may be generated. The comparing of the center signal and the sum signal, as an example, may be done by forming the quotient signal Q out of the center signal and the sum signal and by using a predetermined or determinable relationship between the longitudinal coordinate and the quotient signal for deriving the longitudinal coordinate.

The use of a matrix of optical sensors provides a plurality of advantages and benefits. Thus, the center of the light spot generated by the light beam on the sensor element, such as on the common plane of the light-sensitive areas of the optical sensors of the matrix of the sensor element, may vary with a transversal position of the object. By using a matrix of optical sensors, the detector according to the present invention may adapt to these changes in conditions and, thus, may determine the center of the light spot simply by comparing the sensor signals. Consequently, the detector according to the present invention may, by itself, choose the center signal and determine the sum signal and, from these two signals, derive a combined signal which contains information on the longitudinal coordinate of the object. By evaluating the combined signal, the longitudinal coordinate of the object may, thus, be determined. The use of the matrix of optical sensors, thus, provides a significant flexibility in terms of the position of the object, specifically in terms of a transversal position of the object.

The transversal position of the light spot on the matrix of optical sensors, such as the transversal position of the at least one optical sensor generating the sensor signal, may even be used as an additional item of information, from which at least one item of information on a transversal position of the object may be derived, as e.g. disclosed in WO 2014/198629 A1. Additionally or alternatively, as will be outlined in further detail below, the detector according to the present invention may contain at least one additional transversal detector for, in addition to the at least one longitudinal coordinate, detecting at least one transversal coordinate of the object.

Consequently, in accordance with the present invention, the term "center signal" generally refers to the at least one sensor signal comprising essentially center information of the beam profile. As used herein, the term "highest sensor signal" refers to one or both of a local maximum or a maximum in a region of interest. For example, the center signal may be the signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be adapted to determine the center signal by integration of the plurality of sensor signals, for example the plurality of optical sensors around the optical sensor having the highest sensor signal. For example, the beam profile may be a trapezoid beam profile and the evaluation device may be adapted to determine an integral of the trapezoid, in particular of a plateau of the trapezoid.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized for example by replacing the area integrals in the quotient signal Q by a line integrals along the slice or cut. For improved accuracy, several slices or cuts through the light spot may be used and averaged. In case of an elliptical spot profile, averaging over several slices or cuts may result in an improved distance information.

Similarly, the term "combined signal", as used herein, generally refers to a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of a first linear combination of the center signal and the sum signal and a second linear combination of the center signal and the sum signal. Additionally or alternatively, the combined signal may comprise an arbitrary signal or signal combination which contains at least one item of information on a comparison between the center signal and the sum signal.

The light beam propagating from the object to the detector specifically may fully illuminate the at least one optical sensor from which the center signal is generated, such that the at least one optical sensor from which the center signal arises is fully located within the light beam, with a width of the light beam being larger than the light-sensitive area of the at least one optical sensor from which the sensor signal arises. Contrarily, preferably, the light beam propagating from the object to the detector specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below. As further used herein, a "light spot" generally refers to a visible or detectable round or non-round illumination of an article, an area or object by a light beam.

Specifically, as will be outlined in further detail below, the evaluation device may be configured to determine the at least one longitudinal coordinate z of the object by using at least one known, determinable or predetermined relationship between the sensor signals. In particular, the evaluation device is configured to determine the at least one coordinate z of the by using at least one known, determinable or predetermined relationship between a quotient signal derived from the sensor signals and the longitudinal coordinate.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

As outlined above, raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the detector, such as the evaluation device, may be configured for transforming the sensor signals of the optical sensor, thereby generating secondary optical sensor signals, wherein the evaluation device is configured for performing steps a)-d) by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or maybe determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, the comparison between the center signal and the sum signal specifically may be performed by forming one or more quotient signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa; forming a quotient of a first linear combination of the center signal and the sum signal and a second linear combination of the center signal and the sum signal. Other options, however, exist. The evaluation device may be configured for forming the one or more quotient signals. The evaluation device may further be configured for determining the at least one longitudinal coordinate by evaluating the at least one quotient signal.

The evaluation device specifically may be configured for using at least one predetermined relationship between the quotient signal Q and the longitudinal coordinate, in order to determine the at least one longitudinal coordinate. Thus, due to the reasons disclosed above and due to the dependency of the properties of the light spot on the longitudinal coordinate, the quotient signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the quotient Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

Thus, generally, the evaluation device may be configured for determining the longitudinal coordinate by evaluating the quotient signal Q such as the combined signal. This determining may be a one-step process, such as by directly combining the center signal and the sum signal and deriving the longitudinal coordinate thereof, or may be a multiple step process, such as by firstly deriving the combined signal from the center signal and the sum signal and, secondly, by deriving the longitudinal coordinate from the combined signal. Both options, i.e. the option of steps c) and d) being separate and independent steps and the option of steps c) and d) being fully or partially combined, shall be comprised by the present invention.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

The matrix may be composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

As further outlined above, the matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, as outlined above, in setups in which an axial rotational symmetry is to be expected, circular arrangements or concentric arrangements of the optical sensors of the matrix, which may also be referred to as pixels, may be preferred.

As further outlined above, preferably, the sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The detector may be adapted to determine at least one distance information of the object by using triangulation and/or structured light techniques. In known 3D sensing devices, such as devices using triangulation or structured light techniques, due to correspondence problems regular, constant or periodic pattern are not suitable since each measured point has to be assigned to one reference point of a reference pattern. The at least one light beam propagating from the object to the detector may be adapted to generate at least one reflection pattern on the matrix of optical sensors. The term "reflection pattern" refers to at least one image determined by the optical sensors in response to illumination of the light sensitive areas by the light beam propagating from the object to the detector which was generated in response to illumination by the illumination pattern. The reflection pattern may comprise at least one reflection feature depending on the corresponding illumination feature of the illumination pattern. The detector may be adapted to determine the longitudinal coordinate of an object point for at least one reflection feature of the reflection pattern from the quotient signal. Thus, the detector may be adapted to pre-classify the at least one reflection feature of the reflection pattern. This allows using illumination patterns comprising regular and/or constant and/or periodic pattern such as a triangular pattern, a rectangular pattern, a hexagonal pattern or a pattern comprising further convex tilings. The illumination pattern may comprise as much as possible features per area such that hexagonal patterns may be preferred.

The evaluation device may be adapted to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors.

The evaluation device may be adapted to determine at least one reference feature in at least one reference pattern corresponding to the at least one reflection feature. The term "reference pattern" refers to an image of comparison at a specific spatial position comprising at least one reference feature. As outlined above, the evaluation device may be adapted to perform an image analysis and to identify features of the reflection pattern. The evaluation device may be adapted to identify at least one reference feature in the reference pattern having an essentially identical longitudinal coordinate as the selected reflection feature. The term "essentially identical" refers to identical within 10%, preferably 5%, most preferably 1%. The reference feature corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that the reference pattern and the reflection pattern may be images of the object determined at different spatial positions and/or spatial orientations having a fixed distance. The distance may be a relative distance, also denoted as baseline. The evaluation device may be adapted to determine an epipolar line in the reference pattern. The relative position of the reference pattern and reflection pattern may be known. For example, the relative position of the reference pattern and the reflection pattern may be stored within at least one storage unit of the evaluation device. The evaluation device may be adapted to determine a straight line extending from the selected reflection feature to the real world feature from which it originates. Thus, the straight line may comprise possible object features corresponding to the selected reflection feature. The straight line and the baseline span an epipolar plane. As the reference pattern is determined at a different relative constellation from the reflection pattern, the corresponding possible object features may be imaged on a straight line, called epipolar line, in the reference pattern. The epipolar line may be the intersection of the epipolar plane and the reference pattern. Thus, a feature of the reference pattern corresponding to the selected feature of the reflection pattern lies on the epipolar line.

Depending on the distance to the object, the reference feature corresponding to the image position of the reflection feature may be displaced within the reference pattern compared to the image position in the reflection pattern. The reference pattern may comprise at least one displacement region in which the reference feature corresponding to the selected reflection feature may be imaged. The displacement region may comprise only one reference feature. The displacement region may extend along the epipolar line. The evaluation device may be adapted to determine the reference feature along the epipolar line. The evaluation device may be adapted to determine the longitudinal coordinate z for the reflection feature and an error interval±ε from the quotient signal Q to determine a displacement region along the epipolar line corresponding to z±ε. The evaluation device may be adapted to match the selected reflection feature with at least one reference feature within the displacement region. As used herein, the term "matching" refers to determining and/or evaluating the corresponding reference and reflection features. The evaluation device may be adapted to match the selected feature of the reflection pattern with the reference feature within the displacement region by using at least one evaluation algorithm considering the determined longitudinal coordinate z. The evaluation algorithm may be a linear scaling algorithm. Preferably, the detector may be adapted to pre-classify the selected reflection feature using the quotient signal Q such that an unambiguous assignment to one reference feature is possible. In particular, illumination features of the illumination pattern may be arranged such that corresponding reference features of the reference pattern may have a relative distance to each other as large as possible on the epipolar line. The illumination features of the illumination pattern may be arranged such that only few reference features are positioned on the epipolar line. For example, the illumination pattern may comprise at least one hexagonal pattern. Preferably, the illumination pattern may comprise at least one hexagonal pattern, wherein the pattern is rotated relative to the baseline. Preferably, the illumination pattern may comprise at least one displaced hexagonal pattern, wherein individual points of the hexagonal pattern are displaced by a random distance from the regular position, for example orthogonal to the epipolar line of the point. The displacement of the individual points may be smaller than half of the distance between two parallel epipolar lines, preferably smaller than one fourth of the distance between two parallel epipolar lines. The displacement of the individual points may be as such that two points are not displaced above each other.

The evaluation device may be adapted to determine a displacement of the reference feature and the reflection feature. The evaluation device may be adapted to determine the displacement of the matched reference feature and the selected reflection feature. As used herein, the term "displacement" refers to the difference between an image position in the reference image to an image position in the reflection image. The evaluation device may be adapted to determine a longitudinal information of the matched feature using a predetermined relationship between a longitudinal coordinate and the displacement. As used herein, the term "longitudinal information" refers to information relating to the longitudinal coordinate $z_{triang}$. For example, the longitudinal information may be a distance value. The evaluation device may be adapted to determine the pre-determined relationship by using triangulation methods. In case the position of the selected reflection feature in the reflection pattern and the position of the matched reference feature and/or the relative displacement of the selected reflection feature and the matched reference feature are known, the longitudinal coordinate of the corresponding object feature may be determined by triangulation. Thus, the evaluation device may be adapted to select, for example subsequent and/or column by column, a reflection feature and to determine for each potential position of the reference feature the corresponding distance value using triangulation. The displacement and the corresponding distance value may be stored in at least one storage device of the evaluation device. The evaluation device may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage device may be provided, such as for providing one or more look-up tables for storing the predetermined relationship.

The detector may comprise at least one FiP sensor adapted for generating the so called FiP effect as described in WO 2015/024871 or WO2016/120392. For example, at least one optical sensors of the matrix of optical sensors may be adapted to generate a so called FiP signal. For example, each of the optical sensors of the matrix may be adapted to generate the at least one FiP signal. For example, the matrix of optical sensors may be a pixelated FiP-sensor. Additionally or alternatively, the FiP signal may be determined, such as extracted and/or simulated, from the sensor signals of the matrix and the quotient as outlined above may be determined from the sensor signals.

As outlined above, by evaluating the center signal and the sum signal, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. As outlined above, the position of the at least one optical sensor from which the center signal arises may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R. A. Street (Ed.): *Technology and Applications of Amorphous Silicon*, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be adapted to combine the information of the longitudinal coordinate and the transversal coordinate and to determine a position of the object in space.

The detector may be configured for evaluating a single light beam or a plurality of light beams. In case a plurality of light beams propagates from the object to the detector, means for distinguishing the light beams may be provided. Thus, the light beams may have different spectral properties, and the detector may comprise one or more wavelength selective elements for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device may be configured for distinguishing different light beams having different modulations.

The illumination source may be adapted to generate and/or to project a cloud of points such that a plurality of illuminated regions is generated on the matrix of optical sensor, for example the CMOS detector. Additionally, disturbances may be present on the matrix of optical sensor such as disturbances due to speckles and/or extraneous light and/or multiple reflections. The evaluation device may be adapted to determine at least one region of interest, for example one or more pixels illuminated by the light beam which are used for determination of the longitudinal coordinate of the object. For example, the evaluation device may be adapted to perform a filtering method, for example, a blob-analysis and/or object recognition method.

Preferably, the illumination source may be a movable and/or mobile illumination source. For example, the illumination source may be moved during the measurement such as to illuminate the object from different positions and/or angles. However, embodiments are feasible in which the illumination source may be positioned in at least one fixed position, for example during a complete measurement time. The evaluation device may be adapted to illumination sources with unclear position such as due to high manufacturing tolerances and/or user interaction and/or user assembly or the like.

The illumination source may illuminate the object with a convergent and/or divergent and/or collimated light beam.

In a further preferred embodiment the detector may comprise:

- at least two optical sensors, each optical sensor having a light-sensitive area, wherein each light-sensitive area has a geometrical center, wherein the geometrical centers of the optical sensors are spaced apart from an optical axis of the detector by different spatial offsets, wherein each optical sensor is configured to generate a sensor signal in response to an illumination of its respective light-sensitive area by a light beam propagating from the object to the detector; and
- at least one evaluation device being configured for determining at least one longitudinal coordinate z of the object by combining the at least two sensor signals.

In this further preferred embodiment the optical sensors may be arranged such that the light-sensitive areas of the optical sensors differ in their spatial offset and/or their surface areas The light-sensitive areas of the optical sensors may overlap, as visible from the object, or may not overlap, i.e. may be placed next to each other without overlap. The light-sensitive areas may be spaced apart from each other or may directly be adjacent.

The detector may comprise more than two optical sensors. In any case, i.e. in the case of the detector comprising precisely two optical sensors and in the case of the detector comprising more than two optical sensors, the optical sensors may comprise at least one first optical sensor being spaced apart from the optical axis by a first spatial offset and at least one second optical sensor being spaced apart from the optical axis by a second spatial offset, wherein the first spatial offset and the second spatial offset differ. In case further optical sensors are provided, besides the first and second optical sensors, these additional optical sensors may also fulfill the condition or, alternatively, may be spaced apart from the optical axis by the first spatial offset, by the second spatial offset or by a different spatial offset. The first and second spatial offsets, as an example, may differ by at least a factor of 1.2, more preferably by at least a factor of 1.5, more preferably by at least a factor of two. The spatial offsets may also be zero or may assume negative values, as long as the above-mentioned conditions are fulfilled.

As outlined above, each light-sensitive area has a geometrical center. Each geometrical center of each light-sensitive area may be spaced apart from the optical axis of the detector, such as the optical axis of the beam path or the respective beam path in which the respective optical sensor is located.

As outlined above, the optical sensors specifically may be located in one and the same plane, which, preferably, is a plane perpendicular to the optical axis. Other configurations, however, are possible. Thus, two or more of the optical sensors may also be spaced apart in a direction parallel to the optical axis.

For example, the optical sensors may be partial diodes of a segmented diode, with a center of the segmented diode being off-centered from the optical axis of the detector. As used herein, the term "partial diode" may comprise several diodes that are connected in series or in parallel. This example is rather simple and cost-efficiently realizable. Thus, as an example, bi-cell diodes or quadrant diodes are widely commercially available at low cost, and driving schemes for these bi-cell diodes or quadrant diodes are generally known. As used herein, the term "bi-cell diode" generally refers to a diode having two partial diodes in one packaging. Bi-cell and quadrant diodes may have two or four separate light sensitive areas, in particular two or four active areas. As an example, the bi-cell diodes may each form independent diodes having the full functionality of a diode. As an example, each of the bi-cell diodes may have a square or rectangular shape, and the two diodes may be placed in one plane such that the two partial diodes, in total, form a 1×2 or 2×1 matrix having a rectangular shape. In the present invention, however, a new scheme for evaluating the sensor signals of the bi-cell diodes and quadrant diode is proposed, as will be outlined in further detail below. Generally, however, the optical sensors specifically may be partial diodes of a quadrant diode, with a center of the quadrant diode being off-centered from the optical axis of the detector. As used herein, the term "quadrant diode" generally refers to a diode having four partial diodes in one packaging. As an example, the four partial diodes may each form independent diodes having the full functionality of a diode. As an example, the four partial diodes may each have a square or rectangular shape, and the four partial diodes may be placed in one plane such that the four partial diodes, in total, form a 2×2 matrix having a rectangular or square shape. In a further example, the four partial diodes, in total, may form a 2×2 matrix having a circular or elliptical shape. The partial diodes, as an example, may be adjacent, with a minimum separation from one another. However, the separation between adjacent diodes may also be varied to improve the dynamic range of the quotient signal. As an example, the separation between two adjacent diodes may be increased by using an opaque mask. This may reduce the light on one of the diodes relative and/or absolute as compared to the adjacent diode which will may increase a quotient of the signal of the two diodes.

In case a quadrant diode is used, having a 2×2 matrix of partial diodes, the center of the quadrant diode specifically may be off-centered or offset from the optical axis. Thus, as an example, the center of the quadrant diodes, which may be an intersection of the geometrical centers of the optical sensors of the quadrant diode, may be off-centered from the optical axis by at least 0.2 mm, more preferably by at least 0.5 mm, more preferably by at least 1.0 mm or even 2.0 mm. Similarly, when using other types of optical sensors setups having a plurality of optical sensors, an overall center of the optical sensors may be offset from the optical axis by the same distance.

As outlined above, bi-cell and quadrant diodes may have two or four separate light sensitive areas, in particular two or four active areas. The light sensitive areas may be separated by a dividing line. The dividing line, for example, of two Si-diodes, can be arranged parallel to the baseline of the detector, in particular parallel to a spot movement on the optical sensors. However, other arrangements are feasible. For example, the quadrant diode may comprise two dividing lines. The dividing lines may be arranged orthogonal to each other. The orthogonal arrangement of the dividing lines allows adjusting of the quotient signal for near field and far field applications independently from each other. In addition to determining the quotient signal of sensor signals of two optical sensors of the quadrant diode, the evaluation device may be adapted to determine a second quotient using at least three or all four sensor signals of the quadrant diode. The two quotients can be formed such that two distinct distance ranges are covered. The two quotient signals for the near field and far field may have an overlap region in which both quotient signals allow obtaining reasonable determination of the longitudinal distance z. For example, the quotient signal may be determined by dividing the sensor signals of two top quadrants, also called top segment, by the sensor signals of two bottom quadrants, also called bottom segment. Using the quotient signal of sensor signals determined by two sensor areas which have a dividing line parallel to the baseline of the detector may allow determining of the quotient without any distance dependent movement of the light spot. In particular, as an example, if the dividing line between the top and bottom segment is parallel to the baseline, the quotient signal determined from top segment divided by bottom segment may be used in the near field, wherein the light spot may illuminate only one of a left or right segment of the quadrant diode. In this case determining the quotient signal by dividing sensor signals of the left and right segments may not be possible. However, determining the quotient by dividing the sensor signals of top and bottom segments may provide a reasonable distance measurement. The quotient signal determined by dividing sensor signals of the left and right segments may be used for far field measurement, wherein the light spot illuminates both left and right segments. Furthermore, the evaluation device may be adapted to determine the quotient signal by dividing sensor signals of opposing segments or neighboring segments. The evaluation device may be adapted to combine the acquired sensor signals of the quadrants such that distance measurement is possible over a wide range with a large resolution. Generally, the light-sensitive areas of the optical sensors may have an arbitrary surface area or size. Preferably, however, specifically in view of a simplified evaluation of the sensor signals, the light-sensitive areas of the optical sensors are substantially equal, such as within a tolerance of less than 10%, preferably less than 5% or even less than 1%. This, specifically, is the case in typical commercially available quadrant diodes.

The detector may comprise at least one quadrant diode comprising four quadrants. For example, an upper left quadrant of the quadrant diode may be denoted "ol", a lower left quadrant "ul", an upper right quadrant may be denoted "or" and a lower right quadrant may be denoted "ur". The light spot may move from the left in a small distance range to the left in a far distance range. The detector may comprise at least one neutral density filter. The quadrants of the small distance range may be covered by the neutral density filter. In the small distance range the quotient ol/ul may be used to determine the longitudinal coordinate z. In the far distance range a quotient or/ur and/or a quotient from a combination of all quadrants may be used. The neutral density filter allows that objects in the small distance range are adapted to illuminate the optical sensors brighter by constant amplification without saturating the amplifier. At the same time it is possible to obtain in the far distance range more of the signal. Thus, the neutral density filter allows to enhance dynamic of the detector.

Specifically, as will be outlined in further detail below, the evaluation device may be configured to determine the at least one longitudinal coordinate z of the object by using at least one known, determinable or predetermined relationship between sensor signals and/or any secondary signal derived thereof and the longitudinal coordinate. Thus, the evaluation device may be configured for determining at least one combined sensor signal out of the at least two sensor signals, i.e. of the at least one sensor signal of at least one first optical sensor and out of the at least one sensor signal of at least one second optical sensor.

The detector may comprise at least one FiP sensor adapted for generating the so called FiP effect as described in WO 2015/024871 or WO2016/120392. For example, the bi-cell or quadrant diode may be adapted to generate a so called FiP signal. As outlined e.g. in WO 2015/024871 or WO2016/120392, the FiP signal can be used to determine depth information over a wide distance range. The FiP sensor may be adapted to exhibit a positive and/or a negative FiP effect. According to the FiP-effect, the longitudinal sensor signal, given the same total power, may exhibit at least one pronounced maximum for one or a plurality of focusings and/or for one or a plurality of specific sizes of the light spot on the sensor region or within the sensor region. For purposes of comparison, an observation of a maximum of the longitudinal sensor signal in a condition in which the corresponding material is impinged by a light beam with the smallest possible cross-section, such as when the material may be located at or near a focal point as affected by an optical lens, may be denominated as a "positive FiP-effect". The negative FiP effect describes an observation of a minimum of the longitudinal sensor signal under a condition in which the corresponding material is impinged by a light beam with the smallest available beam cross-section, in particular, when the material may be located at or near a focal point as effected by an optical lens. The negative FiP effect may be used to tune small image effects at high distances. Image changes such as position, size, shape, sharpness, etc. may vanish at high distances while the negative FiP effect increases. Furthermore, no luminance dependence may be introduced since both cells are at the same longitudinal position and thus receive identical photon density.

As outlined above, the detector may comprise the at least one illumination source. A distance perpendicular to an optical axis of the detector between the illumination source and the bi-cell or quadrant diode may be small. The distance perpendicular to the optical axis of the detector between the illumination source and the bi-cell or quadrant diode may be less than 0.1 m, preferably less than 0.05 m, more preferably less than 0,025 m. The illumination source and the optical axis may be separated by a small baseline. The illumination source may be spaced apart from the optical axis by a minimum distance. The minimum distance from the optical axis may be defined by further detector elements such as size and position of the bi-cell or quadrant diode and of the at least one optional transfer device. The baseline may be less than 0.1 m, preferably less than 0.05 m, more preferably less than 0,025 m. For example, the baseline may be 21 mm. Preferably, the illumination source may be arranged right next to the transfer device. For example, the transfer device may be flattened such that the illumination source can be positioned even closer to the optical axis. The illumination source may be arranged behind the transfer device.

As generally used herein, the term "combine" generally may refer to an arbitrary operation in which two or more components such as signals are one or more of mathematically merged in order to form at least one merged combined signal and/or compared in order to form at least one comparison signal or comparison result. As will be outlined in further detail below, the combined sensor signal or secondary signal may be or may comprise at least one quotient signal.

In case more than two sensor signals are provided, as an example, more than one quotient signal may be generated, such as by forming quotient signals of more than one pair of sensor signals.

Thus, as an example, in case more than two optical sensors are provided, the above-mentioned quotient formation may take place between two of the sensor signals generated by these optical sensors or may take place between more than two of the sensor signals. Thus, instead of using the first one of the sensor signals and the second one of the sensor signals in the formulae given above, combined sensor signals may be used for quotient formation.

The quotient signal Q generally is an example for an asymmetry parameter denoting an asymmetry or an asymmetric distribution of the light spot generated by the light beam on the light-sensitive areas. The quotient of the two or more optical sensors, such as the two or more photodiodes, may provide a combined signal which typically is monotonously dependent on the distance between the detector and the object from which the light beam travels towards the detector, as will be shown by experimental data below. In addition or as an alternative to the quotient signal, other types of combined functions implementing the sensor signals of two or more sensors in the setup of the present invention may be used, which also may show a dependency on the distance between the object and the detector. The asymmetry or the asymmetry parameter of the light spot, as an example, may be an indication of the width of a light beam. If this asymmetry parameter depends on the distance only, the measurement can be used to determine the distance.

In typical setups, commercially available quadrant diodes such as quadrant photodiodes are used for positioning, i.e. for adjusting and/or measuring a transversal coordinate of a light spot in the plane of the quadrant photodiode. Thus, as an example, laser beam positioning by using quadrant photodiodes is well known. According to a typical prejudice, however, quadrant photodiodes are used for xy-positioning, only. According to this assumption, quadrant photodiodes are not suitable for measuring distances. The above-mentioned findings, however, using an off-centered quadrant photodiode with regard to an optical axis of the detector, show otherwise, as will be shown in further measurements below. Thus, as indicated above, in quadrant photodiodes, the asymmetry of the spot can be measured by shifting the quadrant diode slightly off-axis, such as by the above-mentioned offset. Thereby, a monotonously z-dependent function may be generated, such as by forming the quotient signal Q of two or more of the sensor signals of two or more partial photodiodes, i.e. quadrants, of the quadrant photodiode. Therein, in principle, only two photodiodes are necessary for the measurement. The other two diodes may be used for noise cancellation or to obtain a more precise measurement.

In addition or as an alternative to using a quadrant diode or quadrant photodiode, other types of optical sensors may be used. Thus, as will be shown in further detail below, staggered optical sensors may be used.

The use of quadrant diodes provides a large number of advantages over known optical detectors. Thus, quadrant diodes are used in a large number of applications in combination with LEDs or active targets and are widely commercially available at very low price, with various optical properties such as spectral sensitivities and in various sizes. No specific manufacturing process has to be established, since commercially available products may be implemented into the detector according to the present invention.

The detector according to the present invention specifically may be used in multilayer optical storage discs, such as disclosed by international patent application number PCT/IB2015/052233, filed on Mar. 26, 2015. Measurements performed by using the detector according to the present invention specifically may be used in order to optimize the focus position in optical storage discs.

As will be outlined in further detail below, the distance measurement by using the detector according to the present invention may be enhanced by implementing one or more additional distance measurement means into the detector and/or by combining the detector with other types of distance measurement means. Thus, as an example, the detector may comprise or may be combined with at least one triangulation distance measurement device. Thus, the distance measurement can be enhanced by making use of a combination of the measurement principle discussed above and a triangulation type distance measurement. Further, means for measuring one or more other coordinates, such as x- and/or y-coordinates, may be provided.

In case a quadrant diode is used, the quadrant diode may also be used for additional purposes. Thus, the quadrant diode may also be used for conventional x-y-measurements of a light spot, as generally known in the art of optoelectronics and laser physics. Thus, as an example, the lens or detector position can be adjusted using the conventional xy-position information of the quadrant diode to optimize the position of the spot for the distance measurement. As a practical example, the light spot, initially, may be located right in the center of the quadrant diode, which typically does not allow for the above-mentioned distance measurement using the quotient function Q. Thus, firstly, conventional quadrant photodiode techniques may be used for off-centering a position of the light spot on the quadrant photodiode, such that, e.g., the spot position on the quadrant diode is optimal for the measurement. Thus, as an example, the different off-centering of the optical sensors of the detector may simply be a starting point for movement of the optical sensors relative to the optical axis such that the light spot is off-centered with respect to the optical axis and with respect to a geometrical center of the array of the optical sensors.

Thus, generally, the optical sensors of the detector may form a sensor array or may be part of a sensor array, such as the above-mentioned quadrant diode. The case m=2, n=2 is the case of the quadrant diode or quadrant optical sensor, which, for practical reasons, is one of the preferred cases, since quadrant photodiodes are widely available.

As a starting point, a geometrical center of the optical sensors within the array may be off-centered from the optical axis, such as by the above-mentioned offset. The sensor array specifically may be movable relative to the optical axis, for example along a gradient, preferably automatically, such as by moving the sensor array, e.g. in a plane perpendicular to the optical axis, and/or by moving the optical axis itself, e.g. shifting the optical axis in a parallel shift and/or tilting the optical axis. Thus, the sensor array may be shifted in order to adjust a position of a light spot generated by the light beam in the plane of the sensor array. Additionally or alternatively, the optical axis may be shifted and/or tilted by using appropriate elements, such as by using one or more deflection elements and/or one or more lenses. The movement, as an example, may take place by using one or more appropriate actuators, such as one or more piezo actuators and/or one or more electromagnetic actuators and/or one or more pneumatic or mechanical actuators, which, e.g., move and/or shift the array and/or move and/or shift and/or tillage one or more optical elements in the beam path in order to move the optical axis, such as parallel shifting the optical axis and/or tilting the optical axis. The evaluation device specifically may be adjusted to control a relative position of the sensor array to the optical axis, e.g. in the plane perpendicular to the optical axis. An adjustment procedure may take place in that the evaluation device is configured for, firstly, determining the at least one transversal position of a light spot generated by the light beam on the sensor array by using the sensor signals and for, secondly, moving the array relative to the optical axis, such as by moving the array and/or the optical axis, e.g. by moving the array in the plane to the optical axis until the light spot is off-centered and/or by tilting a lens until the light spot is off-centered. As used therein, a transversal position may be a position in a plane perpendicular to the optical axis, which may also be referred to as the xy-plane. For the measurement of the transversal coordinate, as an example, the sensor signals of the optical sensors may be compared. As an example, in case the sensor signals are found to be equal and, thus, in case it is determined that the light spot is located symmetrically with respect to the optical sensors, such as in the center of the quadrant diodes, a shifting of the array and/or a tilting of a lens may take place, in order to off-center the light spot in the array. Thus, as outlined above, the off-centering of the array from the optical axis, such as by off-centering the center of the quadrant photodiode from the optical axis, may simply be a starting point in order to avoid the situation which is typical, in which the light spot is located on the optical axis and, thus, is centered. By off-centering the array relative to the optical axis, thus, the light spot should be off-centered. In case this is found not to be true, such that the light spot, incidentally, is located in the center of the array and equally illuminates all optical sensors, the above-mentioned shifting of the array relative to the optical axis may take place, preferably automatically, in order to off-center the light spot on the array. Thereby, a reliable distance measurement may take place.

Further, in a scanning system with a movable light source, the position of the light spot on the quadrant diode may not be fixed. This is still possible, but may necessitate that different calibrations are used, dependent on the xy-position of the spot in the diode.

Further, the use of the above-mentioned quotient signal Q is a very reliable method for distance measurements. Typically, Q is a monotonous function of the longitudinal coordinate of the object and/or of the size of the light spot such as the diameter or equivalent diameter of the light spot. Thus, as an example, specifically in case linear optical sensors are used, the quotient $Q=s_1/s_2$ is a monotonously decreasing function of the size of the light spot. Without wishing to be bound by this theory, it is believed that this is due to the fact that, in the preferred setup described above, the sensor signals, such as the above-mentioned first sensor signal $s_1$ and the above-mentioned second sensor signal $s_2$, decrease as a square function with increasing distance to the light source, since the amount of light reaching the detector decreases. Therein, however, due to the off-centering, the one of the sensor signals decreases more rapidly than the other, since, in the optical setup as used in the experiments, the light spot in the image plane grows and, thus, is spread over a larger area. By spreading the light spot, however, the portion of the light illuminating the one or more optical sensors outside the center of the light spot increases, as compared to a situation of a very small light spot. Thus, the quotient of the sensor signals continuously changes, i.e. increases or decreases, with increasing diameter of the light beam or diameter of the light spot. The quotient, further, may further be rendered mainly independent from the total power of the light beam, since the total power of the light beam forms a factor in all sensor signals. Consequently, the quotient Q may form a secondary signal which provides a unique and unambiguous relationship between the sensor signals and the size or diameter of the light beam.

As outlined above, specifically, quadrant photodiodes may be used. As an example, commercially available quadrant photodiodes may be integrated in order to provide four optical sensors, such as one or more quadrant photodiodes available from Hamamatsu Photonics Deutschland GmbH, D-82211 Herrsching am Ammersee, Germany, such as quadrant Si PIN photodiodes of the type S4349, which are sensitive in the UV spectral range to the near IR spectral range. In case an array of optical sensors is used, the array may be a naked chip or may be an encapsulated array, such as encapsulated in a TO-5 metal package. Additionally or alternatively, a surface mounted device may be used, such as TT Electronics OPR5911 available from TT Electronics plc, Fourth Floor, St Andrews House, West Street Woking Surrey, GU21 6EB, England.

It shall be noted that other optical sensors may also be used.

Further, it shall be noted that, besides the option of using precisely one quadrant photodiode, two or more quadrant photodiodes may also be used. Thus, as an example, a first quadrant photodiode may be used for the distance measurement, as described above, providing the two or more optical sensors. Another quadrant photodiode may be used, e.g. in a second partial beam path split off from the beam path of the first quadrant photodiode, for a transversal position measurement, such as for using at least one transversal coordinate x and/or y. The second quadrant photodiode, as an example, may be located on-axis with respect to the optical axis.

Further, it shall be noted that, besides the option of using one or more quadrant photodiodes, one or more quadrant photodiodes or further photodiode arrays may also be replaced or mimicked by separated photodiodes that are arranged or assembled close to each other, preferably in a symmetric shape such as a rectangular matrix, such as a 2×2 matrix. However further arrangements are feasible. In such an arrangement or assembly, the photodiodes may be arranged or assembled in a housing or mount, such as all photodiodes in a single housing or mount or groups of photodiodes in one housing or mount, or each of the photodiodes in a separate housing or mount. Further, the photodiodes may also be assembled directly on a circuit board. In such arrangements or assemblies, photodiodes may be arranged as such that the separation between the active area of the photodiodes, has a distinct value less than one centimeter, preferably less than one millimeter, more preferably as small as possible. Further, to avoid optical reflexes, distortions, or the like that may deteriorate the measurement, the space between the active areas may be either empty or filled with a material, preferably with a light absorbing material such as a black polymer, such as black silicon, black polyoxymethylene, or the like, more preferably optically absorbing and electrically insulating material, such as black ceramics or insulating black polymers such as black silicon, or the like. Further, the distinct value of the photodiode separation may also be realized by adding a distinct building block between the photodiodes such as a plastic separator. Further embodiments are feasible. The replacement of quadrant photodiodes by single diodes arranged in a similar setup such as in a 2×2 rectangular matrix with minimal distance between the active areas may further minimize the costs for the optical detector. Further, two or more diodes from a quadrant diode may be connected in parallel or in series to form a single light sensitive area.

The optical sensors each specifically may be uniform sensors having a single light-sensitive area each. Thus, the optical sensors specifically may be non-pixelated optical sensors.

In a further preferred embodiment the detector may comprise
- at least one first optical sensor having a first light-sensitive area, wherein the first optical sensor is configured to generate at least one first sensor signal in response to an illumination of the first light-sensitive area by a light beam propagating from the object to the detector;
- at least one second optical sensor having:
  - at least one fluorescent waveguiding sheet forming a second light-sensitive area, wherein the fluorescent waveguiding sheet is oriented towards the object such that at least one light beam propagating from the object towards the detector generates at least one light spot in the second light-sensitive area, wherein the fluorescent waveguiding sheet contains at least one fluorescent material, wherein the fluorescent material is adapted to generate fluorescence light in response to the illumination by the light beam; and
  - at least one photosensitive element located at at least one edge of the fluorescent waveguiding sheet, capable of detecting fluorescence light guided from the light spot towards the photosensitive element by the fluorescent waveguiding sheet and capable of generating at least one second sensor signal in response to the illumination of the second light-sensitive area by the light beam, wherein the first light-sensitive area is smaller than the second light-sensitive area; and
- at least one evaluation device being configured for determining at least one longitudinal coordinate z of the object by evaluating the first and second sensor signals.

In this further preferred embodiment the optical sensors may be arranged such that the light-sensitive areas of the optical sensors differ in their spatial offset and/or their surface areas. The first and second light-sensitive areas specifically may be oriented towards the object The light beam propagating from the object to the detector specifically may fully illuminate the first light-sensitive area, such that the first light-sensitive area is fully located within the light beam, with a width of the light beam being larger than the light-sensitive area of the first optical sensor. Contrarily, preferably, the light beam propagating from the object to the detector specifically may create a light spot on the second light-sensitive area, which is smaller than the second light-sensitive area, such that the light spot is fully located within the second light-sensitive area. Within the light spot on the second light-sensitive area, a shadow created by the first optical sensor may be located. Thus, generally, the first optical sensor, having the smaller first light-sensitive area, may be located in front of the second optical sensor, as seen from the object, with the first light-sensitive area being fully located within the light beam and with the light beam generating a light spot on the second light-sensitive area being smaller than the second light-sensitive area, and with further a shadow created by the first optical sensor within the light spot. The situation may easily be adjusted by a person skilled in the art of optics by choosing one or more appropriate lenses or elements having a focusing or defocusing effect on the light beam, such as by using an appropriate transfer device as will be outlined in further detail below. As further used herein, a light spot generally refers to a visible or detectable round or non-round illumination of an article, an area or object by a light beam.

The first and second optical sensors may be sensitive in one or more of the ultraviolet, the visible or the infrared spectral range. The first and second optical sensors may be sensitive in one and the same spectral range or may have differing spectral sensitivities.

As further used herein, a fluorescent waveguiding sheet generally refers to an element with both waveguiding properties and fluorescent properties. Therein, waveguiding generally refers to the property or a plurality of an element to guide the light in one or more of the ultraviolet, visible or the infrared spectral range by internal reflection, specifically by internal total reflection. The term "fluorescence" generally refers to the property of an element or a material to emit secondary light, also referred to as fluorescence light, in one or more of the ultraviolet, visible or infrared spectral range, in response to excitation by electromagnetic radiation, also referred to as primary radiation or excitation radiation, such as primary light or excitation light. In most cases, the emitted light, fluorescence light or secondary light has a longer wavelength and a lower energy than the primary radiation. The primary radiation typically induces the presence of excited states within the fluorescent material, such as so-called excitons. Typically, excited state decay times for photon emissions with energies from the UV to near infrared are within the range of 0.5 to 20 nanoseconds. Other examples, however, are feasible within the present invention. Similarly, as used herein, the term "fluorescent material" generally refers to a material having fluorescence properties. The term "fluorescence light" generally refers to the secondary light generated during the above-mentioned fluorescence process.

For potential embodiments of the fluorescent waveguiding sheet, generally, reference may be made to the so-called "Q-Foil Technology", as disclosed e.g. in the above-mentioned article by P. Bartu, R. Koeppe, N. Arnold, A. Neulinger, L. Fallon, and S. Bauer, Conformable large-area position-sensitive photodetectors based on luminescence collecting silicone waveguides, J. Appl. Phys. 107, 123101 (2010). Fluorescent waveguiding sheets and/or second optical sensors as disclosed therein may also be used in the context of the present invention, within the second optical sensor.

The fluorescent waveguiding sheet, as will be outlined in further detail below, specifically may be an element or may comprise an element which has a sheet-like shape or which is a sheet. As used herein, a "sheet" generally refers to an element which has a lateral extension, such as a diameter or an equivalent diameter, which significantly exceeds a thickness of the element, such as by at least a factor of 5, more preferably by at least a factor of 10 or even more preferably by at least a factor of 20, a factor of 50 or even a factor of 100. The sheet specifically may be flexible, deformable or rigid.

As will be outlined in further detail below, the fluorescent waveguiding sheet specifically may be or may comprise a transparent material, specifically a transparent sheet. The transparency may be a transparency of at least 50 to 70% in the visible spectral range or in a part thereof, such as in a range of 500 nm to 700 nm. Other embodiments are feasible.

As further used herein, the term "sensitive area" generally refers to a two-dimensional or three-dimensional region of an element, specifically of the fluorescent waveguiding sheet or the optical sensor, which is sensitive to external influences and, e.g., produces at least one reaction in response to an external stimulus. In this case, specifically, the sensitive area may be sensitive to an optical excitation. The sensitive area specifically may be a part of a surface or the volume of the fluorescent waveguiding sheet, such as the whole surface of the fluorescent waveguiding sheet or a part thereof.

As further used herein, the term "fluorescent waveguiding sheet is oriented towards the object" generally refers to the situation that the surface of the fluorescent waveguiding sheet or a part of this surface, specifically the sensitive area, is fully or partially visible from the object. Specifically, at least one interconnecting line between at least one point of the object and at least one point of the sensitive area may form an angle with a surface element of the sensitive area or of the fluorescent waveguiding sheet which is different from 0°, such as an angle in the range of 20°-90°. Other embodiments, however, are feasible.

Most preferably, however, the at least one fluorescent waveguiding sheet, the sensitive area or a part thereof is oriented essentially perpendicular to an optical axis of the optical sensor and/or of the detector.

As further used herein, the term "edge" of the fluorescent waveguiding sheet generally refers to a boundary of the at least one fluorescent waveguiding sheet, such as a side boundary or side edge or a front or back face of the fluorescent waveguiding sheet. Thus, as the skilled person will recognize, the term "edge" of the fluorescent waveguiding sheet may generally refer to an interface or boundary between the fluorescent waveguiding sheet and a surrounding atmosphere, such as air. Specifically, the edge may be a border of a second light-sensitive area formed by the fluorescent waveguiding sheet. The term "located at" generally refers to the fact that the photosensitive elements are either located directly on the edge or in close proximity to the edge. As an example, at least 50% of the light emerging from the edge into the direction of the photosensitive element may be collected by the respective photosensitive element, without being lost by scattering, beam widening or other losses. As an example, the photosensitive element may be located at a position spaced apart from the edge of no more than 10 mm, more preferably of no more than 5 mm. It shall be noted, however, that other embodiments are feasible for connecting the fluorescence light. Most preferably, all photosensitive elements are located relative to their respective edges of the fluorescent waveguiding sheet in the same way, in order to provide similar measurement conditions for all photosensitive elements.

The at least one photosensitive element located at the at least one edge of the fluorescent waveguiding sheet may, as an example, be fully or partially located in the same plane as the fluorescent waveguiding sheet and/or may fully or partially be located in a different plane. In the latter case, as will be outlined in further detail below, as an example, an optical coupling between the edge of the fluorescent waveguiding sheet and the at least one photosensitive element may take place, by using at least one optical coupling element. Further, in case a plurality of photosensitive elements is provided in the second optical sensor, at least one of the photosensitive elements may be located in the same plane as the fluorescent waveguiding sheet and at least one of the photosensitive elements may be located outside the plane of the fluorescent waveguiding sheet. Further, a direction of view of the at least one photosensitive element may be parallel to the plane of the fluorescent waveguiding sheet or may be directed otherwise, such as perpendicular to the plane. Therein, when talking about a "plane" of the fluorescent waveguiding sheet, this term does not necessarily imply that the fluorescent waveguiding sheet is fully planar. Thus, as an example, the fluorescent waveguiding sheet may also be curved or bent, and the plane of the fluorescent waveguiding sheet at the location of the at least one photosensitive element may be a local tangential plane.

The term "edge" of the fluorescent waveguiding sheet, as used herein, may refer to a straight line or straight border area of the fluorescent waveguiding sheet, in the following also referred to as a "straight edge", or may also refer to a non-straight line or non-straight border area of the fluorescent waveguiding sheet, such as a corner of the fluorescent waveguiding sheet. Thus, the at least one photosensitive element or, in case a plurality of photosensitive elements is provided, at least one of the photosensitive elements, may also be located at at least one corner of the fluorescent waveguiding sheet, such as at at least one corner of the second light-sensitive area formed by the fluorescent waveguiding sheet. Thus, specifically, the edge may comprise a rim or a portion of a rim of the fluorescent waveguiding sheet, such as a corner and/or a straight rim portion. Additionally or alternatively, however, the edge may also comprise a flat surface of the fluorescent waveguiding sheet, such as a front side or back side.

As already outlined above, in order to improve feeding fluorescence light guided from the light spot towards the at least one photosensitive element into the at least one respective photosensitive element, at least one optical coupling may take place, by using at least one optical coupling element in between the fluorescent waveguiding sheet and the respective photosensitive element. Thus, the at least one photosensitive element, or, in case a plurality of photosensitive elements is provided, at least one of the photosensitive elements may be optically coupled to the fluorescent waveguiding sheet by at least one optical coupling element configured for at least partially coupling the fluorescence light guided by the fluorescent waveguiding sheet out of the fluorescent waveguiding sheet and, preferably, at least partially into the photosensitive element. As used herein, the term "optical coupling element" generally refers to an arbitrary element which is configured for one or more of disturbing, diminishing or interrupting an internal total reflection within the fluorescent waveguiding sheet which takes place during waveguiding within the fluorescent waveguiding sheet. Thus, as an example, the optical coupling element may be an arbitrary transparent element having an index of refraction in between an index of refraction of the fluorescent waveguiding sheet and the photosensitive element and/or the ambient atmosphere, such as air. Thus, as an example, in case an index of refraction of the fluorescent waveguiding sheet is denoted by $n1$, and an index of refraction of the photosensitive element is denoted by $n2$, an index of refraction $n3$ of the optical coupling element may be $n1 < n3 < n2$ or $n1 > n3 > n2$.

The optical coupling element may be in direct contact with the fluorescent waveguiding sheet, such as with at least one surface, such as a surface facing the object and/or a surface facing away from the object, of the fluorescent waveguiding sheet. Further, the optical coupling element may also be in direct contact with the at least one photosensitive element. Further, for each photosensitive element, an independent optical coupling element may be provided, or alternatively, a plurality of photosensitive elements may share a common optical coupling element, or, alternatively, a plurality of optical coupling elements may be coupled to one photosensitive element.

Various ways of optical coupling are generally known to the skilled person and may also be used for coupling fluorescence light from the fluorescent waveguiding sheet into the photosensitive element. Thus, as an example, the at least one optical coupling element may comprise at least one element selected from the group consisting of: a portion of transparent adhesive attaching the photosensitive element to the fluorescent waveguiding sheet; an etched portion within the fluorescent waveguiding sheet, such as within a surface of the fluorescent waveguiding sheet, such as a surface facing the object and/or facing away from the object; a scratch in the fluorescent waveguiding sheet, such as a scratch in the surface of the fluorescent waveguiding sheet, such as a surface facing the object and/or facing away from the object; a prism. Additionally or alternatively, other optical coupling elements are generally known and may also be used in the present invention. In a most simple case, the at least one photosensitive element may simply be adhered or glued to a surface of the fluorescent waveguiding sheet, such as by at least one transparent glue or adhesive, e.g. a transparent epoxy. Other ways of optical coupling are feasible.

The first optical sensor and the second optical sensor specifically may have an essentially identical electrical capacitance. When referring to a capacitance of an optical sensor, generally, the capacity C as may be determined in an oscillating circuit is referred to, as the person skilled in the art of electronics generally will recognize. Thus, when implementing the first optical sensor or, alternatively, the second optical sensor into an oscillating circuit, the oscillating circuit, as an example, may have essentially the same resonance frequency. As used herein, the term "essentially identical" generally refers to the fact that, as an example, the capacitance of the first optical sensor and the capacitance of the second optical sensor differ by no more than a factor of 10, more preferably a by no more than a factor of 5 or even by no more than a factor of 2. Further, when referring to the capacitance of the second optical sensor, reference is made to the capacitance of the at least one photosensitive element of the second optical sensor, since the photosensitive element determines the electrical behavior and, specifically, the high-frequency behavior of the second optical sensor. In case a plurality of photosensitive elements are present in the second optical sensor, the capacitance of at least one of these photosensitive elements is meant.

As outlined above, for example with respect to the first preferred embodiment, for evaluating the first and second sensor signals at least one predetermined or determinable relationship between the first and second sensor signals and the longitudinal coordinate may be used. With respect to evaluation of the first and second sensor signals reference can be made to the description of the first preferred embodiment. Thus, the evaluation device specifically may be configured for deriving a quotient signal Q by dividing the first and second sensor signals, by dividing multiples of the first and second sensor signals or by dividing linear combinations of the first and second sensor signals. The evaluation device may be configured for determining the longitudinal coordinate by evaluating the quotient signal Q.

Typically, in the setup described above, Q may be a monotonous function of the longitudinal coordinate of the object and/or of the size of the light spot such as the diameter or equivalent diameter of the light spot. Thus, as an example, specifically in case linear optical sensors are used, the quotient $Q=s1/s2$ is a monotonously decreasing function of the size of the light spot. This is due to the fact that, in the preferred setup described above, the first light-sensitive area is fully illuminated and preferably is located in the center of the light spot, such as on the optical axis. Consequently, with increasing diameter of the light spot, the peak intensity of the illumination, which mainly may be located in the first light-sensitive area, decreases and, thus, the first sensor signal decreases. The second sensor signal, however, may be more or less independent from the size of the light spot, as long as the light spot, except for the shadow created by the first optical sensor, is located on the second light-sensitive area. Consequently, the second sensor signal may remain more or less constant. The quotient of the first and second sensor signals, thus, continuously decreases with increasing diameter of the light beam or diameter of the light spot on the first and second light-sensitive areas. The quotient, further, is mainly independent from the total power of the light beam, since the total power of the light beam forms a factor both in the first sensor signal and in the second sensor signal. Consequently, the quotient Q may form a secondary signal which provides a unique and unambiguous relationship between the first and second sensor signals and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the first and second sensor signals and the longitudinal coordinate may exist. For the latter, reference e.g. may be made to WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate of the object, or both.

The first optical sensor and the second optical sensor may be positioned in various ways. Thus, in a first example, the first optical sensor is positioned in front of the second optical sensor, such that the light beam, firstly, passes the first optical sensor and, secondly, thereafter, reaches the second optical sensor. Alternatively, however, a reverse order is possible. Thus, as an alternative, the second optical sensor may be placed in front of the first optical sensor, such that the light beam, firstly, reaches the second optical sensor, fully or partially passes through the second optical sensor and, secondly, thereafter, reaches the first optical sensor. The latter alternative is mainly possible due to the fact that the fluorescent waveguiding sheet of the second optical sensor may, in this embodiment or other embodiments, be embodied fully or partially transparent, specifically in the spectral range of the light beam. Thus, the smaller first optical sensor may be placed on a reverse side of the second optical sensor, from the perspective of the object.

The second optical sensor and, more specifically, the fluorescent waveguiding sheet of the second optical sensor, may be placed in various positions in one or more beam paths. Thus, as an example, the second optical sensor and/or the fluorescent waveguiding sheet of the second optical sensor may be placed close to a focal point within a beam path. Alternatively, however, specifically in order to improve the function of summing, the second optical sensor may also be placed away from the focal point, such as by one, two or more than two Rayleigh wavelengths.

As outlined above, the second optical sensor comprises at least one photosensitive element, from which the at least one second sensor signal arises. Therein, precisely one photosensitive element may be used, such as for collecting at least a part of the fluorescence light and for creating a second sensor signal in response. Alternatively, however, the second optical sensor may comprise two, three, four or more photosensitive elements which, preferably, are located at at least two edges of the fluorescent waveguiding sheet, such as at least two opposing portion of a rim of the fluorescent waveguiding sheet. The photosensitive elements may be capable of detecting fluorescence light guided from the light spot towards the photosensitive elements by the fluorescent waveguiding sheet and capable of generating at least one sensor signal each. Thus, a plurality of second sensor signals may exist.

In case at least two photosensitive elements are provided, being located at at least two edges of the fluorescent waveguiding sheet, a plurality of possibilities exists. Thus, as an example, the at least two photosensitive elements may be located at one or more of: at least two straight edges of the fluorescent waveguiding sheet, such as at least two opposing edges, such as opposing rim portions; at least two corners of the fluorescent waveguiding sheet, such as at least two opposing corners; at least one corner of the fluorescent waveguiding sheet and at least one straight edge, such as at least one straight rim portion, of the fluorescent waveguiding sheet. Other possibilities are generally given.

The detector and, preferably, the evaluation device may specifically be embodied to combine at least two of these second sensor signals to form at least one common second sensor signal. This at least one common second sensor signal, specifically, may be used, in conjunction with the first second sensor signal, for determining the longitudinal coordinate.

Additionally, at least one common second sensor signal may be used for acquiring additional information, such as at least one item of information on a transversal position of the object or a part thereof, as will be outlined in further detail below.

Thus, for combining the at least two second sensor signals, the evaluation device may comprise at least one summing device configured for summing up the sensor signals of the at least two photosensitive elements, thereby forming a sum signal S. As an example, the sum signal may be derived by using the formula $$S = \Sigma_i c_i s_i, \quad (1)$$

with $s_i$ denoting the second sensor signals, with $i = 1 \ldots N$ with N being a positive integer indicating the number of the photosensitive elements or a smaller positive integer, and with $c_i$ being respective calibration coefficients.

As outlined above, the evaluation device specifically may be configured to determine the at least one longitudinal coordinate z of the object by using at least one predetermined relationship between the first sensor signal, the at least one second sensor signal and the longitudinal coordinate z. In case a plurality of second sensor signals is given, as outlined above, at least one combined second sensor signal may be used in this relationship. Thus, specifically, the sum signal S may be used. Thus, as an example, the evaluation device may be configured to determine the at least one longitudinal coordinate z by using at least one predetermined relationship between the first sensor signal, the sum signal S of the second sensor signals and the longitudinal coordinate z.

In addition to the at least one longitudinal coordinate, the detector may further be configured for determining at least one transversal coordinate of the object and/or of a part thereof. For this purpose, the detector may comprise at least one transversal optical sensor. Various transversal sensors are generally known in the art, such as the transversal sensors disclosed in WO 2014/097181 A1 and/or WO 2014/198629 A1 and/or other position-sensitive devices (PSDs), such as quadrant diodes, CCD or CMOS chips or the like.

Thus, as an example, the detector according to the present invention may comprise one or more PSDs disclosed in R. A. Street (Ed.): *Technology and Applications of Amorphous Silicon*, Springer-Verlag Heidelberg, 2010, pp. 346-349. Other embodiments are feasible. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Preferably, however, the at least one second optical sensor itself may be used as a transversal optical sensor, for determining at least one transversal coordinate of the object. This setup is specifically advantageous in case a plurality of photosensitive elements is used in the second optical sensor, such as in different positions and located at different edges of the fluorescent waveguiding sheet. The evaluation device may be configured to determine at least one transversal coordinate x, y of the object by evaluating the sensor signals of the photosensitive elements. The evaluation device may be adapted to combine the information of the longitudinal coordinate and the transversal coordinate and to determine a position of the object in space.

Thus, generally, the evaluation device may further be configured to determine at least one transversal coordinate x, y of the object by evaluating the second sensor signals of the photosensitive elements. For the purpose of determining the at least one transversal coordinate in one or more directions, the sensor signals of the photosensitive elements may be compared. Thus, as is evident to the skilled person, the sensor signal of a respective photosensitive element, which represents the fluorescence light guided to the photosensitive elements by the fluorescent waveguiding sheet from the light spot and, thus, from the location of generation of the fluorescence light, depends on a distance between the light spot and the respective photosensitive element. Generally, with an increasing distance between the light spot and the photosensitive element, the sensor signal of the respective photosensitive element will decrease, such as due to losses during waveguiding and/or due to spreading of the fluorescence light. By comparing the sensor signals of the photosensitive elements located at different, known positions, the lateral or transversal position of the light spot on the fluorescent waveguiding sheet may be determined and, therefrom, by using e.g. a known or determinable relationship between the transversal position of the light spot and the transversal coordinate of the object, the transversal coordinate of the object. Again, empirical relationships and/or semiempirical relationships and/or analytical relationships may be used, such as the lens equation which is generally known to the skilled person.

Thus, the evaluation device specifically may be configured for evaluating at least two second sensor signals of at least two different photosensitive elements. As an example, these at least two second sensor signals may be compared in order to determine a transversal position of the light spot on the fluorescent waveguiding sheet and/or for directly deriving a transversal position of the object. Thus, as an example, a difference between at least two second sensor signals may be determined in order to derive at least one item of information on a transversal position of the object. Consequently, the evaluation device may comprise at least one subtracting device configured to form at least one difference signal D between second sensor signals generated by at least two of the photosensitive elements. The second sensor signals may comprise at least one second sensor signal $s_{21}$ and at least one second sensor signal $s_{22}$, wherein the at least one difference signal D is proportional to $a \cdot s_{21} - b \cdot s_{22}$:

$$D \sim a \cdot s_{21} - b \cdot s_{22}, \quad (2)$$

with a, b being real number coefficients, preferably with a=1 and b=1. Additionally or alternatively, the at least one difference signal D may be derived according to the formula:

$$D = (a \cdot s_{21} - b \cdot s_{22})/(a \cdot s_{21} + b \cdot s_{22}). \quad (3)$$

The subtracting device specifically may be configured to form at least one first difference signal $D_x$ from which at least one first transversal coordinate x of the object is derived. Additionally or alternatively, the subtracting device may be further configured to form at least one second difference signal $D_y$ from which at least one second transversal coordinate y of the object is derived. Thus, the first difference signal $D_x$ may be generated from at least two second sensor signals $s_{x1}$, $s_{x2}$ of at least two photosensitive elements located at opposing edges of the waveguiding sheet in a first dimension. The second difference signal $D_y$ may be generated from at least two second sensor signals $s_{y1}$, $s_{y2}$ of at least two photosensitive elements located at opposing edges of the waveguiding sheet in a second dimension. The at least one first difference signal $D_x$ may be derived according to the formula $$D_x = (a \cdot s_{x1} - b \cdot s_{x2})/(a \cdot s_{x1} + b \cdot s_{x2}), \quad (4)$$

and the at least one second difference signal $D_y$ may be derived according to the formula $$D_y = (c \cdot s_{y1} - d \cdot s_{y2})/(c \cdot s_{y1} + d \cdot s_{y2}), \quad (5)$$

with a, b, c, d being real number coefficients, preferably with a=1, b=1, c=1 and d=1.

As outlined above, in case the second optical sensor comprises a plurality of photosensitive elements, the second optical sensor specifically may comprise at least two photosensitive elements located at opposing edges of the fluorescent waveguiding sheet. The photosensitive elements may comprise at least one first pair of photosensitive elements located at opposing edges of the fluorescent waveguiding sheet in a first dimension of a coordinate system, and the photosensitive elements may further comprise at least one second pair of photosensitive elements located at opposing edges of the fluorescent waveguiding sheet in a second dimension of the coordinate system.

Further optional details may refer to the at least one fluorescent waveguiding sheet and/or to the second light-sensitive area. Thus, as an example, the second light-sensitive area specifically may be a homogeneous light-sensitive area. Thus, the second light-sensitive area may not be subdivided physically into partial areas, such as pixels. Contrarily, the sensitive area may be one homogeneous area which forms a uniform fluorescence.

The second light-sensitive area specifically may be a large sensitive area. Thus, as an example, the second light-sensitive area may have a surface of at least 5 mm$^2$, preferably of at least 10 mm$^2$, more preferably of at least 100 mm$^2$, more preferably of at least 400 mm$^2$. As an example, the sensitive area may have a surface of 5 mm$^2$ to 10,000 mm$^2$, such as 100 mm$^2$ to 2500 mm$^2$. The large-area design of the sensitive area is advantageous in many ways. Thus, specifically, by increasing the surface of the second light-sensitive area, a resolution of the determination of the transversal coordinates may be increased. Further, the field of view of the detector, e.g. the viewing angle, may be widened by using a large second light-sensitive area.

The fluorescent waveguiding sheet specifically may comprise at least one planar sheet. Therein, however, slight curvatures still may be tolerated. In other embodiments, however, the fluorescent waveguiding sheet may also be embodied as a curved fluorescent waveguiding sheet, such as in order to provoke specific optical effects which might be desirable in certain applications. Thus, one of the advantages of the present detector may reside in the fact that the fluorescent waveguiding sheet specifically may be curved, flexible or having a specific geometry.

The fluorescent waveguiding sheet may have a thickness of 10 µm to 3 mm, preferably a thickness of 100 µm to 1 mm, e.g. a thickness of 50 µm to 2 mm. The thickness of the waveguiding sheet specifically may be a dimensioned of the waveguiding sheet along an optical axis of the detector. The thickness may be adapted to improve our optimize waveguiding properties of the fluorescence light.

The fluorescent waveguiding sheet may fully or partially be rigid or, alternatively, may fully or partially be embodied flexible or deformable.

The fluorescent waveguiding sheet may comprise at least one matrix material. As used herein, the term "matrix material" generally refers to a material which forms the main part of the fluorescent waveguiding sheet and which defines the main body of the fluorescent waveguiding sheet. As an example, the matrix material may be a material which is capable of receiving one or more additional materials that therein, such as by intermixing, chemical bonding, dispersion or solving. Thus, the at least one fluorescent material may be one or more of mixed into the matrix material, dispersed into the matrix material, chemically bound to the matrix material or dissolved in the matrix material.

The matrix material specifically may be or may comprise at least one plastic material. The plastic material specifically may be or may comprise at least one polymer material. The plastic material, as an example, may be or may comprise at least one material selected from the group consisting of a polycarbonate, a poly(methyl methacrylate), a polystyrene, a polyurethane, a polypropylene, a polyethylene terephthalate, a polyvinylchloride. Other materials, however, are feasible.

The fluorescent material specifically may comprise an arbitrary fluorophore. Specifically, the at least one fluorescent material may comprise at least one fluorescent dye. A wide variety of fluorescent dyes is generally known to the skilled person. Thereof, as outlined above, most of these fluorescent dyes exhibit the above-mentioned saturation effects, thereby rendering the fluorescence being a nonlinear function of the excitation. As an example, the fluorescent dye may be capable of being saturated by the light beam, such that a total power of the fluorescence light generated by the fluorescent dye is a nonlinear function of an intensity of the light beam. Specifically, the total power of the fluorescence light may be sub-proportional to the intensity of the light beam.

The fluorescent dye specifically may comprise at least one organic fluorescent dye. Inorganic dyes, however, may be used additionally or alternatively. The fluorescent dye specifically may be selected from the group consisting of: a xanthene derivative, preferably one or more of fluorescein, rhodamine, oregon green, eosin, texas red, or a derivative of any component thereof; a cyanine derivative, preferably one or more of cyanine, indocarbocyanine, oxacarbocyanine, thiacarbocyanine, merocyanine, or a derivative of any component thereof; a squaraine derivative or a ring-substituted squaraine, preferably one or more of Seta, SeTau, and Square dyes, or a derivative of any component thereof; a naphthalene derivative, preferably one or more of a dansyl or a prodan derivative thereof; a coumarin derivative; a oxadiazole derivative, preferably one or more of pyridyloxazole, nitrobenzoxadiazole, benzoxadiazole, or a derivative of any component thereof; an anthracene derivative, preferably one or more of an anthraquinone, DRAQ5, DRAQ7, CyTRAK orange, or a derivative of any component thereof; a pyrene derivative, preferably cascade blue; an oxazine derivative, preferably one or more of nile red, nile blue, cresyl violet, oxazine 170, or a derivative of any component thereof; an acridine derivative, preferably one or more of proflavin, acridine orange, acridine yellow, or a derivative of any component thereof; an arylmethine derivative, preferably one or more of auramine, crystal violet, malachite green, or a derivative of any component thereof; a tetrapyrrole derivative, preferably one or more of porphin, phthalocyanine, bilirubin; a rylene dye or any derivative thereof, such as a perylene dye; a naphthalene imid or perylene imide; a naphthoilene benzimidazole dye such as published in WO 2012/168395 A1; or a derivative of any component of the listed substances. It shall be noted, however, that other dyes may be used additionally or alternatively.

Further optional details of the detector referred to the at least one photosensitive element or to the plurality of photosensitive elements. Thus, as an example, the at least one photosensitive element may comprise at least one photodiode, preferably at least one inorganic photodiode, such as a silicon photodiode. The at least one photosensitive element may comprise at least one elongated photosensitive element extending along at least one segment of an edge or rim portion of the waveguiding sheet.

As outlined above, the fluorescent waveguiding sheet specifically may be a rectangular fluorescent waveguiding sheet, preferably a square waveguiding sheet. In the setup, as an example, the photosensitive elements may be located at each of the four edges, such as at each of the four straight rim sections or rim portions, of the waveguiding sheet. Other embodiments are feasible.

The first and second optical sensors each, independently, may be opaque, transparent or semitransparent. For the sake of simplicity, however, opaque sensors which are not transparent for the light beam, may be used, since these opaque sensors generally are widely commercially available. The fluorescent waveguiding sheet, however, may fully or partially be transparent.

The first optical sensor specifically may be a uniform sensor having a uniform light-sensitive area. Thus, specifically, the first optical sensor specifically may be a non-pixelated optical sensor. Alternatively, however, the at least one first optical sensor may also comprise one or more pixelated sensors, each having two or more pixels. Other embodiments are feasible.

Similarly, as discussed in further detail below, the at least one second optical sensor may comprise precisely one second optical sensor or a plurality of optical sensors. Further, the at least one fluorescent waveguiding sheet of the second optical sensor may be precisely one coherent fluorescent waveguiding sheet. Alternatively, however, the at least one second optical sensor also may comprise a plurality of second optical sensors. The latter alternative, as an example, may be realized by providing a plurality of fluorescent waveguiding sheets. Thus, a plurality of fluorescent waveguiding sheets may be provided, each having one or more photosensitive elements. Other embodiments are feasible.

The detector, such as of the second optical sensor, may further comprise at least one optical filter element, preferably at least one optical short-pass filter. Thus, as an example, only photons which are capable of exciting fluorescence light may pass through to the fluorescent waveguiding sheet. Other embodiments, however, are feasible.

The first and second optical sensors specifically may be arranged linearly in one and the same beam path of the detector. Thus, as an example, the first and second optical sensors may be arranged concentrically with respect to an optical axis of the detector, specifically with the first optical sensor being placed in front of the second optical sensor. It shall be noted, however, that other embodiments are feasible, such as embodiments with the first optical sensor and the second optical sensor being placed in separate and different beam paths, wherein the beam path of the detector is split by one or more beam-splitting elements. The linear setup with the first and second optical sensors being placed in one and the same beam path, however, is preferred, due to the simple optical setup and the low volume required for the detector. Thus, the present invention specifically allows for a simple, efficient and inexpensive optical setup.

As outlined above, the first optical sensor specifically may be a semiconductor sensor, preferably an inorganic semiconductor sensor, more preferably a photodiode and most preferably a silicon photodiode. As an example, the first optical sensor may be a uniform sensor having a single light-sensitive area. As an example, a commercially available silicon photodiode may be used.

In a further preferred embodiment the detector may comprise at least one angle dependent optical element adapted to generate at least one light beam having at least one beam profile depending on an angle of incidence of an incident light beam propagating from the object towards the detector and illuminating the angle dependent optical element;

at least two optical sensors, wherein each optical sensor has at least one light sensitive area, wherein each optical sensor is designed to generate at least one sensor signal in response to an illumination of its respective light-sensitive area by the light beam generated by the angle dependent optical element;

the at least one evaluation device being configured for determining at least one longitudinal coordinate z of the object by evaluating the quotient signal Q from the sensor signals.

The angle dependent optical element may comprise at least one optical element selected from the group consisting of: at least one optical fiber, in particular at least one multifurcated optical fiber, in particular at least one bifurcated optical fiber; at least one diffractive optical element, at least one angle dependent reflective element, at least one diffractive grating element, in particular a blaze grating element; at least one aperture stop; at least one prism; at least one lens; at least one lens array, in particular at least one microlens array; at least one optical filter; at least one polarization filter; at least one bandpass filter; at least one liquid crystal filter, in particular a liquid crystal tunable filter; at least one shortpass filter; at least one long-pass filter; at least one notch filter; at least one interference filter; at least one transmission grating; at least one nonlinear optical element, in particular one birefringent optical element.

At least one of the light-sensitive areas may be oriented towards the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. Additionally or alternatively, at least one of the light-sensitive areas may be oriented differing from an orientation towards the object. For example, at least one of the optical sensors may be oriented perpendicular or under an arbitrary angle to the optical axis and with respect to the object. The angle dependent optical element may be adapted to generate the light beam such that the light beam impinges on the light-sensitive areas. For example, in case at least one of the light-sensitive areas is oriented under the arbitrary angle with respect to the optical axis, the angle dependent optical element may be adapted to guide the light beam onto the light-sensitive area.

As used herein, the term "angle dependent optical element" refers to an optical element adapted to generate the at least one light beam having at least one beam profile depending on the angle of incidence of the incident light beam propagating from the object towards the detector and illuminating the angle dependent optical element. In particular, the angle dependent optical element may be adapted to influence and/or change and/or adjust the beam profile of the incident light beam. For example, the angle dependent optical element may have one or more of angle dependent transmission properties, angle dependent reflection properties or angle dependent absorption properties. The light beam generated by the angle dependent optical element may comprise at least one transmission light beam and/or at least one reflection light beam. The angle of incidence may be measured with respect to an optical axis of the angle dependent optical element.

An electromagnetic wave impinging on a first side, for example a surface and/or an entrance, of the angle dependent optical element may be partly, depending on the properties of the angle dependent optical element, absorbed and/or reflected and/or transmitted. The term "absorption" refers to a reduction of power and/or intensity of the incident light beam by the angle dependent optical element. For example, the power and/or intensity of the incident light beam may be transformed by the angle dependent optical element to heat or another type of energy. As used herein, the term "transmission" refers to a part of the electromagnetic wave which is measurable outside the angle dependent optical element in a half-space with angles from 90° and higher with respect to the optical axis. For example, transmission may be a remaining part of the electromagnetic wave impinging on the first side of the angle dependent optical element, penetrating the angle dependent optical element and leaving the angle dependent optical element at a second side, for example an opposite side and/or an exit. The term "reflection" refers to a part of the electromagnetic wave which is measurable outside the angle dependent optical element in a half-space with angles below 90° with respect to the optical axis. For example, reflection may be a change in direction of a wavefront of the incident light beam due to interaction with the angle dependent optical element.

The total power of the electromagnetic wave impinging on the angle dependent optical element may be distributed by the angle dependent optical element in at least three components, i.e. an absorption component, a reflection component and a transmission component. A degree of transmission may be defined as power of the transmission component normalized by the total power of the electromagnetic wave impinging on the angle dependent optical element. A degree of absorption may be defined as power of the absorption component normalized by the total power of the electromagnetic wave impinging on the angle dependent optical element. A degree of reflection may be defined as power of the reflection component normalized by the total power of the electromagnetic wave impinging on the angle dependent optical element.

As used herein, "angle dependent transmission" refers to the fact that the degree of transmission depends on the angle of incidence at which the incident light beam propagating from the object towards the detector impinges on the angle dependent optical element. As outlined above, the angle of incident may be measured with respect to an optical axis of the angle dependent optical element. The angle dependent optical element may be arranged in the direction of propagation behind at least one transfer device. The transfer device may, for example, comprise at least one collimating lens. The angle dependent optical element may be designed to weaken rays impinging with larger angles compared to rays impinging with a smaller angle. For example, the degree of transmission may be highest for light rays parallel to the optical axis, i.e. at 0°, and may decrease for higher angles. In particular, at at least one cut-off angle the degree of transmission may steeply fall to zero. Thus, light rays having a large angle of incidence may be cut-off.

As used herein, the term "angle dependent absorption" refers to the fact that the degree of absorption depends on the angle of incidence at which the incident light beam propagating from the object towards the detector impinges on the angle dependent optical element. As used herein, the term "angle dependent absorption" refers to the fact that a degree of absorption depends on the angle of incidence at which the incident light beam propagating from the object towards the detector impinges on the angle dependent optical element. For example, photon energy and/or intensity of the light beam propagating from the object to the detector may be reduced depending on the angle of incidence.

As used herein, the term "angle dependent reflection" refers to the fact that the degree of reflection depends on the angle of incidence at which the incident light beam propagating from the object towards the detector impinges on the angle dependent optical element.

For example, the angle dependent optical element comprises at least one optical fiber. The optical fiber may be designed such that the degree of transmission may be highest for incoming light rays parallel, i.e. at an angle of 0°, to the optical fiber, neglecting reflection effects. The optical fiber may be designed such that for higher angles, for example angles from 1° to 10°, the degree of transmission may decrease smoothly to around 80% of the degree of transmission for parallel light rays and may remain at this level constantly up to an acceptance angle of the optical fiber. As used herein, the term "acceptance angle" may refer to an angle above which total reflection within the optical fiber is not possible such that the light rays are reflected out of the optical fiber. The optical fiber may be designed that at the acceptance angle, the degree of transmission may steeply fall to zero. Light rays having a large angle of incidence may be cut-off.

The optical fiber may be adapted to transmit at least parts of the incident light beam which are not absorbed and/or reflected, between two ends of the optical fiber. The optical fiber may have a length and may be adapted to permit transmission over a distance. The optical fiber may comprise at least one material selected from the group consisting of: silica, aluminosilicate glass, germane silicate glass, fluorozirconate, rare earth doped glass, fluoride glass, chalcogenide glasses, sapphire, doped variants, especially for silica glass, phosphate glass, PMMA, polystyrene, fluoropolymers such as poly(perfluoro-butenylvinyl ether), or the like. The optical fiber may be a single or multi-mode fiber. The optical fiber may be a step index fiber, a polarizing fiber, a polarization maintaining fiber, a plastic optical fiber or the like. The optical fiber may comprise at least one fiber core which is surrounded by at least one fiber cladding having a lower index of refraction as the fiber core. The fiber cladding may also be a double or multiple cladding. The fiber cladding may comprise a so-called outer jacket. The fiber cladding may be coated by a so-called buffer adapted to protect the optical fiber from damages and moisture. The buffer may comprise at least one UV-cured urethane acrylate composite and/or at least one polyimide material. In one embodiment, a refractive index of the fiber core may be higher than the refractive index of the fiber cladding material and the optical fiber may be adapted to guide the incoming light beam by total internal reflection below the angle of acceptance. In one embodiment, the optical fiber may comprise at least one hollow core fiber, also called photonic bandgap fiber. The hollow-core fiber may be adapted to guide the incoming light beam essentially within a so-called hollow region, wherein a minor portion of the light beam is lost due to propagation into the fiber cladding material.

The optical fiber may comprise one or more fiber connectors at the end of the fiber. The optical fiber may comprise end caps such as coreless end caps. The optical fiber may comprise one or more of a fiber coupler, a fiber Bragg grating, a fiber polarizer, a fiber amplifier, a fiber coupled diode laser, a fiber collimator, a fiber joint, a fiber splicing, a fiber connector, a mechanical splicing, a fusion splicing, or the like. The optical fiber may comprise a polymer coating.

The optical fiber may comprise at least two or more fibers. The optical fiber may be at least one multifurcated optical fiber, in particular at least one bifurcated optical fiber. For example, the bifurcated optical fiber may comprise two fibers, in particular at least one first fiber and at least one second fiber. The first fiber and the second fiber may be arranged close to each other at an entrance end of the bifurcated optical fiber and may split into two legs separated by a distance at an exit end of the bifurcated optical fiber. The first and second fiber may be designed as fibers having identical properties or may be fibers of different type. The first fiber may be adapted to generate at least one first transmission light beam and the second fiber may be adapted to generate at least one second transmission light beam. The bifurcated optical fiber may be arranged such that the incident light beam may impinge at a first angle of incidence into the first fiber and at a second angle of incidence, different from the first angle, into the second fiber, such that the degree of transmission is different for the first transmission light beam and the second transmission light beam. One of the optical sensors may be arranged at an exit end of the first fiber and the other optical sensor may be arranged at an exit end of the second fiber. The optical fiber may comprise more than two fibers, for example three, four or more fibers. For example, the multifurcated may comprise multiple fibers wherein each fiber may comprise at least one of a core, a cladding, a buffer, a jacket, and one or more fibers may partially or entirely be bundled by a further jacket such as a polymer hose to ensure that the fibers stay close to each other such as at one end of the fiber.

The detector may comprise a plurality of optical fibers, for example a plurality of single optical fibers or a plurality of multifurcated optical fibers. For example, the detector may comprise a plurality of single optical fibers, for example optical fibers having identical properties. The optical fibers, i.e. the single optical fibers or multifurcated optical fibers, may be arranged such that the incident light beam may impinge at different angles of incidence into each of the optical fibers such that the degree of transmission is different for each of the optical fibers. At the exit ends of each optical fiber at least one optical sensor may be arranged. Alternatively, at least two or more of the optical fibers may use the same optical sensor.

The illumination source may be adapted to illuminate the object through the angle dependent optical element. The optical fiber may comprise at least one illumination fiber adapted to transmit at least one incoming light beam generated by the illumination source such that it illuminates the object. The illumination source may be adapted to couple the at least one light beam generated by the illumination source into the illumination fiber. The detector may comprise at least one coupling element, for example at least one in-coupling element and/or at least one out-coupling element, which may be arranged in front of and/or behind the optical fiber. The coupling element may be or may comprise at least one transfer device.

The detector may comprise a further coupling element, in particular a further in-coupling element, adapted to couple the light beam travelling from the object to the detector into the illumination fiber. The further coupling element may be arranged in direction of propagation of the light beam travelling from the object to the detector in front of the optical fiber. The further coupling element may be or may comprise at least one transfer device.

In case the detector comprises a plurality of optical fibers, the detector may comprise one illumination source or a plurality of identical illumination sources and/or a plurality of different illumination sources. For example, the plurality of illumination sources may comprise at least two illumination sources generating light with different properties such as color or modulation frequencies. In one embodiment, at least two of the optical fibers of the plurality of the optical fibers may be illuminated using the same illumination source and/or two identical illumination sources. At the exit ends of each optical fiber illuminated by the same illumination source and/or by identical illumination sources at least one optical sensor may be arranged. Alternatively, at least two or more of the optical fibers illuminated by the same illumination source may use the same optical sensor. Such a detector, in which for a plurality of optical fibers the same illumination source and same optical sensors are used, may be used as proximity sensor. In one embodiment, at least two of the optical fibers of the plurality of optical fibers may be illuminated by using at least two different illumination sources. At the exit ends of each optical fiber at least one optical sensor may be arranged. Alternatively, at least two or more of the optical fibers may use the same optical sensor.

As outlined above, the distance perpendicular to an optical axis of the detector between the illumination source and the optical sensors may be small. The baseline may be less than 0.1 m, preferably less than 0.05 m, more preferably less than 0,025 m. For example, the baseline may be 21 mm. In particular in case the angle dependent optical element is an optical fiber, the baseline may even be smaller than a radius of the transfer device.

For example, the angle dependent optical element may be an optical fiber. The illumination source may be guided through an optical fiber wherein the illumination beam may exit the optical fiber behind the transfer device within a baseline that is smaller than the radius of the transfer device.

The illumination source may be adapted to generate at least one illumination light beam, wherein the optical fiber guiding the illumination beam may be attached to the transfer device such as by a polymer or glue or the like, to reduce reflections at interfaces with larger differences in refractive index. For example, the detector may be a compact device without further optical elements, wherein the illumination source may be placed as close as possible to an edge of the transfer device. Thus, the baseline may be close to half a diameter of the transfer device, in particular the lens diameter and housings of lens and light source. For example, the detector may be an even more compact device, wherein a mirror, in particular a small mirror, may be positioned in front of the transfer device, in particular in a center, for example a geometrical center, or close to the center of the transfer device, in order to couple the illumination beam into the beam path. Thus, the baseline may be less than half the diameter of the transfer device. The illumination source may be arranged such that the baseline is as small as possible. By arranging the illumination source such that the direction of propagation of the illumination light beam is essentially parallel to the optical axis and that the illumination source and the optical axis are separated by the small baseline, very compact devices are possible. For example, a distance from the center of the transfer device to the illumination source, in particular along a connecting line from the center of the transfer device to the illumination source, may be preferably less than 2.5 times a distance from the center of the transfer device to an edge if the transfer device, more preferably less than 1.5 times the distance center to edge of the transfer device, and most preferably less 1 times the distance center to edge of the transfer device. The transfer device may have an arbitrary shape, in particular a non-circular shapes are possible. At small distances an aperture of the illumination source may be small and the baseline may be small. At large distances an aperture of the illumination source may be large and the baseline may be small. This is contrarily as in triangulation methods, wherein at large distances a large baseline is necessary. Further, triangulation based systems have a minimum detection range significantly greater than zero, for example such as 20 cm from the detector system, due to necessary spatial extend of the baseline. Such a large baseline may result in that the illuminated light scattered from the object may not reach the light sensitive area of the optical sensor behind the transfer device. In addition, in triangulation based systems, using a small baseline would reduce the minimum detection range, however, at the same time would reduce a maximum detection range. Further, triangulation based systems require a plurality of light sensitive areas and sensor signals, for example sensor signals of at least one detector row. According to the invention, determination of the longitudinal coordinate z is possible with a reduced number of sensor signals, in particular with less than 20, preferably less than 10 and more preferably less than 5 sensor signals. The illumination source and the angle dependent optical element may be arranged in the direction of propagation of the light beam traveling from the object to the detector behind the transfer device, which will be described in detail below. The distance perpendicular to the optical axis of the detector between the illumination source and the optical sensors may be less than the radius of the transfer device.

The illumination source and the optical sensors and/or the illumination source and the angle dependent optical element and/or the optical sensors may be arranged with a relative spatial offset from the optical axis of the detector. Such an arrangement may allow enhancing the tendency of the quotient, and thus, accuracy of the distance measurement. In particular, with increasing spatial offset a slope in a Q vs distance diagram increases and thus allows distinguishing similar distances more accurately. For example, one of the illumination source and the optical sensors may be arranged on the optical axis and the other one may be arranged spaced apart from the optical axis. For example, both of illumination source and the optical sensors may be arranged spaced apart from the optical axis by at least one different distance, in particular perpendicular to the optical axis. For example, the at least two fibers of a multifurcated optical fiber may be arranged at different distances from the optical axis. The angle dependent optical element is adapted to mimic a larger distance compared to the real distance perpendicular to an optical axis between the illumination source and the optical sensors without moving the illumination source and/or optical sensors.

By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

Alternatively to the linear arrangement of the two optical sensors, the optical sensors may be arranged in different beam paths of the detector. The angle dependent optical element may be adapted to generate the first light beam and the second light beam. The first light beam and the second light beam may be generated with different degree of transmission. The first optical sensor may be configured to generate the first sensor signal in response to the illumination of the first light-sensitive area by the first light beam generated by the angle dependent optical element. The second optical sensor may be configured to generate the second sensor signal in response to the illumination of the second light-sensitive area by the second light beam generated by the angle dependent optical element. For example, as outlined above, the angle dependent optical element may comprise at least one multifurcated optical fiber which may be arranged such that the incident light beam may impinge at the first angle of incidence into the first fiber and at the second angle of incidence, different from the first angle, into the second fiber, such that the degree of transmission is different for the first light beam, in this case a first transmission light beam, and the second light beam, in this case a second transmission light beam. One of the first and second optical sensors may be arranged at the exit end of the first fiber and the other optical sensor may be arranged at the exit end of the second fiber.

At least one sensor element may have a matrix of optical sensors, wherein the optical sensors each having a light-sensitive area, wherein each optical sensor may be configured to generate at least one sensor signal in response to an illumination of the light-sensitive area by the light beam generated by the angle dependent optical element.

For example, the detector may comprise two sensor elements, in particular at least one first sensor element and at least one second sensor element, arranged in different beam paths of the detector. The angle dependent optical element may be adapted to generate the first light beam and the second light beam. The first light beam and the second light beam may be generated with different degree of transmission. The first sensor element may be configured to generate the first sensor signal in response to the illumination by the first light beam generated by the angle dependent optical element. The second sensor element may be configured to generate the second sensor signal in response to an illumination by the second light beam generated by the angle dependent optical element. For example, as outlined above, the angle dependent optical element may comprise at least one multifurcated optical fiber arranged such that the incident light beam may impinge at the first angle of incidence into the first fiber and at the second angle of incidence, different from the first angle, into the second fiber, such that the degree of transmission is different for the first transmission light beam and the second transmission light beam. One of the first and second sensors elements may be arranged at the exit end of the first fiber and the other sensor element may be arranged at the exit end of the second fiber.

The detector may comprise at least two optical sensors, each optical sensor having a light-sensitive area, wherein each light-sensitive area has a geometrical center, wherein the geometrical centers of the optical sensors are spaced apart from an optical axis of the detector by different spatial offsets, wherein each optical sensor is configured to generate a sensor signal in response to an illumination of its respective light-sensitive area by the light beam generated by the angle dependent optical element.

The evaluation device may be configured for determining at least one longitudinal coordinate z of the object by combining the at least two sensor signals. In this further embodiment the optical sensors may be arranged such that the light-sensitive areas of the optical sensors differ in their spatial offset and/or their surface areas The detector may have a single beam path along which a light beam may travel from the object to the optical sensors, or may have a plurality of beam paths. For example, in case the angle dependent optical element comprises at least one multifurcated optical fiber, each of the fibers of the multifurcated optical fiber may constitute an independent beam path. As an example, a single beam path may be given or the beam path may be split into two or more partial beam paths. In the latter case, each partial beam path may have its own optical axis, and the condition noted above generally may refer to each beam path independently. The optical sensors may be located in one and the same beam path or partial beam path. Alternatively, however, the optical sensors may also be located in different partial beam paths. In case the optical sensors are distributed over different partial beam paths, the above-mentioned condition may be described such that at least one first optical sensor is located in at least one first partial beam path, being offset from the optical axis of the first partial beam path by a first spatial offset, and at least one second optical sensor is located in at least one second partial beam path, being offset from the optical axis of the second partial beam path by at least one second spatial offset, wherein the first spatial offset and the second spatial offset are different.

As outlined above, each light-sensitive area has a geometrical center. Each geometrical center of each light-sensitive area may be spaced apart from the optical axis of the detector, such as the optical axis of the beam path or the respective beam path in which the respective optical sensor is located.

As outlined above, the optical sensors specifically may be located in one and the same plane, which, preferably, is a plane perpendicular to the optical axis. Other configurations, however, are possible. Thus, two or more of the optical sensors may also be spaced apart in a direction parallel to the optical axis.

For example, the optical sensors may be partial diodes of a segmented diode, with a center of the segmented diode being off-centered from the optical axis of the detector. As an example, bi-cell diodes or quadrant diodes are widely commercially available at low cost, and driving schemes for these bi-cell diodes or quadrant diodes are generally known. As an example, the bi-cell diodes may each form independent diodes having the full functionality of a diode. As an example, each of the bi-cell diodes may have a square or rectangular shape, and the two diodes may be placed in one plane such that the two partial diodes, in total, form a 1×2 or 2×1 matrix having a rectangular shape. In the present invention, however, a new scheme for evaluating the sensor signals of the bi-cell diodes and quadrant diode is proposed, as will be outlined in further detail below. Generally, however, the optical sensors specifically may be partial diodes of a quadrant diode, with a center of the quadrant diode being off-centered from the optical axis of the detector. As an example, the four partial diodes may each form independent diodes having the full functionality of a diode. As an example, the four partial diodes may each have a square or rectangular shape, and the four partial diodes may be placed in one plane such that the four partial diodes, in total, form a 2×2 matrix having a rectangular or square shape. In a further example, the four partial diodes, in total, may form a 2×2 matrix having a circular or elliptical shape. The partial diodes, as an example, may be adjacent, with a minimum separation from one another.

In case a quadrant diode is used, having a 2×2 matrix of partial diodes, the center of the quadrant diode specifically may be off-centered or offset from the optical axis. Thus, as an example, the center of the quadrant diodes, which may be an intersection of the geometrical centers of the optical sensors of the quadrant diode, may be off-centered from the optical axis by at least 0.2 mm, more preferably by at least 0.5 mm, more preferably by at least 1.0 mm or even 2.0 mm. Similarly, when using other types of optical sensors setups having a plurality of optical sensors, an overall center of the optical sensors may be offset from the optical axis by the same distance.

In a further aspect of the present invention, a detector system for determining a position of at least one object is disclosed. The detector system comprises at least one detector according to the present invention, such as according to one or more of the embodiments disclosed above or according to one or more of the embodiments disclosed in further detail below. The detector system further comprises at least one beacon device adapted to direct at least one light beam towards the detector, wherein the beacon device is at least one of attachable to the object, holdable by the object and integratable into the object. Further details regarding the beacon device will be given below, including potential embodiments thereof. Thus, the at least one beacon device may be or may comprise at least one active beacon device, comprising one or more illumination sources such as one or more light sources like lasers, LEDs, light bulbs or the like. As an example, the light emitted by the illumination source may have a wavelength of 300-500 nm. Alternatively, as outlined above, the infrared spectral range may be used, such as in the range of 780 nm to 3.0 µm. Specifically, the near infrared region where silicon photodiodes are applicable specifically in the range of 700 nm to 1000 nm may be used. The light emitted by the one or more beacon devices may be non-modulated or may be modulated, as outlined above, in order to distinguish two or more light beams. Additionally or alternatively, the at least one beacon device may be adapted to reflect one or more light beams towards the detector, such as by comprising one or more reflective elements. Further, the at least one beacon device may be or may comprise one or more scattering elements adapted for scattering a light beam. Therein, elastic or inelastic scattering may be used. In case the at least one beacon device is adapted to reflect and/or scatter a primary light beam towards the detector, the beacon device may be adapted to leave the spectral properties of the light beam unaffected or, alternatively, may be adapted to change the spectral properties of the light beam, such as by modifying a wavelength of the light beam.

In a further aspect of the present invention, a human-machine interface for exchanging at least one item of information between a user and a machine is disclosed. The human-machine interface comprises at least one detector system according to the embodiments disclosed above and/or according to one or more of the embodiments disclosed in further detail below. Therein, the at least one beacon device is adapted to be at least one of directly or indirectly attached to the user or held by the user. The human-machine interface is designed to determine at least one position of the user by means of the detector system, wherein the human-machine interface is designed to assign to the position at least one item of information.

In a further aspect of the present invention, an entertainment device for carrying out at least one entertainment function is disclosed. The entertainment device comprises at least one human-machine interface according to the embodiment disclosed above and/or according to one or more of the embodiments disclosed in further detail below. The entertainment device is configured to enable at least one item of information to be input by a player by means of the human-machine interface. The entertainment device is further configured to vary the entertainment function in accordance with the information.

In a further aspect of the present invention, a tracking system for tracking a position of at least one movable object is disclosed. The tracking system comprises at least one detector system according to one or more of the embodiments referring to a detector system as disclosed above and/or as disclosed in further detail below. The tracking system further comprises at least one track controller. The track controller is adapted to track a series of positions of the object at specific points in time.

In a further aspect of the present invention, a camera for imaging at least one object is disclosed. The camera comprises at least one detector according to any one of the embodiments referring to a detector as disclosed above or as disclosed in further detail below.

In a further aspect of the present invention, a readout device for optical storage media is proposed. The readout device comprises at least one detector according to any one of the preceding embodiments referring to a detector. As used therein, a readout device for optical storage media generally refers to a device which is capable of optically retrieving information stored in optical storage media such as optical storage discs, e.g. CCD, DVD or Blu-ray discs. Thus, the above-described measurement principle of the detector according to the present invention may be used for detecting data modules within an optical storage medium such as in optical storage discs. As an example, in case a reflective data module is present and reflects the illuminating light beam, the detector will not only detect the reflected light beam according to the above-mentioned measurement principle but will also detect a distance between the detector and the reflective data module, i.e. a depth of the reflective data module within the optical storage medium. Thus, as an example, the detector may be used for detecting different layers of information modules or data modules within the optical storage medium. Thereby, as an example, two layer discs or three layer discs or even discs having more than three layers may be generated and read out.

In a further aspect of the present invention, a scanning system for determining a depth profile of a scenery, which may also imply determining at least one position of at least one object, is provided. The scanning system comprises at least one detector according to the present invention, such as at least one detector as disclosed in one or more of the embodiments listed above and/or as disclosed in one or more of the embodiments below. The scanning system further comprises at least one illumination source adapted to scan the scenery with at least one light beam, which may also be referred to as an illumination light beam or scanning light beam. As used herein, the term "scenery" generally refers to a two-dimensional or three-dimensional range which is visible by the detector, such that at least one geometric or spatial property of the two-dimensional or three-dimensional range may be evaluated with the detector. As further used herein, the term "scan" generally refers to a consecutive measurement in different regions. Thus, the scanning specifically may imply at least one first measurement with the illumination light beam being oriented or directed in a first fashion, and at least one second measurement with the illumination light beam being oriented or directed in a second fashion which is different from the first fashion. The scanning may be a continuous scanning or a stepwise scanning. Thus, in a continuous or stepwise fashion, the illumination light beam may be directed into different regions of the scenery, and the detector may be detected to generate at least one item of information, such as at least one longitudinal coordinate, for each region. As an example, for scanning an object, one or more illumination light beams may, continuously or in a stepwise fashion, create light spots on the surface of the object, wherein longitudinal coordinates are generated for the light spots. Alternatively, however, a light pattern may be used for scanning. The scanning may be a point scanning or a line scanning or even a scanning with more complex light patterns. The illumination source of the scanning system may be distinct from the optional illumination source of the detector. Alternatively, however, the illumination source of the scanning system may also be fully or partially identical with or integrated into the at least one optional illumination source of the detector.

Thus, the scanning system may comprise at least one illumination source which is adapted to emit the at least one light beam being configured for the illumination of the at least one dot located at the at least one surface of the at least one object. As used herein, the term "dot" refers to an area, specifically a small area, on a part of the surface of the object which may be selected, for example by a user of the scanning system, to be illuminated by the illumination source. Preferably, the dot may exhibit a size which may, on one hand, be as small as possible in order to allow the scanning system to determine a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300-500 nm. Additionally or alternatively, light in the infrared spectral range may be used, such as in the range of 780 nm to 3.0 μm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such as a base plate or holder comprising a magnetic material, in particular for increasing the accuracy of the distance measurement and/or the handleability of the scanning system by the user.

Particularly, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined. The illumination source may be adapted to generate and/or to project a cloud of points, for example the illumination source may comprise one or more of at least one digital light processing (DLP) projector, at least one LCoS projector, at least one spatial light modulator; at least one diffractive optical element; at least one array of light emitting diodes; at least one array of laser light sources.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beamsplitting devices and mirrors, may be provided which may allow a generation of the described array of the laser beams. In particular, the illumination source may be directed to scan an area or a volume by using one or more movable mirrors to redirect the light beam in a periodic or non-periodic fashion.

Thus, the scanning system may provide a static arrangement of the one or more dots placed on the one or more surfaces of the one or more objects. Alternatively, the illumination source of the scanning system, in particular the one or more laser beams, such as the above described array of the laser beams, may be configured for providing one or more light beams which may exhibit a varying intensity over time and/or which may be subject to an alternating direction of emission in a passage of time, in particular by moving one or more mirrors, such as the micro-mirrors comprised within the mentioned array of micro-mirrors. As a result, the illumination source may be configured for scanning a part of the at least one surface of the at least one object as an image by using one or more light beams with alternating features as generated by the at least one illumination source of the scanning device. In particular, the scanning system may, thus, use at least one row scan and/or line scan, such as to scan the one or more surfaces of the one or more objects sequentially or simultaneously. Thus, the scanning system may be adapted to measure angles by measuring three or more dots, or the scanning system may be adapted to measure corners or narrow regions such as a gable of a roof, which may be hardly accessible using a conventional measuring stick. As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step. As non-limiting examples, the scanning system may be used in industrial safety curtain applications. As non-limiting examples, the scanning system may be used to perform sweeping, vacuuming, mopping, or waxing functions, or yard or garden care functions such as mowing or raking. As non-limiting examples, the scanning system may employ an LED illumination source with collimated optics and may be adapted to shift the frequency of the illumination source to a different frequency to obtain more accurate results and/or employ a filter to attenuate certain frequencies while transmitting others. As non-limiting examples, the scanning system and/or the illumination source may be rotated as a whole or rotating only a particular optics package such as a mirror, beam splitter or the like, using a dedicated motor as such that in operation, the scanning system may have a full 360 degree view or even be moved and or rotated out of plane to further increase the scanned area. Further, the illumination source may be actively aimed in a predetermined direction. Further, to allow the rotation of wired electrical systems, slip rings, optical data transmission, or inductive couplings may be employed.

As a non-limiting example, the scanning system may be attached to a tripod and point towards an object or region with a several corners and surfaces. One or more flexibly movable laser sources are attached to the scanning system. The one or more laser sources are moved as such that they illuminate points of interest. The position of the illuminated points with respect to the scanning system is measured when pressing a designated button on the scanning system and the position information is transmitted via a wireless interface to a mobile phone. The position information is stored in a mobile phone application. The laser sources are moved to illuminate further points of interest the position of which are measured and transmitted to the mobile phone application. The mobile phone application may transform the set of points into a 3d model by connecting adjacent points with planar surfaces. The 3d model may be stored and processed further. The distances and or angles between the measured points or surfaces may be displayed directly on a display attached to a scanning system or on the mobile phone to which the position information is transmitted.

As a non-limiting example, a scanning system may comprise two or more flexible movable laser sources to project points and further one movable laser source projecting a line. The line may be used to arrange the two or more laser spots along a line and the display of the scanning device may display the distance between the two or more laser spots that may be arranged along the line, such as at equal distance. In the case of two laser spots, a single laser source may be used whereas the distance of the projected points is modified using one or more beam-splitters or prisms, where a beam-splitter or prism can be moved as such that the projected laser spots move apart or closer together. Further, the scanning system may be adapted to project further patterns such as a right angle, a circle, a square, a triangle, or the like, along which a measurement can be done by projecting laser spots and measuring their position.

As a non-limiting example, the scanning system may be adapted as a line scanning device. In particular, the scanning device may comprise at least one sensor line or row. Triangulation systems require a sufficient baseline such that in the near filed no detection may be possible. Near field detection may be possible if the laser spot is tilted in direction of the transfer device. However, the tilting leads to that the light spot will move out of the field of view which limits detection in far field regions. These near field and far field problems can be overcome by using the detector according to the present invention. In particular, the detector may comprise a CMOS line of optical sensors. The scanning system may be adapted to detect a plurality of light beams propagating from the object to the detector on the CMOS line. The light beams may be generated at different positions on the object or by movement of the illumination source. The scanning system may be adapted to determine at least one longitudinal coordinate for each of the light points by determining the quotient signal Q as described above and in more detail below.

As a non-limiting example, the scanning system may be adapted to support the work with tools, such as wood or metal processing tools, such as a saw, a driller, or the like. Thus, the scanning system may be adapted to measure the distance in two opposite directions and display the two measured distances or the sum of the distances in a display. Further, the scanning system may be adapted to measure the distance to the edge of a surface as such that when the scanning system is placed on the surface, a laser point is moved automatically away from the scanning system along the surface, until the distance measurement shows a sudden change due to a corner or the edge of a surface. This makes it possible to measure the distance of the end of a wood plank while the scanning device is placed on the plank but remote from its end. Further, the scanning system may measure the distance of the end of a plank in one direction and project a line or circle or point in a designated distance in the opposite direction. The scanning system may be adapted to project the line or circle or point in a distance depending on the distance measured in the opposite direction such as depending on a predetermined sum distance. This allows working with a tool such as a saw or driller at the projected position while placing the scanning system in a safe distance from the tool and simultaneously perform a process using the tool in a predetermined distance to the edge of the plank. Further, the scanning system may be adapted to project points or lines or the like in two opposite directions in a predetermined distance. When the sum of the distances is changed, only one of the projected distances changes.

As a non-limiting example, the scanning system may be adapted to be placed onto a surface, such as a surface on which a task is performed, such as cutting, sawing, drilling, or the like, and to project a line onto the surface in a predetermined distance that can be adjusted such as with buttons on the scanning device.

As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step.

The transfer device can, as explained above, be designed to feed light propagating from the object to the detector to the optical sensor, preferably successively. As explained above, this feeding can optionally be effected by means of imaging or else by means of non-imaging properties of the transfer device. In particular the transfer device can also be designed to collect the electromagnetic radiation before the latter is fed to the optical sensor. The transfer device can also be wholly or partly a constituent part of at least one optional illumination source, for example by the illumination source being designed to provide a light beam having defined optical properties, for example having a defined or precisely known beam profile, for example at least one linear combination of Gaussian beams, in particular at least one laser beam having a known beam profile.

The beacon devices and/or the at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers, more preferably in the part of the near infrared region where silicon photodiodes are applicable specifically in the range of 700 nm to 1000 nm. For thermal imaging applications the target may emit light in the far infrared spectral range, preferably in the range of 3.0 micrometers to 20 micrometers. For example, the at least one illumination source is adapted to emit light in the visible spectral range, preferably in the range of 500 nm to 780 nm, most preferably at 650 nm to 750 nm or at 690 nm to 700 nm. For example, the at least one illumination source is adapted to emit light in the infrared spectral range. Other options, however, are feasible.

The feeding of the light beam to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the transfer device may be designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

In a further aspect, the present invention discloses an inertial measurement unit for use in an electronic device. The electronic device may be a mobile electronic device. The electronic de-vice may be a camera. The electronic device may be a mobile phone. The inertial measurement unit is adapted to receive data determined by at least one inertial measurement unit comprising at least one detector according to the present invention, such as according to one or more of the embodiments referring to a detector as disclosed above or as disclosed in further detail below. As used herein, the term "data determined by the at least one detector" refers to at least one information on the at least one longitudinal coordinate z. The inertial measurement unit further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angular sensor, an angular rate sensor, a magnetic field sensor, a magnetometer, an accelerometer; a gyroscope. As used herein, the term "data determined by the at least one further sensor" refers to at least one information selected from the group consisting of: angle information; speed information; information on turn rate; information on inclination. The inertial measurement unit is adapted to determine by evaluating the data from the detector and the at least one further sensor at least one property of the electronic device selected from the group consisting of: position in space, relative or absolute motion in space, rotation, acceleration, orientation, angle position, inclination, turn rate, speed. The inertial measurement unit may comprise at least one processor. The processor may be adapted to evaluate data recorded by the further sensor. In particular, the processor may be adapted to determine and/or calculate one or more of spatial position, spatial orientation, movement and velocity. The inertial measurement unit may comprise a plurality of further sensors. The inertial measurement unit may be adapted to fuse information determined from at least two of the further sensors. The inertial measurement unit may be adapted to fuse information of at least two further sensors by using at least one Kalman filter. As outlined above, the detector may be adapted to provide an absolute measurement of the longitudinal coordinate z. The processor, e.g. the evaluation device as described above, may be adapted to fuse the information of the at least two further sensors considering the longitudinal coordinate z. The various sensor signals may be used within a Kalman filter or a linear quadratic estimated to take into account that each sensor signal is subject to measurement errors and inaccuracies. Fusion of these sensor signals within a Kalman filter may yield an improved estimate such as for the measurement of the longitudinal coordinate.

In a further aspect, the present invention discloses a method for determining a position of at least one object by using a detector, such as a detector according to the present invention, such as according to one or more of the embodiments referring to a detector as disclosed above or as disclosed in further detail below. Still, other types of detectors may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following method steps:
providing at least two optical sensors, each optical sensor having a light-sensitive area, wherein each optical sensor is configured to generate a sensor signal in response to an illumination of its respective light-sensitive area by the light beam, wherein the detector has at least one transfer device, wherein the transfer device has at least one focal length in response to the light beam propagating from the object to the detector;
illuminating each of light-sensitive areas of at least two optical sensors of the detector with a light beam propagating from the object to the detector, wherein, thereby, each of the light-sensitive areas generates at least one sensor signal; and
evaluating the sensor signals, thereby, determining at least one longitudinal coordinate z of the object, wherein the evaluating comprises deriving a quotient signal Q of the sensor signals.

The longitudinal coordinate z of the object may be determined in at least one measurement range independent from the object size in an object plane.

The deriving of the quotient signal Q may comprise one or more of dividing the sensor signals, dividing multiples of the sensor signals, dividing linear combinations of the sensor signals.

The method may comprise adjusting the measurement range by adjusting on one or more parameters selected from the group consisting of: a longitudinal distance from the object to the transfer device $z_0$; the focal length of the transfer device f; a diameter of an exit pupil of the transfer device $E_x$; a longitudinal distance from the transfer device to the light sensitive area $z_s$, a distance from the transfer device to an image of the object $z_i$; an object size $O_{size}$ of the object in the object plane.

The transfer device may have an optical axis. With respect to embodiments of the transfer device reference is made to the embodiments of the transfer device described with respect to a first aspect above.

For details, options and definitions, reference may be made to the detector as discussed above. Thus, specifically, as outlined above, the method may comprise using the detector according to the present invention, such as according to one or more of the embodiments given above or given in further detail below.

In a first preferred embodiment the method may comprise the following method steps, wherein the method steps may be performed in the given order or may be performed in a different order. Further, one or more additional method steps may be present which are not listed. Further, one, more than one or even all of the method steps may be performed repeatedly.

The method steps may be as follows:
illuminating at least one first light-sensitive area of at least one first optical sensor of the detector with a light beam propagating from the object to the detector and, thereby, generating at least one first sensor signal;
illuminating at least one second light-sensitive area of at least one second optical sensor of the detector with the light beam and, thereby, generating at least one second sensor signal, wherein the first light-sensitive area is smaller than the second light-sensitive area; and
evaluating the first and second sensor signals, thereby determining at least one longitudinal coordinate z of the object.

Specifically, evaluating the first and second sensor signal may comprise deriving the quotient signal Q by dividing the first and second sensor signals, by dividing multiples of the first and second sensor signals or by dividing linear combinations of the first and second sensor signals. Further, the determining the longitudinal coordinate may comprise evaluating the quotient signal Q.

In a second preferred embodiment the method may comprise the following method steps, wherein the method steps may be performed in the given order or may be performed in a different order. Further, one or more additional method steps may be present which are not listed. Further, one, more than one or even all of the method steps may be performed repeatedly.

The method steps may be as follows:
illuminating at least one sensor element of the detector with at least one light beam propagating from the object to the detector, the detector having a matrix of optical sensors, the optical sensors each having a light-sensitive area, wherein each optical sensor generates at least one sensor signal in response to the illumination;
evaluating the sensor signals, by
determining at least one optical sensor having the highest sensor signal and forming at least one center signal;
a) evaluating the sensor signals of the optical sensors of the matrix and forming at least one sum signal;
b) determining at least one combined signal by combining the center signal and the sum signal; and
c) determining at least one longitudinal coordinate z of the object by evaluating the combined signal.

Specifically, the evaluation of the first and second sensor signal may comprise deriving the quotient signal Q by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of a first linear combination of the center signal and the sum signal and a second linear combination of the center signal and the sum signal. Further, the determination of the longitudinal coordinate may comprise evaluating the quotient signal Q. The evaluation of the quotient signal specifically may comprise using at least one predetermined relationship between the quotient signal Q and the longitudinal coordinate, in order to determine the longitudinal coordinate.

In a third preferred embodiment the method may comprise the following method steps, wherein the method steps may be performed in the given order or may be performed in a different order. Further, one or more additional method steps may be present which are not listed. Further, one, more than one or even all of the method steps may be performed repeatedly.

The method steps may be as follows:
providing at least two optical sensors, each optical sensor having a light-sensitive area, wherein each light-sensitive area has a geometrical center, wherein the geometrical centers of the optical sensors are spaced apart from an optical axis of the detector by different separations, wherein each optical sensor is configured to generate a sensor signal in response to an illumination of its respective light-sensitive area by a light;
illuminating the at least two light-sensitive areas of the at least two optical sensors of the detector with a light beam propagating from the object to the detector and, thereby, generating at least two sensor signals; and
evaluating the sensor signals by combining the at least two sensor signals, thereby determining at least one longitudinal coordinate z of the object.

Specifically, evaluating the first and second sensor signal may comprise deriving the quotient signal Q by one or more of dividing the sensor signals, dividing multiples of the sensor signals or dividing linear combinations of the sensor signals, and wherein the determining of the longitudinal coordinate comprises evaluating the quotient signal Q. Further, the determining of the longitudinal coordinate may comprise evaluating the quotient signal Q.

In a further preferred embodiment the method may comprise the following method steps, wherein the method steps may be performed in the given order or may be performed in a different order. Further, one or more additional method steps may be present which are not listed. Further, one, more than one or even all of the method steps may be performed repeatedly.

The method steps may be as follows:
illuminating at least one first light-sensitive area of at least one first optical sensor with a light beam propagating from the object to the detector and generating at least one first sensor signal by the first optical sensor, in response to the illumination of the first light-sensitive area;
illuminating at least one second light-sensitive area of at least one second optical sensor with the light beam and generating at least one second sensor signal by the second optical sensor, in response to the illumination of the second light-sensitive area, the second optical sensor having:
at least one fluorescent waveguiding sheet forming a second light-sensitive area, wherein the fluorescent waveguiding sheet is oriented towards the object such that at least one light beam propagating from the object towards the detector generates at least one light spot in the second light-sensitive area, wherein the fluorescent waveguiding sheet contains at least one fluorescent material, wherein the fluorescent material is adapted to generate fluorescence light in response to the illumination by the light beam; and at least one photosensitive element located at at least one edge of the fluorescent waveguiding sheet, capable of detecting fluorescence light guided from the light spot towards the photosensitive element by the fluorescent waveguiding sheet and capable of generating the at least one second sensor signal in response to the illumination of the second light-sensitive area by the light beam, wherein the first light-sensitive area is smaller than the second light-sensitive area; and determining at least one longitudinal coordinate z of the object by evaluating the first and second sensor signals.

Specifically, as discussed above, the evaluating the first and second sensor signals may comprise deriving a quotient signal Q by dividing the first and second sensor signals, by dividing multiples of the first and second sensor signals or by dividing linear combinations of the first and second sensor signals. The determining the at least one longitudinal coordinate of the object may comprise evaluating the quotient signal Q. as discussed above, at least one predetermined relationship between the quotient signal and the longitudinal coordinate may be used for determining the longitudinal coordinate.

As also discussed above, the second optical sensor specifically may comprise at least two photosensitive elements. The method may further comprise determining at least one transversal coordinate x, y of the object by evaluating the sensor signals of the photosensitive elements.

For details, options and definitions, reference may be made to the detector as discussed above. Thus, specifically, as outlined above, the method may comprise using the detector according to the present invention, such as according to one or more of the embodiments given above or given in further detail below.

In a further preferred embodiment, the method comprises the following steps:
 providing at least one angle dependent optical element and generating at least one light beam having at least one beam profile depending on an angle of incidence;
 providing at least two optical sensors, wherein each optical sensor has at least one light sensitive area, wherein each optical sensor is designed to generate at least one sensor signal in response to an illumination of its respective light-sensitive area by the light beam generated by the angle dependent optical element;
 illuminating each of the light-sensitive areas of the at least two optical sensors of the detector with the light beam generated by the angle dependent optical element, wherein, thereby, each of the light-sensitive areas generates at least one sensor signal; and
evaluating the sensor signals, thereby, determining at least one longitudinal coordinate z of the object, wherein the evaluating comprises deriving the quotient signal Q of the sensor signals.

Specifically, evaluating the first and second sensor signal may comprise deriving the quotient signal Q by dividing the first and second sensor signals, by dividing multiples of the first and second sensor signals or by dividing linear combinations of the first and second sensor signals. Further, the determining the longitudinal coordinate may comprise evaluating the quotient signal Q.

As also discussed above, the second optical sensor specifically may comprise at least two photosensitive elements. The method may further comprise determining at least one transversal coordinate x, y of the object by evaluating the sensor signals of the photosensitive elements.

For details, options and definitions, reference may be made to the detector as discussed above. Thus, specifically, as outlined above, the method may comprise using the detector according to the present invention, such as according to one or more of the embodiments given above or given in further detail below.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; an optical data storage application; a security application; a surveillance application; a safety application; a human-machine interface application; a tracking application; a photography application; an imaging application or camera application; a mapping application for generating maps of at least one space; a homing or tracking beacon detector for vehicles; a machine vision application; a robotics application; a quality control application; a manufacturing application.

The object generally may be a living or non-living object. The detector or the detector system even may comprise the at least one object, the object thereby forming part of the detector system. Preferably, however, the object may move independently from the detector, in at least one spatial dimension. The object generally may be an arbitrary object. In one embodiment, the object may be a rigid object. Other embodiments are feasible, such as embodiments in which the object is a non-rigid object or an object which may change its shape.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

Thus, generally, the devices according to the present invention, such as the detector, may be applied in various fields of uses. Specifically, the detector may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing, logistics, surveillance, or maintenance technology.

The devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning and/or detecting environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. mouse, keyboard, touchpad, microphone etc. Further, the devices according to the present invention may be used in applications for gaming, such as by using a webcam. Further, the devices according to the present invention may be used in virtual training applications and/or video conferences. Further, devices according to the present invention may be used to recognize or track hands, arms, or objects used in a virtual or augmented reality application, especially when wearing head-mounted displays.

Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for augmented reality applications and/or for recognizing whether a display is being looked at and/or from which perspective a display is being looked at. Further, devices according to the present invention may be used to explore a room, boundaries, obstacles, in connection with a virtual or augmented reality application, especially when wearing a head-mounted display.

Further, the devices according to the present invention may be used in or as digital cameras such as DSC cameras and/or in or as reflex cameras such as SLR cameras. For these applications, reference may be made to the use of the devices according to the present invention in mobile applications such as mobile phones, as disclosed above.

Further, the devices according to the present invention may be used for security or surveillance applications. Thus, as an example, at least one device according to the present invention can be combined with one or more digital and/or analogue electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors. The devices according to the present invention may further be combined with an active infrared light source to allow detection in low light surroundings. The devices according to the present invention are generally advantageous as compared to active detector systems, specifically since the devices according to the present invention avoid actively sending signals which may be detected by third parties, as is the case e.g. in radar applications, ultrasound applications, LIDAR or similar active detector devices. Thus, generally, the devices according to the present invention may be used for an unrecognized and undetectable tracking of moving objects. Additionally, the devices according to the present invention generally are less prone to manipulations and irritations as compared to conventional devices.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photomultipliers. Further, the devices according to the present invention may be used in public spaces or crowded spaces to detect potentially hazardous activities such as commitment of crimes such as theft in a parking lot or unattended objects such as unattended baggage in an airport.

Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use.

Conventional optical systems having two or more lenses with high quality generally are voluminous, such as due to the general need for voluminous beam-splitters. Further, the devices according to the present invention generally may be used for focus/autofocus devices, such as autofocus cameras. Further, the devices according to the present invention may also be used in optical microscopy, especially in confocal microscopy.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, traffic sign detection, traffic sign recognition, lane recognition, rear cross traffic alert, light source recognition for adapting the head light intensity and range depending on approaching traffic or vehicles driving ahead, adaptive frontlighting systems, automatic control of high beam head lights, adaptive cut-off lights in front light systems, glare-free high beam front lighting systems, marking animals, obstacles, or the like by headlight illumination, rear cross traffic alert, and other driver assistance systems such as advanced driver assistance systems, or other automotive and traffic applications. Further, devices according to the present invention may be used in driver assistance systems anticipating maneuvers of the driver beforehand for collision avoidance or the like. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. The use of an airbag may be prevented in case the passenger is located as such, that the use of an airbag will cause a severe injury. Further, in vehicles such as cars, trains, planes or the like, especially in autonomous vehicles, devices according to the present invention may be used to determine whether a driver pays attention to the traffic or is distracted, or asleep, or tired, or incapable of driving such as due to the consumption of alcohol or the like.

In these or other applications, generally, the devices according to the present invention may be used as stand-alone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. In these applications, the generally passive nature of the devices according to the present invention is advantageous. Thus, since the devices according to the present invention generally do not require emitting signals, the risk of interference of active sensor signals with other signal sources may be avoided. The devices according to the present invention specifically may be used in combination with recognition software, such as standard image recognition software. Thus, signals and data as provided by the devices according to the present invention typically are readily processable and, therefore, generally require lower calculation power than established 3D measurement systems. Given the low space demand, the devices according to the present invention such as cameras may be placed at virtually any place in a vehicle, such as on or behind a window screen, on a front hood, on bumpers, on lights, on mirrors or other places and the like. Various detectors according to the present invention such as one or more detectors based on the effect disclosed within the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, side window or front window, on the bumpers or on the lights.

A combination of at least one device according to the present invention such as at least one detector according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention generally may be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots.

Further, the devices according to the present invention may be used in the fields of medical systems and sports. Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Further, the devices according to the present invention may be combined with an appropriate monitoring software, in order to enable tracking and analysis of movements. This may allow an instant overlay of the position of a medical device, such as an endoscope or a scalpel, with results from medical imaging, such as obtained from magnetic resonance imaging, x-ray imaging, or ultrasound imaging. These applications are specifically valuable e.g. in medical treatments where precise location information is important such as in brain surgery and long-distance diagnosis and tele-medicine. Further, the devices according to the present invention may be used in 3D-body scanning. Body scanning may be applied in a medical context, such as in dental surgery, plastic surgery, bariatric surgery, or cosmetic plastic surgery, or it may be applied in the context of medical diagnosis such as in the diagnosis of myofascial pain syndrome, cancer, body dysmorphic disorder, or further diseases. Body scanning may further be applied in the field of sports to assess ergonomic use or fit of sports equipment. Further, the devices according to the present invention may be used in wearable robots such as in exoskeletons or prosthesis or the like.

Body scanning may further be used in the context of clothing, such as to determine a suitable size and fitting of clothes. This technology may be used in the context of tailor-made clothes or in the context of ordering clothes or shoes from the internet or at a self-service shopping device such as a micro kiosk device or customer concierge device. Body scanning in the context of clothing is especially important for scanning fully dressed customers.

Further, the devices according to the present invention may be used in the context of people counting systems, such as to count the number of people in an elevator, a train, a bus, a car, or a plane, or to count the number of people passing a hallway, a door, an aisle, a retail store, a stadium, an entertainment venue, a museum, a library, a public location, a cinema, a theater, or the like. Further, the 3D-function in the people counting system may be used to obtain or estimate further information about the people that are counted such as height, weight, age, physical fitness, or the like. This information may be used for business intelligence metrics, and/or for further optimizing the locality where people may be counted to make it more attractive or safe. In a retail environment, the devices according to the present invention in the context of people counting may be used to recognize returning customers or cross shoppers, to assess shopping behavior, to assess the percentage of visitors that make purchases, to optimize staff shifts, or to monitor the costs of a shopping mall per visitor.

Further, people counting systems may be used for anthropometric surveys. Further, the devices according to the present invention may be used in public transportation systems for automatically charging passengers depending on the length of transport. Further, the devices according to the present invention may be used in playgrounds for children, to recognize injured children or children engaged in dangerous activities, to allow additional interaction with playground toys, to ensure safe use of playground toys or the like.

Further the devices according to the present invention may be used in construction tools, such as a range meter that determines the distance to an object or to a wall, to assess whether a surface is planar, to align objects or place objects in an ordered manner, or in inspection cameras for use in construction environments or the like.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing, golf, car racing, laser tag, battlefield simulation etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

Further, the devices according to the present invention may be used in the field of auto racing or car driver training or car safety training or the like to determine the position of a car or the track of a car, or the deviation from a previous track or an ideal track or the like.

The devices according to the present invention may further be used to support a practice of musical instruments, in particular remote lessons, for example lessons of string instruments, such as fiddles, violins, violas, celli, basses, harps, guitars, banjos, or ukuleles, keyboard instruments, such as pianos, organs, keyboards, harpsichords, harmoniums, or accordions, and/or percussion instruments, such as drums, timpani, marimbas, xylophones, vibraphones, bongos, congas, timbales, djembes or tablas.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a passive controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. Given the passive nature of the devices according to the present invention, the devices according to the present invention may be advantageous over active devices and/or may be used complementary to existing solutions like radar, ultrasound, 2D cameras, IR detection etc. One particular advantage of the devices according to the present invention is the low likelihood of signal interference. Therefore multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used to monitor the filling level of tanks, silos etc. Further, devices according to the present invention may be used to inspect complex products for missing parts, incomplete parts, loose parts, low quality parts, or the like, such as in automatic optical inspection, such as of printed circuit boards, inspection of assemblies or sub-assemblies, verification of engineered components, engine part inspections, wood quality inspection, label inspections, inspection of medical devices, inspection of product orientations, packaging inspections, food pack inspections, or the like.

Further, the devices according to the present invention may be used in vehicles, trains, airplanes, ships, spacecraft and other traffic applications. Thus, besides the applications mentioned above in the context of traffic applications, passive tracking systems for aircraft, vehicles and the like may be named. The use of at least one device according to the present invention, such as at least one detector according to the present invention, for monitoring the speed and/or the direction of moving objects is feasible. Specifically, the tracking of fast moving objects on land, sea and in the air including space may be named. The at least one device according to the present invention, such as the at least one detector according to the present invention, specifically may be mounted on a still-standing and/or on a moving device. An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention generally are useful and advantageous due to the low calculation power required, the instant response and due to the passive nature of the detection system which generally is more difficult to detect and to disturb as compared to active systems, like e.g. radar. The devices according to the present invention are particularly useful but not limited to e.g. speed control and air traffic control devices. Further, the devices according to the present invention may be used in automated tolling systems for road charges.

The devices according to the present invention generally may be used in passive applications. Passive applications include guidance for ships in harbors or in dangerous areas, and for aircraft when landing or starting. Wherein, fixed, known active targets may be used for precise guidance. The same can be used for vehicles driving on dangerous but well defined routes, such as mining vehicles. Further, the devices according to the present invention may be used to detect rapidly approaching objects, such as cars, trains, flying objects, animals, or the like. Further, the devices according to the present invention can be used for detecting velocities or accelerations of objects, or to predict the movement of an object by tracking one or more of its position, speed, and/or acceleration depending on time.

Further, as outlined above, the devices according to the present invention may be used in the field of gaming. Thus, the devices according to the present invention can be passive for use with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low light conditions or in other situations in which enhancement of the surrounding conditions is required. Additionally or alternatively, a combination of one or more devices according to the present invention with one or more IR or VIS light sources is possible. A combination of a detector according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racket, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, the devices according to the present invention may be used to detect and or track objects that emit light by themselves, such as due to high temperature or further light emission processes. The light emitting part may be an exhaust stream or the like. Further, the devices according to the present invention may be used to track reflecting objects and analyze the rotation or orientation of these objects.

Further, the devices according to the present invention generally may be used in the field of building, construction and cartography. Thus, generally, one or more devices according to the present invention may be used in order to measure and/or monitor environmental areas, e.g. countryside or buildings. Therein, one or more devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or from air. Potential fields of application may be construction, cartography, real estate management, land surveying or the like. As an example, the devices according to the present invention may be used in drones or multicopters to monitor buildings, production sites, chimneys, agricultural production environments such as fields, production plants, or landscapes, to support rescue operations, to support work in dangerous environments, to support fire brigades in a burning location indoors or outdoors, or to find or monitor one or more persons or animals, or the like, or for entertainment purposes, such as a drone following and recording one or more persons doing sports such as skiing or cycling or the like, which could be realized by following a helmet, a mark, a beacon device, or the like. Devices according to the present invention could be used recognize obstacles, follow a predefined route, follow an edge, a pipe, a building, or the like, or to record a global or local map of the environment. Further, devices according to the present invention could be used for indoor or outdoor localization and positioning of drones, for stabilizing the height of a drone indoors where barometric pressure sensors are not accurate enough, or for the interaction of multiple drones such as concertized movements of several drones or recharging or refueling in the air or the like.

Further, the devices according to the present invention may be used within an interconnecting network of home appliances such as CHAIN (Cedec Home Appliances Interoperating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support. Further, the devices according to the present invention may be used in heating or cooling systems such as an air-conditioning system, to locate which part of the room should be brought to a certain temperature or humidity, especially depending on the location of one or more persons. Further, the devices according to the present invention may be used in domestic robots, such as service or autonomous robots which may be used for household chores. The devices according to the present invention may be used for a number of different purposes, such as to avoid collisions or to map the environment, but also to identify a user, to personalize the robot's performance for a given user, for security purposes, or for gesture or facial recognition. As an example, the devices according to the present invention may be used in robotic vacuum cleaners, floor-washing robots, dry-sweeping robots, ironing robots for ironing clothes, animal litter robots, such as dog or cat litter robots, charging robot for electrical vehicles, security robots that detect intruders, robotic lawn mowers, automated pool cleaners, rain gutter cleaning robots, robotic shopping carts, luggage carrying robots, line following robots, laundry robots, ironing robots, window washing robots, toy robots, patient monitoring robots, baby monitoring robots, elderly monitoring robots, children monitoring robots, transport robots, telepresence robots, professional service robots, programmable toy robots, pathfinder robots, social robots providing company to less mobile people, following robots, smart card following robots, psychotherapy robots, or robots translating and speech to sign language or sign language to speech. In the context of less mobile people, such as elderly persons, household robots with the devices according to the present invention may be used for picking up objects, transporting objects, and interacting with the objects and the user in a safe way. Further, the devices according to the present invention may be used in humanoid robots, especially in the context of using humanoid hands to pick up or hold or place objects. Further, the devices according to the present invention may be used in combination with audio interfaces especially in combination with household robots which may serve as a digital assistant with interfaces to online or offline computer applications. Further, the devices according to the present invention may be used in robots that can control switches and buttons in industrial and household purposes. Further, the devices according to the present invention may be used in smart home robots such as Mayfield's Kuri. Further the devices according to the present invention may be used in robots operating with hazardous materials or objects or in dangerous environments. As a non-limiting example, the devices according to the present invention may be used in robots or unmanned remote-controlled vehicles to operate with hazardous materials such as chemicals or radioactive materials especially after disasters, or with other hazardous or potentially hazardous objects such as mines, unexploded arms, or the like, or to operate in or to investigate insecure environments such as near burning objects or post disaster areas or for manned or unmanned rescue operations in the air, in the sea, underground, or the like.

Further, devices according to the present invention may be used for the inspection of adhesive beads, sealing beads, or the like, such as to recognize disruptions, slubs, contractions, asymetries, local defects, or the like. Further, devices according to the present invention may be used to count objects such as dry fruits on a conveyer belt, such as in difficult situations, such as when fruit of similar color and shape may be in direct contact with each other. Further, devices according to the present invention may be used in quality control of die cast or injection molded parts such as to ensure flawless casting or molding, recognize surface damages, worn out toolings or the like. Further, devices according to the present invention may be used for laser-scribing such as for quality control and positioning of the laser. Further, devices according to the present invention may be used for sorting systems, such as to detect position, rotation, and shape of an object, compare it to a database of objects, and classify the object. Further, devices according to the present invention may be used for stamping part inspection, packaging inspection, such as food and pharma packaging inspection, filament inspection, or the like.

Further, devices according to the present invention may be used for navigation purposes, where Global Positioning Systems (GPS) are not sufficiently reliable. GPS signals commonly use radio waves that are can be blocked or difficult to receive indoors or outdoors in valleys or in forests below the treeline. Further, especially in unmanned autonomous vehicles, the weight of the system may be critical. Especially unmanned autonomous vehicles need high-speed position data for reliable feedback and stability of their control systems. Using devices according to the present invention may allow short time response and positioning without adding weight due to a heavy device.

Further, the devices according to the present invention may be used in household, mobile or entertainment devices, such as a refrigerator, a microwave, a washing machine, a window blind or shutter, a household alarm, an air condition devices, a heating device, a television, an audio device, a smart watch, a mobile phone, a phone, a dishwasher, a stove or the like, to detect the presence of a person, to monitor the contents or function of the device, or to interact with the person and/or share information about the person with further household, mobile or entertainment devices.

Further, the devices according to the present invention may be used to support elderly or disabled persons or persons with limited or no vision, such as in household chores or at work such as in devices for holding, carrying, or picking objects, or in a safety system with optical or acoustical signals signaling obstacles in the environment.

The devices according to the present invention may further be used in agriculture, for example to detect and sort out vermin, weeds, and/or infected crop plants, fully or in parts, wherein crop plants may be infected by fungus or insects. Further, for harvesting crops, the devices according to the present invention may be used to detect animals, such as deer, which may otherwise be harmed by harvesting devices. Further, the devices according to the present invention may be used to monitor the growth of plants in a field or greenhouse, in particular to adjust the amount of water or fertilizer or crop protection products for a given region in the field or greenhouse or even for a given plant. Further, in agricultural biotechnology, the devices according to the present invention may be used to monitor the size and shape of plants.

Further, devices according to the present invention may be used to automatically remove weeds such as with mechanical means, such as to avoid the use of herbicides. Further, devices according to the present invention may be used in the field of agriculture, in particular to detect and/or locate specific insects such as to decide whether or not to apply a crop protection or fertilization substance, such as to reduce the amount of applied substance or to protect specific groups of animals such as bees.

Further, devices according to the present invention may be used to guide users during a shaving, hair cutting, or cosmetics procedure, or the like. Further, devices according to the present invention may be used to record or monitor what is played on an instrument, such as a violin. Further, devices according to the present invention may be used in smart household appliances such as a smart refrigerator, such as to monitor the contents of the refrigerator and transmit notifications depending on the contents. Further, devices according to the present invention may be used for monitoring or tracking populations of humans, animals, or plants, such as dear or tree populations in forests. Further, devices according to the present invention may be used in harvesting machines, such as for harvesting crops, flowers or fruits, such as grapes, corn, hops, apples, grains, rice, strawberries, asparagus, tulips, roses, soy beans, or the like. Further, devices according to the present invention may be used to monitor the growth of plants, animals, algae, fish, or the like, such as in breeding, food production, agriculture or research applications, to control irrigation, fertilization, humidity, temperature, use of herbicides, insecticides, fungicides, rodenticides, or the like.

Further, devices according to the present invention may be used in feeding machines for animals or pets, such as for cows, pigs, cats, dogs, birds, fish, or the like. Further, devices according to the present invention may be used in animal product production processes, such as for collecting milk, eggs, fur, meat, or the like, such as in automated milking or butchering processes. Further, devices according to the present invention may be used for automated seeding machines, or sowing machines, or planting machines such as for planting corn, garlic, trees, salad or the like. Further, devices according to the present invention may be used to assess or monitor weather phenomena, such as clouds, fog, or the like, or to warn from danger of avalanches, tsunamis, gales, earthquakes, thunder storms, or the like. Further, devices according to the present invention may be used to measure motions, shocks, concussions, or the like such as to monitor earthquake risk. Further, devices according to the present invention may be used in traffic technology to monitor dangerous crossings, to control traffic lights depending on traffic, to monitor public spaces, to monitor roads, gyms, stadiums, ski resorts, public events, or the like. Further, devices according to the present invention may be used in medical applications such as to monitor or analyze tissues, medical or biological assays, changes in tissues such as in moles or melanoma or the like, to count bacteria, blood cells, cells, algae, or the like, for retina scans, breath or pulse measurements, gastroscopy, patient surveillance, or the like. Further, devices according to the present invention may be used to monitor the shape, size, or circumference of drops, streams, jets, or the like or to analyze, assess, or monitor profiles or gas or liquid currents such as in a wind channel, or the like. Further, devices according to the present invention may be used to warn drivers such as car or train drivers when they are getting sick or tired or the like. Further, devices according to the present invention may be used in material testing to recognize strains or tensions or fissures, or the like. Further, devices according to the present invention may be used in sailing to monitor and optimize sail positions such as automatically. Further, devices according to the present invention may be used for fuel level gauges.

Further, the devices according to the present invention may be combined with sensors to detect chemicals or pollutants, electronic nose chips, microbe sensor chips to detect bacteria or viruses or the like, Geiger counters, tactile sensors, heat sensors, or the like. This may for example be used in constructing smart robots which are configured for handling dangerous or difficult tasks, such as in treating highly infectious patients, handling or removing highly dangerous substances, cleaning highly polluted areas, such as highly radioactive areas or chemical spills, or for pest control in agriculture.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. Further, the devices according to the present invention may be used in inspections and maintenance, such as pipeline inspection gauges. Further, in a production environment, the devices according to the present invention may be used to work with objects of a badly defined shape such as naturally grown objects, such as sorting vegetables or other natural products by shape or size or cutting products such as meat or objects that are manufactured with a precision that is lower than the precision needed for a processing step.

Further the devices according to the present invention may be used in local navigation systems to allow autonomously or partially autonomously moving vehicles or multicopters or the like through an indoor or outdoor space. A non-limiting example may comprise vehicles moving through an automated storage for picking up objects and placing them at a different location. Indoor navigation may further be used in shopping malls, retail stores, museums, airports, or train stations, to track the location of mobile goods, mobile devices, baggage, customers or employees, or to supply users with a location specific information, such as the current position on a map, or information on goods sold, or the like.

Further, the devices according to the present invention may be used to ensure safe driving of motorcycles such as driving assistance for motorcycles by monitoring speed, inclination, upcoming obstacles, unevenness of the road, or curves or the like. Further, the devices according to the present invention may be used in trains or trams to avoid collisions.

Further, the devices according to the present invention may be used in handheld devices, such as for scanning packaging or parcels to optimize a logistics process. Further, the devices according to the present invention may be used in further handheld devices such as personal shopping devices, RFID-readers, handheld devices for use in hospitals or health environments such as for medical use or to obtain, exchange or record patient or patient health related information, smart badges for retail or health environments, or the like.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like. Further, the devices according to the present invention may be used for detecting the shape of one or more articles, such as for anti-product piracy and for anti-counterfeiting purposes.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term photography generally refers to the technology of acquiring image information of at least one object. As further used herein, a camera generally is a device adapted for performing photography. As further used herein, the term digital photography generally refers to the technology of acquiring image information of at least one object by using a plurality of light-sensitive elements adapted to generate electrical signals indicating an intensity and/or color of illumination, preferably digital electrical signals. As further used herein, the term 3D photography generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

As outlined above and as will be outlined in further detail below, the present invention preferably may be applied in the field of human-machine interfaces, in the field of sports and/or in the field of computer games. Thus, preferably, the object may be selected from the group consisting of: an article of sports equipment, preferably an article selected from the group consisting of a racket, a club, a bat, an article of clothing, a hat, a shoe. Other embodiments are feasible.

As used herein, the object generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

With regard to the coordinate system for determining the position of the object, which may be a coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The detector may be a device configured for providing at least one item of information on the position of the at least one object and/or a part thereof. Thus, the position may refer to an item of information fully describing the position of the object or a part thereof, preferably in the coordinate system of the detector, or may refer to a partial information, which only partially describes the position. The detector generally may be a device adapted for detecting light beams, such as the light beams propagating from the beacon devices towards the detector.

The evaluation device and the detector may fully or partially be integrated into a single device. Thus, generally, the evaluation device also may form part of the detector. Alternatively, the evaluation device and the detector may fully or partially be embodied as separate devices. The detector may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

The detector specifically may be used to record a light-field behind a lens or lens system of the detector, comparable to a plenoptic or light-field camera. Thus, specifically, the detector may be embodied as a light-field camera adapted for acquiring images in multiple focal planes, such as simultaneously. The term light-field, as used herein, generally refers to the spatial light propagation of light inside the detector such as inside camera. The detector according to the present invention, specifically having a stack of optical sensors, may have the capability of directly recording a light-field within the detector or camera, such as behind a lens. The plurality of sensors may record images at different distances from the lens. Using, e.g., convolution-based algorithms such as "depth from focus" or "depth from defocus", the propagation direction, focus points, and spread of the light behind the lens can be modeled. From the modeled propagation of light behind the lens, images at various distances to the lens can be extracted, the depth of field can be optimized, pictures that are in focus at various distances can be extracted, or distances of objects can be calculated. Further information may be extracted.

The use of several optical sensors further allows for correcting lens errors in an image processing step after recording the images. Optical instruments often become expensive and challenging in construction, when lens errors need to be corrected. These are especially problematic in microscopes and telescopes. In microscopes, a typical lens error is that rays of varying distance to the optical axis are distorted differently (spherical aberration). In telescopes, varying the focus may occur from differing temperatures in the atmosphere. Static errors such as spherical aberration or further errors from production may be corrected by determining the errors in a calibration step and then using a fixed image processing such as fixed set of pixels and sensor, or more involved processing techniques using light propagation information. In cases in which lens errors are strongly time-dependent, i.e. dependent on weather conditions in telescopes, the lens errors may be corrected by using the light propagation behind the lens, calculating extended depth of field images, using depth from focus techniques, and others.

The detector according to the present invention may further allow for color detection. For color detection, a plurality of optical sensors having different spectral properties may be used, and sensor signals of these optical sensors may be compared. Further, the devices according to the present invention may be used in the context of gesture recognition. In this context, gesture recognition in combination with devices according to the present invention may, in particular, be used as a human-machine interface for transmitting information via motion of a body, of body parts or of objects to a machine. Herein, the information may, preferably, be transmitted via a motion of hands or hand parts, such as fingers, in particular, by pointing at objects, applying sign language, such as for deaf people, making signs for numbers, approval, disapproval, or the like, by waving the hand, such as when asking someone to approach, to leave, or to greet a person, to press an object, to take an object, or, in the field of sports or music, in a hand or finger exercise, such as a warm-up exercise. Further, the information may be transmitted by motion of arms or legs, such as rotating, kicking, grabbing, twisting, rotating, scrolling, browsing, pushing, bending, punching, shaking, arms, legs, both arms, or both legs, or a combination of arms and legs, such as for a purpose of sports or music, such as for entertainment, exercise, or training function of a machine. Further, the information may be transmitted by motion of the whole body or major parts thereof, such as jumping, rotating, or making complex signs, such as sign language used at airports or by traffic police in order to transmit information, such as "turn right", "turn left", "proceed", "slow down", "stop", or "stop engines", or by pretending to swim, to dive, to run, to shoot, or the like, or by making complex motions or body positions such as in yoga, pilates, judo, karate, dancing, or ballet. Further, the information may be transmitted by using a real or mock-up device for controlling a virtual device corresponding to the mock-up device, such as using a mock-up guitar for controlling a virtual guitar function in a computer program, using a real guitar for controlling a virtual guitar function in a computer program, using a real or a mock-up book for reading an e-book or moving pages or browsing through in a virtual document, using a real or mock-up pen for drawing in a computer program, or the like. Further, the transmission of the information may be coupled to a feedback to the user, such as a sound, a vibration, or a motion.

In the context of music and/or instruments, devices according to the present invention in combination with gesture recognition may be used for exercising purposes, control of instruments, recording of instruments, playing or recording of music via use of a mock-up instrument or by only pretending to have a instrument present such as playing air guitar, such as to avoid noise or make recordings, or, for conducting of a virtual orchestra, ensemble, band, big band, choir, or the like, for practicing, exercising, recording or entertainment purposes or the like.

Further, in the context of safety and surveillance, devices according to the present invention in combination with gesture recognition may be used to recognize motion profiles of persons, such as recognizing a person by the way of walking or moving the body, or to use hand signs or movements or signs or movements of body parts or the whole body as access or identification control such as a personal identification sign or a personal identification movement.

Further, in the context of smart home applications or internet of things, devices according to the present invention in combination with gesture recognition may be used for central or non-central control of household devices which may be part of an interconnecting network of home appliances and/or household devices, such as refrigerators, central heating, air condition, microwave ovens, ice cube makers, or water boilers, or entertainment devices, such as television sets, smart phones, game consoles, video recorders, DVD players, personal computers, laptops, tablets, or combinations thereof, or a combination of household devices and entertainment devices.

Further, in the context of virtual reality or of augmented reality, devices according to the present invention in combination with gesture recognition may be used to control movements or function of the virtual reality application or of the augmented reality application, such as playing or controlling a game using signs, gestures, body movements or body part movements or the like, moving through a virtual world, manipulating virtual objects, practicing, exercising or playing sports, arts, crafts, music or games using virtual objects such as a ball, chess figures, go stones, instruments, tools, brushes.

Further, in the context of medicine, devices according to the present invention in combination with gesture recognition may be used to support rehabilitation training, remote diagnostics, or to monitor or survey surgery or treatment, to overlay and display medical images with positions of medical devices, or to overlay display prerecorded medical images such as from magnetic resonance tomography or x-ray or the like with images from endoscopes or ultra sound or the like that are recorded during an surgery or treatment.

Further, in the context of manufacturing and process automation, devices according to the present invention in combination with gesture recognition may be used to control, teach, or program robots, drones, unmanned autonomous vehicles, service robots, movable objects, or the like, such as for programming, controlling, manufacturing, manipulating, repairing, or teaching purposes, or for remote manipulating of objects or areas, such as for safety reasons, or for maintenance purposes.

Further, in the context of business intelligence metrics, devices according to the present invention in combination with gesture recognition may be used for people counting, surveying customer movements, areas where customers spend time, objects, customers test, take, probe, or the like.

Further, devices according to the present invention may be used in the context of do-it-yourself or professional tools, especially electric or motor driven tools or power tools, such as drilling machines, saws, chisels, hammers, wrenches, staple guns, disc cutters, metals shears and nibblers, angle grinders, die grinders, drills, hammer drills, heat guns, wrenches, sanders, engravers, nailers, jig saws, biscuit joiners, wood routers, planers, polishers, tile cutters, washers, rollers, wall chasers, lathes, impact drivers, jointers, paint rollers, spray guns, morticers, or welders, in particular, to support precision in manufacturing, keeping a minimum or maximum distance, or for safety measures.

Further, the devices according to the present invention may be used to aid visually impaired persons. Further, devices according to the present invention may be used in touch screen such as to avoid direct context such as for hygienic reasons, which may be used in retail environments, in medical applications, in production environments, or the like. Further, devices according to the present invention may be used in agricultural production environments such as in stable cleaning robots, egg collecting machines, milking machines, harvesting machines, farm machinery, harvesters, forwarders, combine harvesters, tractors, cultivators, ploughs, destoners, harrows, strip tills, broadcast seeders, planters such as potato planters, manure spreaders, sprayers, sprinkler systems, swathers, balers, loaders, forklifts, mowers, or the like.

Further, devices according to the present invention may be used for selection and/or adaption of clothing, shoes, glasses, hats, prosthesis, dental braces, for persons or animals with limited communication skills or possibilities, such as children or impaired persons, or the like. Further, devices according to the present invention may be used in the context of warehouses, logistics, distribution, shipping, loading, unloading, smart manufacturing, industry 4.0, or the like. Further, in a manufacturing context, devices according to the present invention may be used in the context of processing, dispensing, bending, material handling, or the like.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as Camera-Link. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information. Further, devices according to the present invention may be used in 360° digital cameras or surround view cameras.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

A further embodiment of the present invention may be an incorporation of the detector or a part thereof such as the evaluation device and/or the data processing device in a device for use in automotive, for use in autonomous driving or for use in car safety systems such as Daimler's Intelligent Drive system, wherein, as an example, a device incorporating one or more of the optical sensors, optionally one or more optical systems, the evaluation device, optionally a communication device, optionally a data processing device, optionally one or more interfaces, optionally a system on a chip, optionally one or more display devices, or optionally further electronic devices may be part of a vehicle, a car, a truck, a train, a bicycle, an airplane, a ship, a motorcycle. In automotive applications, the integration of the device into the automotive design may necessitate the integration of the optical sensor, optionally optics, or device at minimal visibility from the exterior or interior. The detector or a part thereof such as the evaluation device and/or the data processing device may be especially suitable for such integration into automotive design.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally may refer to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams such as a linear combination of Gaussian light beams, which may be characterized by one or more Gaussian beam parameters, such as one or more of a beam waist, a Rayleigh-length or any other beam parameter or combination of beam parameters suited to characterize a development of a beam diameter and/or a beam propagation in space.

The detector according to the present invention may further be combined with one or more other types of sensors or detectors. Thus, the detector may further comprise at least one additional detector. The at least one additional detector may be adapted for detecting at least one parameter, such as at least one of: a parameter of a surrounding environment, such as a temperature and/or a brightness of a surrounding environment; a parameter regarding a position and/or orientation of the detector; a parameter specifying a state of the object to be detected, such as a position of the object, e.g. an absolute position of the object and/or an orientation of the object in space. Thus, generally, the principles of the present invention may be combined with other measurement principles in order to gain additional information and/or in order to verify measurement results or reduce measurement errors or noise.

As outlined above, the human-machine interface may comprise a plurality of beacon devices which are adapted to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be adapted in such a way that the detector device generates at least one item of information on the position of the user or of at least one body part of the user. Specifically in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit, a stick that may be held by hand, a bat, a club, a racket, a cane, a toy, such as a toy gun. Thus, as an example, the detector system may be part of the human-machine interface and/or of the entertainment device.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device. The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is adapted to track a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

The detector according to the present invention may be realized as a simple device combining the functionality of distance measurement or measurement of z-coordinates, with the additional option of measuring one or more transversal coordinates, thereby integrating the functionality of a PSD.

When mentioning a range of measurement, the range of measurement may both refer to a range of brightness which may be used with the detector according to the present invention, such as a range of total powers of the light beam, or may refer to a range of distances between the detector and the object which may be measured. Conventional detectors, such as according to one or more of the documents listed above, are typically limited in both ranges of measurement. The use of the quotient signal, as mentioned above, contrarily, provides a wide range of a continuously and monotonously decreasing or increasing functions which may be used to determine the longitudinal coordinate from the quotient signal. Consequently, a very wide range of measurement in terms of distance between the object and the detector is given. Similarly, due to the general independence of the quotient signal from the total power of the light beam, at least as long as no saturation of one or both of the optical sensors is reached, also provides a very wide range of measurement in terms of brightness, i.e. in terms of total power of the light beam.

The light beam, within the detector, generally may propagate along an optical axis of the detector. The first and second optical sensors may be placed on the optical axis. The light beam, however, may also propagate in other ways than along the optical axis. As an example, an illumination light beam may be generated which propagates along the optical axis or which propagates parallel to the optical axis or at an angle to the optical axis which is different from 0°, such as an angle of 1° to 20°. Other embodiments are feasible.

Overall, in the context of the present invention, the following embodiments are regarded as preferred:

Embodiment 1: A detector for determining a position of at least one object, the detector comprising:
at least one transfer device, wherein the transfer device has at least one focal length in response to at least one incident light beam propagating from the object to the detector;
at least two optical sensors, wherein each optical sensor has at least one light sensitive area, wherein each optical sensor is designed to generate at least one sensor signal in response to an illumination of its respective light-sensitive area by the light beam,
at least one evaluation device being configured for determining at least one longitudinal coordinate z of the object by evaluating a quotient signal Q from the sensor signals.

Embodiment 2: The detector according to the preceding embodiment, wherein the detector is adapted to determine the longitudinal coordinate z of the object in at least one measurement range independent from the object size in an object plane.

Embodiment 3: The detector according to any one of the preceding embodiments, wherein the measurement range is adjustable by adjusting on one or more parameters selected from the group consisting of: a longitudinal distance from the object to the transfer device $z_0$; the focal length of the transfer device f; a diameter of an exit pupil of the transfer device $E_x$; a longitudinal distance from the transfer device to the light sensitive area $z_s$, a distance from the transfer device to an image of the object $z_i$; an object size $O_{size}$ of the object in the object plane.

Embodiment 4: The detector according to the preceding embodiment, wherein the detector is adapted to determine the longitudinal coordinate z of the object independent from the object size if a circle of confusion of at least one light beam emitted from at least one point of the object is greater than an image size of the object.

Embodiment 5: The detector according to the preceding embodiment, wherein the detector is adapted to determine the longitudinal coordinate z of the object independent from the object size if $$O_{size} < \frac{z_0 E_x}{z_i^2}|z_s - z_i|$$

holds true for at least one distance.

Embodiment 6: The detector according to the preceding embodiment, wherein the evaluation device is configured for deriving the quotient signal Q by one or more of dividing the sensor signals, dividing multiples of the sensor signals, dividing linear combinations of the sensor signals.

Embodiment 7: The detector according to the preceding embodiment, wherein the evaluation device is configured for using at least one predetermined relationship between the quotient signal Q and the longitudinal coordinate for determining the longitudinal coordinate.

Embodiment 8: The detector according to any one of the preceding embodiments, wherein the evaluation device is configured for deriving the quotient signal Q by $$Q(z_O) = \frac{\int\int_{A_1} E(x, y; z_O)dxdy}{\int\int_{A_2} E(x, y; z_O)dxdy}$$

wherein x and y are transversal coordinates, A1 and A2 are areas of the beam profile at the sensor position, and $E(x,y,z_o)$ denotes the beam profile given at the object distance $z_o$.

Embodiment 9: The detector according to any one of the preceding embodiments, wherein the optical sensors are positioned off focus.

Embodiment 10: The detector according to any one of the preceding embodiments, wherein the transfer device has an optical axis, wherein the transfer device constitutes a coordinate system, wherein a longitudinal coordinate I is a coordinate along the optical axis and wherein d is a spatial offset from the optical axis, wherein the optical sensors are arranged such that the light-sensitive areas of the optical sensors differ in at least one of: their longitudinal coordinate, their spatial offset, or their surface areas.

Embodiment 11: The detector according to any one of the preceding embodiments, wherein the light beam may be a monochromatic light beam.

Embodiment 12: The detector according to any one of the preceding embodiments, wherein each of the sensor signals comprises at least one information of at least one area of the beam profile of at least one beam profile of the light beam.

Embodiment 13: The detector according to the preceding embodiment, wherein the beam profile is selected from the group consisting of a trapezoid beam profile; a triangle beam profile; a conical beam profile and a linear combination of Gaussian beam profiles.

Embodiment 14: The detector according to any one of the two preceding embodiments, wherein the light-sensitive regions are arranged such that a first sensor signal comprises information of a first area of the beam profiles and a second sensor signal comprises information of a second area of the beam profile, wherein the first area of the beam profile and the second area of the beam profile are one or both of adjacent or overlapping regions.

Embodiment 15: The detector according to the preceding embodiment, wherein the evaluation device is configured to determine the first area of the beam profile and the second area of the beam profile.

Embodiment 16: The detector according to any one of the four preceding embodiments, wherein the first area of the beam profile comprises essentially edge information of the beam profile and the second area of the beam profile comprises essentially center information of the beam profile.

Embodiment 17: The detector according to any one of the preceding embodiments, wherein the edge information comprises an information relating to a number of photons in the first area of the beam profile and the center information comprises an information relating to a number of photons in the second area of the beam profile.

Embodiment 18: The detector according to any one of the two the preceding embodiments, wherein the evaluation device is configured to derive the quotient signal Q by one or more of dividing the edge information and the center information, dividing multiples of the edge information and the center information, dividing linear combinations of the edge information and the center information.

Embodiment 19: The detector according to any one of the three preceding embodiments, wherein the light beam propagating from the object to the detector illuminates the optical sensors with at least one line pattern, wherein A1 corresponds to an area with a full line width of the line pattern on the optical sensors, wherein A2 is a central area of the line pattern on the optical sensors.

Embodiment 20: The detector according to any one of the four preceding embodiments, wherein the light beam propagating from the object to the detector illuminates the optical sensor with at least one point pattern, wherein A1 corresponds to an area with a full radius of a point of the point pattern on the optical sensors, wherein A2 is a central area of the point in the point pattern on the optical sensors.

Embodiment 21: The detector according to any one of the preceding embodiments, wherein the optical sensors comprise a first optical sensor having a first light sensitive area and a second optical sensor having a second light sensitive area, wherein the first and the second light sensitive areas are arranged such that a condition $$\frac{a}{c} \neq \frac{b}{d}$$

is satisfied, wherein "a" is a ratio of photons hitting both an inner region of a plane perpendicular to the optical axis intersecting the optical axis at a distance equal to half of a focal length of the transfer device and the first light sensitive area, "b" is a ratio of photons hitting both the inner region of the plane and the second light sensitive area, "c" is a ratio of photons hitting both an outer region of the plane and the first light-sensitive area, "d" is a ratio of the photons hitting both the outer region of the plane and the second light sensitive area.

Embodiment 22: The detector according to the preceding embodiment, wherein the first light sensitive area and the second light sensitive area are arranged such that the inner region has an area with a geometrical center point on the optical axis and an extension such that half of the photons hit the plane within the inner region and the other half hit the plane outside the inner region.

Embodiment 23: The detector according to the preceding embodiment, wherein the first light sensitive area and the second light sensitive area are arranged such that the inner region is designed as a circle with a center point on the optical axis and a radius r which is chosen such that half of the photons hit the plane within the circle and the other half hit the plane outside the circle.

Embodiment 24: A detector for determining a position of at least one object, the detector having
- at least one first optical sensor having a first light-sensitive area, wherein the first optical sensor is configured to generate at least one first sensor signal in response to an illumination of the first light-sensitive area by a light beam propagating from the object to the detector;
- at least one second optical sensor having a second light-sensitive area, wherein the second optical sensor is configured to generate at least one second sensor signal in response to an illumination of the second light-sensitive area by the light beam, wherein the first light-sensitive area is smaller than the second light-sensitive area; and
- at least one evaluation device being configured for determining at least one longitudinal coordinate z of the object by evaluating the first and second sensor signals.

Embodiment 25: The detector according to the preceding embodiment, wherein the evaluation device is configured for deriving a quotient signal Q by dividing the first and second sensor signals, by dividing multiples of the first and second sensor signals or by dividing linear combinations of the first and second sensor signals, wherein the evaluation device is configured for determining the longitudinal coordinate by evaluating the quotient signal Q.

Embodiment 26: The detector according to the preceding embodiment, wherein the evaluation device is configured for using at least one predetermined relationship between the quotient signal Q and the longitudinal coordinate.

Embodiment 27: The detector according to the preceding embodiment, wherein the predetermined relationship is one or more of an empiric relationship, a semi-empiric relationship and an analytically derived relationship.

Embodiment 28: The detector according to any one of the two preceding embodiments, wherein the evaluation device comprises at least one data storage device for storing the predetermined relationship.

Embodiment 29: The detector according to any one of the four preceding embodiments, wherein the evaluation device comprises at least one divider, wherein the divider is configured for deriving the quotient signal.

Embodiment 30: The detector according to the preceding embodiment, wherein the divider is fully or partially embodied as one or both of a software divider or a hardware divider.

Embodiment 31: The detector according to any one of the seven preceding embodiments, wherein the first and second optical sensors are arranged linearly in one and the same beam path of the detector.

Embodiment 32: The detector according to the preceding embodiment, wherein the first and second optical sensors are arranged concentrically with respect to an optical axis of the detector.

Embodiment 33: The detector according to any one of the eight preceding embodiments, wherein the first optical sensor is arranged in front of the second optical sensor and is spaced apart from the second optical sensor by no more than five times the square root of a surface area of the first light-sensitive area.

Embodiment 34: The detector according to any one of the nine preceding embodiments, wherein the first optical sensor is arranged in front of the second optical sensor and is spaced apart from the second optical sensor by no more than 50 mm, preferably by no more than 15 mm.

Embodiment 35: The detector according to any one of the ten preceding embodiments, wherein the second light-sensitive area is larger by at least a factor of two, more preferably by at least a factor of three and most preferably by at least a factor of five as compared to the first light-sensitive area.

Embodiment 36: The detector according to any one of the eleven preceding embodiments, wherein the first light-sensitive area has a surface area of 1 $mm^2$ to 150 $mm^2$, more preferably a surface area of 10 $mm^2$ to 100 $mm^2$.

Embodiment 37: The detector according to any one of the twelve preceding embodiments, specifically according to the preceding embodiment, wherein the second light-sensitive area has a surface area of 160 $mm^2$ to 1000 $mm^2$, more preferably a surface area of 200 $mm^2$ to 600 $mm^2$.

Embodiment 38: The detector according to any one of the thirteen preceding embodiments, wherein the first and second optical sensor each have, at least within a range of measurement, a linear signal characteristic such that the respective first and second sensor signals are dependent on the total power of illumination of the respective optical sensor and are independent from a diameter of a light spot of the illumination.

Embodiment 39: The detector according to any one of the fourteen preceding embodiments, wherein the first and second optical sensors each are semiconductor sensors, preferably inorganic semiconductor sensors, more preferably photodiodes and most preferably silicon photodiodes.

Embodiment 40: The detector according to any one of the fifteen preceding embodiments, wherein the first and second optical sensors each are uniform sensors having a single light-sensitive area each.

Embodiment 41: The detector according to any one of the sixteen preceding embodiments, wherein the detector further comprises an illumination source for illuminating the object.

Embodiment 42: The detector according to the preceding embodiment, wherein the illumination source is configured for generating an illuminating light beam for illuminating the object, wherein the detector is configured such that the illuminating light beam propagates from the detector towards the object along an optical axis of the detector.

Embodiment 43: The detector according to the preceding embodiment, wherein the detector comprises at least one reflective element, preferably at least one prism, for deflecting the illuminating light beam onto the optical axis.

Embodiment 44: The detector according to any one of the three preceding embodiments, wherein the illumination source is adapted to generate at least one illumination pattern for illumination of the object, wherein the illumination pattern comprises at least one pattern selected from the group consisting of: at least one point pattern, in particular a pseudorandom point pattern or a random point pattern; at least one Sobol pattern; at least one quasiperiodic pattern; at least one pattern comprising at least one pre-known feature; at least one regular pattern; at least one triangular pattern; at least one hexagonal pattern, in particular a rotated hexagonal pattern and/or a displaced hexagonal pattern; at least one rectangular pattern at least one pattern comprising convex uniform tilings; at least one fringe pattern; at least one line pattern comprising at least one line; at least one line pattern comprising at least two lines such as parallel or crossing lines.

Embodiment 45: The detector according to the preceding embodiment, wherein the optical sensors are adapted to determine at least one reflection pattern, wherein the evaluation device is adapted to select at least one feature of the reflection pattern and to determine the longitudinal coordinate z of the selected feature of the reflection pattern by evaluating the quotient signal Q.

Embodiment 46: The detector according to any one of the twenty-one preceding embodiments, wherein the detector further comprises at least one transfer device, the transfer device being adapted to guide the light beam onto the optical sensors.

Embodiment 47: The detector according to the preceding embodiment, wherein the transfer device comprises one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system.

Embodiment 48: The detector according to any one of the twenty-three preceding embodiments, wherein the first light-sensitive area, in a direction of propagation of the light beam, overlaps with the second light-sensitive area.

Embodiment 49: A detector for determining a position of at least one object, the detector having at least one sensor element having a matrix of optical sensors, the optical sensors each having a light-sensitive area, wherein each optical sensor is configured to generate at least one sensor signal in response to an illumination of the light-sensitive area by at least one light beam propagating from the object to the detector;

at least one evaluation device configured for evaluating the sensor signals, by a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal.

Embodiment 50: The detector according to the preceding embodiment, wherein the center signal is selected from the group consisting of: the highest sensor signal; an average of a group of sensor signals being within a predetermined range of tolerance from the highest sensor signal; an average of sensor signals from a group of optical sensors containing the optical sensor ha-ving the highest sensor signal and a predetermined group of neighboring optical sensors; a sum of sensor signals from a group of optical sensors containing the optical sensor having the high-est sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Embodiment 51: The detector according to any one of the two preceding embodiments, wherein the detector, specifically the evaluation device, is configured for transforming the sensor signals of the optical sensor, thereby generating secondary optical sensor signals, wherein the evaluation device is configured for performing steps a)-d) by using the secondary optical sensor signals.

Embodiment 52: The detector according to the preceding embodiment, wherein the transforming of the sensor signals comprises at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue, saturation, and brightness channels, a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image.

Embodiment 53: The detector according to any one of the four preceding embodiments, wherein the evaluation device comprises at least one center detector for detecting the at least one highest sensor signal and/or for forming the center signal.

Embodiment 54: The detector according to the preceding embodiment, wherein the center detector is fully or partially integrated into the sensor element.

Embodiment 55: The detector according to any one of the two preceding embodiments, wherein the center detector is fully or partially embodied in one or both of software or hardware.

Embodiment 56: The detector according to any one of the seven preceding embodiments, wherein the sum signal is selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal.

Embodiment 57: The detector according to the preceding embodiment, wherein the evaluation device comprises at least one summing device for forming the sum signal.

Embodiment 58: The detector according to the preceding embodiment, wherein the summing device is fully or partially integrated into the sensor element.

Embodiment 59: The detector according to any one of the two preceding embodiments, wherein the summing device is fully or partially embodied in one or both of software or hardware.

Embodiment 60: The detector according to any one of the eleven preceding embodiments, wherein the combined signal is a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of a first linear combination of the center signal and the sum signal and a second linear combination of the center signal and the sum signal.

Embodiment 61: The detector according to the preceding embodiment, wherein the evaluation device is configured for using at least one predetermined relationship between the quotient sig-nal Q and the longitudinal coordinate for determining the longitudinal coordinate.

Embodiment 62: The detector according to the preceding embodiment, wherein the predeter-mined relationship is one or more of an empiric relationship, a semi-empiric relationship and an analytically derived relationship.

Embodiment 63: The detector according to any one of the two preceding embodiments, wherein the evaluation device comprises at least one data storage device for storing the predetermined relationship.

Embodiment 64: The detector according to any one of the four preceding embodiments, wherein the evaluation device comprises at least one divider, wherein the divider is configured for de-riving the quotient signal.

Embodiment 65: The detector according to the preceding embodiment, wherein the divider is fully or partially embodied as one or both of a software divider or a hardware divider.

Embodiment 66: The detector according to any one of the two preceding embodiments, wherein the divider is fully or partially integrated into the sensor element.

Embodiment 67: The detector according to any one of the eighteen preceding embodiments, wherein the optical sensors are photodetectors, preferably inorganic photodetectors, more preferably inorganic semiconductor photodetectors, most preferably silicon photodetectors.

Embodiment 68: The detector according to any one of the nineteen preceding embodiments, wherein the optical sensors are sensitive in the infrared spectral range.

Embodiment 69: The detector according to any one of the twenty preceding embodiments, wherein the matrix comprises one or both of a CCD detector, preferably a CCD detector chip, or a CMOS detector, preferably a CMOS detector chip.

Embodiment 70: The detector according to any one of the twenty-one preceding embodiments, wherein the matrix is a rectangular matrix having at least one row, preferably a plurality of rows, and a plurality of columns.

Embodiment 71: The detector according to the preceding embodiment, wherein the rows and columns are oriented essentially perpendicular.

Embodiment 72: The detector according to any one of the two preceding embodiments, wherein the matrix has at least 10 rows, preferably at least 50 rows, more preferably at least 100 rows.

Embodiment 73: The detector according to any one of the three preceding embodiments, wherein the matrix has at least 10 columns, preferably at least 50 columns, more preferably at least 100 columns.

Embodiment 74: The detector according to any one of the four preceding embodiments, wherein the ratio of the number of rows and the number of columns is close to 1 preferable larger than 1:3, more preferably larger than 1:2.

Embodiment 75: The detector according to any one of the twenty-six preceding embodiments, wherein the matrix comprises at least 50 optical sensors, preferably at least 100 optical sensors, more preferably at least 500 optical sensors.

Embodiment 76: The detector according to any one of the twenty-seven preceding embodiments, wherein the sensor element is oriented essentially perpendicular to an optical axis of the detector.

Embodiment 77: The detector according to any one of the twenty-eight preceding embodiments, wherein the optical sensors each have, at least within a range of measurement, a linear signal characteristic such that the respective sensor signals are dependent on the total power of illumination of the respective optical sensor.

Embodiment 78: The detector according to any one of the twenty-nine preceding embodiments, wherein the detector further comprises an illumination source for illuminating the object.

Embodiment 79: The detector according to the preceding embodiment, wherein the illumination source is configured for generating an illuminating light beam for illuminating the object, wherein the detector is configured such that the illuminating light beam propagates from the detector towards the object along an optical axis of the detector.

Embodiment 80: The detector according to the preceding embodiment, wherein the detector comprises at least one reflective element, preferably at least one prism, for deflecting the illuminating light beam onto the optical axis.

Embodiment 81: The detector according to any one of the three preceding embodiments, wherein the illumination source is adapted to generate at least one illumination pattern for illumination of the object, wherein the illumination pattern comprises at least one pattern selected from the group consisting of: at least one point pattern, in particular a pseudorandom point pattern or a random point pattern; at least one Sobol pattern; at least one quasiperiodic pattern; at least one pattern comprising at least one pre-known feature; at least one regular pattern; at least one triangular pattern; at least one hexagonal pattern, in particular a rotated hexagonal pattern and/or a displaced hexagonal pattern; at least one rectangular pattern at least one pattern comprising convex uniform tilings; at least one fringe pattern; at least one line pattern comprising at least one line; at least one line pattern comprising at least two lines such as parallel or crossing lines.

Embodiment 82: The detector according to the preceding embodiment, wherein the optical sensors are adapted to determine at least one reflection pattern, wherein the evaluation device is adapted to select at least one feature of the reflection pattern and to determine the longitudinal coordinate z of the selected feature of the reflection pattern by evaluating the quotient signal Q.

Embodiment 83: The detector according to any one of the thirty-four preceding embodiments, wherein the detector further comprises at least one transfer device, the transfer device being adapted to guide the light beam onto the optical sensors.

Embodiment 84: The detector according to the preceding embodiment, wherein the transfer device comprises one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system.

Embodiment 85: The detector according to any one of the thirty-six preceding embodiments, wherein the evaluation device is further configured for determining at least one transversal coordinate of the object by evaluating a transversal position of the at least one optical sensor having the highest sensor signal.

Embodiment 86: The detector according to any one of the thirty-eight preceding embodiments, wherein the evaluation device is configured for distinguishing different light beams having different modulations.

Embodiment 87: A detector for determining a position of at least one object, the detector having
 at least two optical sensors, each optical sensor having a light-sensitive area, wherein each light-sensitive area has a geometrical center, wherein the geometrical centers of the optical sensors are spaced apart from an optical axis of the detector by different spatial offsets, wherein each optical sensor is configured to generate a sensor signal in response to an illumination of its respective light-sensitive area by a light beam propagating from the object to the detector; and at least one evaluation device being configured for determining at least one longitudinal coordinate z of the object by combining the at least two sensor signals.

Embodiment 88: The detector according to the preceding embodiment, wherein the optical sensors are located in the same plane.

Embodiment 89: The detector according to any one of the two preceding embodiments, wherein the optical sensors are partial diodes of a segmented diode, with a center of the segmented diode being off-centered from the optical axis of the detector.

Embodiment 90: The detector according to any one of the three preceding embodiments, wherein the optical sensors are part of a sensor array, such as an array comprising 2-4 optical sensors such as a quadrant photodiode.

Embodiment 91: The detector according to the preceding embodiment, wherein a geometrical center of the sensor array is offset from the optical axis.

Embodiment 92: The detector according to any one of the two preceding embodiments, wherein the sensor array is movable, preferably automatically, relative to the optical axis.

Embodiment 93: The detector according to the preceding embodiment, wherein the evaluation device is configured for, firstly, determining the at least one transversal position of a light spot generated by the light beam on the sensor array by using the sensor signals and for, secondly, moving the sensor array relative to the optical axis until the light spot is off-centered.

Embodiment 94: The detector according to any one of the seven preceding embodiments, wherein the optical sensors are partial diodes of a quadrant diode, with a geometrical center of the quadrant diode being off-centered from the optical axis of the detector.

Embodiment 95: The detector according to any one of the eight preceding embodiments, wherein the light-sensitive areas of the optical sensors are equal.

Embodiment 96: The detector according to any one of the nine preceding embodiments, wherein the detector comprises at least one lens, wherein the optical axis of the detector is an axis of symmetry of the lens.

Embodiment 97: The detector according to any one of the ten preceding embodiments, wherein the evaluation device is configured for deriving a quotient signal Q by one or more of dividing the sensor signals, dividing multiples of the sensor signals or dividing linear combinations of the sensor signals, and wherein the evaluation device is further configured for determining the longitudinal coordinate by evaluating the quotient signal Q.

Embodiment 98: The detector according to the preceding embodiment, wherein the evaluation device is configured for using at least one predetermined relationship between the quotient signal Q and the longitudinal coordinate.

Embodiment 99: The detector according to the preceding embodiment, wherein the predetermined relationship is one or more of an empiric relationship, a semi-empiric relationship and an analytically derived relationship.

Embodiment 100: The detector according to any one of the two preceding embodiments, wherein the evaluation device comprises at least one data storage device for storing the predetermined relationship.

Embodiment 101: The detector according to any one of the four preceding embodiments, wherein the evaluation device comprises at least one divider, wherein the divider is configured for deriving the quotient signal.

Embodiment 102: The detector according to the preceding embodiment, wherein the divider is fully or partially embodied as one or both of a software divider or a hardware divider.

Embodiment 103: The detector according to any one of the sixteen preceding embodiments, wherein the optical sensors are arranged in one and the same beam path of the detector.

Embodiment 104: The detector according to any one of the seventeen preceding embodiments, wherein the optical sensors each are semiconductor sensors, preferably inorganic semiconductor sensors, more preferably photodiodes and most preferably silicon photodiodes.

Embodiment 105: The detector according to any one of the eighteen preceding embodiments, wherein the optical sensors each are uniform sensors having a single light-sensitive area each.

Embodiment 106: The detector according to any one of the nineteen preceding embodiments, wherein the optical sensors each have, at least within a range of measurement, a linear signal characteristic such that the sensor signals are dependent on the total power of illumination of the respective optical sensor and are independent from a diameter of a light spot of the illumination.

Embodiment 107: The detector according to any one of the twenty preceding embodiments, wherein the detector further comprises an illumination source for illuminating the object, e.g., an illumination source comprising at least one laser, such as an illumination source providing at least one illuminating light beam being on the optical axis or being not on the optical axis.

Embodiment 108: The detector according to the preceding embodiment, wherein the illumination source is configured for generating an illuminating light beam for illuminating the object, wherein the detector is configured such that the illuminating light beam propagates from the detector towards the object along an optical axis of the detector.

Embodiment 109: The detector according to the preceding embodiment, wherein the detector comprises at least one reflective element, preferably at least one prism, for deflecting the illuminating light beam onto the optical axis.

Embodiment 110: The detector according to any one of the three preceding embodiments, wherein the illumination source is adapted to generate at least one illumination pattern for illumination of the object, wherein the illumination pattern comprises at least one pattern selected from the group consisting of: at least one point pattern, in particular a pseudorandom point pattern or a random point pattern; at least one Sobol pattern; at least one quasiperiodic pattern; at least one pattern comprising at least one pre-known feature; at least one regular pattern; at least one triangular pattern; at least one hexagonal pattern, in particular a rotated hexagonal pattern and/or a displaced hexagonal pattern; at least one rectangular pattern at least one pattern comprising convex uniform tilings; at least one fringe pattern; at least one line pattern comprising at least one line; at least one line pattern comprising at least two lines such as parallel or crossing lines.

Embodiment 111: The detector according to the preceding embodiment, wherein the optical sensors are adapted to determine at least one reflection pattern, wherein the evaluation device is adapted to select at least one feature of the reflection pattern and to determine the longitudinal coordinate z of the selected feature of the reflection pattern by evaluating the quotient signal Q.

Embodiment 112: The detector according to any one of the twenty-five preceding embodiments, wherein the detector further comprises at least one transfer device, the transfer device being adapted to guide the light beam onto the optical sensors.

Embodiment 113: The detector according to the preceding embodiment, wherein the transfer device comprises one or more of: at least one lens, for example, at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one diffractive optical element; at least one Fresnel lens; at least one beam splitting element, preferably at least one of a beam splitting cube or a beam splitting mirror; at least one multi-lens system.

Embodiment 114: A detector for determining a position of at least one object, the detector having
- at least one first optical sensor having a first light-sensitive area, wherein the first optical sensor is configured to generate at least one first sensor signal in response to an illumination of the first light-sensitive area by a light beam propagating from the object to the detector;
- at least one second optical sensor having:
  - at least one fluorescent waveguiding sheet forming a second light-sensitive area, wherein the fluorescent waveguiding sheet is oriented towards the object such that at least one light beam propagating from the object towards the detector generates at least one light spot in the second light-sensitive area, wherein the fluorescent waveguiding sheet contains at least one fluorescent material, wherein the fluorescent material is adapted to generate fluorescence light in response to the illumination by the light beam; and
  - at least one photosensitive element located at at least one edge of the fluorescent waveguiding sheet, capable of detecting fluorescence light guided from the light spot towards the photosensitive element by the fluorescent waveguiding sheet and capable of generating at least one second sensor signal in response to the illumination of the second light-sensitive area by the light beam, wherein the first light-sensitive area is smaller than the second light-sensitive area; and
- at least one evaluation device being configured for determining at least one longitudinal coordinate z of the object by evaluating the first and second sensor signals.

Embodiment 115: The detector according to the preceding embodiment, wherein the at least one photosensitive element is located at at least one of: a corner of the fluorescent waveguiding sheet; a straight edge, e.g. a straight rim portion, of the fluorescent waveguiding sheet.

Embodiment 116: The detector according to any one of the two preceding embodiments, wherein the at least one photosensitive element is optically coupled to the fluorescent waveguiding sheet by at least one optical coupling element configured for at least partially coupling the fluorescence light guided by the fluorescent waveguiding sheet out of the fluorescent waveguiding sheet.

Embodiment 117: The detector according to the preceding embodiment, wherein the optical coupling element is configured for at least partially coupling the fluorescence light coupled out of the fluorescent waveguiding sheet into the photosensitive element.

Embodiment 118: The detector according to any one of the two preceding embodiments, wherein the optical coupling element is selected from the group consisting of: a portion of transparent adhesive attaching the photosensitive element to the fluorescent waveguiding sheet; an etched portion within the fluorescent waveguiding sheet; a scratch in the fluorescent waveguiding sheet; a prism.

Embodiment 119: The detector according to any one of the five preceding embodiments, wherein the at least one first optical sensor and the at least one photosensitive element of the at least one second optical sensor have essentially identical electrical capacitance.

Embodiment 120: The detector according to any one of the six preceding embodiments, wherein the evaluation device is configured for deriving a quotient signal Q by dividing the first and second sensor signals, by dividing multiples of the first and second sensor signals or by dividing linear combinations of the first and second sensor signals, wherein the evaluation device is configured for determining the longitudinal coordinate by evaluating the quotient signal Q.

Embodiment 121: The detector according to the preceding embodiment, wherein the evaluation device is configured for using at least one predetermined relationship between the quotient signal Q and the longitudinal coordinate.

Embodiment 122: The detector according to the preceding embodiment, wherein the predetermined relationship is one or more of an empiric relationship, a semi-empiric relationship and an analytically derived relationship.

Embodiment 123: The detector according to any one of the two preceding embodiments, wherein the evaluation device comprises at least one data storage device for storing the predetermined relationship.

Embodiment 124: The detector according to any one of the four preceding embodiments, wherein the evaluation device comprises at least one divider, wherein the divider is configured for deriving the quotient signal.

Embodiment 125: The detector according to the preceding embodiment, wherein the divider is fully or partially embodied as one or both of a software divider or a hardware divider.

Embodiment 126: The detector according to any one of the twelve preceding embodiments, wherein the first optical sensor is located in front of the second optical sensor, preferably such that the light beam, in the given order, illuminates the first optical sensor and, afterwards, the second optical sensor.

Embodiment 127: The detector according to any one of the thirteen preceding embodiments, wherein the second optical sensor comprises at least two, preferably at least three and most preferably at least four photosensitive elements located at at least two edges of the fluorescent waveguiding sheet, capable of detecting fluorescence light guided from the light spot towards the photosensitive elements by the fluorescent waveguiding sheet and capable of generating at least one sensor signal each.

Embodiment 128: The detector according to the preceding embodiment, wherein the at least two photosensitive elements are located at one or more of: at least two straight edges, e.g. straight rim portions, of the fluorescent waveguiding sheet, at least two corners of the fluorescent waveguiding sheet, at least one corner of the fluorescent waveguiding sheet and at least one straight edge of the fluorescent waveguiding sheet.

Embodiment 129: The detector according to the preceding embodiment, wherein the evaluation device comprises at least one summing device configured for summing up the sensor signals of the at least two photosensitive elements, thereby forming a sum signal S.

Embodiment 130: The detector according to the preceding embodiment, wherein the sum signal is derived by using the formula $S=\Sigma_i c_i s_i$, with $s_i$ being the sensor signals, with i=1 . . . N with N being a positive integer indicating the number of the photosensitive elements or a smaller positive integer, and with $c_i$ being respective calibration coefficients.

Embodiment 131: The detector according to any one of the two preceding embodiments, wherein the evaluation device is configured to determine the at least one longitudinal coordinate z of the object by using at least one predetermined relationship between the first sensor signal, the sum signal S of the second sensor signals and the longitudinal coordinate z.

Embodiment 132: The detector according to any one of the four preceding embodiments, wherein the evaluation device is further configured to determine at least one transversal coordinate x, y of the object by evaluating the sensor signals of the photosensitive elements.

Embodiment 133: The detector according to the preceding embodiment, wherein the evaluation device comprises at least one subtracting device configured to form at least one difference signal D between second sensor signals generated by at least two of the photosensitive elements.

Embodiment 134: The detector according to the preceding embodiment, wherein the second sensor signals comprise at least one second sensor signal $s_{21}$ and at least one second sensor signal $s_{22}$, wherein the at least one difference signal D is proportional to $a \cdot s_{21} - b \cdot s_{22}$, with a, b being real number coefficients, preferably with a=1 and b=1.

Embodiment 135: The detector according to the preceding embodiment, wherein the at least one difference signal D is derived according to the formula $D=(a \cdot s_{21} - b \cdot s_{22})/(a \cdot s_{21} + b \cdot s_{22})$.

Embodiment 136: The detector according to any one of the three preceding embodiments, wherein the subtracting device is configured to form at least one first difference signal $D_x$ from which at least one first transversal coordinate x of the object is derived, wherein the subtracting device is further configured to form at least one second difference signal $D_y$ from which at least one second transversal coordinate y of the object is derived.

Embodiment 137: The detector according to the preceding embodiment, wherein the first difference signal $D_x$ is generated from at least two second sensor signals $s_{x1}$, $s_{x2}$ of at least two photosensitive elements located at opposing edges, e.g. opposing rim portions and/or corners, of the waveguiding sheet in a first dimension, and wherein the second difference signal $D_y$ is generated from at least two second sensor signals $s_{y1}$, $s_{y2}$ of at least two photosensitive elements located at opposing edges, e.g. opposing rim portions and/or corners, of the waveguiding sheet in a second dimension.

Embodiment 138: The detector according to the preceding embodiment, wherein the at least one first difference signal $D_x$ is derived according to the formula $D_x=(a \cdot s_{x1} - b \cdot s_{x2})/(a \cdot s_{x1} + b \cdot s_{x2})$, and wherein the at least one second difference signal $D_y$ is derived according to the formula $D_y=(c \cdot s_{y1} - d \cdot s_{y2})/(c \cdot s_{y1} + d \cdot s_{y2})$, with a, b, c, d being real number coefficients, preferably with a=1, b=1, c=1 and d=1.

Embodiment 139: The detector according to any one of the 11 preceding embodiments, wherein the photosensitive elements comprise at least two photosensitive elements located at opposing edges, e.g. opposing rim portions and/or corners, of the fluorescent waveguiding sheet.

Embodiment 140: The detector according to any one of the 12 preceding embodiments, wherein the photosensitive elements comprise at least one first pair of photosensitive elements located at opposing edges, e.g. opposing rim portions and/or corners, of the fluorescent waveguiding sheet in a first dimension of a coordinate system, wherein the photosensitive elements further comprise at least one second pair of photosensitive elements located at opposing edges, e.g. opposing rim portions and/or corners, of the fluorescent waveguiding sheet in a second dimension of the coordinate system.

Embodiment 141: The detector according to any one of the 27 preceding embodiments, wherein the second sensitive area is a homogeneous sensitive area.

Embodiment 142: The detector according to any one of the 28 preceding embodiments, wherein the second sensitive area has a surface area of at least 5 mm², preferably of at least 10 mm², more preferably of at least 100 mm², more preferably of at least 400 mm².

Embodiment 143: The detector according to any one of the 29 preceding embodiments, wherein the fluorescent waveguiding sheet comprises at least one planar sheet.

Embodiment 144: The detector according to any one of the 30 preceding embodiments, wherein the fluorescent waveguiding sheet has a thickness of 10 μm to 3 mm, preferably a thickness of 100 μm to 1 mm, such as a thickness of 50 μm to 2 mm.

Embodiment 145: The detector according to any one of the 31 preceding embodiments, wherein the fluorescent waveguiding sheet is flexible or deformable.

Embodiment 146: The detector according to any one of the 32 preceding embodiments, wherein the fluorescent waveguiding sheet comprises at least one matrix material, wherein the at least one fluorescent material is one or more of mixed into the matrix material, dispersed into the matrix material, chemically bound to the matrix material or dissolved in the matrix material.

Embodiment 147: The detector according to the preceding embodiment, wherein the matrix material comprises at least one plastic material.

Embodiment 148: The detector according to the preceding embodiment, wherein the plastic material comprises at least one polymer material.

Embodiment 149: The detector according to any one of the two preceding embodiments, wherein the plastic material comprises at least one material selected from the group consisting of: a polycarbonate, a poly(methyl methacrylate), a polystyrene, a polyurethane, a polypropylene, a polyethylene terephthalate, a polyvinylchloride.

Embodiment 150: The detector according to any one of the 36 preceding embodiments, wherein the fluorescent material comprises at least one fluorescent dye.

Embodiment 151: The detector according to the preceding embodiment, wherein the fluorescent dye comprises at least one organic fluorescent dye.

Embodiment 152: The detector according to any one of the two preceding embodiments, wherein the fluorescent dye is selected from the group consisting of: a xanthene derivative, preferably one or more of fluorescein, rhodamine, oregon green, eosin, texas red, or a derivative of any component thereof; a cyanine derivative, preferably one or more of cyanine, indocarbocyanine, oxacarbocyanine, thiacarbocyanine, merocyanine, or a derivative of any component thereof; a squaraine derivative or a ring-substituted squaraine, preferably one or more of Seta, SeTau, and Square dyes, or a derivative of any component thereof; a naphthalene derivative, preferably one or more of a dansyl or a prodan derivative thereof; a coumarin derivative; a oxadiazole derivative, preferably one or more of pyridyloxazole, nitrobenzoxadiazole, benzoxadiazole, or a derivative of any component thereof; an anthracene derivative, preferably one or more of an anthraquinone, DRAQ5, DRAQ7, CyTRAK orange, or a derivative of any component thereof; a pyrene derivative, preferably cascade blue; an oxazine derivative, preferably one or more of nile red, nile blue, cresyl violet, oxazine 170, or a derivative of any component thereof; an acridine derivative, preferably one or more of proflavin, acridine orange, acridine yellow, or a derivative of any component thereof; an arylmethine derivative, preferably one or more of auramine, crystal violet, malachite green, or a derivative of any component thereof; a tetrapyrrole derivative, preferably one or more of porphin, phthalocyanine, bilirubin; a rylene dye or any derivative thereof, such as a perylene dye; a naphthalene imid or perylene imide; a naphthoilene benzimidazole dye such as published in WO 2012/168395 A1; or a derivative of any component thereof.

Embodiment 153: The detector according to any one of the 39 preceding embodiments, wherein the at least one photosensitive element comprises at least one elongated photosensitive element extending along at least one segment of an edge of the fluorescent waveguiding sheet.

Embodiment 154: The detector according to any one of the 40 preceding embodiments, wherein the fluorescent waveguiding sheet is a rectangular fluorescent waveguiding sheet, preferably a square fluorescent waveguiding sheet, wherein photosensitive elements are located at each of the four edges, e.g. each of the four rim portions and/or corners, of the fluorescent waveguiding sheet.

Embodiment 155: The detector according to any one of the 41 preceding embodiments, wherein the detector further comprises at least one optical filter element, preferably at least one optical short-pass filter.

Embodiment 156: The detector according to any one of the 42 preceding embodiments, wherein the first and second optical sensors are arranged linearly in one and the same beam path of the detector.

Embodiment 157: The detector according to the preceding embodiment, wherein the first and second optical sensors are arranged concentrically with respect to an optical axis of the detector.

Embodiment 158: The detector according to any one of the 44 preceding embodiments, wherein the first optical sensor is arranged in front of the second optical sensor and is spaced apart from the second optical sensor by no more than five times the square root of a surface area of the first light-sensitive area.

Embodiment 159: The detector according to any one of the 45 preceding embodiments, wherein the first optical sensor is arranged in front of the second optical sensor and is spaced apart from the second optical sensor by no more than 50 mm, preferably by no more than 15 mm.

Embodiment 160: The detector according to any one of the 46 preceding embodiments, wherein the second light-sensitive area is larger by at least a factor of two, more preferably by at least a factor of three and most preferably by at least a factor of five as compared to the first light-sensitive area.

Embodiment 161: The detector according to any one of the 47 preceding embodiments, wherein the first light-sensitive area has a surface area of 1 mm² to 150 mm², more preferably a surface area of 10 mm² to 100 mm².

Embodiment 162: The detector according to any one of the 48 preceding embodiments, specifically according to the preceding embodiment, wherein the second light-sensitive area has a surface area of 160 mm² to 1000 mm², more preferably a surface area of 200 mm² to 600 mm².

Embodiment 163: The detector according to any one of the 49 preceding embodiments, wherein the first and second optical sensor each have, at least within a range of measurement, a linear signal characteristic such that the respective first and second sensor signals are dependent on the total power of illumination of the respective optical sensor and are independent from a diameter of a light spot of the illumination.

Embodiment 164: The detector according to any one of the 50 preceding embodiments, wherein the first optical sensor is a semiconductor sensor, preferably an inorganic semiconductor sensor, more preferably a photodiode and most preferably a silicon photodiode.

Embodiment 165: The detector according to any one of the 51 preceding embodiments, wherein the first optical sensor is a uniform sensor having a single light-sensitive area.

Embodiment 166: The detector according to any one of the 52 preceding embodiments, wherein the detector further comprises an illumination source for illuminating the object.

Embodiment 167: The detector according to the preceding embodiment, wherein the illumination source is configured for generating an illuminating light beam for illuminating the object, wherein the detector is configured such that the illuminating light beam propagates from the detector towards the object along an optical axis of the detector.

Embodiment 168: The detector according to the preceding embodiment, wherein the detector comprises at least one reflective element, preferably at least one prism, for deflecting the illuminating light beam onto the optical axis.

Embodiment 169: The detector according to any one of the 55 preceding embodiments, wherein the detector further comprises at least one transfer device, the transfer device being adapted to guide the light beam onto the optical sensors.

Embodiment 170: The detector according to the preceding embodiment, wherein the transfer device comprises one or more of: at least one lens, at least one focus-tunable lens, at least one spheric lens, at least one aspheric lens, at least one Fresnel lens; at least one diffractive optical element; at least one beam deflection element, preferably at least one mirror; at least one beam splitting element, preferably at least one of a beam splitting cube or a beam splitting mirror; at least one multi-lens system.

Embodiment 171: The detector according to any one of the 57 preceding embodiments, wherein the first light-sensitive area, in a direction of propagation of the light beam, overlaps with the second light-sensitive area.

Embodiment 172: A detector for determining a position of at least one object, the detector comprising:
- at least one angle dependent optical element adapted to generate at least one transmis-sion light beam having at least one beam profile depending on an angle of inci-dence of an inci-dent light beam propagating from the object towards the detector and illuminating the angle de-pendent optical element;
- at least two optical sensors, wherein each optical sensor has at least one light sensitive area, wherein each optical sensor is designed to generate at least one sensor signal in response to an illumination of its respective light-sensitive area by the light beam generated by the angle dependent optical element;
- at least one evaluation device being configured for determining at least one longitudinal coordinate z of the object by evaluating a quotient signal Q from the sensor signals.

Embodiment 173: The detector according to the preceding embodiment, wherein the angle dependent optical element comprises at least one optical element selected from the group consisting of: at least one optical fiber, in particular at least one multifurcated optical fiber, in particular at least one bifurcated optical fiber; at least one diffractive optical element; at least one angle dependent reflective element, at least one diffractive grating element, in particular a blaze grating element; at least one aperture stop; at least one lens array, in particular at least one microlens array; at least one optical filter; at least one polarization filter; at least one bandpass filter; at least one liquid crystal filter, in particular a liquid crystal tunable filter; at least one short-pass filter; at least one long-pass filter; at least one notch filter; at least one interference filter; at least one transmission grating; at least one nonlinear optical element, in particular one birefringent optical element.

Embodiment 174: The detector according to any one of the two preceding embodiments, wherein the detector comprises at least one transfer device, wherein the transfer device has at least one focal length in response to at least one incident light beam propagating from the object to the detector.

Embodiment 175: The detector according to any one of the three preceding embodiments, wherein the detector further comprises an illumination source for illuminating the object.

Embodiment 176: The detector according to the preceding embodiment, wherein the illumination source is adapted to illuminate the object through the angle dependent optical element.

Embodiment 177: The detector according to any one of the two preceding embodiments, wherein the illumination source and the angle dependent optical element are arranged in the direction of propagation of the light beam traveling from the object to the detector behind the transfer device.

Embodiment 178: The detector according to any one of the three preceding embodiments, wherein a distance perpendicular to an optical axis of the detector between the illumination source and the optical sensors is small.

Embodiment 179: The detector according to the preceding embodiment, wherein the distance perpendicular to the optical axis of the detector between the illumination source and the optical sensors is less than 0.1 m, preferably less than 0.05 m, more preferably less than 0.025 m.

Embodiment 180: The detector according to any one of the two preceding embodiments, wherein the angle dependent optical element is an optical fiber, wherein the illumination source is guided through the optical fiber, wherein the illumination source is adapted to generate at least one illumination beam, wherein the illumination beam exits the optical fiber behind the transfer device within a baseline that is smaller than a radius of the transfer device, wherein the optical fiber guiding the illumination beam may be attached to the transfer device to reduce reflections at interfaces with larger differences in refractive index.

Embodiment 181: The detector according to the preceding embodiment, wherein the optical fiber is attached to the transfer device by one or more of a polymer, a glue or other means for attachment.

Embodiment 182: The detector according to any one of the four preceding embodiments, wherein the distance perpendicular to the optical axis of the detector between the illumination source and the optical sensors is less than the radius of the transfer device.

Embodiment 183: The detector according to any one of the eleven preceding embodiments, wherein the evaluation device is configured for deriving the quotient signal Q by one or more of dividing the sensor signals, dividing multiples of the sensor signals, dividing linear combinations of the sensor signals.

Embodiment 184: The detector according to the preceding embodiment, wherein the evaluation device is configured for using at least one predetermined relationship between the quotient signal Q and the longitudinal coordinate for determining the longitudinal coordinate.

Embodiment 185: The detector according to any one of the thirteen preceding embodiments, wherein the evaluation device is configured for deriving the quotient signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are areas of the beam profile at a sen-sor position of the optical sensors, and E(x,y,zo) denotes the beam profile given at the object distance zo.

Embodiment 186: The detector according to any one of the fourteen preceding embodiments, wherein the evaluation device comprises at least one divider, wherein the divider is configured for deriving the quotient signal.

Embodiment 187: The detector according to any one of the fifteen preceding embodiments, wherein the optical sensors are positioned off focus.

Embodiment 188: The detector according to any one of the sixteen preceding embodiments, wherein each of the sensor signals comprises at least one information of at least one area of the beam profile of the beam profile of the light beam generated by the angle dependent optical element.

Embodiment 189: The detector according to the preceding embodiment, wherein the beam profile is selected from the group consisting of a trapezoid beam profile; a triangle beam profile; a conical beam profile and a linear combination of Gaussian beam profiles.

Embodiment 190: The detector according to any one of the two preceding embodiments, wherein the light-sensitive areas are arranged such that a first sensor signal comprises information of a first area of the beam profiles and a second sensor signal comprises information of a second area of the beam profile, wherein the first area of the beam profile and the second area of the beam profile are one or both of adjacent or overlapping regions.

Embodiment 191: The detector according to the preceding embodiment, wherein the evaluation device is configured to determine the first area of the beam profile and the second area of the beam profile.

Embodiment 192: The detector according to any one of the four preceding embodiments, wherein the first area of the beam profile comprises essentially edge information of the beam profile and the second area of the beam profile comprises essentially center information of the beam profile.

Embodiment 193: The detector according to any one of the twenty preceding embodiments, wherein the edge information comprises information relating to a number of photons in the first area of the beam profile and the center information comprises information relating to a number of photons in the second area of the beam profile.

Embodiment 194: The detector according to any one of the two preceding embodiments, wherein the light beam propagating from the object to the detector illuminates the optical sensors with at least one line pattern, wherein A1 corresponds to an area with a full line width of the line pattern on the optical sensors, wherein A2 is a central area of the line pattern on the optical sensors.

Embodiment 195: The detector according to any one of the four preceding embodiments, wherein the light beam propagating from the object to the detector illuminates the optical sensors with at least one point pattern, wherein A1 corresponds to an area with a full radius of a point of the point pattern on the optical sensors, wherein A2 is a central area of the point in the point pattern on the optical sensors.

Embodiment 196: The detector according to any one of the two the preceding embodiments, wherein the evaluation device is configured to derive the quotient signal Q by one or more of dividing the edge information and the center information, dividing multiples of the edge infor-mation and the center information, dividing linear combinations of the edge information and the center in-formation.

Embodiment 197: The detector according to any one of the 23 preceding embodiments, wherein the detector has at least one sensor element having a matrix of optical sensors, the optical sensors each having a light-sensitive area, wherein each optical sensor is configured to generate at least one sensor signal in response to an illumination of the light-sensitive area by the light beam generated by the angle dependent optical element.

Embodiment 198: The detector according to the preceding embodiment, wherein the evaluation device is configured for evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal.

Embodiment 199: The detector according to the preceding embodiment, wherein the center signal is selected from the group consisting of: the highest sensor signal; an average of a group of sensor signals being within a predetermined range of tolerance from the highest sensor signal; an aver-age of sensor signals from a group of optical sensors containing the optical sensor hav-ing the highest sensor signal and a predetermined group of neighboring optical sensors; a sum of sensor signals from a group of optical sensors containing the optical sensor having the high-est sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined thresh-old; an integral of sensor signals from a group of optical sensors containing the optical sensor having the highest sensor signal and a predetermined group of neighboring optical sensors; an integral of a group of sensor sig-nals being within a predetermined range of tol-erance from the highest sensor signal; an integral of a group of sensor signals being above a predetermined threshold.

Embodiment 200: The detector according to any one of the two preceding embodiments, wherein the sum signal is selected from the group consisting of: an average over all sensor signals of the matrix; a sum of all sensor signals of the matrix; an integral of all sensor signals of the ma-trix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sen-sors within a predetermined range from the optical sensor having the highest sensor signal; a sum of sensor signals above a certain threshold of optical sensors being located within a prede-termined range from the optical sensor having the highest sensor signal; an integral of sensor signals above a certain threshold of optical sensors being located within a predetermined range from the optical sensor having the highest sensor signal.

Embodiment 201: The detector according to any one of the three preceding embodiments, wherein the combined signal is the quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of a first linear combination of the center signal and the sum signal and a second linear com-bination of the center signal and the sum signal.

Embodiment 202: The detector according to any one of the 27 preceding embodiments, wherein each light-sensitive area has a geometrical center, wherein the geometrical centers of the opti-cal sensors are spaced apart from an optical axis of the detector by different spatial offsets, wherein each optical sensor is configured to generate a sensor signal in response to an illumi-nation of its respective light-sensitive area by the light beam generated by the angle dependent optical element.

Embodiment 204: The detector according to the preceding embodiment, wherein the optical sensors are part of a sensor array, wherein a geometrical center of the sensor array is offset from the optical axis.

Embodiment 205: The detector according to the preceding embodiment, wherein the sensor array is movable relative to the optical axis.

Embodiment 206: The detector according to the preceding embodiment, wherein the evaluation device is configured for, firstly, determining the transversal position of a light spot generated by the light beam on the sensor array by using the sensor signals and for, secondly, moving the sensor array relative to the optical axis until the light spot is off-centered.

Embodiment 207: The detector according to any one of the four preceding embodiments, wherein the optical sensors are partial diodes of a bi-cell or quadrant diode, with a geometrical center of the quadrant diode being off-centered from the optical axis of the detector.

Embodiment 208: A detector system for determining a position of at least one object, the detector system compris-ing at least one detector according to any one of the preceding embodiments, the detector system further com-prising at least one beacon device adapted to direct at least one light beam towards the detector, wherein the beacon device is at least one of attachable to the object, holdable by the object and integratable into the object.

Embodiment 209: A human-machine interface for exchanging at least one item of information between a user and a machine, wherein the human-machine interface com-prises at least one detector system according to the preced-ing embodiment, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

Embodiment 210: An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 211: A tracking system for tracking a position of at least one movable object, the tracking system comprising at least one detector system according to any one of the preceding embodiments referring to a detector system, the tracking system further comprising at least one track controller, wherein the track controller is adapted to track a series of positions of the object at specific points in time.

Embodiment 212: A scanning system for determining a depth profile of a scenery, the scanning system comprising at least one detector according to any of the preceding embodiments referring to a detector, the scanning system further comprising at least one illumination source adapted to scan the scenery with at least one light beam.

Embodiment 213: A camera for imaging at least one object, the camera comprising at least one detector according to any one of the preceding embodiments referring to a detector.

Embodiment 214: An inertial measurement unit for use in an electronic device, wherein the iner-tial measurement unit is adapted to receive data determined by at least one detector according to any one of the preceding embodiment referring to a detector, wherein the inertial measure-ment unit further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angu-lar sensor, an angular rate sensor, a magnetic field sensor, a magnetometer, an accelerometer; a gyroscope, wherein the inertial measurement unit is adapted to determine by evaluating the data from the detector and the at least one further sensor at least one property of the electronic device selected from the group consisting of:

position in space, relative or absolute motion, rotation, acceleration, orientation, angle position, inclination, turn rate, speed.

Embodiment 215: A readout device for optical storage media, the readout device comprising at least one detector according to any one of the preceding embodiments referring to a detector.

Embodiment 216: A method for determining a position of at least one object by using at least one detector, the method comprising the following steps:

providing at least two optical sensors, each optical sensor having a light-sensitive area, wherein each optical sensor is configured to generate a sensor signal in response to an illumination of its respective light-sensitive area by the light beam, wherein the detector has at least one transfer device, wherein the transfer device has at least one focal length in response to the light beam propagating from the object to the detector;
illuminating each of the light-sensitive areas of the at least two optical sensors of the detector with a light beam propagating from the object to the detector, wherein, thereby, each of the light-sensitive areas generates at least one sensor signal; and
evaluating the sensor signals, thereby, determining at least one longitudinal coordinate z of the object, wherein the evaluating comprises deriving a quotient signal Q of the sensor signals.

Embodiment 217: The method according to the preceding embodiment, wherein the longitudinal coordinate z of the object is determined in at least one measurement range independent from the object size in an object plane.

Embodiment 218: The method according to the preceding embodiment, wherein the deriving of the quotient signal Q comprises one or more of dividing the sensor signals, dividing multiples of the sensor signals, dividing linear combinations of the sensor signals.

Embodiment 219: The method according to any one of the preceding embodiments referring to a method, wherein the method comprises adjusting the measurement range by adjusting on one or more parameters selected from the group consisting of: a longitudinal distance from the object to the transfer device $z_0$; the focal length of the transfer device f; a diameter of an exit pupil of the transfer device $E_x$; a longitudinal distance from the transfer device to the light sensitive area $z_s$, a distance from the transfer device to an image of the object $z_i$; an object size $O_{size}$ of the object in the object plane.

Embodiment 220: The method according to any one of the preceding embodiments referring to a method, wherein the transfer device has an optical axis, wherein the transfer device constitutes a coordinate system, wherein a longitudinal coordinate I is a coordinate along the optical axis and wherein d is a spatial offset from the optical axis, wherein the method comprises arranging the optical sensors such that the light-sensitive areas of the optical sensors differ in at least one of: their longitudinal coordinate, their spatial offset, or their surface areas.

Embodiment 221: The method according to any one of the preceding embodiments referring to a method, wherein each of the sensor signals comprises at least one information of at least one beam profile of the light beam, wherein the beam profile is selected from the group consisting of a trapezoid beam profile; a triangle beam profile; a conical beam profile and a linear combination of Gaussian beam profiles, wherein the light-sensitive regions are arranged such that a first sensor signal comprises information of a first area of the beam profiles and a second sensor signal comprises information of a second area of the beam profile, wherein the first area of the beam profile and the second area of the beam profile are one or both of adjacent or overlapping regions.

Embodiment 222: The method according to the preceding embodiment, wherein the evaluating comprises determining the first area of the beam profile and the second area of the beam profile.

Embodiment 223: The method according to any one of the two preceding embodiments, wherein the first area of the beam profile comprises essentially edge information of the beam profile and the second area of the beam profile comprises essentially center information of the beam profile, wherein the edge information comprises an information relating to a number of photons in the first area of the beam profile and the center information comprises an information relating to a number of photons in the second area of the beam profile, wherein the evaluating comprises deriving the quotient signal Q by one or more of dividing the edge information and the center information, dividing multiples of the edge information and the center information, dividing linear combinations of the edge information and the center information.

Embodiment 224: A method for determining a position of at least one object by using at least one detector, the method comprising the following steps:
illuminating at least one first light-sensitive area of at least one first optical sensor of the detector with a light beam propagating from the object to the detector and, thereby, generating at least one first sensor signal;
illuminating at least one second light-sensitive area of at least one second optical sensor of the detector with the light beam and, thereby, generating at least one second sensor signal, wherein the first light-sensitive area is smaller than the second light-sensitive area; and
evaluating the first and second sensor signals, thereby determining at least one longitudinal coordinate z of the object.

Embodiment 225: The method according to the preceding embodiment, wherein the evaluating the first and second sensor signal comprises deriving a quotient signal Q by dividing the first and second sensor signals, by dividing multiples of the first and second sensor signals or by dividing linear combinations of the first and second sensor signals, and wherein the determining the longitudinal coordinate comprises evaluating the quotient signal Q.

Embodiment 226: A method for determining a position of at least one object by using at least one detector, the method comprising the following steps:
illuminating at least one sensor element of the detector with at least one light beam propagating from the object to the detector, the detector having a matrix of optical sensors, the optical sensors each having a light-sensitive area, wherein each optical sensor generates at least one sensor signal in response to the illumination;
evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal.

Embodiment 227: The method according to the preceding embodiment, wherein the combined signal is a quotient signal Q, derived by one or more of: forming a quotient of the center signal and the sum signal or vice versa; forming a quotient of a multiple of the center signal and a mul-tiple of the sum signal or vice versa; forming a quotient of a linear combination of the center signal and a linear combination of the sum signal or vice versa; forming a quotient of a first linear combination of the center signal and the sum signal and a second linear combination of the center signal and the sum signal.

Embodiment 228: The method according to the preceding embodiment, wherein determining the longitudinal coordinate comprises evaluating the quotient signal Q, wherein evaluating the quotient signal comprises using at least one predetermined relationship between the quotient signal Q and the longitudinal coordinate for determining the longitudinal coordinate.

Embodiment 229: The method according to any one of the three preceding method embodiments, wherein the method comprises using the detector according to any one of the preceding embodiments referring to a detector.

Embodiment 230: A method for determining a position of at least one object by using at least one detector, the method comprising the following steps:
providing at least two optical sensors, each optical sensor having a light-sensitive area, wherein each light-sensitive area has a geometrical center, wherein the geometrical centers of the optical sensors are spaced apart from an optical axis of the detector by different separations, wherein each optical sensor is configured to generate a sensor signal in response to an illumination of its respective light-sensitive area by a light beam;
illuminating the at least two light-sensitive areas of the at least two optical sensors of the detector with a light beam propagating from the object to the detector and, thereby, generating at least two sensor signals; and
evaluating the sensor signals by combining the at least two sensor signals, thereby determining at least one longitudinal coordinate z of the object.

Embodiment 231: The method according to the preceding embodiment, wherein evaluating of the sensor signals comprises deriving a quotient signal Q by one or more of dividing the sensor signals, dividing multiples of the sensor signals or dividing linear combinations of the sensor signals, and wherein the determining of the longitudinal coordinate comprises evaluating the quotient signal Q.

Embodiment 232: A method for determining a position of at least one object by using at least one detector, the method comprising the following steps:
providing at least one angle dependent optical element and generating at least one light beam having at least one beam profile depending on an angle of incidence;
providing at least two optical sensors, wherein each optical sensor has at least one light sensitive area, wherein each optical sensor is designed to generate at least one sensor signal in response to an illumination of its respective light-sensitive area by the light beam generated by the angle dependent optical element;
illuminating each of the light-sensitive areas of the at least two optical sensors of the de-tector with the light beam generated by the angle dependent optical element, wherein, thereby, each of the light-sensitive areas generates at least one sensor signal; and
evaluating the sensor signals, thereby, determining at least one longitudinal coordinate z of the object, wherein the evaluating comprises deriving a combined signal Q of the sensor signals.

Embodiment 233: The method according to the preceding embodiment, wherein the deriving of the combined signal Q comprises one or more of dividing the sensor signals, dividing multiples of the sensor signals, dividing linear combinations of the sensor signals.

Embodiment 234: A use of the detector according to any one of the preceding embodiments relating to a detector, for a purpose of use, selected from the group consisting of: a position measurement in traffic technology; an entertainment application; an optical data storage application; a security application; a surveillance application; a safety application; a human-machine interface application; a tracking application; a photography application; a logistics application; a machine vision application; a robotics application; a quality control application; a manufacturing application; a use in combination with optical data storage and readout.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures:

FIGS. 31A to O show further exemplary configurations of optical sensors according to the present invention;

FIG. 32 shows experimental results of a determination of a longitudinal coordinate z for different object sizes;

DETAILED DESCRIPTION OF THE EMBODIMENTS

Figure 1:
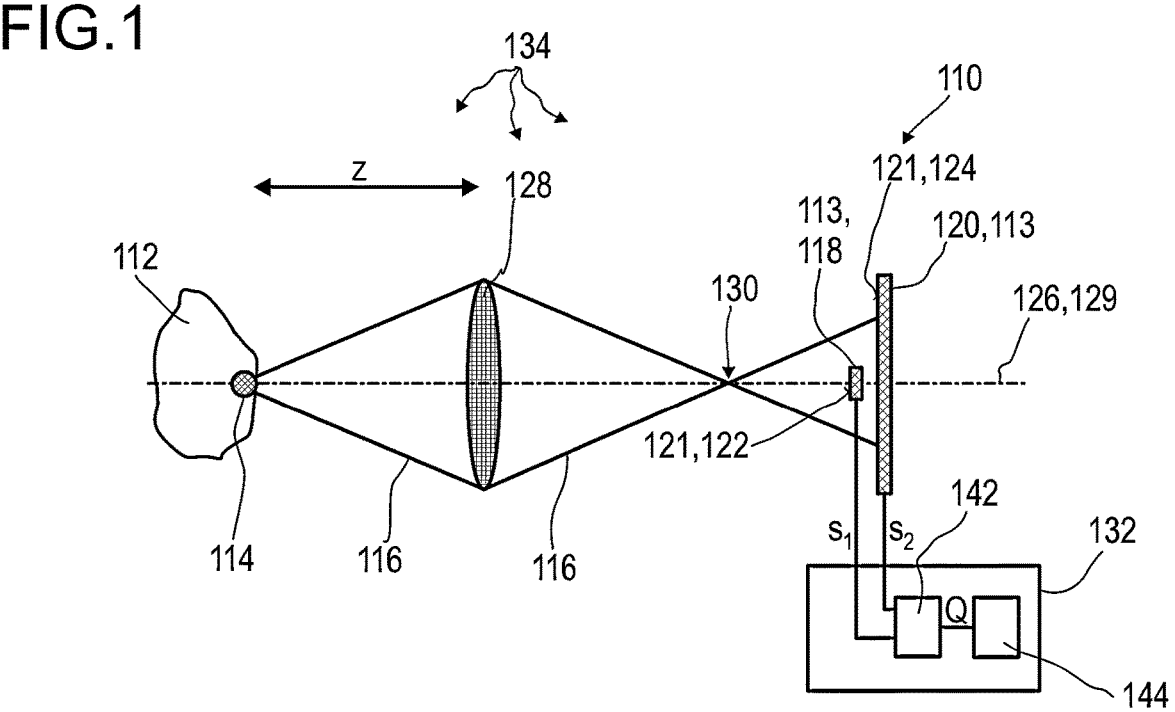
FIGS. 1 and 2 show different embodiments of a detector according to the present invention.

In FIG. 1, a schematic view of a first embodiment of a detector 110 for determining a position of at least one object 112 is depicted. The detector 110 comprises at least two optical sensors 113, for example a first optical sensor 118 and a second optical sensor 120, each having at least one light-sensitive area 121. In this case, the object 112 comprises a beacon device 114, from which a light beam 116 propagates towards the first optical sensor 118 and the second optical sensor 120. The first optical sensor 118 may comprise a first light-sensitive area 122, and the second optical sensor 120 may comprise a second light-sensitive area 124. The light beam 116, as an example, may propagate along an optical axis 126 of the detector 110. Other embodiments, however, are feasible. The optical detector 110, further, comprises at least one transfer device 128, such as at least one lens or a lens system, specifically for beam shaping. The transfer device 128 has at least one focal length in response to the incident light beam 116 propagating from the object 112 to the detector 110. The transfer device 128 has an optical axis 129, wherein the transfer device 128 and the optical detector preferably may have a common optical axis. The transfer device 128 constitutes a coordinate system. A direction parallel or anti-parallel to the optical axis 126, 129 may be defined as a longitudinal direction, whereas directions perpendicular to the optical axis 126, 129 may be defined as transversal directions, wherein a longitudinal coordinate I is a coordinate along the optical axis 126, 129 and wherein d is a spatial offset from the optical axis 126, 129. Consequently, the light beam 116 is focused, such as in one or more focal points 130, and a beam width of the light beam 116 may depend on a longitudinal coordinate z of the object 112, such as on a distance between the detector 110 and the beacon device 114 and/or the object 112. The optical sensors 118, 120 may be positioned off focus. For details of this beam width dependency on the longitudinal coordinate, reference may be made to one or more of WO 2012/110924 A1 and/or WO 2014/097181 A1.

In this first preferred embodiment the optical sensors 118, 120 may be arranged such that the light-sensitive areas 122, 124 differ in their longitudinal coordinate and/or their surface areas and/or their surface shapes. As can be seen in FIG. 1, the first optical sensor 118 is a small optical sensor, whereas the second optical sensor 120 is a large optical sensor. Thus, the width of the light beam 116 fully covers the first light-sensitive area 122, whereas, on the second light-sensitive area 124, a light spot is generated which is smaller than the second light-sensitive area 124, such that the light spot is fully located within the second light-sensitive area 124. As an example, the first light-sensitive area 122 may have a surface area of 1 $mm^2$ to 100 $mm^2$, whereas the second light-sensitive area 124 may have a surface area of 50 to 600 $mm^2$. Other embodiments, however, are feasible.

The first optical sensor 118, in response to the illumination by the light beam 116, may generate a first sensor signal $s_1$, whereas the second optical sensor 120 may generate a second sensor signal $s_2$. Preferably, the optical sensors 118, 120 are linear optical sensors, i.e. the sensor signals $s_1$ and $s_2$ each are solely dependent on the total power of the light beam 116 or of the portion of the light beam 116 illuminating their respective light-sensitive areas 122, 124, whereas these sensor signals $s_1$ and $s_2$ are independent from the actual size of the light spot of illumination. In other words, preferably, the optical sensors 118, 120 do not exhibit the above-described FiP effect.

The sensor signals $s_1$ and $s_2$ are provided to an evaluation device 132 of the detector 110. The evaluation device 132, as symbolically shown in FIG. 1, is embodied to derive a quotient signal Q, as explained above. From the quotient signal Q, derived by dividing the sensor signals $s_1$ and $s_2$ or multiples or linear combinations thereof, may be used for deriving at least one item of information on a longitudinal coordinate z of the object 112 and/or the beacon device 114, from which the light beam 116 propagates towards the detector 110. For further details of this evaluation, reference is made to FIGS. 3 and 4 below.

The detector 110, in combination with the at least one beacon device 114, may be referred to as a detector system 134, as will be explained in further detail below with reference to FIG. 5.

Figure 2:
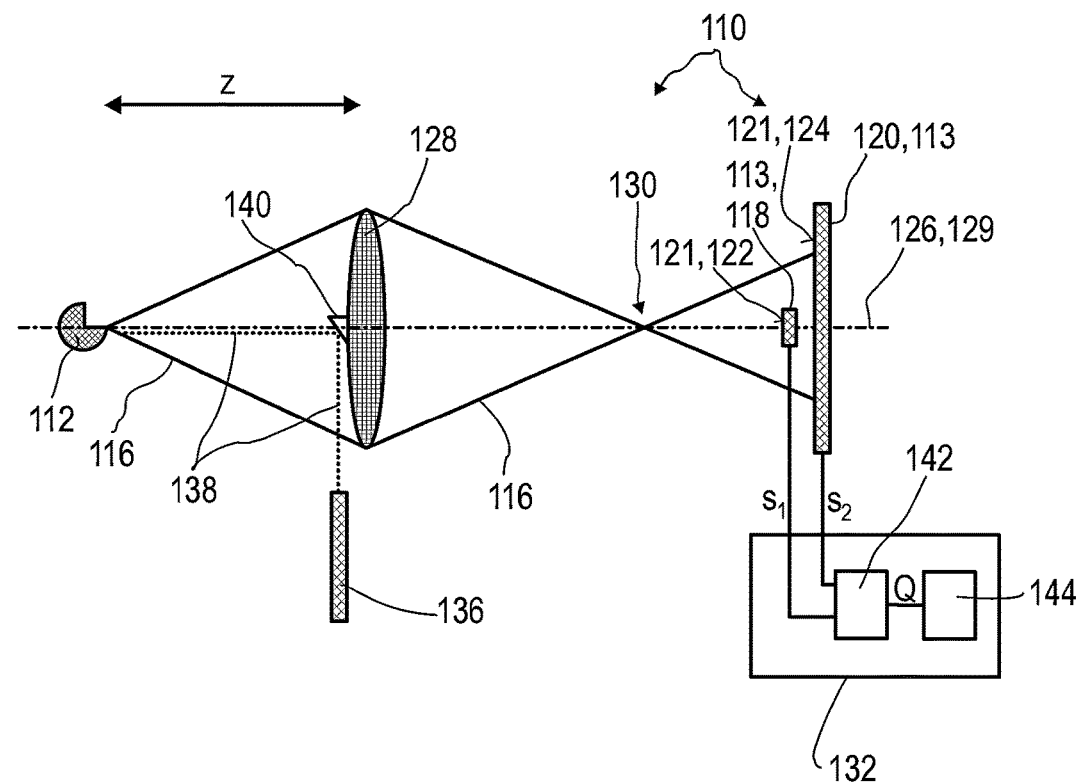

In FIG. 2, a modification of the embodiment of FIG. 1 is shown, which forms an alternative detector 110. The alternative embodiment of the detector 110 widely corresponds to the embodiment shown in FIG. 1. Instead of using an active light source, i.e. a beacon device 114 with light-emitting properties for generating the light beam 116, however, the detector 110 comprises at least one illumination source 136. The illumination source 136, as an example, may comprise a laser, whereas, in FIG. 1, as an example, the beacon device 114 may comprise a light-emitting diode (LED). The illumination source 136 may be configured for generating at least one illumination light beam 138 for illuminating the object 112. The illumination light beam 138 is fully or partially reflected by the object 112 and travels back towards the detector 110, thereby forming the light beam 116.

As shown in FIG. 2, as an example, the illumination light beam 138 may be parallel to the optical axis 126 of the detector 110. Other embodiments, i.e. off-axis illumination and/or illumination at an angle, are feasible, too. In order to provide an on-axis illumination, as shown in FIG. 2, as an example, one or more reflective elements 140 may be used, such as one or more prisms and/or mirrors, such as dichroitic mirrors, such as movable mirrors or movable prisms.

Apart from these modifications, the setup of the embodiment in FIG. 2 corresponds to the setup in FIG. 1. Thus, again, an evaluation device 132 may be used, having, e.g., at least one divider 142 for forming the quotient signal Q, and, as an example, at least one position evaluation device 144, for deriving the at least one longitudinal coordinate z from the quotient signal Q. It shall be noted that the evaluation device 132 may fully or partially be embodied in hardware and/or software. Thus, as an example, one or more of components 142, 144 may be embodied by appropriate software components.

It shall further be noted that the embodiments shown in FIGS. 1 and 2 simply provide embodiments for determining the longitudinal coordinate z of the object 112. It is also feasible, however, to modify the setups of FIGS. 1 and 2 to provide additional information on a transversal coordinate of the object 112 and/or of parts thereof. As an example, e.g. in between the transfer device 128 and the optical sensors 118, 120, one or more parts of the light beam 116 may be branched off, and may be guided to a position-sensitive device such as one or more CCD and/or CMOS pixelated sensors and/or quadrant detectors and/or other position sensitive devices, which, from a transversal position of a light spot generated thereon, may derive a transversal coordinate of the object 112 and/or of parts thereof. The transversal coordinate may be used to verify and/or enhance the quality of the distance information. For further details, as an example, reference may be made to one or more of the above-mentioned prior art documents which provide for potential solutions of transversal sensors.

Figure 3:
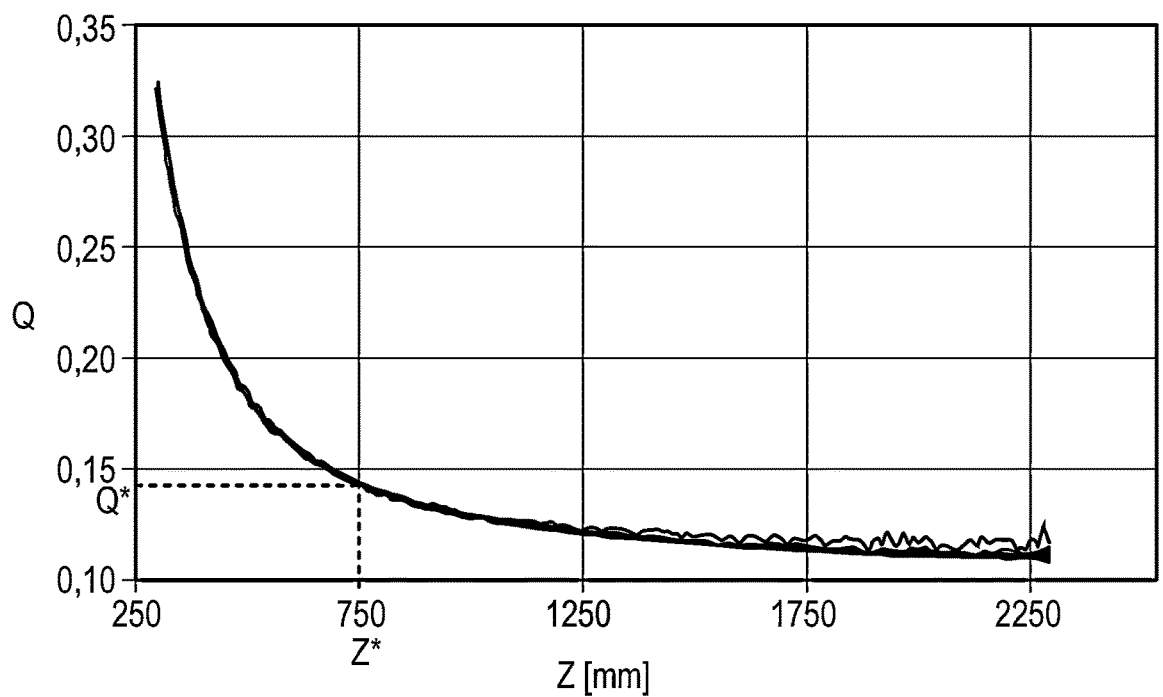
FIG. 3 shows a quotient signal Q as a function of a longitudinal coordinate z of an object, for various intensities of a light source.
Figure 4:
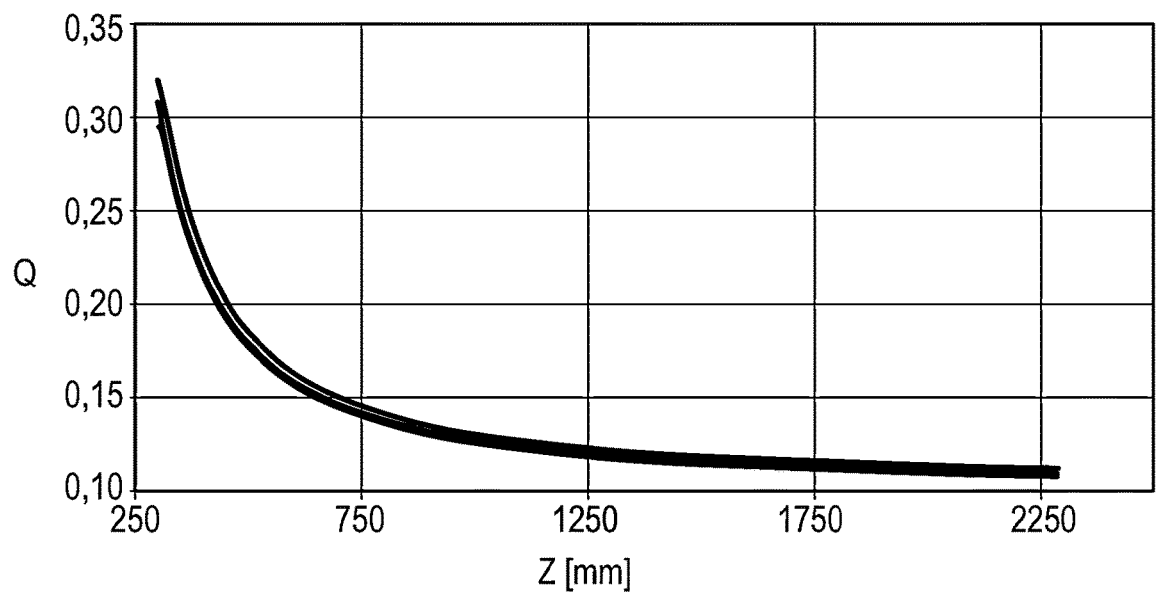
FIG. 4 shows a quotient signal Q as a function of a longitudinal coordinate z of an object for various target sizes.

In FIGS. 3 and 4 typical quotient signals Q are depicted, as a function of the longitudinal coordinate z of an object 112 in a test setup. Therein, a simple quotient $s_1/s_2$ is shown, for an exemplary setup of the detector 110. FIGS. 3 and 4, each, show a bundle of experiments which are not resolved in these figures. Thus, in FIG. 3, various curves are given for the setup shown in FIG. 1, with an active beacon device 114 having an LED. The current of the LED target of the beacon device 114, in this experiment, is changed from 1000 mA to 25 mA. Basically, no difference in the quotient signal, as a function of the longitudinal coordinate z (given in mm) can be detected over the spatial measurement range of 250 mm to 2,250 mm. The experiment clearly shows that the setup of the detector 110 according to the present invention is independent from the total power of the light beam 116. Thus, no additional information on the total power of the light beam, and, thus, no additional illumination on the luminance is required in order to derive the longitudinal coordinate. Thus, as shown in FIG. 3, as an example, a unique relationship between a quotient signal Q* as measured in an experiment and a longitudinal coordinate z* exists.

Thus, the curves as shown in FIG. 3, as an example, may be used as calibration curves for indicating a unique and predetermined or determinable relationship between the quotient signal Q and the longitudinal coordinate. The curves as shown in FIG. 3, as an example, may be stored in a data storage and/or in a lookup table. The calibration curves Q may simply be determined by calibration experiments. It is also feasible, however, to derive these curves by one or more of modelling, analytically, semi-empirically and empirically.

The experiment shown in FIG. 3 clearly demonstrates that the setup of the detector 110 according to the present invention provides a large range of measurement, both in terms of space (e.g. a measurement range from 270 to 2,250 mm) and in terms of brightness or total power of the light beam 116. In FIG. 4, an additional experiment is shown which demonstrates that the setup is widely independent from the target size, i.e. the lateral diameter of the beacon device 114. For this experiment, again, an LED beacon device 114 was used, similar to the setup shown in FIG. 1, wherein the size of the target, i.e. the visible part of the LED, was changed by using a diffuser and an adjustable aperture. Thereby, the aperture or the size of the target was varied from 1 mm to 25 mm in diameter. Without resolving the curves shown in FIG. 4 in detail, it is clearly visible that the quotient signal Q, again, is widely independent from the target size, in between a target size of 1 mm to 25 mm. Thus, again, a unique relationship between the quotient signal Q and the longitudinal coordinate z can be derived, for various target sizes, which may be used for evaluation.

The results shown in FIGS. 3 and 4 were derived experimentally, by varying the named parameters and by measuring appropriate signals. The results, however, may also be derived analytically, semi-analytically or by modelling. Comparable results were obtained.

Figure 5:
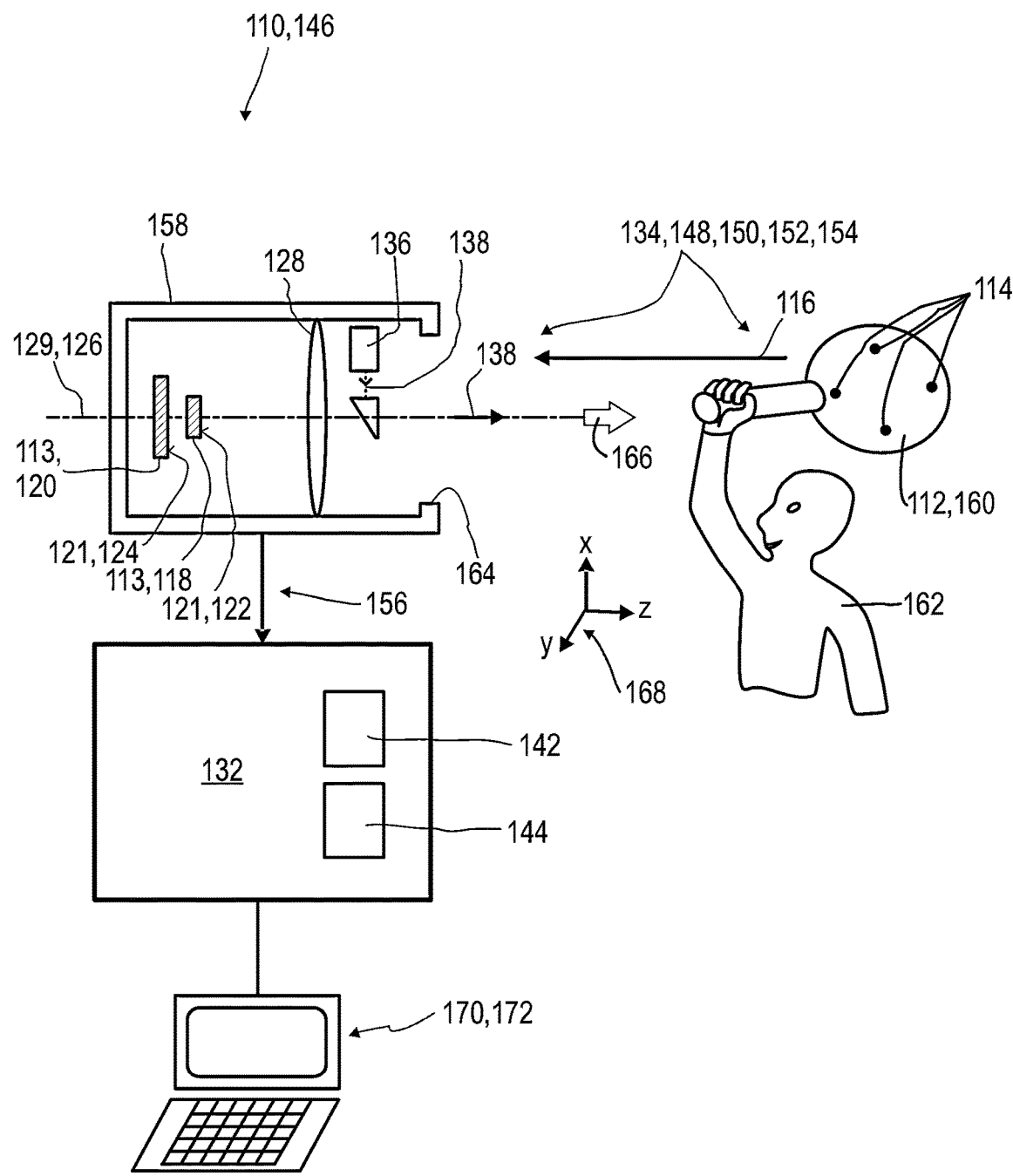
FIG. 5 shows an exemplary embodiment of a detector according to the present invention, a detector system, a human-machine interface, an entertainment device, a tracking system, a scanning system and a camera.

FIG. 5 shows, in a highly schematic illustration, an exemplary embodiment of a detector 110, e.g. according to the embodiments shown in FIG. 1 or 2. The detector 110 specifically may be embodied as a camera 146 and/or may be part of a camera 146. The camera 146 may be made for imaging, specifically for 3D imaging, and may be made for acquiring standstill images and/or image sequences such as digital video clips. Other embodiments are feasible.

FIG. 5 further shows an embodiment of a detector system 134, which, besides the at least one detector 110, comprises one or more beacon devices 114, which, in this example, may be attached and/or integrated into an object 112, the position of which shall be detected by using the detector 110. FIG. 5 further shows an exemplary embodiment of a human-machine interface 148, which comprises the at least one detector system 134 and, further, an entertainment device 150, which comprises the human-machine interface 148. The figure further shows an embodiment of a tracking system 152 for tracking a position of the object 112, which comprises the detector system 134. The components of the devices and systems shall be explained in further detail below.

FIG. 5 further shows an exemplary embodiment of a scanning system 154 for scanning a scenery comprising the object 112, such as for scanning the object 112 and/or for determining at least one position of the at least one object 112. The scanning system 154 comprises the at least one detector 110, and, further, optionally, the at least one illumination source 136 as well as, optionally, at least one further illumination source 136. The illumination source 136, generally, is configured to emit at least one illumination light beam 138, such as for illumination of at least one dot, e.g. a dot located on one or more of the positions of the beacon devices 114 and/or on a surface of the object 112. The scanning system 154 may be designed to generate a profile of the scenery including the object 112 and/or a profile of the object 112, and/or may be designed to generate at least one item of information about the distance between the at least one dot and the scanning system 154, specifically the detector 110, by using the at least one detector 110.

As outlined above, an exemplary embodiment of the detector 110 which may be used in the setup of FIG. 5 is shown in FIGS. 1 and 2. Thus, the detector 110, besides the optical sensors 118, 120, comprises at least one evaluation device 132, having e.g. the at least one divider 142 and/or the at least one position evaluation device 144, as symbolically depicted in FIG. 5. The components of the evaluation device 132 may fully or partially be integrated into a distinct device and/or may fully or partially be integrated into other components of the detector 110. Besides the possibility of fully or partially combining two or more components, one or more of the optical sensors 118, 120 and one or more of the components of the evaluation device 132 may be interconnected by one or more connectors 156 and/or by one or more interfaces, as symbolically depicted in FIG. 5. Further, the one or more connectors 156 may comprise one or more drivers and/or one or more devices for modifying or pre-processing sensor signals. Further, instead of using the at least one optional connector 156, the evaluation device 132 may fully or partially be integrated into one or both of the optical sensors 118, 120 and/or into a housing 158 of the detector 110. Additionally or alternatively, the evaluation device 132 may fully or partially be designed as a separate device.

In this exemplary embodiment, the object 112, the position of which may be detected, may be designed as an article of sports equipment and/or may form a control element or a control device 160, the position of which may be manipulated by a user 162. As an example, the object 112 may be or may comprise a bat, a racket, a club or any other article of sports equipment and/or fake sports equipment. Other types of objects 112 are possible. Further, the user 162 himself or herself may be considered as the object 112, the position of which shall be detected.

As outlined above, the detector 110 comprises at least the optical sensors 118, 120. The optical sensors 118, 120 may be located inside the housing 158 of the detector 110. Further, the at least one transfer device 128 is comprised, such as one or more optical systems, preferably comprising one or more lenses.

An opening 164 inside the housing 158, which, preferably, is located concentrically with regard to the optical axis 126 of the detector 110, preferably defines a direction of view 166 of the detector 110. A coordinate system 168 may be defined, in which a direction parallel or anti-parallel to the optical axis 126 may be defined as a longitudinal direction, whereas directions perpendicular to the optical axis 126 may be defined as transversal directions. In the coordinate system 128, symbolically depicted in FIG. 5, a longitudinal direction is denoted by z, and transversal directions are denoted by x and y, respectively. Other types of coordinate systems 168 are feasible, such as non-Cartesian coordinate systems.

The detector 110 may comprise the optical sensors 118, 120 as well as, optionally, further optical sensors. The optical sensors 118, 120 preferably are located in one and the same beam path, one behind the other, such that the first optical sensor 118 covers a portion of the second optical sensor 120. Alternatively, however, a branched beam path may be possible, with additional optical sensors in one or more additional beam paths, such as by branching off a beam path for at least one transversal detector or transversal sensor for determining transversal coordinates of the object 112 and/or of parts thereof. Alternatively, however, the optical sensors 118, 120 may be located at the same longitudinal coordinate.

One or more light beams 116 are propagating from the object 112 and/or from one or more of the beacon devices 114, towards the detector 110. The detector 110 is configured for determining a position of the at least one object 112. For this purpose, as explained above in the context of FIGS. 1 to 4, the evaluation device 132 is configured to evaluate sensor signals provided by the optical sensors 118, 120. The detector 110 is adapted to determine a position of the object 112, and the optical sensors 118, 120 are adapted to detect the light beam 116 propagating from the object 112 towards the detector 110, specifically from one or more of the beacon devices 114. In case no illumination source 136 is used, the beacon devices 114 and/or at least one of these beacon devices 114 may be or may comprise active beacon devices with an integrated illumination source such as a light-emitting diode. In case the illumination source 136 is used, the beacon devices 114 do not necessarily have to be active beacon devices. Contrarily, a reflective surface of the object 112 may be used, such as integrated reflected beacon devices 114 having at least one reflective surface such as a mirror, retro reflector, reflective film, or the like. The light beam 116, directly and/or after being modified by the transfer device 128, such as being focused by one or more lenses, illuminates the light-sensitive areas 122, 124 of the optical sensors 118, 120. For details of the evaluation, reference may be made to FIGS. 1 to 4 above.

As outlined above, the determination of the position of the object 112 and/or a part thereof by using the detector 110 may be used for providing a human-machine interface 148, in order to provide at least one item of information to a machine 170. In the embodiments schematically depicted in FIG. 5, the machine 170 may be a computer and/or may comprise a computer. Other embodiments are feasible. The evaluation device 132 may even be fully or partially integrated into the machine 170, such as into the computer.

As outlined above, FIG. 5 also depicts an example of a tracking system 152, configured for tracking the position of the at least one object 112 and/or of parts thereof. The tracking system 152 comprises the detector 110 and at least one track controller 172. The track controller 172 may be adapted to track a series of positions of the object 112 at specific points in time. The track controller 172 may be an independent device and/or may be fully or partially integrated into the machine 170, specifically the computer, as indicated in FIG. 5 and/or into the evaluation device 132.

Similarly, as outlined above, the human-machine interface 148 may form part of an entertainment device 150. The machine 170, specifically the computer, may also form part of the entertainment device 150. Thus, by means of the user 162 functioning as the object 112 and/or by means of the user 162 handling a control device 160 functioning as the object 112, the user 162 may input at least one item of information, such as at least one control command, into the computer, thereby varying the entertainment functions, such as controlling the course of a computer game.

Figure 6:
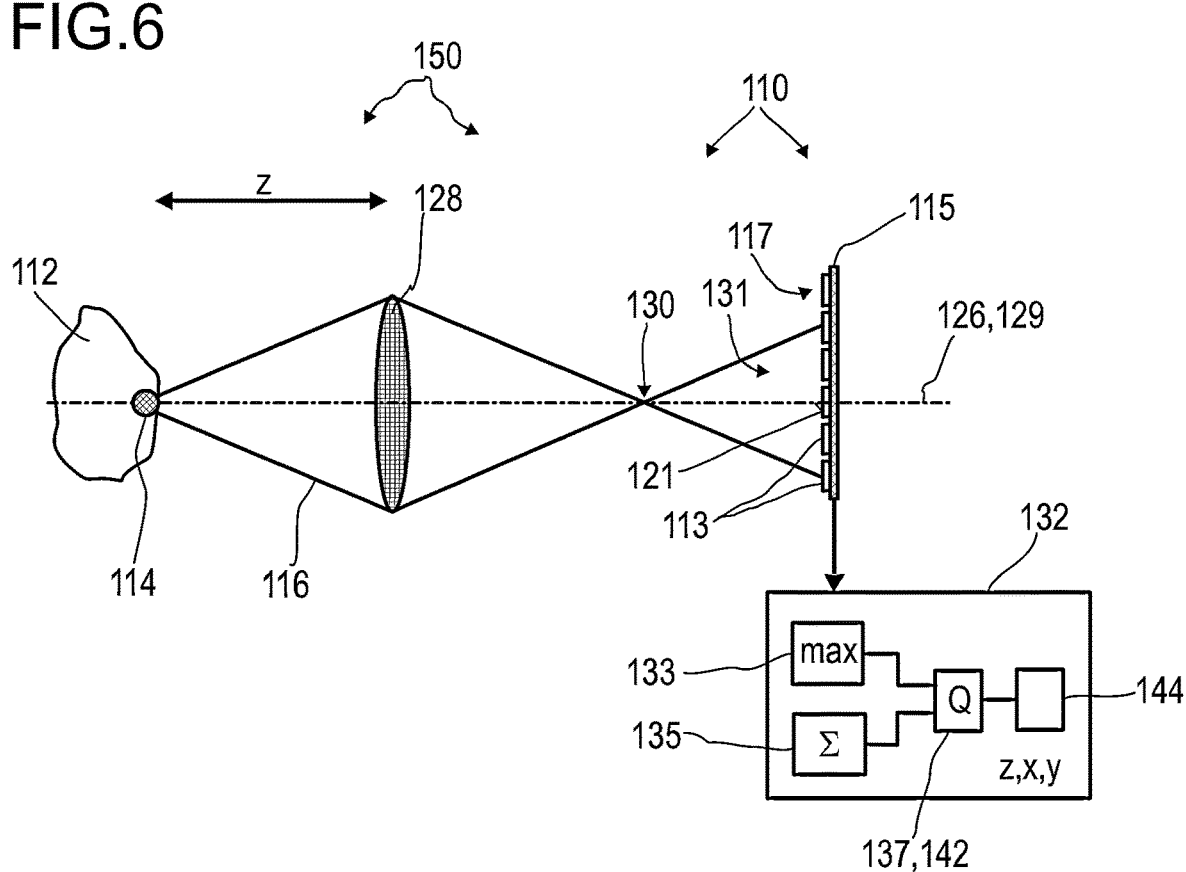
FIGS. 6 and 7 show further different embodiments of a detector according to the present invention.

In FIG. 6, a schematic view of a further embodiment of the detector 110 for determining a position of at least one object 112 is depicted. In this case, the object 112 comprises the at least one beacon device 114, from which the light beam 116 propagates towards at least one sensor element 115. The sensor element 115 comprises a matrix 117 of optical sensors 113, each optical sensor 113 having at least one light-sensitive area 121 facing the object 112. In this second preferred embodiment the optical sensors 118, 120 may be arranged such that the light-sensitive areas of the optical sensors 113 differ in spatial offset and/or surface areas. The light beam 116, as an example, may propagate along the optical axis 126 of the detector 110. Other embodiments, however, are feasible. The optical detector 110 comprises the at least one transfer device 128, such as at least one lens and/or at least one lens system, specifically for beam shaping. Consequently, the light beam 116 may be focused, such as in one or more focal points 130, and a beam width of the light beam 116 may depend on the longitudinal coordinate z of the object 112, such as on the distance between the detector 110 and the beacon device 114 and/or the object 112. The transfer device 128 constitutes the optical axis 129, wherein the transfer device 128 and the optical detector preferably may have a common optical axis. Consequently, the light beam 116 is focused, such as in one or more focal points 130, and a beam width of the light beam 116 may depend on a longitudinal coordinate z of the object 112, such as on a distance between the detector 110 and the beacon device 114 and/or the object 112. The optical sensors 118, 120 are positioned off focus. For details of this beam width dependency on the longitudinal coordinate, reference may be made to one or more of WO 2012/110924 A1 and/or WO 2014/097181 A1.

Figure 8:
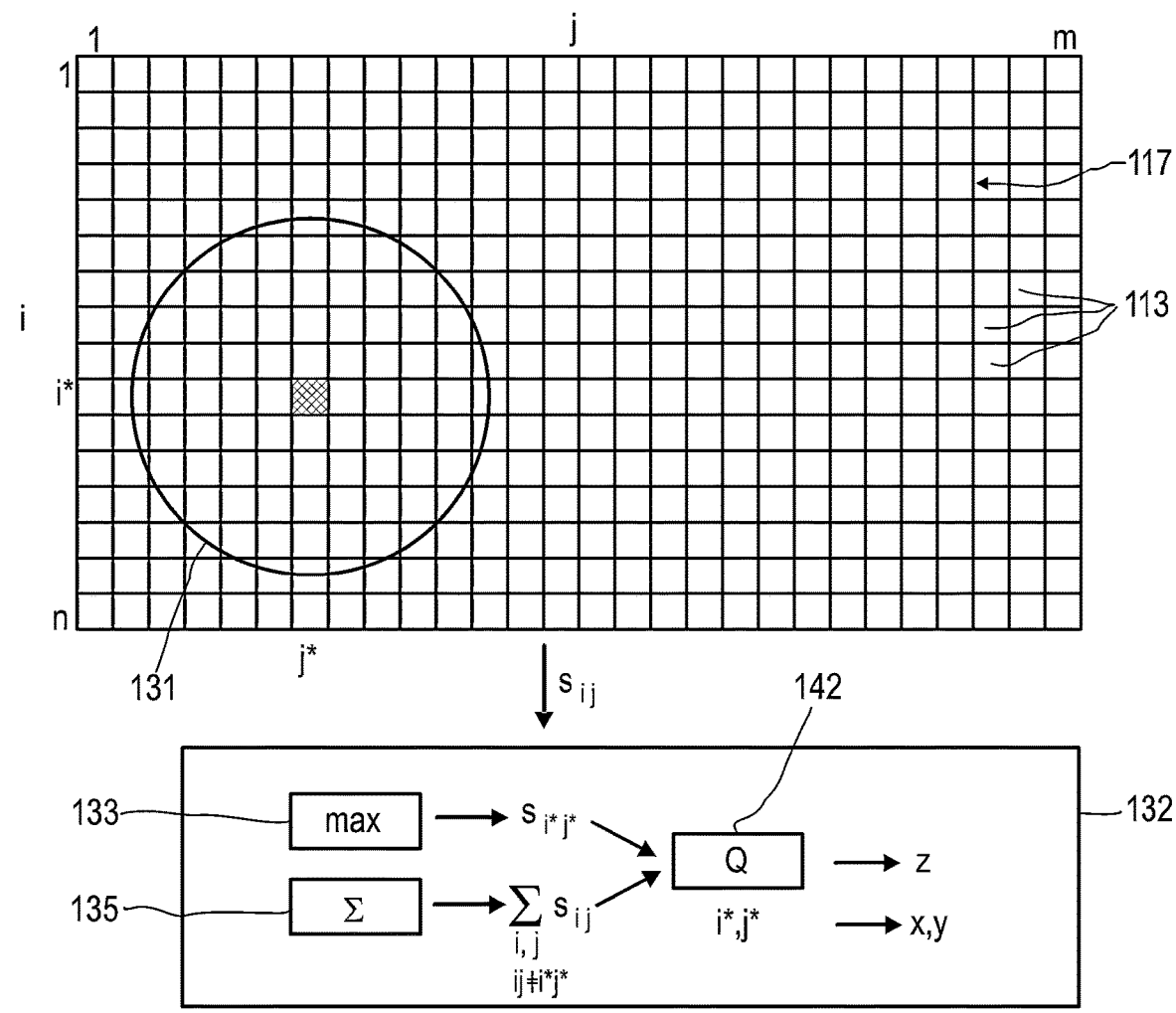
FIG. 8 shows an example of a light spot on a matrix of optical sensors and the evaluation thereof.

As can be seen in FIG. 6, the light beam 116 generates a light spot 131 on the matrix 117. In FIG. 8, an exemplary view of the light spot 131 on the matrix 117 is shown. As can be seen, in this exemplary embodiment, the matrix 117 specifically may be a rectangular matrix, with rows numbered by "i", from 1 to n, and with columns, denoted by "j", from 1 to m, with n, m being integers. The center of the light spot 131, in this exemplary embodiment, is located in the sensor element denoted by i*, j*. The optical sensors 113 may provide sensor signals $s_{ij}$ to an evaluation device 132 which, out of the sensor signals, determines at least one center signal, denoted symbolically by $s_{i*j*}$. As outlined in further detail above, for generating the center signal, the evaluation device 132 may comprise at least one center detector 133. As an example, the center detector 133 simply may determine the maximum sensor signal out of the plurality of sensor signals generated by the optical sensors 113. Alternative methods are feasible. Thus, as an example, instead of determining a single maximum optical sensor signal, a plurality of sensor signals may be used for generating the center signal. Thus, as an example, neighboring optical sensors which are adjacent to the optical sensor i*, j* may contribute to the center signal, such as optical sensors with the coordinates i*−1, . . . , i*+1 and j*−1, . . . , j*+1. These coordinates, in the simple exemplary embodiment, may form a square around the optical sensor i*, j*. Instead of a square having a side length of 3, as in this embodiment, other environments around the optical sensor having the highest sensor signal may be used such as to optimize the signal to noise ratio of the detector signal and or of the distance information. Further, additionally or alternatively, the center signal may be generated by adding up and/or averaging over sensor signals within a certain range from the maximum sensor signal which may for example be beneficial to the measurement precision concerning noise such as pixel noise. Further, additionally or alternatively, for the determination of the center signal or sum signal, image processing techniques such as sub-pixel processing, interpolation, normalization or the like may be employed. Other alternatives are feasible. The evaluation device 132 may be adapted to determine the center signal by integrating of the plurality of sensor signals, for example the plurality of optical sensors around the optical sensor having the highest sensor signal. For example, the beam profile may be a trapezoid beam profile and the evaluation device 132 may be adapted to determine an integral of the trapezoid, in particular of a plateau of the trapezoid. Further, when trapezoid beam profiles may be assumed, the evaluation device 132 may be adopted to determine the edge and center signals by equivalent evaluations making use of properties of the trapezoid beam profile such as determination of the slope and position of the edges and of the height of the central plateau and deriving edge and center signals by geometric considerations. Additionally or alternatively, the evaluation device 132 may be adapted to determine one or both of center information or edge information from at least one slice or cut of the light spot. This may be realized for example by replacing the area integrals in the quotient signal Q by a line integrals along the slice or cut. For improved accuracy, several slices or cuts through the light spot may be used and averaged. In case of an elliptical spot profile, averaging over several slices or cuts may result in an improved distance information.

Further, the evaluation device 132 is configured for determining at least one sum signal out of the sensor signals of the matrix 117. For this purpose, the evaluation device 132 may comprise at least one summing device 135. The summing device 135 may be configured for adding up, integrating or averaging over the sensor signals of the entire matrix 117, of a region of interest within the matrix 117, each option with or without the optical sensors from which the center signal is generated. Thus, in the exemplary embodiment shown in FIG. 8, the summing device 135 is simply configured for summing over the sensor signals $s_{ij}$ of the entire matrix 117, except for the center optical detector with the coordinates i*, j*. Other options, however, are feasible. The evaluation device 132 may be adapted to determine the sum signal by integrating of signals of the entire matrix 117, of the region of interest within the matrix 117. For example, the beam profile may be a trapezoid beam profile and the evaluation device 132 may be adapted to determine an integral of the entire trapezoid.

The evaluation device 132 may be adapted to determine at least one region of interest within the matrix, such as one or more pixels illuminated by the light beam which are used for determination of the longitudinal coordinate of the object. For example, the evaluation device may be adapted to perform at least one filtering, for example at least one object recognition method. The region of interest may be determined manually by a user or maybe determined automatically, such as by recognizing an object within an image generated by the optical sensors.

The evaluation device 132 further is configured for forming at least one combined signal out of the center signal and the sum signal. For this purpose, the evaluation device 132, as an example, may comprise at least one combining device 137, such as at least one divider 142. As a very simple embodiment, a quotient Q may be formed, by dividing the center signal by the sum signal or vice versa. Other options are feasible and are given above.

Finally, the evaluation device 132 is configured for determining at least one longitudinal coordinate z of the object by evaluating the combined signal. For this purpose, the evaluation device may comprise at least one further component, such as at least one evaluation component, for example a position evaluation device 144. It shall be noted that the components of the evaluation device 132 shown in FIG. 8 may fully or partially be embodied in hardware and/or software. Further, the components may fully or partially be embodied as independent or separate components, and/or may fully or partially be embodied as components which are integrated into the sensor element 115.

The embodiment of FIG. 8 further shows that, in addition to the longitudinal coordinate z, at least one item of information on a transversal coordinate of the object 112 and/or the beacon device 114 may be generated. Thus, the coordinates i* and j* provide additional items of information on a transversal position of the object 112 and/or the beacon device 114. In the setup of FIG. 6, the beacon device 114, for the sake of simplicity, is positioned in the center, i.e. on the optical axis 126, 129. In this case, the light spot 131 is likely to be centered in the middle of the matrix 117. In the embodiment shown in FIG. 8, however, as can easily be detected, the light spot 131 is off-centered. This off-centering is characterized by the coordinates i*, j*. By using known optical relationships between this off-centering and a transversal position of the object 112 and/or the beacon device 114, such as by using the lens equation, at least one transversal coordinate of the object 112 and/or the beacon device 114 may be generated. This option is also shown in the exemplary embodiment of FIG. 8.

Figure 7:
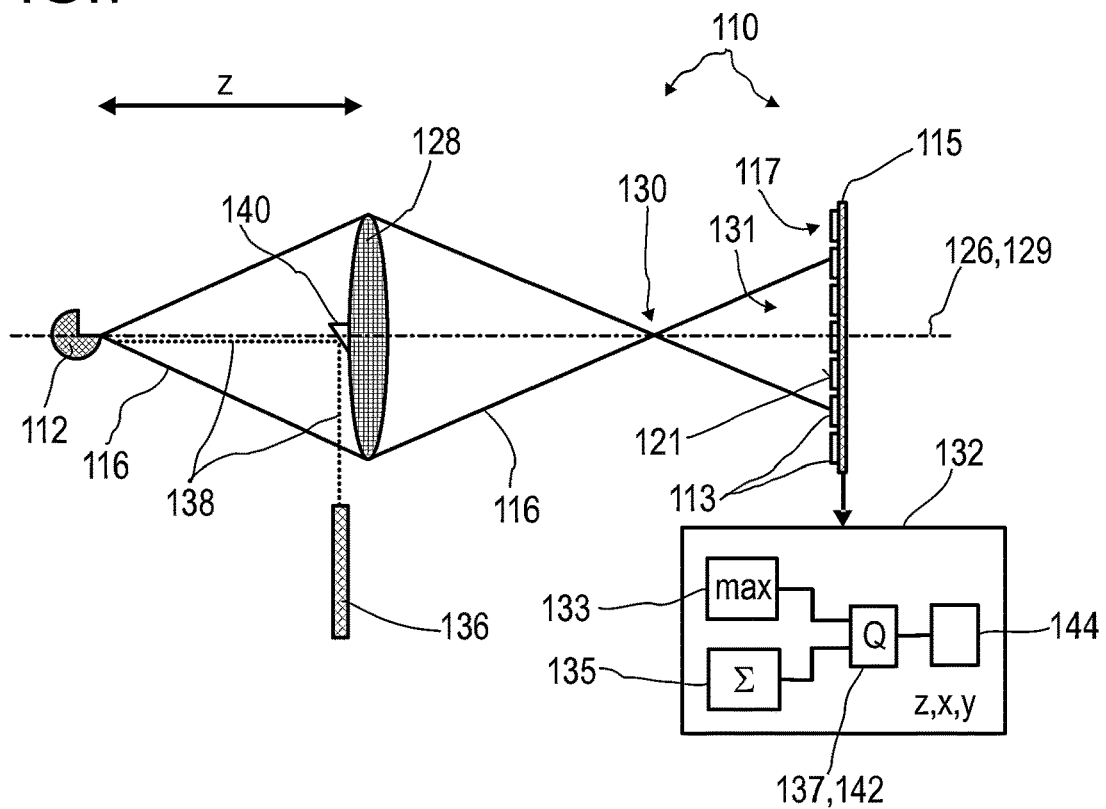

In FIG. 7, a modification of the embodiment of FIG. 6 is shown, which forms an alternative detector 110. The alternative embodiment of the detector 110 widely corresponds to the embodiment shown in FIG. 6. Instead of using an active beacon device 114 with light-emitting properties for generating the light beam 116, however, the detector 110 itself comprises at least one illumination source 136. The illumination source 136, as an example, may comprise at least one laser, whereas, in FIG. 6, as an example, the beacon device 114 may comprise a light-emitting diode (LED). Other embodiments, however, are feasible. The illumination source 136 may be configured for generating at least one illumination light beam 138 for fully or partially illuminating the object 112. The illumination light beam 138 is fully or partially reflected by the object 112 and travels back towards the detector 110, thereby forming the light beam 116.

As shown in FIG. 7, as an example, the illumination light beam 138 may be parallel to the optical axis 126 of the detector 110. Other embodiments, i.e. off-axis illumination and/or illumination at an angle, are feasible, too. In order to provide an on-axis illumination, as shown in FIG. 7, as an example, one or more reflective elements 140 may be used, such as one or more prisms and/or mirrors, such as dichroitic mirrors, such as movable mirrors or movable prisms.

Apart from these modifications, the setup of the embodiment in FIG. 7 corresponds to the setup in FIG. 6. Thus, again, an evaluation device 132 may be used, having e.g. at least one divider 142 for forming the quotient signal Q, and, as an example, at least one position evaluation device 144, for deriving the at least one longitudinal coordinate z from the quotient signal Q and/or another type of combined signal. It shall be noted that the evaluation device 132, again, may fully or partially be embodied in hardware and/or software. Thus, as an example, one or more of components 133, 135, 137, 142, 144 may fully or partially be embodied by appropriate software components and/or may fully or partially be embodied by hardware components.

The optical sensors 113 of the matrix 117, as an example, may be pixels of a pixelated optical sensor, such as a CCD and/or a CMOS sensor chip. Thus, as an example, the optical sensors 113 may have a side length and/or an equivalent diameter in the range of a few micrometers to several hundred micrometers. It shall be noted, however, that larger pixels or optical sensors 113 may be used. Further, instead of using an integrated sensor element 115 such as a CCD and/or CMOS sensor chip, non-integrated matrices may be used.

Figure 9:
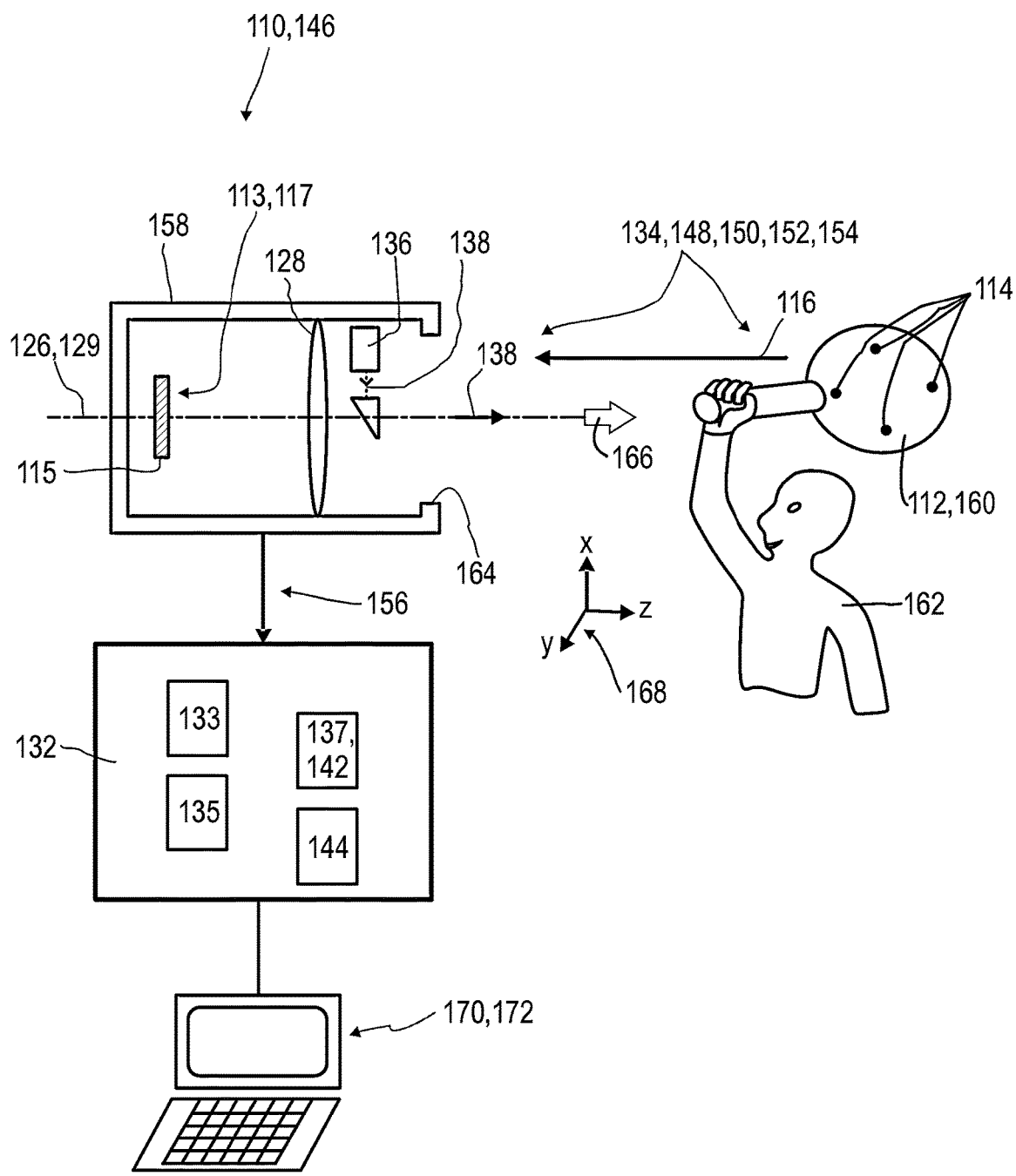
FIG. 9 shows a further exemplary embodiment of a detector according to the present invention; a detector system, a human machine interface, an entertainment device, a tracking system, a scanning system and a camera.

FIG. 9 shows, in a highly schematic illustration, an exemplary embodiment of a detector 110, e.g. according to the embodiments in FIG. 6 or 7. The detector 110, specifically, may be embodied as the camera 146 and/or may be part of a camera 146. The camera 146 may be made for imaging, specifically for 3D imaging, and may be made for acquiring standstill images and/or image sequences such as digital video clips. Other embodiments are feasible.

FIG. 9 further shows an embodiment of a detector system 134, which, besides the at least one detector 110, comprises one or more beacon devices 114, which, in this example, may be attached to and/or integrated into an object 112, the position of which shall be detected by using the detector 110. FIG. 9 further shows an exemplary embodiment of a human-machine interface 148, which comprises the at least one detector system 134 and, further, an entertainment device 150, which comprises the human-machine interface 151. The figure further shows an embodiment of a tracking system 152 for tracking a position of the object 112, which comprises the detector system 134. The components of the devices and systems shall be explained in further detail below.

FIG. 9 further shows an exemplary embodiment of a scanning system 154 for scanning a scenery comprising the at least one object 112, such as for scanning the object 112 and/or for determining at least one position of the at least one object 112. The scanning system 154 comprises the at least one detector 110 and, further, optionally, the at least one illumination source 136 as well as, optionally, at least one further illumination source 136, which is not shown. The illumination source 136, generally, may be configured to emit the at least one illumination light beam 138, such as for illumination of at least one dot, e.g. a dot located on one or more of the positions of the beacon devices 114 and/or on a surface of the object 112. It shall be noted, however, that an active beacon device, as e.g. shown in the setup of FIG. 6, may also be used, and, thus, that setups with no integrated illumination source 136 are also feasible. The scanning system 154 may be designed to generate a profile of the scenery including the object 112 and/or a profile of the object 112 and/or may be designed to generate at least one item of information about the distance between the at least one dot and the scanning system 154, specifically the detector 110, by using the at least one detector 110.

As outlined above, an exemplary embodiment of the detector 110 which may be used in the setup of FIG. 9 is shown in FIGS. 6 and 7. Thus, the detector 110, besides the sensor element 115, comprises the at least one evaluation device 132, having, e.g., the at least one center detector 133, the at least one summing device 135, the at least one combining device 140, the at least one divider 142, the at least one position evaluation device 144 and/or combinations thereof. These components, which may optionally be present, are symbolically depicted in FIG. 9. The components of the evaluation device 132 may fully or partially be integrated into a distinct device and/or may fully or partially be integrated into other components of the detector 110. Besides the possibility of fully or partially combining two or more components, one or more of the components of the evaluation device 132 and one or more of the components of the sensor element 115 may be interconnected by one or more connectors 156 and/or by one or more interfaces, as symbolically depicted in FIG. 9. Further, the one or more connectors 156 may comprise one or more drivers and/or one or more devices for modifying or preprocessing sensor signals. Further, instead of using the at least one optional connector 156, the evaluation device 132 may fully or partially be integrated into one or both of the sensor element 115 and/or into a housing 158 of the detector 110. Additionally or alternatively, the evaluation device 132 may fully or partially be designed as a separate device.

In this exemplary embodiment, the object 112, the position of which may be detected, may be designed as an article of sports equipment and/or may form a control element or a control device 160, the position of which may be manipulated by a user 162. As an example, the object 112 may be or may comprise a bat, a racket, a club or any other article of sports equipment and/or fake sports equipment. Other types of objects 112 are possible. Further, the user 162 himself or herself may be considered as the object 112, the position of which shall be detected.

As outlined above, the detector 110 comprises at least the sensor element 115. The sensor 115, wherein one or more of the sensor elements 115 may be provided, may be located inside the housing 158 of the detector 110. Further, the at least one transfer device 128 is comprised, such as one or more optical systems, preferably comprising one or more lenses.

An opening 164 inside the housing 158, which, preferably, is located concentrically with regard to the optical axis 126 of the detector 110, preferably defines a direction of view 166 of the detector 110. In the coordinate system 168, symbolically depicted in FIG. 9, a longitudinal direction is denoted by z, and transversal directions are denoted by x and y, respectively. Other types of coordinate systems 168 are feasible, such as non-Cartesian coordinate systems.

The detector 110 may comprise the sensor element 115 as well as, optionally, one or more further optical sensors. A non-branched beam path may be used or, alternatively, a branched beam path may be possible, with, e.g., additional optical sensors in one or more additional beam paths, such as by branching off a beam path for at least one transversal detector or transversal sensor for determining the transversal coordinates of the object 112 and/or parts thereof. As outlined above, however, in the context of FIG. 8, the at least one transversal coordinate may also be determined by the sensor element 115 itself, such as by determining the transversal coordinates of the center of the light spot 131.

One or more light beams 116 are propagating from the object 112 and/or from one or more of the beacon devices 114, towards the detector 110. The detector 110 is configured for determining a position of the at least one object 112. For this purpose, as outlined above in the context of FIGS. 6 to 8, the evaluation device 132 may be configured to evaluate the sensor signals provided by the optical sensors 113 of the matrix 117 of the sensor element 115. The detector 110 is adapted to determine a position of the object 112, and the optical sensors 113 are adapted to detect the light beam 116 propagating from the object 112 towards the detector 110, specifically from one or more of the beacon devices 114. In case no illumination source 136 is used, the beacon devices 114 and/or at least one of these beacon devices 114 may comprise active beacon devices with an integrated illumination source such as light-emitting diodes. In case the illumination source 136 is used, the beacon devices do not necessarily have to be active beacon devices. Contrarily, a reflective surface of the object 112 may be used, such as integrated reflective beacon devices 114 having at least one reflective surface. The light beam 116, directly and/or after being modified by the transfer device 128, such as being focused by one or more lenses, illuminates the sensor element 118. For details of the evaluation, reference may be made to FIGS. 6 to 8 above.

As outlined above, the determination of the position of the object 112 and/or a part thereof by using the detector 110 may be used for providing a human-machine interface 148, in order to provide at least one item of information to a machine 170. In the embodiments schematically depicted in FIG. 9, the machine 170 may be a computer and/or may comprise a computer. Other embodiments are feasible. The evaluation device 132 may even be fully or partially integrated into the machine 170, such as into the computer.

As outlined above, FIG. 9 also depicts an example of a tracking system 152, configured for tracking the position of the at least one object 112 and/or of parts thereof. The tracking system 152 comprises the detector 110 and at least one track controller 172. The track controller 172 may be adapted to track a series of positions of the object 112 at specific points in time. The track controller 172 may be an independent device and/or may fully or partially be integrated into the machine 170, specifically the computer, as indicated in FIG. 9, and/or into the evaluation device 132.

Similarly, as outlined above, the human-machine interface 148 may form part of an entertainment device 150. The machine 170, specifically the computer, may also form part of the entertainment device 150. Thus, by means of the user 162 functioning as the object 112 and/or by means of the user 162 handling a control device 160 functioning as the object 112, the user 162 may input at least one item of information, such as at least one control command, into the computer, thereby varying the entertainment functions, such as controlling the course of a computer game.

Figure 10:
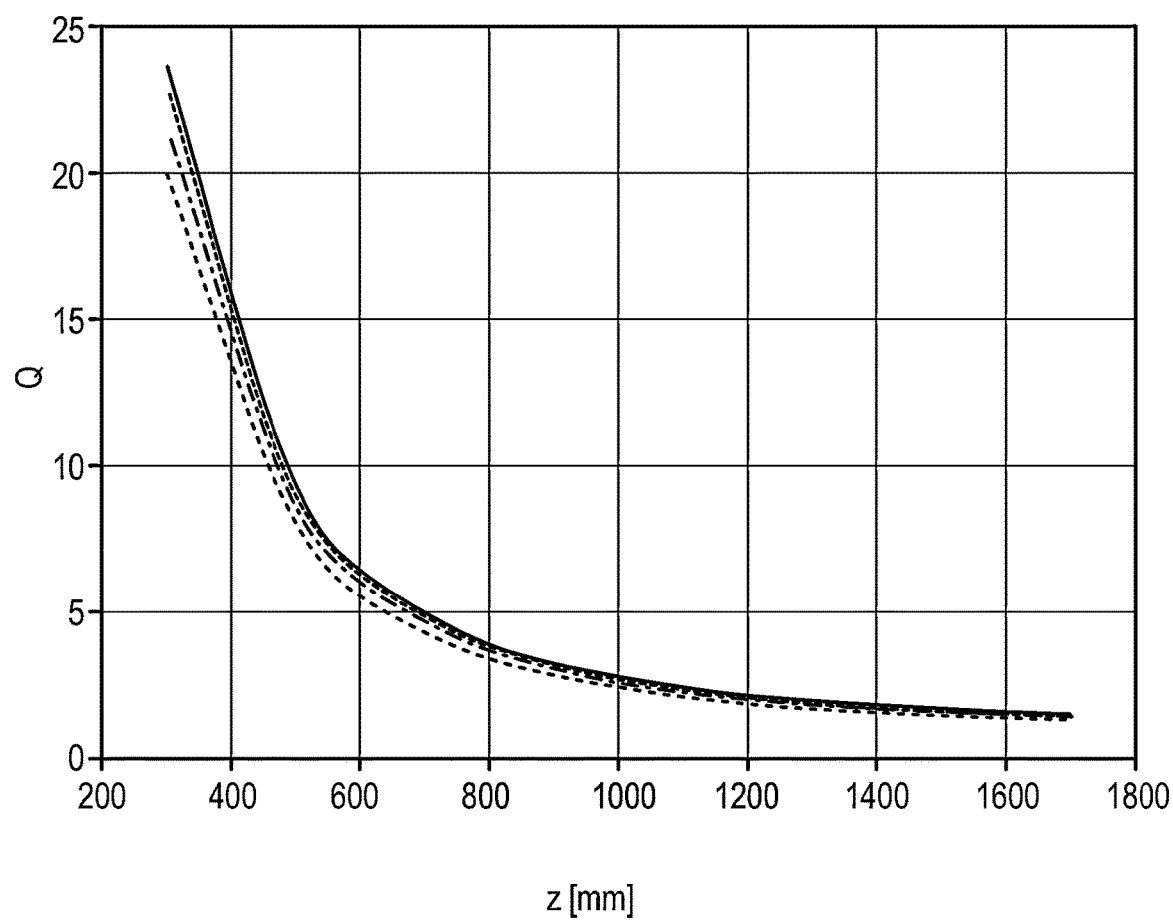
FIG. 10 shows an exemplary embodiment of a quotient signal Q as a function of a longitudinal coordinate z, for various illumination intensities.

In FIG. 10, experimental data are shown which demonstrate an exemplary embodiment of the present invention in terms of measurement data. The figure shows a quotient signal Q as a function of a longitudinal coordinate z, given in millimeters, for various illumination intensities.

In order to gain the experimental data shown in FIG. 10, an experimental setup was used with a sensor element 118 formed by a Basler AC 1920-40GC camera, with a transfer device 128 formed by a Nikkor 50 mm lens.

As a beacon device 114, a light-emitting diode (LED) was used, having a central nominal wavelength of 532 nm. A diffusor made from Teflon film was used in front of the LED and a diaphragm, in order to provide a well-defined light-emitting area having a diameter of 5 mm. The intensity of the LED was varied, by varying a drive current of the LED between 5 mA and 150 mA.

In the experiments, the distance z between the LED and the lens was varied from 300 mm to 1700 mm. The signal of the Basler AC 1920-40GC camera was evaluated by the following procedure. As a center signal, an accumulated signal of an inner circle having a radius of 15 pixels around the optical axis was determined, with the light spot centered at the optical axis. As a sum signal, the sum of the signals of all pixels of the camera within the light spot was generated. A quotient signal was formed, by dividing the sum signal by the center signal.

In FIG. 10, the solid curves, overlapping, show the quotient signal curves for LED currents of 150 mA, 125 mA, 100 mA and 50 mA. As can be seen, there are basically no differences between these curves, within the whole measurement range. This experiment clearly shows that the quotient signal is widely independent on the total power of the light beam. Only at lower intensities, the curves may be distinguished. Thus, the dotted curve shows measurements at an LED current of 25 mA, the dashed-dotted line at an LED current of 10 mA, and the dashed line at an LED current of 5 mA. Still, even at these low intensities, the measurement curves are very close to the solid curves, which shows the high tolerances of the measurement.

Figure 11:
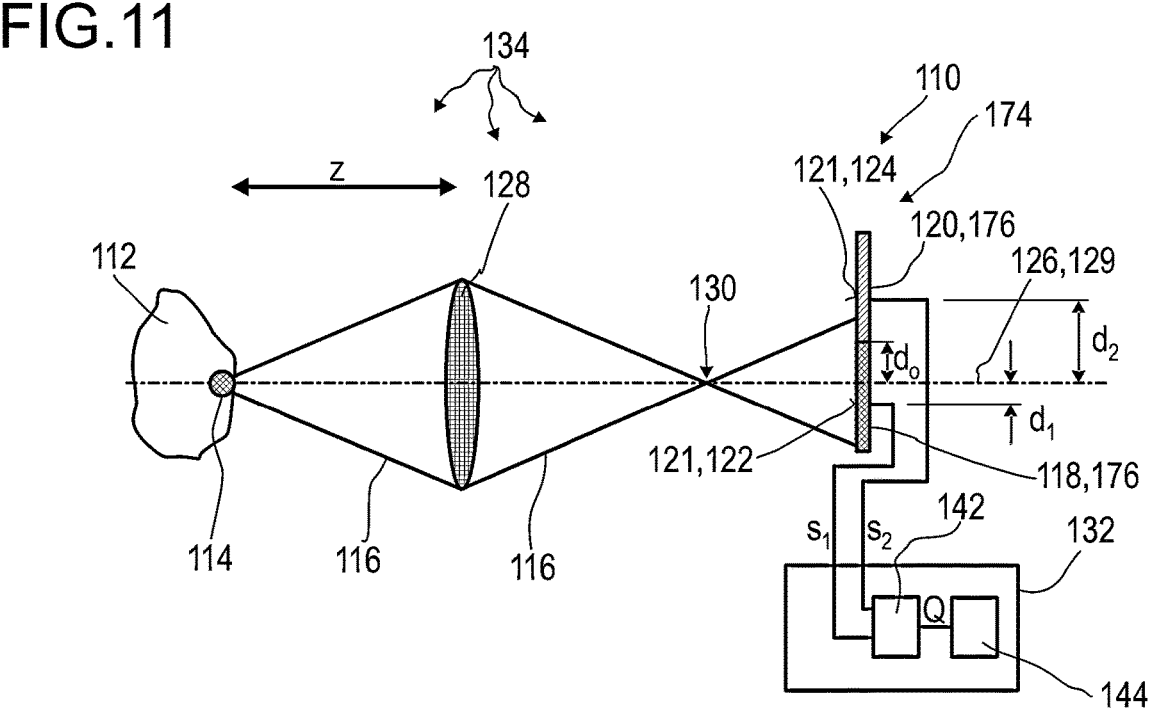
FIGS. 11 and 12 show further different embodiments of a detector according to the present invention.

In FIG. 11, a schematic view of a further embodiment of a detector 110 for determining a position of at least one object 112 is depicted. In this case, the object 112 comprises the beacon device 114, from which the light beam 116 propagates towards the first optical sensor 118 and the second optical sensor 120. The first optical sensor 118 may comprise a first light-sensitive area 122, and the second optical sensor 120 comprises the second light-sensitive area 124. The optical sensors 118, 120, as shown e.g. in FIG. 14, may be part of an array 174 of optical sensors 176, such as the first optical sensor 118 being the optical sensor 176 in the upper left corner of the array 174 and the second optical sensor 120 being the optical sensor 176 in the lower right corner of the array 174. Other choices are feasible. The array 174, as an example, may be a quadrant photodiode 178, and the optical sensors 176 may be partial diodes of the quadrant photodiode 178.

The light beam 116, as an example, may propagate along an optical axis 126 of the detector 110. Other embodiments, however, are feasible. The optical detector 110 comprises the at least one transfer device 128, such as at least one lens and/or at least one lens system, specifically for beam shaping. Consequently, the light beam 116 may be focused, such as in one or more focal points 130, and a beam width of the light beam 116 may depend on the longitudinal coordinate z of the object 112, such as on the distance between the detector 110 and the beacon device 114 and/or the object 112. The optical sensors 118, 120 are positioned off focus. In this third preferred embodiment the optical sensors 118, 120 may be arranged such that the light-sensitive areas of the optical sensors differ in their spatial offset and/or their surface areas. For details of this beam width dependency on the longitudinal coordinate, reference may be made to one or more of WO 2012/110924 A1 and/or WO 2014/097181 A1.

Figure 14:
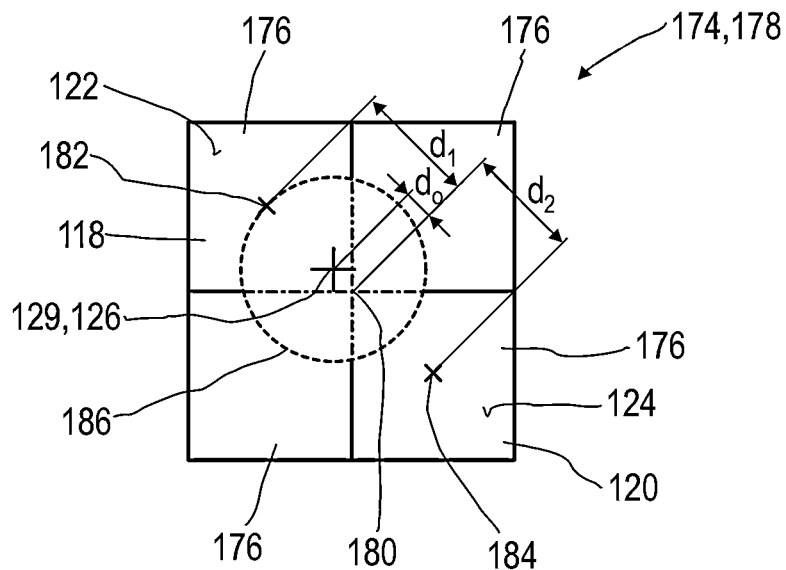
FIG. 14 shows an off-centered position of the optical axis of the detector and of a light spot on a quadrant diode.

As can be seen in FIG. 14, the setup of the detector 110 is off-centered in various ways. Thus, a geometrical center 180 of the array 174 may be off-centered from the optical axis 126, 129 by offset $d_3$. Further, a geometrical center 182 of the first optical sensor 118 is off-centered from the optical axis 126 by offset $d_1$, and a geometrical center 184 of the second optical sensor 120 is off-centered from the optical axis 126 by offset $d_2$, wherein $d_1 \ast d_2$. In other words, a light spot 186 is formed, which is unequally distributed over the light-sensitive areas 122, 124.

As will be shown in further detail below, the detector 110 may be configured for automatically establishing the off-centered position of the light spot 186 on the array 174. For this purpose, firstly, the detector 110 may be configured for determining whether the sensor signals generated by the optical sensors 176 of the array 174 are equal. If this should be the case, the detector 110 may be configured to determine that the light spot 186 is centered in the array 174 and, consequently, may shift the light spot 186 out of the geometrical center 180 of the array 174, such as by shifting the whole array 174 in a plane perpendicular to the optical axis 126, 129. For this purpose, as will be shown in further detail below with respect to FIG. 13, one or more actuators may be provided in the detector 110.

Turning back to the setup of FIG. 11, the first optical sensor 118, in response to the illumination by the light beam 116, generates a first sensor signal $s_1$, whereas the second optical sensor 120 generates a second sensor signal $s_2$. Preferably, the optical sensors 118, 120 are linear optical sensors, i.e. the sensor signals $s_1$ and $s_2$ each are solely dependent on the total power of the light beam 116 or of the portion of the light beam 116 illuminating their respective light-sensitive areas 122, 124, whereas these sensor signals $s_1$ and $s_2$ are independent from the actual size of the light spot of illumination. In other words, preferably, the optical sensors 118, 120 do not exhibit the above-described FiP effect.

The sensor signals $s_1$ and $s_2$ are provided to an evaluation device 132 of the detector 110. The evaluation device 110, as symbolically shown in FIG. 1, may specifically be embodied to derive a quotient signal Q, as explained above. The quotient signal Q, derived by dividing the sensor signals $s_1$ and $s_2$ or multiples or linear combinations thereof, may be used for deriving at least one item of information on a longitudinal coordinate z of the object 112 and/or the beacon device 114, from which the light beam 116 propagates towards the detector 110, as will be explained in further detail with reference to the corrosion signals shown in FIGS. 16 to 18 below.

The detector 110, in combination with the at least one beacon device 114, may be referred to as the detector system 134, as will be explained in further detail below with reference to FIG. 13.

Figure 12:
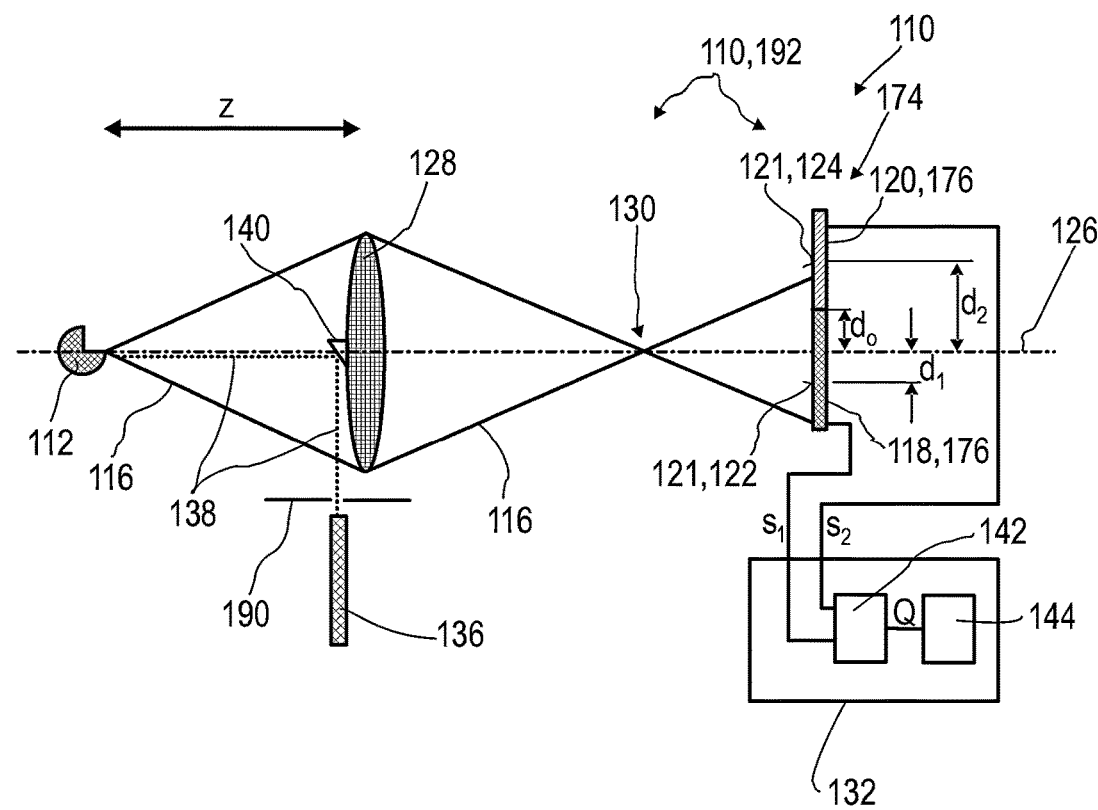

In FIG. 12, a modification of the embodiment of FIG. 11 is shown, which forms an alternative detector 110. The alternative embodiment of the detector 110 widely corresponds to the embodiment shown in FIG. 11. Instead of using an active light source, i.e. a beacon device 114 with light-emitting properties for generating the light beam 116, however, the detector 110 comprises the at least one illumination source 136. The illumination source 136, as an example, may comprise a laser, whereas, in FIG. 11, as an example, the beacon device 114 may comprise a light-emitting diode (LED). The illumination source 136 may be configured for generating at least one illumination light beam 138 for illuminating the object 112. The illumination light beam 138 is fully or partially reflected by the object 112 and travels back towards the detector 110, thereby forming the light beam 116. The illumination source 136, as an example, may comprise one or more diaphragms 190, such as an adjustable diaphragm 190, e.g. an adjustable iris diaphragm and/or a pin hole.

The setup shown in FIG. 12, as an example, may also be used in or as a readout device 192 for optical storage media. Thus, as an example, the object 112 may be an optical storage medium such as in optical storage discs, e.g. a CCD, DVD or Blu-ray disc. By measuring the presence or non-presence of data storage modules and the depth of the same within the object 112, by using the above-mentioned measurement principle, a data readout may take place.

The light beam 116, specifically, may travel along the optical axis 126 of the detector 110. As shown in FIG. 12, as an example, the illumination light beam 138 may be parallel to the optical axis 126 of the detector 110. Other embodiments, i.e. off-axis illumination and/or illumination at an angle, are feasible, too, as will be shown in the context of FIGS. 19A and 19B below. In order to provide an on-axis illumination, as shown in FIG. 12, as an example, one or more reflective elements 140 may be used, such as one or more prisms and/or mirrors, such as dichroitic mirrors, such as movable mirrors or movable prisms.

Apart from these modifications, the setup of the embodiment in FIG. 12 corresponds to the setup in FIG. 11. Thus, again, an evaluation device 132 may be used, having, e.g., at least one divider 142 for forming the quotient signal Q, and, as an example, at least one position evaluation device 144, for deriving the at least one longitudinal coordinate z from the at least one quotient signal Q. It shall be noted that the evaluation device 132 may fully or partially be embodied in hardware and/or software. Thus, as an example, one or more of components 142, 144 may be embodied by appropriate software components.

It shall further be noted that the embodiments shown in FIGS. 11 and 12 simply provide embodiments for determining the longitudinal coordinate z of the object 112. It is also feasible, however, to modify the setups of FIGS. 11 and 12 to provide additional information on a transversal coordinate of the object 112 and/or of parts thereof. As an example, e.g. in between the transfer device 128 and the optical sensors 118, 120, one or more parts of the light beam 116 may be branched off, and may be guided to a position-sensitive device such as one or more CCD and/or CMOS pixelated sensors and/or additional quadrant detectors and/or other position sensitive devices, which, from a transversal position of a light spot generated thereon, may derive a transversal coordinate of the object 112 and/or of parts thereof. For further details, as an example, reference may be made to one or more of the above-mentioned prior art documents which provide for potential solutions of transversal sensors.

Figure 13:
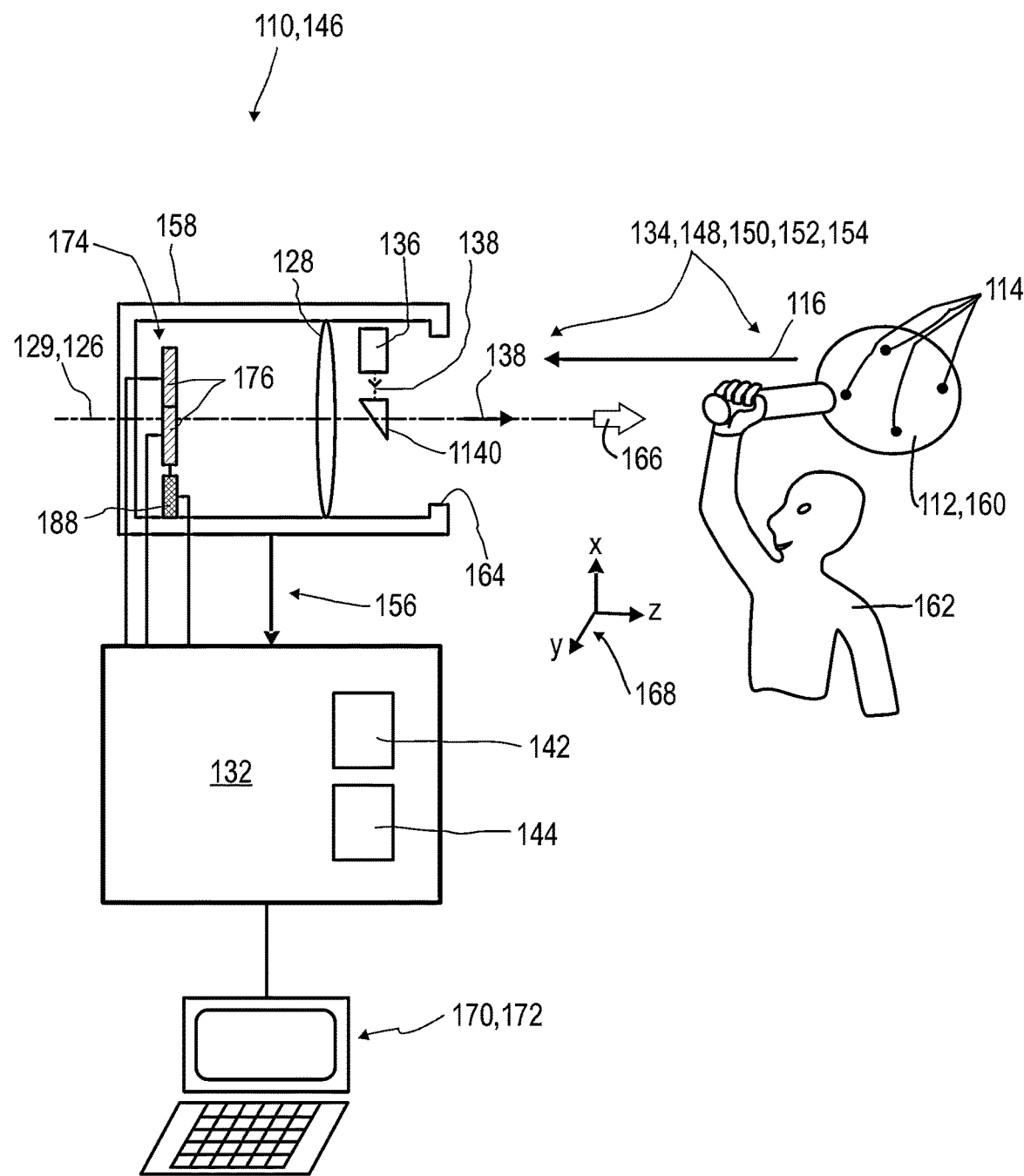
FIG. 13 shows a further exemplary embodiment of a detector according to the present invention, a detector system, a human-machine interface, an entertainment device, a tracking system, a scanning system and a camera.

FIG. 13 shows, in a highly schematic illustration, an exemplary embodiment of a detector 110, e.g. according to the embodiments shown in FIG. 11 or 12. The detector 110 specifically may be embodied as a camera 146 and/or may be part of a camera 146. The camera 146 may be made for imaging, specifically for 3D imaging, and may be made for acquiring standstill images and/or image sequences such as digital video clips. Other embodiments are feasible.

FIG. 13 further shows an embodiment of a detector system 134, which, besides the at least one detector 110, comprises one or more beacon devices 114, which, in this example, may be attached and/or integrated into an object 112, the position of which shall be detected by using the detector 110. FIG. 13 further shows an exemplary embodiment of a human-machine interface 148, which comprises the at least one detector system 134 and, further, an entertainment device 150, which comprises the human-machine interface 148. The figure further shows an embodiment of a tracking system 152 for tracking a position of the object 112, which comprises the detector system 134. The components of the devices and systems shall be explained in further detail below.

FIG. 13 further shows an exemplary embodiment of a scanning system 154 for scanning a scenery comprising the object 112, such as for scanning the object 112 and/or for determining at least one position of the at least one object 112. The scanning system 154 comprises the at least one detector 110, and, further, optionally, the at least one illumination source 136 as well as, optionally, at least one further illumination source 136. The illumination source 136, generally, is configured to emit at least one illumination light beam 138, such as for illumination of at least one dot, e.g. a dot located on one or more of the positions of the beacon devices 114 and/or on a surface of the object 112. The scanning system 154 may be designed to generate a profile of the scenery including the object 112 and/or a profile of the object 112, and/or may be designed to generate at least one item of information about the distance between the at least one dot and the scanning system 154, specifically the detector 110, by using the at least one detector 110.

Figure 15:
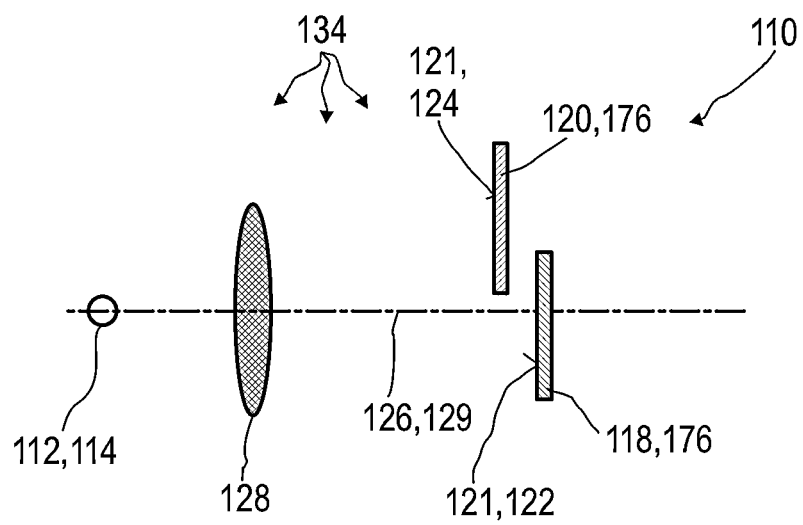
FIG. 15 shows an alternative embodiment of a detector with staggered optical sensors.

As outlined above, an exemplary embodiment of the detector 110 which may be used in the setup of FIG. 13 is shown in FIGS. 11 and 12 or will be shown, as an alternative embodiment, in FIG. 15 below. Thus, the detector 110, besides the optical sensors 118, 120, comprises at least one evaluation device 132, having e.g. the at least one divider 142 and/or the at least one position evaluation device 144, as symbolically depicted in FIG. 13. The components of the evaluation device 132 may fully or partially be integrated into a distinct device and/or may fully or partially be integrated into other components of the detector 110. Besides the possibility of fully or partially combining two or more components, one or more of the optical sensors 118, 120 and one or more of the components of the evaluation device 132 may be interconnected by one or more connectors 156 and/or by one or more interfaces, as symbolically depicted in FIG. 15. Further, the one or more connectors 156 may comprise one or more drivers and/or one or more devices for modifying or preprocessing sensor signals. Further, instead of using the at least one optional connector 156, the evaluation device 132 may fully or partially be integrated into one or both of the optical sensors 118, 120 and/or into a housing 158 of the detector 110. Additionally or alternatively, the evaluation device 132 may fully or partially be designed as a separate device.

In FIG. 13, as an example, one or more reflective elements 140 may be used, for example partially transparent, such as one or more prisms and/or mirrors, such as dichroitic mirrors, such as movable mirrors or movable prisms.

The detector 110 as symbolically shown in the exemplary embodiment of FIG. 13 may also comprise at least one actuator 188 for moving the array 174 of the optical sensors 176 relative to the optical axis 126. As outlined above, for providing this movement, the optical axis 126 may be moved in relation to the array 174 by moving the optical axis 126, by moving the array 174 or both. Thus, as an example, the optical axis may be moved by using one or more of deflecting elements and/or by using the transfer device 128. As a simple example, a lens of the transfer device 128 may be tilted, such as by using one or more actuators 188 (not depicted). Additionally or alternatively, the array 174 may be shifted by the one or more actuators 188, preferably in a plane perpendicular to the optical axis 126. As an example, one or more electromechanical actuators may be used, such as one electromechanical actuator for an x-direction and another electromechanical actuator for a y-direction. Other embodiments are feasible. Thereby, the above-mentioned off-centering procedure may be implemented for establishing an off-centered situation as shown e.g. in FIG. 14.

In the exemplary embodiment shown in FIG. 13, further, the object 112, the position of which may be detected, may be designed as an article of sports equipment and/or may form a control element or a control device 160, the position of which may be manipulated by a user 162. As an example, the object 112 may be or may comprise a bat, a racket, a club or any other article of sports equipment and/or fake sports equipment. Other types of objects 112 are possible. Further, the user 162 himself or herself may be considered as the object 112, the position of which shall be detected.

As outlined above, the detector 110 comprises at least the optical sensors 176, including at least the first optical sensor 118 and the second optical sensor 120. The optical sensors 176 may be located inside the housing 158 of the detector 110. Further, the at least one transfer device 128 is comprised, such as one or more optical systems, preferably comprising one or more lenses.

An opening 164 inside the housing 158, which, preferably, is located concentrically with regard to the optical axis 126 of the detector 110, preferably defines a direction of view 166 of the detector 110. In the coordinate system 128, symbolically depicted in FIG. 15, a longitudinal direction is denoted by z, and transversal directions are denoted by x and y, respectively. Other types of coordinate systems 168 are feasible, such as non-Cartesian coordinate systems.

The detector 110 may comprise the optical sensors 118, 120 as well as, optionally, further optical sensors. The optical sensors 118, 120 preferably are located in one and the same beam path, one behind the other, such that the first optical sensor 118 covers a portion of the second optical sensor 120. Alternatively, however, a branched beam path may be possible, with additional optical sensors in one or more additional beam paths, such as by branching off a beam path for at least one transversal detector or transversal sensor for determining transversal coordinates of the object 112 and/or of parts thereof.

One or more light beams 116 are propagating from the object 112 and/or from one or more of the beacon devices 114, towards the detector 110. The detector 110 is configured for determining a position of the at least one object 112. For this purpose, as explained above in the context of FIGS. 11, 12 and 14, the evaluation device 132 is configured to evaluate sensor signals provided by the optical sensors 118, 120. The detector 110 is adapted to determine a position of the object 112, and the optical sensors 118, 120 are adapted to detect the light beam 116 propagating from the object 112 towards the detector 110, specifically from one or more of the beacon devices 114. In case no illumination source 136 is used, the beacon devices 114 and/or at least one of these beacon devices 114 may be or may comprise active beacon devices with an integrated illumination source such as a light-emitting diode. In case the illumination source 136 is used, the beacon devices 114 do not necessarily have to be active beacon devices. Contrarily, a reflective surface of the object 112 may be used, such as integrated reflective beacon devices 114 having at least one reflective surface. The light beam 116, directly and/or after being modified by the transfer device 128, such as being focused by one or more lenses, illuminates the light-sensitive areas 122, 124 of the optical sensors 118, 120. For details of the evaluation, reference may be made to FIGS. 11, 12 and 14 above.

As outlined above, the determination of the position of the object 112 and/or a part thereof by using the detector 110 may be used for providing a human-machine interface 148, in order to provide at least one item of information to a machine 170. In the embodiments schematically depicted in FIG. 13, the machine 170 may be a computer and/or may comprise a computer. Other embodiments are feasible. The evaluation device 132 may even be fully or partially integrated into the machine 170, such as into the computer.

As outlined above, FIG. 13 also depicts an example of a tracking system 152, configured for tracking the position of the at least one object 112 and/or of parts thereof. The tracking system 152 comprises the detector 110 and at least one track controller 172. The track controller 172 may be adapted to track a series of positions of the object 112 at specific points in time. The track controller 172 may be an independent device and/or may be fully or partially integrated into the machine 170, specifically the computer, as indicated in FIG. 13 and/or into the evaluation device 132.

Similarly, as outlined above, the human-machine interface 148 may form part of an entertainment device 150. The machine 170, specifically the computer, may also form part of the entertainment device 150. Thus, by means of the user 162 functioning as the object 112 and/or by means of the user 162 handling a control device 160 functioning as the object 112, the user 162 may input at least one item of information, such as at least one control command, into the computer, thereby varying the entertainment functions, such as controlling the course of a computer game.

In the setup of the detectors 110 as shown in FIGS. 11, 12 and 13, the optical sensors 176 are part of an array 174, and all optical sensors 176 may be located in one and the same plane oriented essentially perpendicular to the optical axis 126. As noted in this context, when mentioning "perpendicular" or "essentially perpendicular", preferably, a 90° orientation is given. However, tolerances may be present, such as angular tolerances of no more than 20°, preferably of no more than 10° or more preferably of no more than 5°. The optical sensors 176, however, not necessarily have to be located in an array 174 and not necessarily have to be located in one and the same plane, as is shown in an alternative setup of the detector 110 shown in FIG. 15. In this figure, only the optical components are shown. For other components, reference may be made to FIGS. 11, 12 and 13 above.

As can be seen, in this alternative setup, two or more optical sensors 176 are present, comprising at least one first optical sensor 118 and at least one second optical sensor 120 located in different planes which are offset in a direction of the optical axis 126, also referred to as the z-direction. Thus, further, as can also be seen, the optical sensors 118, 120 may overlap, whereas in the previous embodiments, preferably, no overlap between the optical sensors 176 is given. Apart from these modifications, the functionality and the evaluation of the sensor signals generally corresponds to the embodiment of FIGS. 11, 12 and 13 above.

Figure 16:
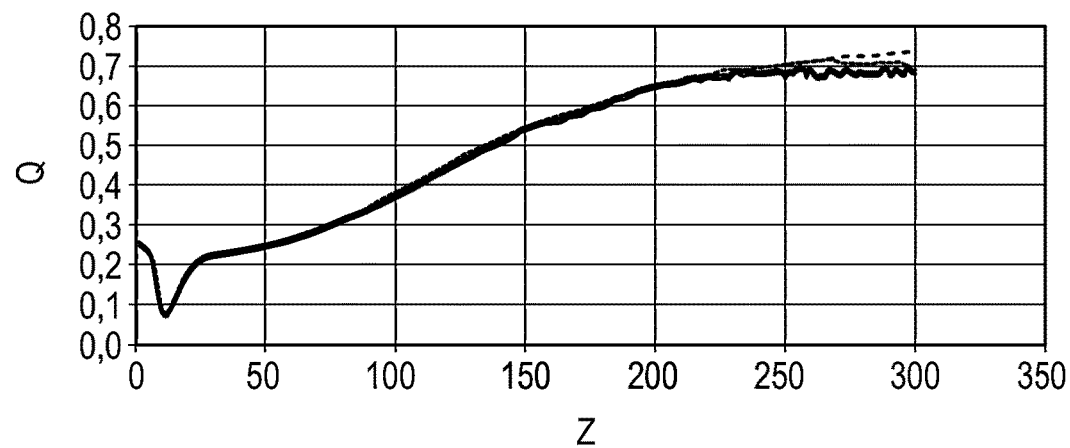
FIGS. 16 to 18 show a quotient signal Q of two sensor signals of two photodiodes of a quadrant photodiode as a function of a longitudinal coordinate z of an object under various measurement conditions.
Figure 17:
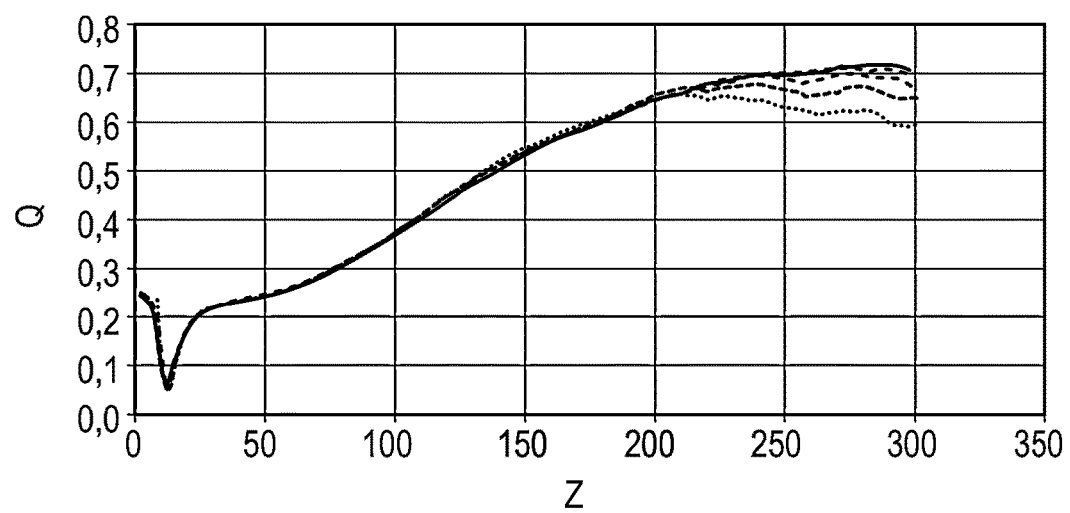
Figure 18:
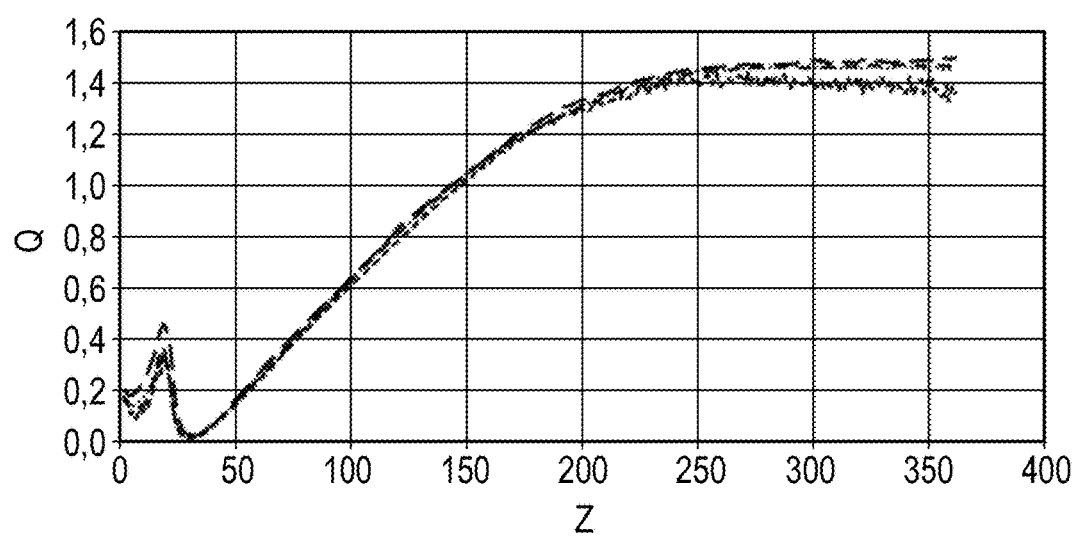

As discussed above, for evaluating the at least two sensor signals of the at least two optical sensors 176 and for deriving an information on the longitudinal position of the object 112 thereof, such as a distance between the detector 110 and the object 112 and/or a z-coordinate of the object 112, preferably, at least one combined sensor signal is generated by the evaluation device 132. The combined sensor signal, as long as this combined sensor signal provides, at least over a measurement range, a unique function of the distance, may be used for deriving the longitudinal coordinate. As an example, the combined sensor signal may be or may comprise at least one quotient signal Q. In FIGS. 16 to 18, quotient signals Q of two sensor signals of two optical sensors 176 are shown under various measurement conditions. In each case, the quotient signal Q is denoted on the vertical axis, as a function of the longitudinal coordinate z of the object 112 on the horizontal axis, the latter given in centimeters.

In all experiments, a setup as shown in FIG. 12 was used. As an illumination source 136, in the experiments of FIGS. 16 and 17, a 980 nm Picotronic laser source was used, in conjunction with a lens having a focal length of 100 mm. In the experiment of FIG. 18, a Laser Components laser light source having a wavelength of 850 nm was used, in conjunction with a lens having a focal length of 79 mm. In all experiments, the laser beam was aligned on the optical axis 126 via a small prism in front of the lens 128, forming a reflective element 140. A diaphragm 190 in front of the laser source was used to vary the spot size. The quadrant diode 178 was used to measure the reflection of the laser source on different materials. In all experiments, the distance dependency is given by the quotient Q of two adjacent quadrant currents.

In FIG. 16, the laser power was varied during the experiment, from 8 nA laser current, denoted by the dotted line, to 106 nA, denoted by the solid line. Therein, since the laser current typically does not provide a measure for the laser intensity, the laser current indicated therein is a current of a silicon photodetector in a measurement setup in which the laser illuminates a white sheet of paper at a distance of 330 mm from the lens. As is clearly visible, the curves are nearly identical and, at least within this range of variation of the laser power, do not significantly depend on the laser power. This experiment shows that the quotient signal provides a reliable and monotonous function of the longitudinal coordinate, independent from the influence of the brightness of the illumination source.

In FIG. 17, a spot size of the illumination source 136 was varied, by varying the open diameter of the diaphragm 190 in front of the laser. The spot size was varied from 1.5 mm, denoted by the dotted line, to 3.5 mm, denoted by the solid line, in steps of 0.5 mm. As can be seen, up to a distance of approximately 200 cm, the quotient signal Q does not depend on the spot size and, thus, again, is not negatively affected by this variation.

In FIG. 18, a material of the object 112 illuminated by the laser beam was varied. Therein, the dotted line denotes white paper, the dashed line with the smallest dashes denotes black paper, the dashed line with the medium dashes denotes wood, and the dashed line with the largest dashes denotes an aluminum plate. As can be seen, at least up to a measurement range of approximately 250 cm, the experiment does not strongly depend on the type of material used for the object 112.

The experiments shown in FIGS. 16 to 18, thus, clearly demonstrate that the quotient signal Q provides a reliable function of the distance. At least within a range of measurement, the function monotonously rises with the distance. The function is not strongly influenced by the most significant variations which may occur in real life measurements, such as the brightness of the illumination source, the spot size of the illumination source or the material of the object 112. Thus, by evaluating the quotient signal Q of two or more optical sensors 176, reliable distance information may be generated. Thus, as an example, the curves shown in FIGS. 16 to 18 directly may be used as calibration curves for the purpose of the evaluation device 132. Other evaluation methods, however, are feasible.

Figure 19A:
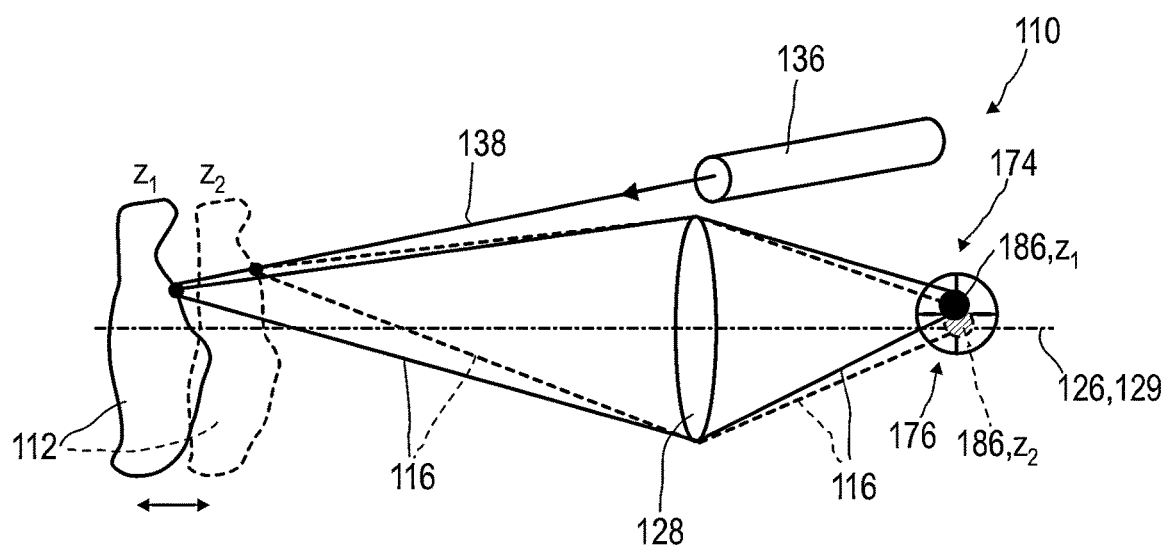
FIGS. 19A and 19B show a modification of the embodiment of FIG. 12, with an off-axis illumination light beam.
Figure 19B:
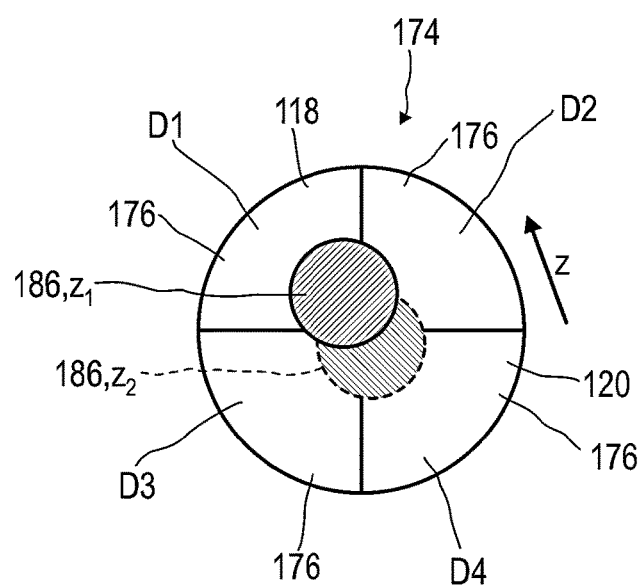

In FIGS. 19A and 19B, an alternative embodiment of the detector 110 is shown which is a modification of the setup shown in FIG. 2. Thus, for most elements and optional details as well as further elements not shown in the schematic FIGS. 19A and 19B, reference may be made to the description of FIG. 12 above.

In FIG. 12, the illumination light beam 138, as discussed above, preferably travels along the optical axis 126, i.e. parallel to the optical axis 126 or even on the optical axis 126. In the setup, the position of the center of the light spot 186 typically does not depend on the z-coordinate of the object 112, such as on a distance between the object 112 and the detector 110. In other words, the diameter or equivalent diameter of the light spot 186 changes with the distance between the object 112 and the detector 110 whereas, typically, the position of the light spot 186 on the array 174 does not.

Contrarily, in FIGS. 19A and 19B, a setup of the detector 110 is shown in which an illumination light beam 138 travels off-axis, i.e. one or both of at an angle other than 0° with the optical axis 126 or parallel to the optical axis 126 but shifted from the optical axis 126. This embodiment, as will be discussed in further detail below, demonstrates that the method according to the present invention can be further enhanced by increasing the z-dependency of a combined sensor signal. Thus, in FIG. 19A, a side view is shown with two different positions of the object 112, i.e. a first position at $z_1$, drawn in solid lines, and a second position at $z_2$, drawn in dashed lines. As can be seen, the illumination light beam 138 which, as an example, propagates at an angle of 5° to 30°, e.g. 10° to 20°, with the optical axis 126, hits the object 112 in both cases at different positions. From these points of the object 112 illuminated by the illumination light beam 138, light beams 116 propagate towards the detector 110, wherein, again, the light beam 116 for the object 112 being located at position $z_1$ is drawn in solid lines, wherein the light beam 116 for the object 112 being located at position $z_2$ is drawn in dashed lines.

In FIG. 19B, the array 174, e.g. a quadrant photodiode, is shown in an enlarged fashion. As can be seen in this setup, the position of the light spot 186 moves with the longitudinal position z of the object 112. Thus, not only is the size of the light spot 186 affected by the longitudinal position z but also is the position on the array 174 of the light spot 186 changed. In FIG. 19B, this movement of the light spot 186 is denoted by arrow z.

Consequently, by this movement of the light spot 186, the z-dependency of a combined sensor signal taking into account at least two sensor signals of the optical sensors 176 may be increased. As an example, the four diodes of the array 174, in FIG. 19B, are denoted by D1-D4. The quotient signal Q, as an example, may be formed as $Q=i(D1)/i(D4)$, with i(D1) being the sensor signal of photodiode D1, and i(D4) being the sensor signal of photodiode D4. As shown in FIG. 19B, the quadrant diode may comprise two dividing lines. The dividing lines may be arranged orthogonal to each other. The orthogonal arrangement of the dividing lines allows adjusting of the quotient signal for near field and far field applications independently from each other. In addition to determining the quotient signal of sensor signals of two optical sensors of the quadrant diode, the evaluation device 132 may be adapted to determine a second quotient using at least three or all four sensor signals of the quadrant diode. The two quotients can be formed such that two distinct distance ranges are covered. The two quotient signals for the near field and far field may have an overlap region in which both quotients allow obtaining reasonable determination of the longitudinal distance z. For example, the quotient may be determined by $Q=i(D1+D2)/i(D3+D4)$, wherein the sensor signals of the two top quadrants, also called top segment, are divided by the sensor signals of the two bottom quadrants, also called bottom segment. Using the quotient of sensor signals determined by two sensor areas which have a dividing line parallel to the baseline of the detector may allow determining of the quotient without any distance dependent movement of the light spot. In particular, as an example, if the dividing line between top and bottom segment is parallel to the baseline, the quotient signal determined from the top segment divided by the bottom segment may be used in the near field, wherein the light spot may illuminate only one of a left or right segment of the quadrant diode. In this case determining the quotient signal by dividing sensor signals of the left and right segments may not be possible. However, determining the quotient by dividing the sensor signals of top and bottom segments may provide a reasonable distance measurement. The quotient signal determined by dividing sensor signals of the left and right segments, i.e. $Q=i(D1+D3)/i(D2+D4)$, may be used for far field measurement, wherein the light spot illuminates both left and right segments. Furthermore, the evaluation device may be adapted to determine the quotient by dividing sensor signals of opposing segments or neighboring segments. The evaluation device may be adapted to combine the acquired sensor signals i(D1), i(D2), i(D3) and i(D4) of the quadrants such that distance measurement is possible over a wide range with a large resolution.

In the situation shown in FIG. 12, the position of the light spot 186 does not depend on z. With a change in z, depending on the optical situation, the spot will become larger or smaller, such as by becoming more diffuse or more focused. In case the spot size increases and the spot becomes more diffuse, i(D4) will increase more rapidly than i(D1), such that the quotient signal Q decreases.

Contrarily, in the situation of FIG. 19A, both the size and the position of the light spot 186 are dependent on the z-coordinate. Thus, the tendency of the z-dependency of the combined sensor signal such as the quotient signal Q will be increased. In the situation of FIG. 12, depending on the z-coordinate, the sensor signal of at least one sensor will increase and simultaneously the sensor signal of at least one different sensor will decrease, resulting in the z-dependent quotient signal Q. In the situation of FIG. 19A, the position dependency of the light spot 186 can result in three different situations depending on the relative position of light source, optical axis, and sensor: Firstly, the position dependency of the light spot 186 may result in a further decrease of the at least one decreasing sensor signal depending on the z-coordinate, while, simultaneously, the position dependency of the light spot 186 may result in a further increase of the at least one decreasing sensor signal depending on the z-coordinate compared to the situation in FIG. 12. Secondly, the position dependency of the light spot 186 may result in a reduced decrease or even increase of the at least one decreasing sensor signal depending on the z-coordinate, while, simultaneously, the position dependency of the light spot 186 may result in a reduced increase or even decrease of the at least one decreasing sensor signal depending on the z-coordinate compared to the situation in FIG. 12. Thirdly, the position dependency of the light spot 186 may be as such that the z-dependence of the sensor signals is largely unchanged compared to the situation in FIG. 12. However, according to the present invention, object distance is not determined from the position of the light spot 186 on a sensor as done in triangulation methods. Instead, movement of the light spot 186 on the array 174 may be used to enhance dynamic of the sensor signals and or the resulting quotient signal Q which may result in an enhanced dynamic of the z-dependency. Furthermore, movement of the light spot 186 on the array 174 during measurement may be used to establish and/or to enhance object size independence for the whole measurement range by suitable relative positioning of the optical sensor 176 and the illumination source 136. Thus, movement of the light spot 186 may not be used for the purpose of triangulation but for the purpose of object size independence.

Additionally, as known from the prior art, the sensor signals i(D1), i(D2), i(D3), i(D4) may also be used for determining a transversal position x, y of the object 112. Further, the sensor signals may also be used for verifying the z-coordinate determined by the present invention.

Figure 19C:
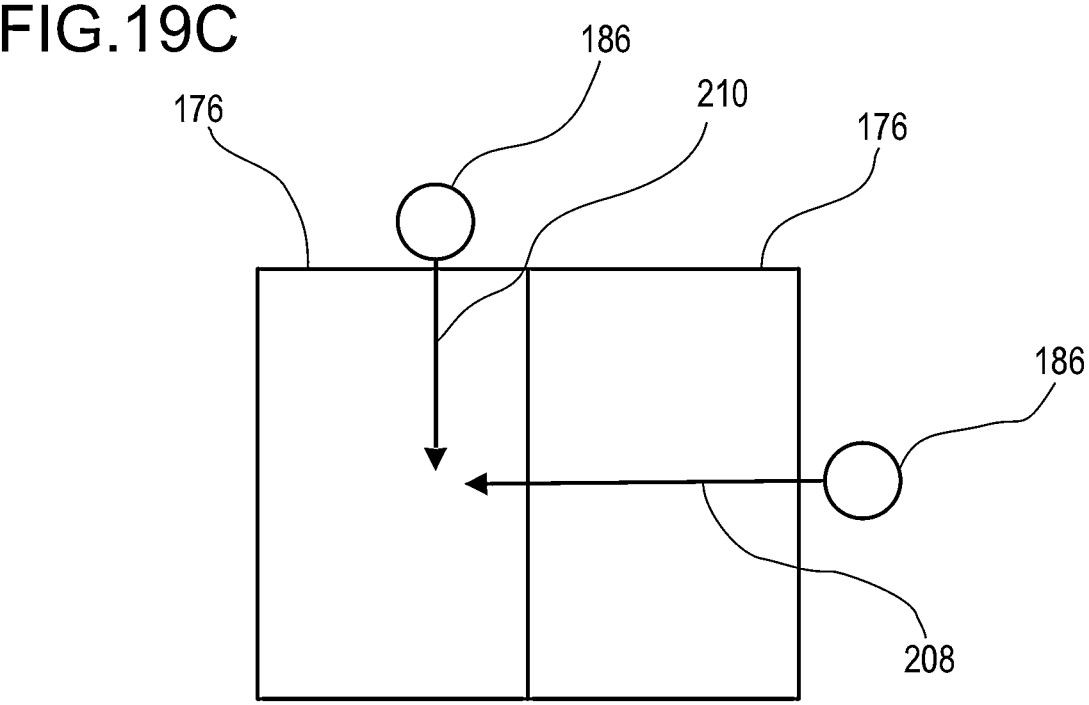
FIGS. 19C to 19E shows a comparison of two experimental setups using a detector setup according to FIG. 19A with a Bi-cell as optical sensors and experimental results.

FIG. 19C shows a comparison of two experimental setups using a detector setup according to FIG. 19A with a Bi-cell as optical sensors 176 with two light sensitive areas. In a first experimental setup, depending on the relative position of the illumination light source, the optical axis and the sensor, the light spot 186 may move in parallel to the linear boundary of the two optical sensors 176 of the Bi-cell along a direction of movement 210 in dependence of the object distance. Since the direction of movement 210 of the light spot 186 is in parallel to the linear boundary of the two light sensitive areas in dependence of the object distance, the resulting sensor signals are identical to a situation with no movement of the light spot 186 depending on object distance as shown in FIG. 12. In a second experimental setup, depending on the relative position of the illumination light source, the optical axis and the sensor, the light spot 186 may move as such that the distance of the center of the light spot 186 to the boundary of the two optical sensors 176 of the Bi-cell changes in dependence of the object distance such as a movement orthogonal to the boundary of the two optical sensors 176 such as a movement along a direction of movement 208 in dependence of the object distance. The detector setup allowing movement of the light spot 186 may be a modification of the setup shown in FIG. 19A. Thus, for most elements and optional details as well as further elements, reference may be made to the description of FIG. 19A above. In FIG. 19C, the optical sensors 176 may be a bi-cell diode.

Figure 19D:
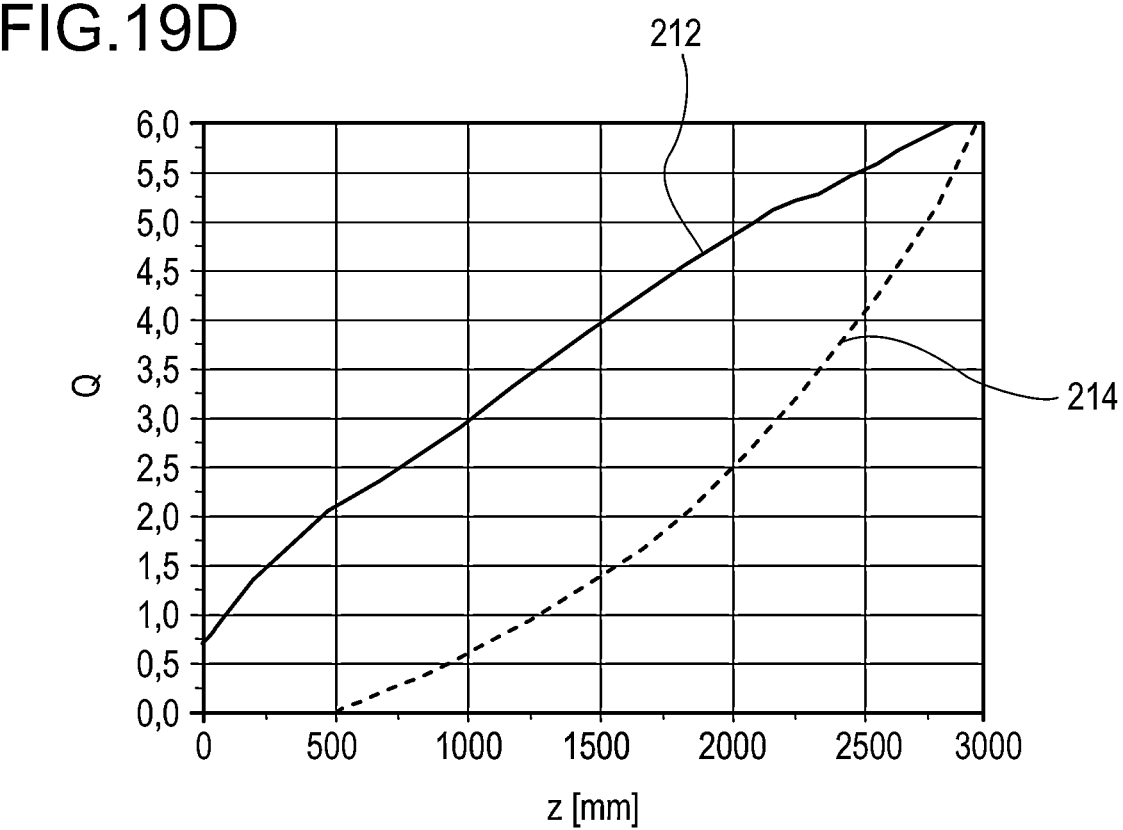

FIG. 19D shows experimental results of the comparison of the two experimental setups using a detector setup according to FIG. 19A, allowing movement of the light spot 186 according to FIG. 19C with movement of the light spot depending on the object distance along directions of movement 210 and 208. Curve 212 shows the dependency of quotient Q on the longitudinal coordinate z for the detector setup allowing movement of the light spot 186 along a direction of movement 210 as shown in FIG. 19C which is in parallel to the boundary of the optical sensors of the Bi-Cell and, which is a situation equivalent to FIG. 12 without a movement of the light spot depending on the object distance. Curve 214 shows the dependency of quotient Q on the longitudinal coordinate z for the detector setup according to FIG. 19A and using a detector setup allowing movement of the light spot 186 with movement of the light spot 186 according to FIG. 19C with movement of the light spot depending on the object distance along a direction of movement 208. The experimental setup was as follows: The optical sensors 176 may be a bi-cell diode, in particular a Si—Bi-Cell. The illumination source 136 may be a 950 nm laser with a spot size of 4 mm. The transfer device 128 may have a focal length of 20 mm, e.g. a lens available as Thorlabs Asphere, f=20 mm. The distance of the object 112 was varied from 0 to 3000 mm. Determination of the longitudinal coordinate z may be possible without allowing movement of the light spot 186. In particular, according to the present invention, movement of the light spot may not be essential for determination of the longitudinal coordinate z. With the detector setup allowing movement of the light spot 186 along a direction 210 or without any movement determination of object distance is possible at very small distance, whereas with movement along a direction 208 determination of object distance is possible for object distance such as distances greater than 500 mm.

Figure 19E:
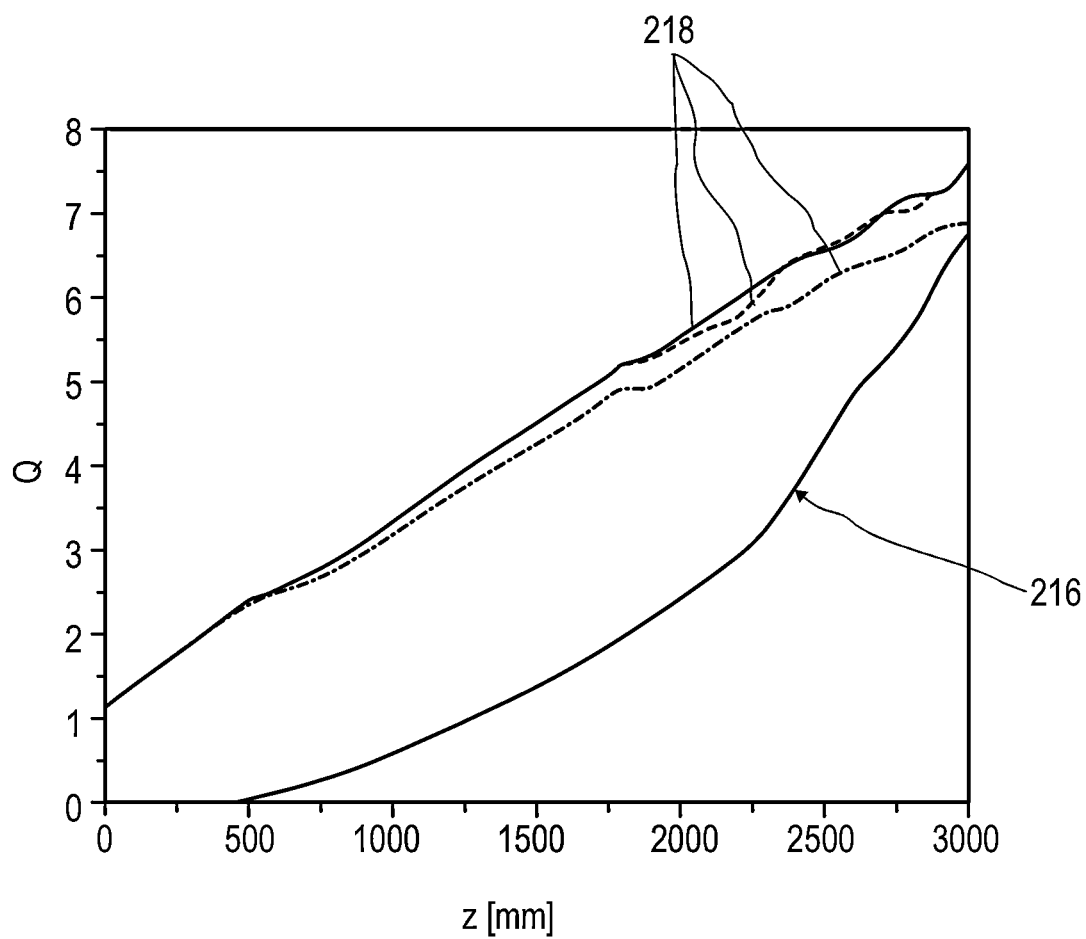

FIG. 19E shows object independence of the two experimental setups using a detector setup according to FIG. 19A, allowing movement of the light spot 186 according to FIG. 19C with movement of the light spot depending on the object distance along directions of movement 208 and 210. In addition, for both experimental setups, the object size was varied from 1 mm (dashed line), 2 mm (dotted line), 6 mm (solid line) and 12 mm (loosely dotted line) by varying the aperture of the laser illumination source. Set of curves 216 shows dependency of quotient Q on the longitudinal coordinate z for the experimental setup allowing movement of the light spot 186 along a direction 208. Set of curves 218 shows dependency of quotient Q on the longitudinal coordinate z for the experimental setup allowing movement of the light spot 186 along a direction 210 or without any movement. Set of curves 216 show only small deviations, in particular less than 5%, whereas set of curves 218 show larger deviations, in particular with increasing distance z. Thus, movement of the light spot 186 on the array 174 during measurement may be used to establish and/or to enhance object size independence for the whole measurement range by suitable relative positioning of the optical sensor 176 and the illumination source 136.

Figure 20:
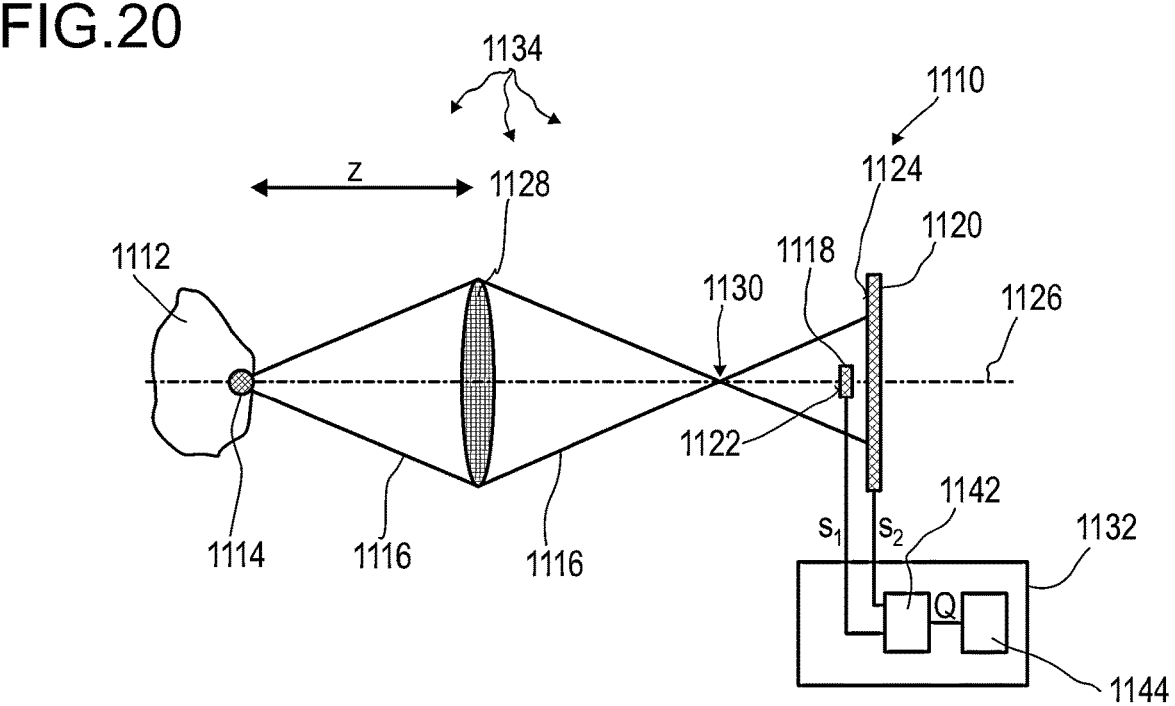
FIGS. 20 and 21 show further different embodiments of a detector according to the present invention.

In FIG. 20, a schematic view of a further embodiment of a detector 1110 for determining a position of at least one object 1112 is depicted. In this case, the object 1112 may comprise a beacon device 1114, from which a light beam 1116 propagates towards a first optical sensor 1118 and a second optical sensor 1120. The first optical sensor 1118 comprises a first light-sensitive area 1122, and the second optical sensor 1120 comprises a second light-sensitive area 1124. Details of the second optical sensor 1120 and the second light-sensitive area 124 will be explained in further detail below, with reference to FIGS. 22A, 22B and 23.

It shall be noted therein, that, in the embodiment shown in FIG. 20, the first optical sensor 1118 is positioned in front of the second optical sensor 1120, such that the light beam 1116 reaches the first optical sensor 1118 before the second optical sensor 1120. As discussed above, however, another order is feasible. Thus, as an example, the second optical sensor 1120 may be positioned in front of the first optical sensor 1118. The latter option, which is not depicted herein, is specifically possible in case the second light-sensitive area 1124 is fully or partially transparent, such as by providing a transparent fluorescent waveguiding sheet 1174, as will be outlined in further detail below.

The light beam 1116, as an example, may propagate along an optical axis 1126 of the detector 1110. Other embodiments, however, are feasible.

The detector 1110, further, may comprise at least one transfer device 1128, such as at least one lens or a lens system, specifically for beam shaping. Consequently, the light beam 1116 may be focused, such as in one or more focal points 1130, and a beam width of the light beam 1116 may depend on a longitudinal coordinate z of the object 1112, such as on a distance between the detector 1110 and the beacon device 1114 and/or the object 1112. For details of this beam width dependency on the longitudinal coordinate, reference may be made to one or more of WO 2012/110924 A1 and/or WO 2014/097181 A1.

As can be seen in FIG. 20, the first optical sensor 1118 is a small optical sensor, whereas the second optical sensor 1120 is a large optical sensor. Thus, the width of the light beam 1116 fully may cover the first light-sensitive area 1122, whereas, on the second light-sensitive area 1124, a light spot is generated which is smaller than the light-sensitive area 1124, such that the light spot is fully located within the second light-sensitive area 1124. Possible embodiments will be explained below with reference to FIG. 23. Thus, as an example, the first light-sensitive area 1122 may have a surface area of 10 mm² to 100 mm², whereas the second light-sensitive area 1124 may have a surface area of more than 100 mm², such as 200 mm² or more, e.g. 200 to 600 mm² or 500 mm² or more. Other embodiments, however, are feasible.

The first optical sensor 1118, in response to the illumination by the light beam 1116, may generate a first sensor signal $s_1$, and the second optical sensor 1120 may generate at least one second sensor signal $s_2$. As an example, the first optical sensor 1118 may be a linear optical sensor, i.e. the sensor signal $s_1$ is dependent on the total power of the light beam 1116 or on the portion of the light beam 1116 illuminating the first light-sensitive area 1122, whereas the sensor signal $s_1$ is independent from the actual size of the light spot of illumination. In other words, the first optical sensor 1118, preferably, does not exhibit the above-described FiP effect.

The sensor signals $s_1$ and $s_2$ may be provided to an evaluation device 1132 of the detector 1110. The evaluation device 1110, as symbolically depicted in FIG. 20, may specifically be embodied to derive a quotient signal Q, as explained above. The quotient signal Q, derived by dividing e.g. the sensor signals $s_1$ and $s_2$ or multiples or linear combinations thereof, may be used for deriving at least one item of information on a longitudinal coordinate z of the object 1112 and/or the beacon device 1114, from which the light beam 1116 propagates towards the detector 1110. Thus, as an example, a unique evaluation curve may exist, in which, for each quotient signal Q, a longitudinal coordinate z is assigned.

The detector 1110, in combination with the at least one beacon device 1114, may be referred to as a detector system 1134, as will be explained in further detail below, with reference to FIG. 25.

Figure 21:
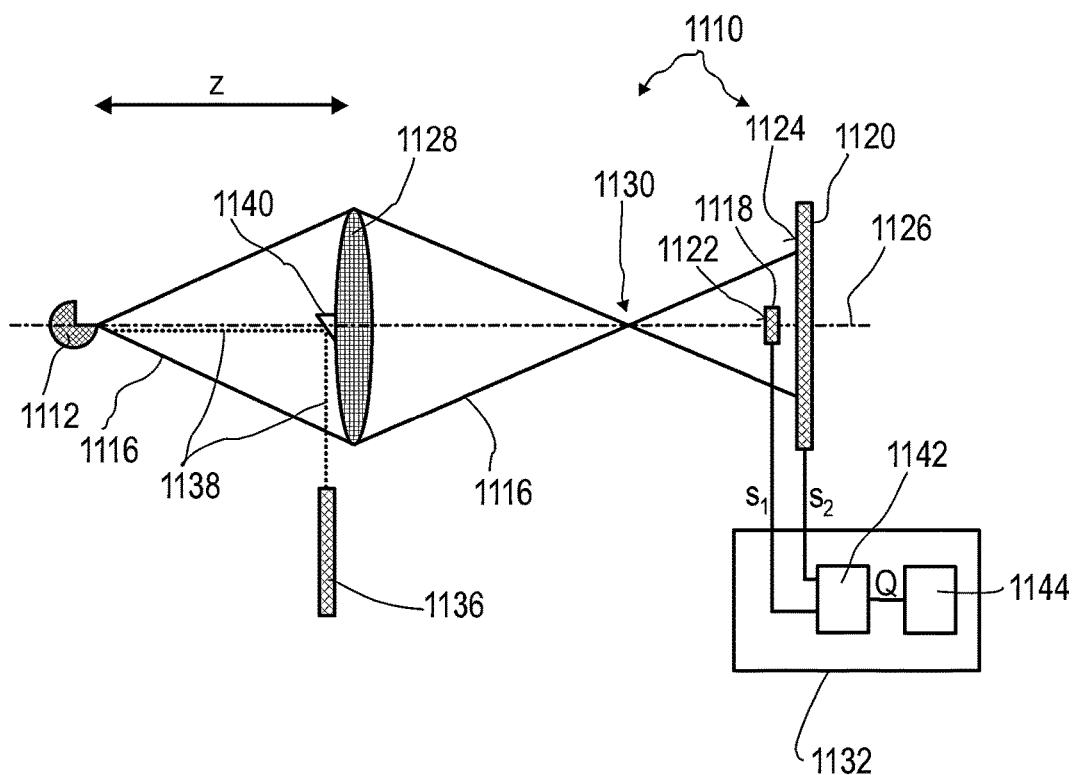

In FIG. 21, a modification of the embodiment of FIG. 20 is shown, which forms an alternative detector 1110. The alternative embodiment of the detector 1110 widely corresponds to the embodiment shown in FIG. 20. Instead of using an active light source, i.e. a beacon device 1114 with light-emitting properties for generating the light beam 1116, however, the detector 1110 may comprise at least one illumination source 1136. The illumination source 1136, as an example, may comprise a laser, whereas, in FIG. 20, as an example, the beacon device 1114 may comprise a light-emitting diode (LED). The illumination source 1136 may be configured for generating at least one illumination light beam 1138 for illuminating the object 1112. The illumination light beam 1138 may fully or partially be reflected by the object 1112 and may travel back towards the detector 1110, thereby forming the light beam 1116.

As shown in FIG. 20, as an example, the illumination light beam 1138 may be parallel to the optical axis 1126 of the detector 1110. Other embodiments, i.e. off-axis illumination and/or illumination at an angle, are feasible, too. In order to provide an on-axis illumination, as shown in FIG. 21, as an example, one or more reflective elements 1140 may be used, such as one or more prisms and/or mirrors, such as dichroitic mirrors, such as movable mirrors or movable prisms.

Apart from these modifications, the setup of the embodiment in FIG. 21 corresponds to the setup in FIG. 20. Thus, again, an evaluation device 1132 may be used, having, e.g., at least one divider 1142 for forming the quotient signal Q, and, as an example, at least one position evaluation device 1144, for deriving the at least one longitudinal coordinate z from the quotient signal Q. It shall be noted that the evaluation device 1132 may fully or partially be embodied in hardware and/or software. Thus, as an example, one or more of components 1142, 1144 may be embodied by appropriate software components.

It shall be further noted that the embodiments shown in FIGS. 20 and 21 simply provide embodiments for determining the longitudinal coordinate of the object 1112. As will be outlined in further detail below with reference to FIGS. 22A and 22B as well as to FIG. 23, the detector 1110 may also be used for providing additional information on at least one transversal coordinate of the object 1112 and/or of parts thereof.

Figure 22A:
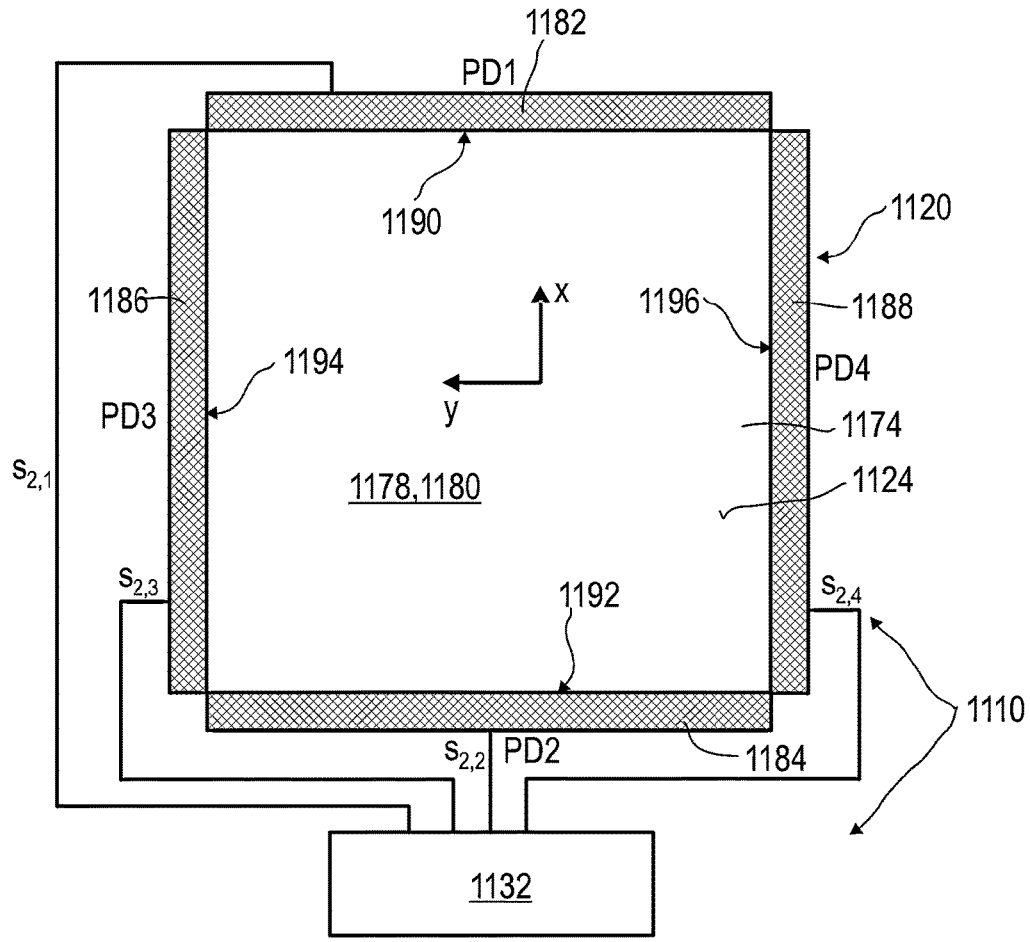
FIGS. 22A and 22B show different views of an exemplary embodiment of a second optical sensor which may be used in the present invention.
Figure 22B:
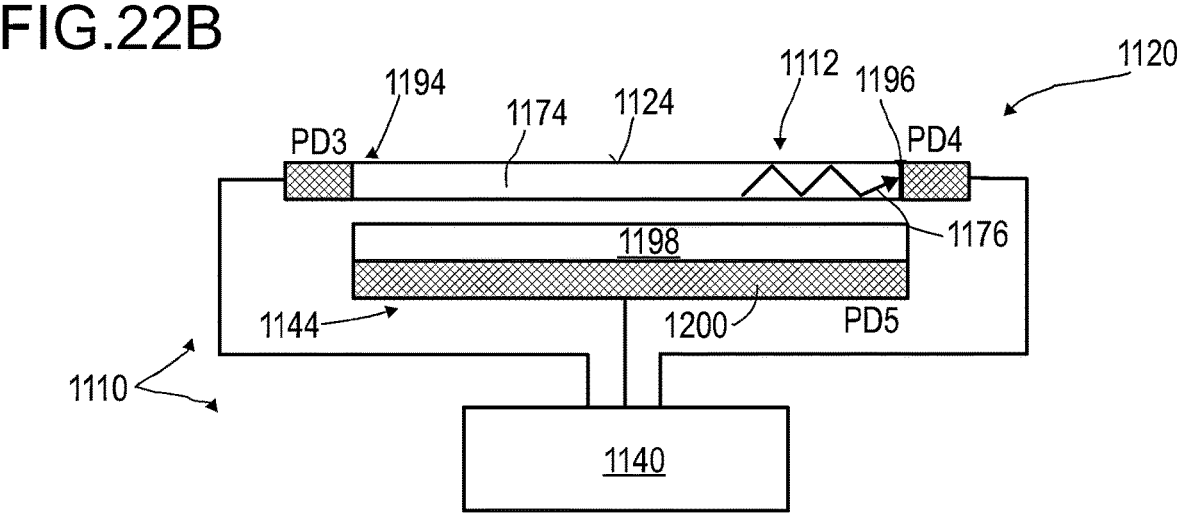

In FIGS. 22A and 22B, a top view (FIG. 22A) and a cross-sectional view of the second optical sensor 1120, which may be used in the setups e.g. of FIGS. 20 and/or 21, is shown. The second optical sensor 1120 may comprise a fluorescent waveguiding sheet 1174 which forms the second light-sensitive area 1124 facing towards the object 1112. The fluorescent waveguiding sheet 1174, in this exemplary embodiment, may be designed as a flat waveguiding sheet, in which, as symbolically depicted by the arrow 1176 in FIG. 22B, waveguiding by internal reflection may take place, specifically by internal total reflection, specifically a waveguiding of fluorescence light generated within the fluorescent waveguiding sheet 1174. The fluorescent waveguiding sheet 1174, as an example, may have a lateral extension of at least 25 mm², such as at least 100 mm², more preferably of at least 400 mm². As an example, a 10 mm×10 mm square sheet, a 20 mm×20 mm square sheet, a 50 mm×50 mm square sheet or another dimension may be used. It shall be noted, however, that non-square geometries or even non-rectangular geometries may be used, such as circular or oval geometries or polygonal geometries.

The fluorescent waveguiding sheet 1174, as an example, may comprise a matrix material 1178 and at least one fluorescent material 1180 disposed therein, such as at least one fluorophore, e.g. a fluorescent dye. For exemplary embodiments, reference may be made to the above-mentioned materials, such as one or more of the materials listed in WO 2012/168395 A1. As an example, the following fluorescent material may be used:

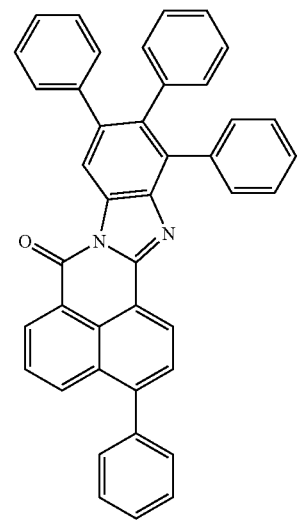 [SMILES: O=c1c2cccc3c(-c4ccccc4)ccc(c32)c2nc3c(-c4ccccc4)c(-c4ccccc4)c(-c4ccccc4)cc3n12]

This fluorescent material is disclosed as substance 34.2 in WO 2012/168395 A1, including potential synthesis methods. The material may be immersed in polystyrene, such as at a concentration of 0.001-0.5 wt. %. The fluorescent material 1180 may be designed to generate fluorescence light in response to an illumination by the light beam 1116.

The fluorescent material 1180 and/or the concentration of the fluorescent material 1180 within the matrix material 1178, specifically may be chosen to show linear properties, at least within a range of measurement, i.e. within a range of intensities, such that the total power of the fluorescence light generated in response to an excitation is a linear function of the intensity of the illumination by the excitation light, i.e. by the light beam 1116. As an example, the materials and/or intensities may be chosen such that saturation effects are avoided.

The second optical sensor 1120 further, in this embodiment, may comprise a plurality of photosensitive elements 1182, 1184, 1186, 1188, in FIGS. 22A and 22B referred to as PD1-PD4, located at respective edges 190, 192, 194, 196 of the fluorescent waveguiding sheet 174, e.g. rim portions of the fluorescent waveguiding sheet 1174. In this exemplary embodiment, the fluorescent waveguiding sheet 1174 may have a rectangular shape, such that pairs of edges are opposing each other, such as the pair of edges 1190, 1192 and the pair of edges 1194, 1196. The sides of the rectangular shape of the fluorescent waveguiding sheet 174 may define a Cartesian coordinate system, with an x-dimension defined by an interconnection between edges 1190 and 192, and a y-dimension defined by an interconnection between edges 1196, 1194, as indicated in FIG. 22A. It shall be noted, however, that other coordinate systems are feasible.

The photosensitive elements 1182, 1184, 1186, 1188, as an example, may comprise photodiodes. Specifically, these photosensitive elements 1182, 1184, 1186, 1188 may have, each, a comparable, preferably an identical, electrical capacity as the first optical sensor 1118. It shall be noted, however, that other embodiments are feasible. The photosensitive elements 1182, 1184, 1186, 1188, as an example, may be or may comprise strip-shaped photodiodes covering, preferably, the full length of the respective edges 1190, 1192, 1194, 1196, or, preferably, covering at least 50% or more preferably at least 70% of the length of these respective edges 1190, 1192, 1194, 1196. Other embodiments, however, are feasible, such as embodiments in which more than one photosensitive element is located at a respective edge.

The photosensitive elements 1182, 1184, 1186, 1188 each produce at least one sensor signal, in response to the light, specifically the fluorescence light, detected by these photosensitive elements 1182, 1184, 1186, 1188. All of these sensor signals are referred to as second sensor signals, wherein, in the following, PD1 creates sensor signal $s_{2,1}$, PD2 creates sensor signal $s_{2,2}$, PD3 creates sensor signal $s_{2,3}$, and PD4 creates sensor signal $s_{2,4}$, with the first index 2 denoting the fact that these sensor signals are second sensor signals, and with the second index, from 1 to 4, indicating the respective photosensitive element 1182, 1184, 1186, 1188 from which the respective sensor signal originates.

As outlined above in FIGS. 20 and 21, the at least one first sensor signal $s_1$ and the second sensor signals $s_{2,j}$ (with j=1, . . . , 4) are provided to the evaluation device 1132 of the detector 1110, the function of which will be explained in further detail below, specifically with reference to FIG. 24.

The evaluation device 1132 is configured to determine at least one longitudinal coordinate z of the object 1112, which is not depicted in these figures, and from which the light beam 1116 propagates towards the detector 1110, by evaluating the first and second sensor signals. Additionally as will be outlined in further detail below, at least one transversal coordinate x and/or y may be determined, as will also be outlined in further detail below, with reference to FIGS. 3 and 24.

The second optical sensor 1120, as depicted in FIG. 22B, may further optionally comprise at least one optical filter element 1198. The optical filter element 1198 may be placed in front of an optional reference photosensitive element 1200, which may further, with or without the optical filter element 1198, be present in the detector 1110. As an example, the reference photosensitive element 1200 may comprise a large area photodiode. Other setups, however, are feasible. Thus, it shall be noted, that the reference photosensitive element 1200 may also be left out in this embodiment, since the first optical sensor 1118 may also take over the functionality of the reference photosensitive element 1200. Specifically, in case a transparent fluorescent waveguiding sheet 1174 is used and in case the first optical sensor 1118 is placed behind the second optical sensor 1120, the first optical sensor 118 may also take over the functionality of the reference photosensitive element 1200. It shall further be noted that one or both of the first optical sensor 1118 and the second optical sensor 1120 may be a uniform optical sensor, having a single light-sensitive area 1122, 1124, each, or that one or both of these optical sensors 1118, 1120 may be pixelated.

As an example, the at least one optical filter element 1198 may be designed to prevent fluorescence light from entering the reference photosensitive element 1200 or, at least, may attenuate fluorescence light by at least 70%, or, preferably, by at least 80%.

Figure 23:
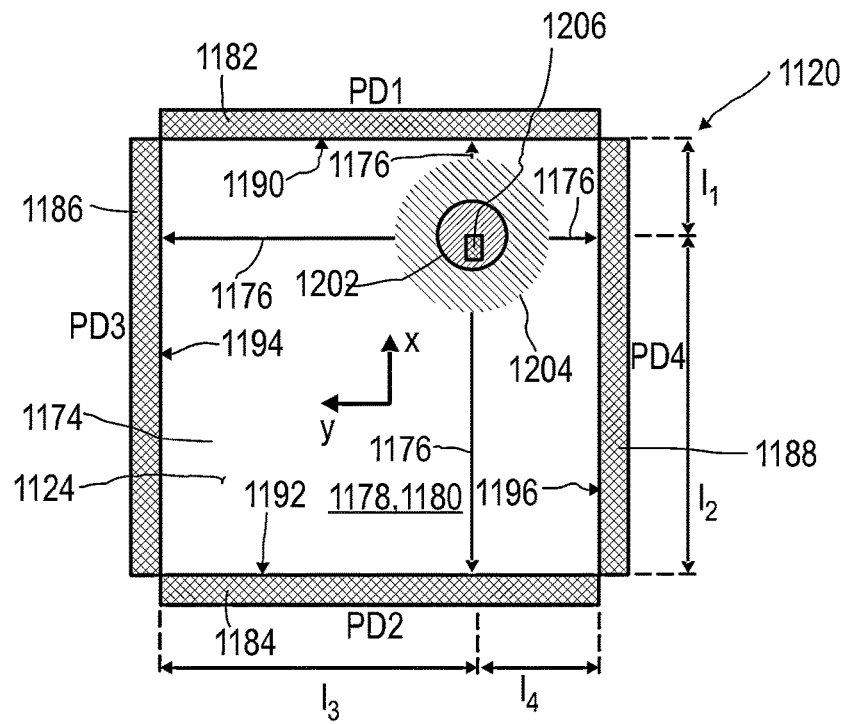
FIG. 23 shows a top view onto the light-sensitive area of the second optical sensor shown in FIGS. 22A and 22B, with a light spot generated by a light beam.

In FIG. 23, an illumination of the second light-sensitive area 1124 by the light beam 1116 is shown. Therein, two different situations are depicted, representing different distances between the object 1112 and from which the light beam 1116 propagates towards the detector 1110, and the detector 1110 itself, resulting in two different spot sizes of light spots generated by the light beam in the fluorescent waveguiding sheet 1174. Firstly, a small light spot 1202 and, secondly, a large light spot 1204. In both cases, the overall power of the light beam remains the same over light spots 1202, 1204. Further, a shadow 1206 is depicted, which is generated by the first optical sensor 118 being placed in front of the second optical sensor 1120. In the following, it is assumed that the first optical sensor 1118 is still fully illuminated by the light beam 1116.

The illumination by the light beam 1116 induces fluorescence which, as depicted in FIG. 22B above, is fully or partially transported by waveguiding towards the photosensitive elements 1182, 1184, 1186, 1188. As indicated above, corresponding second sensor signals are generated by these photosensitive elements, and are provided to the evaluation device 1132, in conjunction with the first sensor signal and, optionally, further in conjunction with at least one reference sensor signal generated by the at least one reference photosensitive element 1200.

Figure 24:
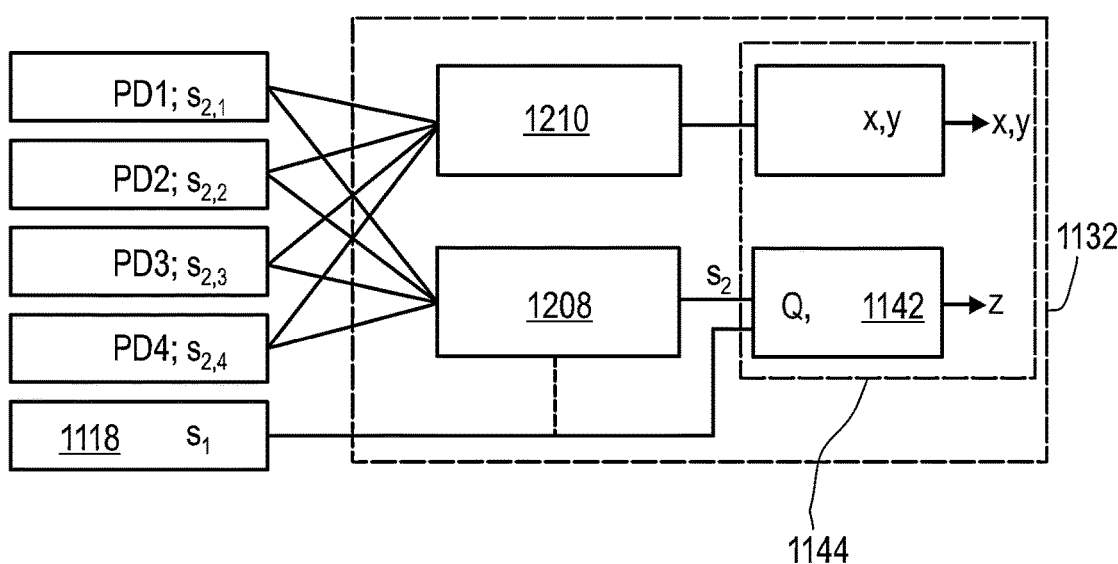
FIG. 24 shows a further exemplary schematic setup of an evaluation device.

The evaluation device 1132, as symbolically depicted in FIG. 24, is designed to evaluate the sensor signals which, therein, are represented as outlined above. The sensor signals may be evaluated by the evaluation device in various ways, in order to determine a location information and/or a geometrical information of the object 1112, such as at least one longitudinal coordinate z of the object 1112 and, optionally, one or more transversal coordinates of the object 1112.

Firstly, the evaluation device 1132 may comprise at least one summing device 1208 configured to form a sum signal S of the sensor signals PD1 to PD4, such as according to formula (1) above, for the second sensor signals $s_{2,i}$, with i=1, . . . , 4 (the first index, for the sake of simplicity, is left out in the above-mentioned formula (1)). This sum signal S may replace the second sensor signal $s_2$ in general and/or, for a part of the further evaluation, may be used as "the" second sensor signal of the second optical sensor 1120. This sum signal S may represent the total power of the fluorescence light generated by the light beam 1116. Even though, some losses may occur, since, generally, not all of the fluorescence light will actually reach the photosensitive elements 1182, 1184, 1186, 1188. Thus, as an example, losses in waveguiding may occur, or some of the fluorescence light may actually be emitted from the edges 1190, 1192, 1194, 1196, in a direction which is not covered by the photosensitive elements 1182, 1184, 1186, 188. Still, the sum signal S provides a fairly good measure for the total power of the fluorescence generated within the fluorescent waveguiding sheet 1174.

The evaluation device 1132 may comprise at least one divider 1142 which, as symbolically depicted in FIG. 24, may be part of a position evaluation device 1144 and which may be configured for forming at least one quotient signal out of the first and second sensor signals $s_1$, $s_2$, with $s_2$, as an example, being the sum signal S of the respective second sensor signals, as outlined above. Thus, as an example, the divider 1142 may be configured for one or more of dividing the first and second sensor signals, dividing multiples of the first and second sensor signals or dividing linear combinations of the first and second sensor signals. The position evaluation device 1144 further may be configured for determining the at least one longitudinal coordinate z by evaluating the quotient signal Q, such as by using at least one predetermined or determinable relationship between the quotient signal Q and the longitudinal coordinate. As an example, calibration curves may be used. The divider 1142 and/or the position evaluation device 1144 may, as an example, comprise at least one data processing device, such as at least one processor, at least one DSP, at least one FPGA and/or at least one ASIC. Further, for storing the at least one predetermined or determinable relationship between the longitudinal coordinate z and the quotient signal, at least one data storage device may be provided, such as for providing one or more look-up tables for storing the predetermined relationship.

As outlined above, additional information may be derived from the second sensor signals $s_{2,1}$, $s_{2,2}$, $s_{2,3}$ and $s_{2,4}$, besides the at least one longitudinal coordinate z of the object. Thus, additionally, at least one transversal coordinate x, y may be derived. This is mainly due to the fact that the distances between a center of the light spots 1202, 1204 and the photosensitive elements 1182, 1184, 1186, 1188 are non-equal. Thus, the center of the light spot 1202, 1204 has a distance from the photosensitive element 1182 of $l_1$, a distance from the photosensitive element 1184 of $l_2$, from the photosensitive element 1186 of $l_3$ and from the photosensitive element 1188 of $l_4$. Due to the differences in these distances between the location of the generation of the fluorescence light and the photosensitive elements detecting said fluorescence light, the sensor signals will differ. This is due to various effects. Firstly, again, internal losses will occur during waveguiding, since each internal total reflection implies a certain loss, such that the fluorescence light will be attenuated on its way, depending on the length of the path. The longer the distance of travel, the higher the attenuation and the higher the losses. Further, absorption effects will occur. Thirdly, a spreading of the light will have to be considered. The longer the distance between the light spot 1202, 1204 to the respective photosensitive element 1182, 1184, 1186, 1188, the higher the probability that a photon will be directed into a direction other than the photosensitive element. Consequently, by comparing the sensor signals of the photosensitive elements 1182, 1184, 1186, 1188, at least one item of information on a transversal coordinate of the light spot 1202, 1204 and, thus, of the object 1112 may be generated.

The comparison of the sensor signals may take place in various ways. Thus, generally, the evaluation device 1132 may be designed to compare the sensor signals in order to derive the at least one transversal coordinate of the object 1112 and/or of the light spot 1202, 1204. As an example, the evaluation device 1132 may comprise at least one subtracting device 1210 and/or any other device which provides a function which is dependent on at least one transversal coordinate, such as on the coordinates x, y, of the object 1112. For exemplary embodiments, the subtracting device 1210 and/or any other device may provide a function which is dependent on at least one transversal coordinate, such as on the coordinates x, y. For exemplary embodiments, the subtracting device 1210 may be designed to generate at least one difference signal, such as a signal according to formula (4) and/or (5) above, for one or each of dimensions x, y in FIG. 23. As an example, a simple difference between PD1 and PD2, such as PD1−PD2/(PD1+PD2) may be used, as a measure for the x-coordinate, and a difference between PD3 and PD4, such as (PD3−PD4)/(PD3+PD4), may be used as measure for the y-coordinate. A transformation of the transversal coordinates of the light spot 1202, 1204 in the plane of the second light-sensitive area 1124, as an example, into transversal coordinates of the object from which the light beam 1116 propagates to the detector 1110, may simply be made by using the well-known lens equation. For further details, as an example, reference may be made to WO 2014/097181 A1.

It shall be noted, however, that other transformations or other algorithms for processing the sensor signals by evaluating device 1140 are feasible. Thus, besides subtractions or the linear combinations with positive or negative coefficients, non-linear transformations are generally feasible. As an example, for transforming the sensor signals into z-coordinates and/or x, y-coordinates, one or more known or determinable relationships may be used, which, as an example, may be derived empirically, such as by calibrating experiments with the object placed at various distances from the detector 1110 and/or by calibrating experiments with the object placed at various transversal positions or three-dimensional positions, and by recording the respective sensor signals.

Figure 25:
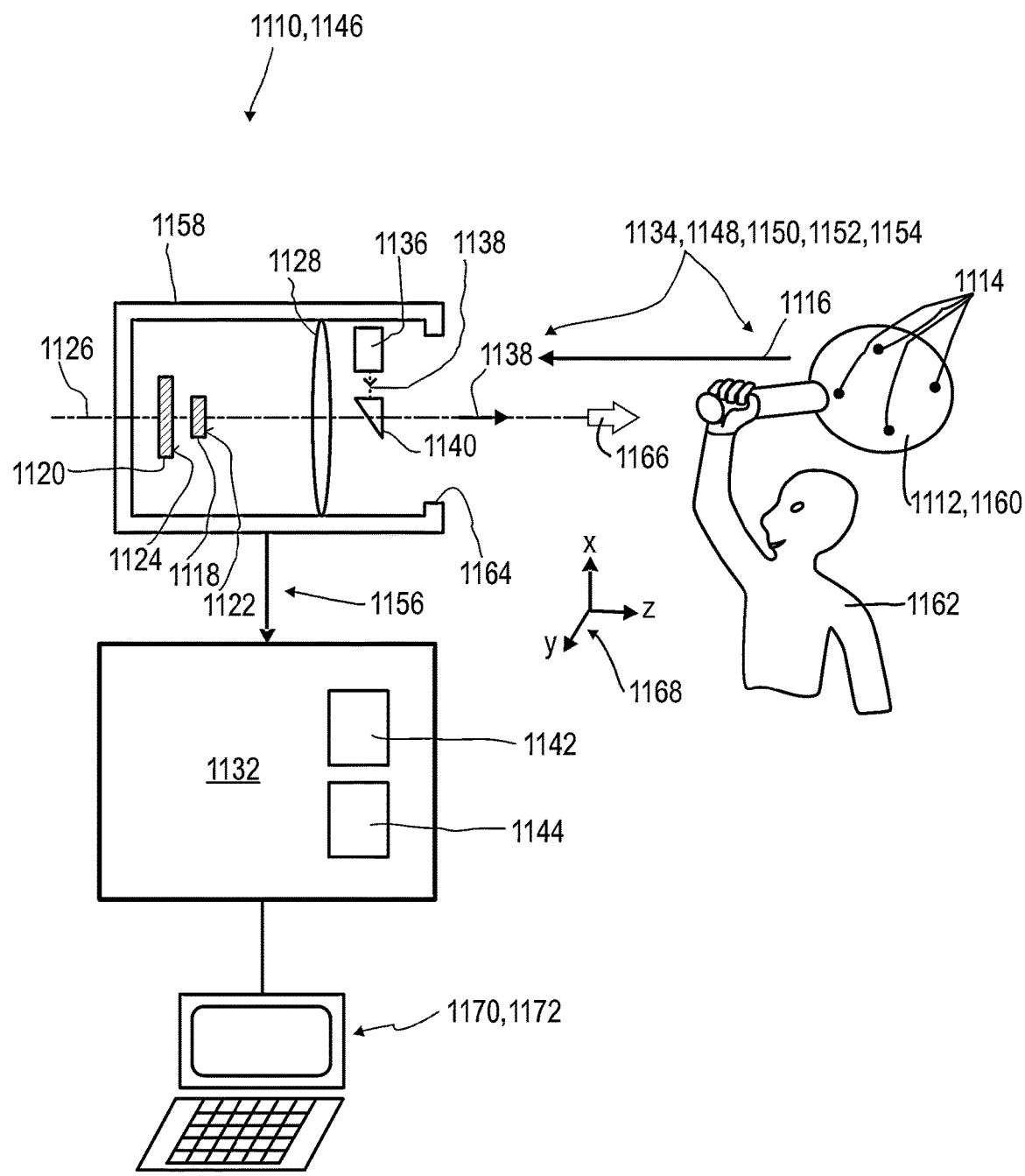
FIG. 25 shows a further exemplary embodiment of a detector according to the present invention, a detector system, a human-machine interface, an entertainment device, a tracking system, a scanning system and a camera.

FIG. 25 shows, in a highly schematic illustration, an exemplary embodiment of a detector 1110, e.g. according to the embodiments shown in FIG. 20 or 21. The detector 1110 specifically may be embodied as a camera 1146 and/or may be part of a camera 1146. The camera 1146 may be made for imaging, specifically for 3D imaging, and may be made for acquiring standstill images and/or image sequences such as digital video clips. Other embodiments are feasible.

FIG. 25 further shows an embodiment of a detector system 1134, which, besides the at least one detector 1110, comprises one or more beacon devices 1114, which, in this example, may be attached and/or integrated into an object 1112, the position of which shall be detected by using the detector 1110. FIG. 25 further shows an exemplary embodiment of a human-machine interface 1148, which comprises the at least one detector system 1134 and, further, an entertainment device 1150, which comprises the human-machine interface 1148. The figure further shows an embodiment of a tracking system 1152 for tracking a position of the object 1112, which comprises the detector system 1134. The components of the devices and systems shall be explained in further detail below.

FIG. 25 further shows an exemplary embodiment of a scanning system 1154 for scanning a scenery comprising the object 1112, such as for scanning the object 1112 and/or for determining at least one position of the at least one object 1112. The scanning system 1154 comprises the at least one detector 1110, and, further, optionally, the at least one illumination source 1136 as well as, optionally, at least one further illumination source 1136. The illumination source 1136, generally, is configured to emit at least one illumination light beam 1138, such as for illumination of at least one dot, e.g. a dot located on one or more of the positions of the beacon devices 1114 and/or on a surface of the object 1112. The scanning system 1154 may be designed to generate a profile of the scenery including the object 1112 and/or a profile of the object 1112, and/or may be designed to generate at least one item of information about the distance between the at least one dot and the scanning system 1154, specifically the detector 1110, by using the at least one detector 1110. In FIG. 13, as an example, one or more reflective elements 1140 may be used, for example partially transparent, such as one or more prisms and As outlined above, an exemplary embodiment of the detector 1110 which may be used in the setup of FIG. 25 is shown in FIGS. 20 and 21. Thus, the detector 1110, besides the optical sensors 1118, 1120, comprises at least one evaluation device 1132, having e.g. the at least one divider 1142 and/or the at least one position evaluation device 1144, as symbolically depicted in FIG. 25. The components of the evaluation device 1132 may fully or partially be integrated into a distinct device and/or may fully or partially be integrated into other components of the detector 1110. Besides the possibility of fully or partially combining two or more components, one or more of the optical sensors 1118, 1120 and one or more of the components of the evaluation device 1132 may be interconnected by one or more connectors 1156 and/or by one or more interfaces, as symbolically depicted in FIG. 25. Further, the one or more connectors 1156 may comprise one or more drivers and/or one or more devices for modifying or preprocessing sensor signals. Further, instead of using the at least one optional connector 1156, the evaluation device 1132 may fully or partially be integrated into one or both of the optical sensors 1118, 1120 and/or into a housing 1158 of the detector 1110. Additionally or alternatively, the evaluation device 1132 may fully or partially be designed as a separate device.

In this exemplary embodiment, the object 1112, the position of which may be detected, may be designed as an article of sports equipment and/or may form a control element or a control device 1160, the position of which may be manipulated by a user 1162. As an example, the object 1112 may be or may comprise a bat, a racket, a club or any other article of sports equipment and/or fake sports equipment. Other types of objects 1112 are possible. Further, the user 1162 himself or herself may be considered as the object 1112, the position of which shall be detected.

As outlined above, the detector 1110 comprises at least the optical sensors 1118, 1120. The optical sensors 1118, 1120 may be located inside the housing 1158 of the detector 1110. Further, the at least one transfer device 1128 may be comprised, such as one or more optical systems, preferably comprising one or more lenses.

An opening 1164 inside the housing 1158, which, preferably, is located concentrically with regard to the optical axis 1126 of the detector 1110, preferably defines a direction of view 1166 of the detector 1110. A coordinate system 1168 may be defined, in which a direction parallel or anti-parallel to the optical axis 1126 may be defined as a longitudinal direction, whereas directions perpendicular to the optical axis 1126 may be defined as transversal directions. In the coordinate system 1128, symbolically depicted in FIG. 25, a longitudinal direction is denoted by z, and transversal directions are denoted by x and y, respectively. Other types of coordinate systems 1168 are feasible, such as non-Cartesian coordinate systems.

The detector 1110 may comprise the optical sensors 1118, 1120 as well as, optionally, further optical sensors. The optical sensors 1118, 1120 preferably are located in one and the same beam path, one behind the other, such that the first optical sensor 1118 covers a portion of the second optical sensor 1120. Alternatively, however, a branched beam path may be possible, with additional optical sensors in one or more additional beam paths, such as by branching off a beam path for at least one transversal detector or transversal sensor for determining transversal coordinates of the object 1112 and/or of parts thereof.

One or more light beams 1116 are propagating from the object 1112 and/or from one or more of the beacon devices 1114, towards the detector 1110. The detector 1110 is configured for determining a position of the at least one object 1112. For this purpose, as explained above in the context of FIGS. 20 to 23, the evaluation device 1132 is configured to evaluate sensor signals provided by the optical sensors 1118, 1120. The detector 1110 is adapted to determine a position of the object 1112, and the optical sensors 1118, 1120 are adapted to detect the light beam 1116 propagating from the object 1112 towards the detector 1110, specifically from one or more of the beacon devices 1114. In case no illumination source 1136 is used, the beacon devices 1114 and/or at least one of these beacon devices 1114 may be or may comprise active beacon devices with an integrated illumination source such as a light-emitting diode. In case the illumination source 1136 is used, the beacon devices 1114 do not necessarily have to be active beacon devices. Contrarily, a reflective surface of the object 1112 may be used, such as integrated reflected beacon devices 1114 having at least one reflective surface. The light beam 1116, directly and/or after being modified by the transfer device 1128, such as being focused by one or more lenses, illuminates the light-sensitive areas 1122, 1124 of the optical sensors 1118, 1120. For details of the evaluation, reference may be made to FIGS. 20 to 23 above.

As outlined above, the determination of the position of the object 1112 and/or a part thereof by using the detector 1110 may be used for providing a human-machine interface 1148, in order to provide at least one item of information to a machine 1170. In the embodiments schematically depicted in FIG. 25, the machine 1170 may be a computer and/or may comprise a computer. Other embodiments are feasible. The evaluation device 1132 may even be fully or partially integrated into the machine 1170, such as into the computer.

As outlined above, FIG. 25 also depicts an example of a tracking system 1152, configured for tracking the position of the at least one object 1112 and/or of parts thereof. The tracking system 1152 comprises the detector 1110 and at least one track controller 1172. The track controller 1172 may be adapted to track a series of positions of the object 1112 at specific points in time. The track controller 1172 may be an independent device and/or may be fully or partially integrated into the machine 1170, specifically the computer, as indicated in FIG. 25 and/or into the evaluation device 1132.

Similarly, as outlined above, the human-machine interface 1148 may form part of an entertainment device 1150. The machine 1170, specifically the computer, may also form part of the entertainment device 1150. Thus, by means of the user 1162 functioning as the object 1112 and/or by means of the user 1162 handling a control device 1160 functioning as the object 1112, the user 1162 may input at least one item of information, such as at least one control command, into the computer, thereby varying the entertainment functions, such as controlling the course of a computer game.

Figure 26A:
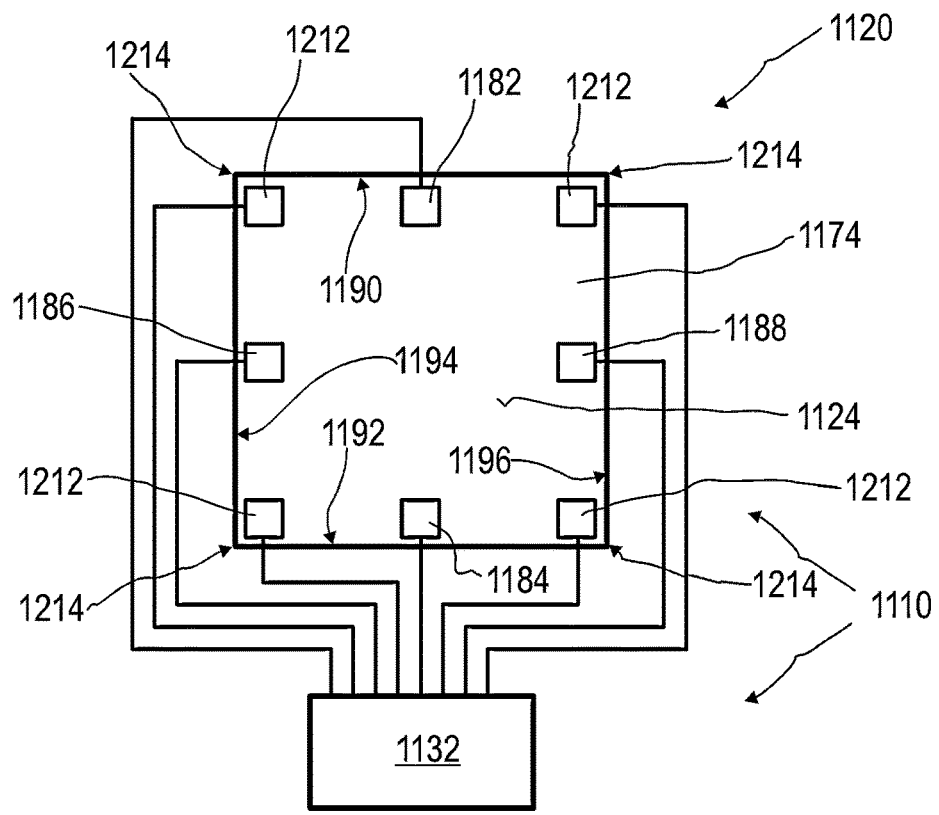
FIGS. 26A and 26B show an alternative embodiment of a second optical sensor which may be used in the present invention.
Figure 26B:
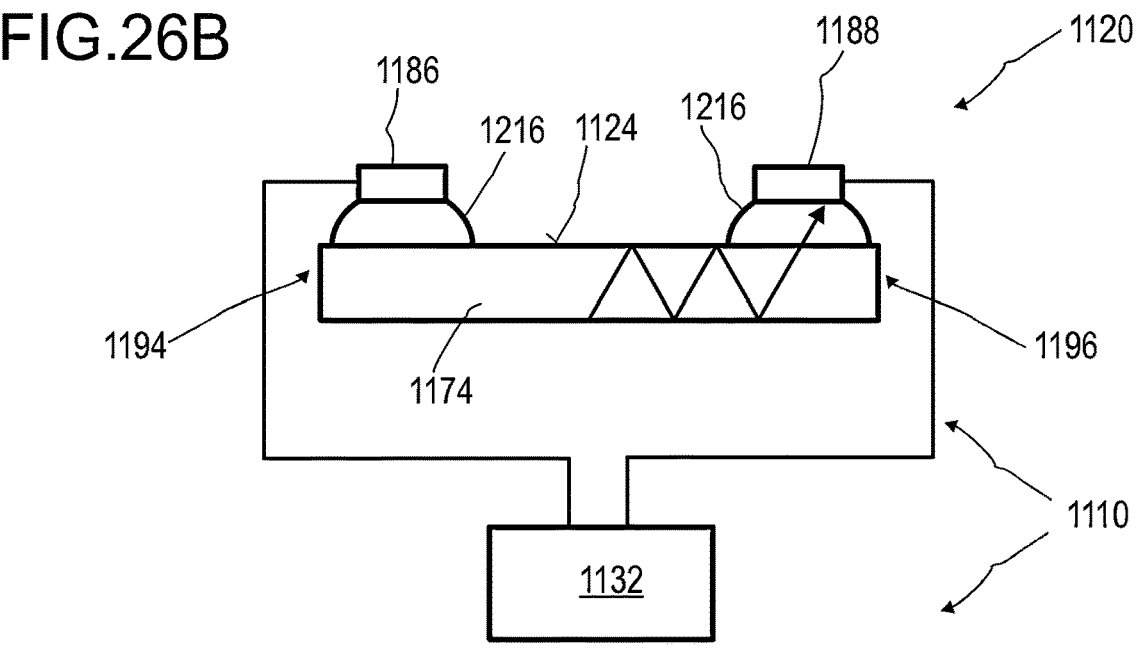

In FIGS. 26A and 26B, an alternative embodiment of the second optical sensor 1120 is shown, in a top view (FIG. 26A) and in a cross-sectional view (FIG. 26B). For most of the details of the second optical sensor 1120, reference may be made to FIGS. 22A and 22B above. The embodiment, however, shows various variations from the embodiment of FIGS. 22A and 22B, which may be realized in an isolated fashion or in combination.

Thus, firstly, the embodiment shows variations of the placement of the photosensitive elements. Besides the photosensitive elements 1182, 1184, 1186, 1188 located at opposing edges 1190, 1192, 1194, 1196, which, in this embodiment, are straight edges, additional photosensitive elements 1212 are located at corners 1214 of the fluorescent waveguiding sheet 1174. The edges 1190, 1192, 1194, 1196 in combination may form a rim of the fluorescent waveguiding sheet 1174, such as a rectangular rim. The rim itself may be roughened or even blackened in order to avoid back reflections from the rim. The corners 1214 also are part of the edges of the fluorescent waveguiding sheet 1174. The photosensitive elements 1212 located at the corners 1214 may provide additional second sensor signals which may be evaluated in a similar fashion as shown e.g. in FIG. 24. They may provide an increased accuracy of the determination of the z-coordinate and/or of the x, y-coordinate. Thus, as an example, these additional sensor signals may be included in the sum signal, such as formed by using formula (1) above. Additionally or alternatively, these additional sensor signals may be implemented into the formation of difference signals, such as according to formulae (2) and/or (3) above. As an example, difference signals between two photosensitive elements 1212 located at opposing corners 1214 may be formed and/or difference signals between one photosensitive element 1212 located at a corner 1214 and one photosensitive element located at a straight edge, e.g. a straight rim portion, may be formed. The difference signal D, in each case, may denote a location of the light spot on an axis interconnecting the two photosensitive elements.

Further, the embodiment of FIGS. 26A and 26B shows a variation of the placement of the photosensitive elements 1182, 1184, 1186, 1188, 1212 with respect to the fluorescent waveguiding sheet 1174. Thus, in the embodiment of FIGS. 22A and 22B, the photosensitive elements 1182, 1184, 1186, 1188 may be located within the plane of the fluorescent waveguiding sheet 1174. Additionally or alternatively, as shown in the embodiment of FIGS. 26A and 26B, some or even all of the photosensitive elements 1182, 1184, 1186, 1188, 1212 may be located outside the plane of the fluorescent waveguiding sheet 1174. Specifically, as shown in the cross-sectional view of FIG. 26B, as an example, the photosensitive elements 1182, 1184, 1186, 1188, 1212 may be optically coupled to the fluorescent waveguiding sheet 1174 by optical coupling elements 1216. As an example, the photosensitive elements 1182, 1184, 1186, 1188, 1212 simply may be glued to the fluorescent waveguiding sheet 1174 by using one or more transparent adhesives, such as an epoxy adhesive.

Further, the embodiment of FIGS. 26A and 26B shows a variation of the size and shape of the photosensitive elements 1182, 1184, 1186, 1188, 1212. Thus, the photosensitive elements 1182, 1184, 1186, 1188, 1212 do not necessarily have to be strip-shaped photosensitive elements. As an example, very small photodiodes may be used, such as rectangular photodiodes or even point-like or spot-like photodiodes. As outlined above, a small size of the photodiodes generally may lead to a lower electrical capacitance and, thus, may lead to a faster response of the second optical sensor 1120.

Further, the embodiment of FIGS. 26A and 26B shows that no reference photosensitive element 1200 is necessary. Thus, as discussed above, the sum signal itself may replace the function of the reference photosensitive element 1200. Thus, the second optical sensor 1120 as shown in the embodiment of FIGS. 26A and 26B provides a fully functional and, optionally, transparent PSD. No further PSDs are required.

Figure 27A:
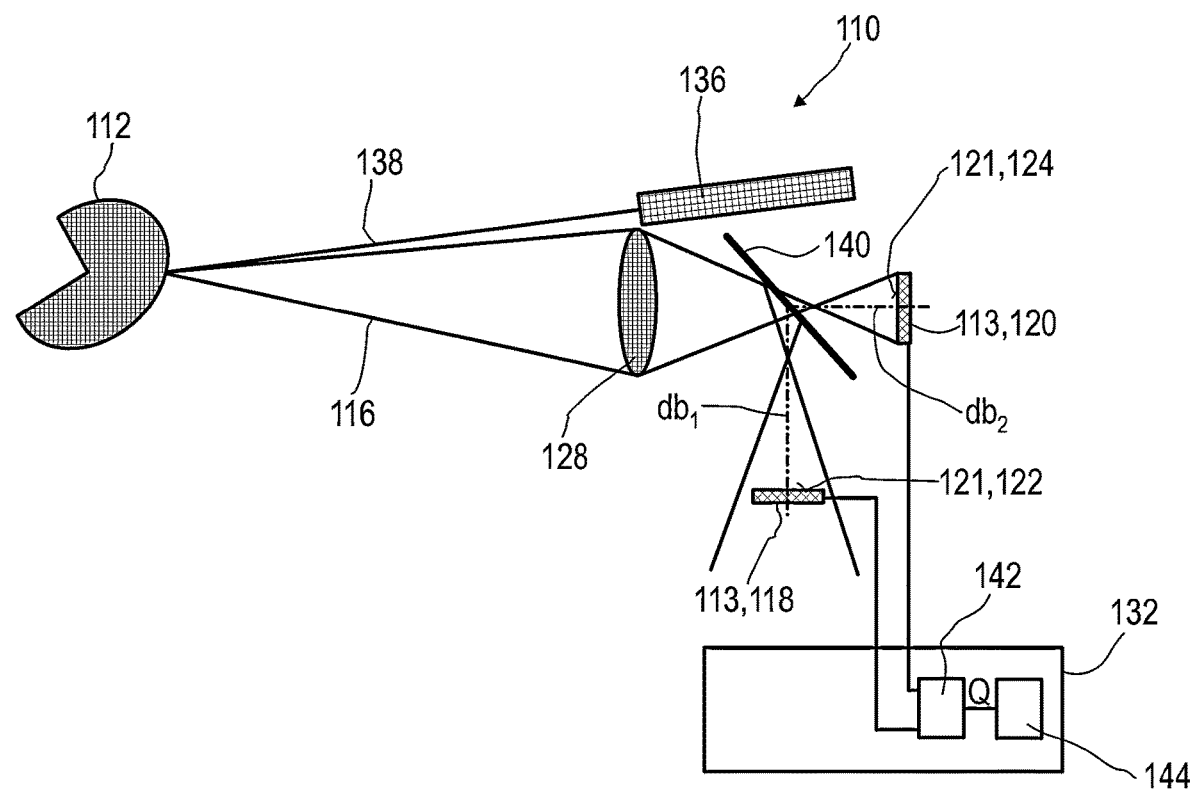
FIGS. 27A and 27 B show further exemplary embodiments of a detector according to the present invention.
Figure 27B:
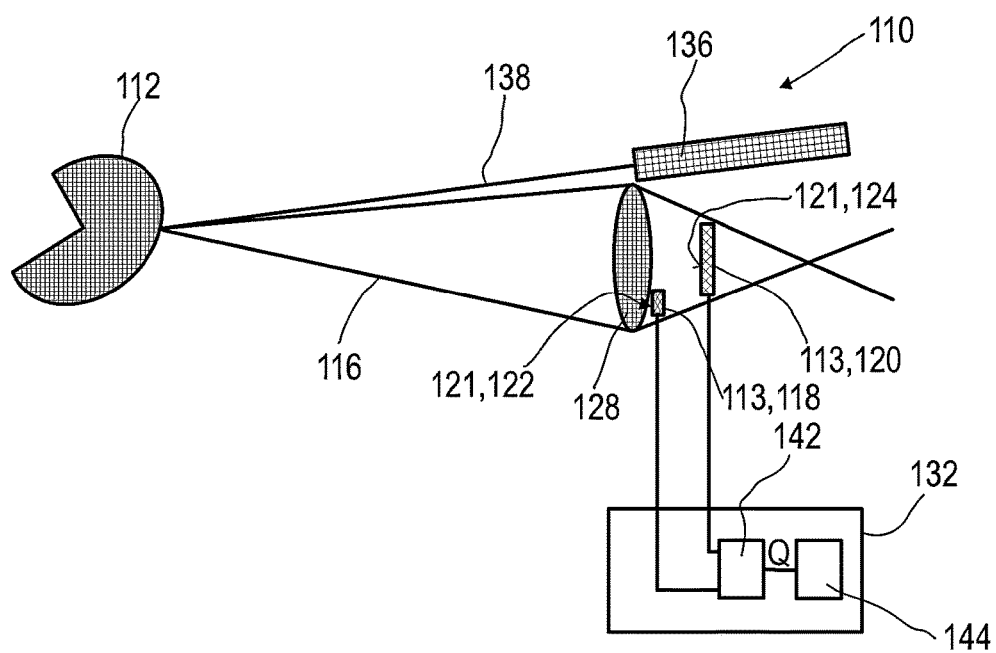

FIGS. 27A and 27B show a schematic view of a further exemplary embodiment of a detector 110 according to the present invention. In FIG. 27A, the detector 110 comprises at least two optical sensors 113, for example a first optical sensor 118 and a second optical sensor 120, each having at least one light-sensitive area 121. The optical detector 110, further, comprises at least one transfer device 128, such as at least one lens or a lens system, specifically for beam shaping. The transfer device 128 has an optical axis 129, wherein the transfer device 128 and the optical detector preferably may have a common optical axis. The detector 110 may comprise at least one illumination source 136. The illumination source 136, as an example, may comprise a laser source. The illumination source 136 may be arranged such that the illumination light beam 138 is one or both of non-parallel to the optical axis 126, but off-axis, or shifted from the optical axis 126. The illumination source 136 may be configured for generating at least one illumination light beam 138 for illuminating the object 112. The illumination light beam 138 is fully or partially reflected by the object 112 and travels back towards the detector 110, thereby forming the light beam 116. The light beam 116 propagates from the object 112 towards the first optical sensor 118 and the second optical sensor 120. The first optical sensor 118 may comprise a first light-sensitive area 122, and the second optical sensor 120 may comprise a second light-sensitive area 124. In this embodiment the optical sensors 118, 120 may be arranged such that the light-sensitive areas 122, 124 have identical surface areas. For example, the optical sensors 118, 120 may be identical. The detector 110 may further comprise the reflective element 140, such as at least one beam splitter, which is adapted to lead the light beam 116 from the transfer device 128 to both of the optical sensors 118, 120. The first optical sensor 118 may have a distance $db_1$ from the beam splitter and the second optical sensor 120 may have a distance $db_2$ from the beam splitter, wherein $db_1 \neq db_2$. Again, an evaluation device 132 may be used, having, e.g., at least one divider 142 for forming the quotient signal Q, and, as an example, at least one position evaluation device 144, for deriving the at least one longitudinal coordinate z from the quotient signal Q. It shall be noted that the evaluation device 132 may fully or partially be embodied in hardware and/or software. Thus, as an example, one or more of components 142, 144 may be embodied by appropriate software components.

In FIG. 27 B, the detector 110 comprises at least two optical sensors 113, for example a first optical sensor 118 and a second optical sensor 120, each having at least one light-sensitive area 121. The optical detector 110, further, may comprise at least one transfer device 128, such as at least one lens or a lens system. The transfer device 128 has an optical axis 129, wherein the transfer device 128 and the optical detector preferably may have a common optical axis. The detector 110 may comprise at least one illumination source 136. The illumination source 136, as an example, may comprise a laser source, for example with a 1550 nm laser source. The illumination source 136 may be arranged such that the illumination light beam 138 is one or both of non-parallel to the optical axis 126, but off-axis, or shifted from the optical axis 126. The illumination source 136 may be configured for generating at least one illumination light beam 138 for illuminating the object 112. The illumination light beam 138 is fully or partially reflected by the object 112 and travels back towards the detector 110, thereby forming the light beam 116. The light beam 116 propagates from the object 112 towards the first optical sensor 118 and the second optical sensor 120. The first optical sensor 118 may comprise the first light-sensitive area 122, and the second optical sensor 120 may comprise the second light-sensitive area 124. As can be seen in FIG. 27B, the first optical sensor 118 is a small optical sensor, whereas the second optical sensor 120 is a large optical sensor. The optical sensors 118, 120 may be Ge-sensors. The first optical sensor 118 may have a first distance from the transfer device 128 and the second optical sensor 120 may have a second distance from the transfer device 128. In FIG. 27B, the first optical sensor 118 may be close to the transfer device 128, whereas the second optical sensor 120 may be arranged further away in direction to the focus. The first optical sensor 118 may be arranged such that, independent from a distance from the object, a sensor signal of the first optical sensor 118 may be proportional to the total power of the light beam passing the transfer device 128. Again, an evaluation device 132 may be used, having, e.g., at least one divider 142 for forming the quotient signal Q, and, as an example, at least one position evaluation device 144, for deriving the at least one longitudinal coordinate z from the quotient signal Q. It shall be noted that the evaluation device 132 may fully or partially be embodied in hardware and/or software. Thus, as an example, one or more of components 142, 144 may be embodied by appropriate software components.

Figure 28:
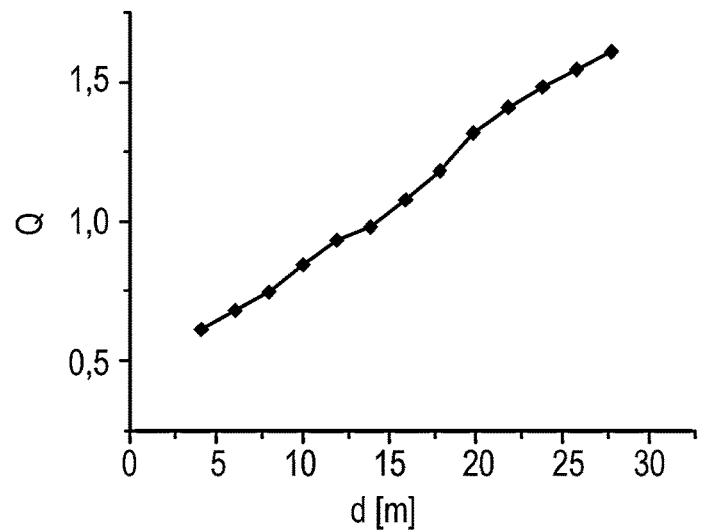
FIG. 28 shows experimental results of a distance determination with a detector according to the present invention.

In FIG. 28 experimental results of a distance determination with the detector 110 is shown. In this experimental setup, the transfer device 128 was a plano-convex lens having a focal length of 150 mm, a diameter of 75 mm and coated with an anti-reflective coating for a range of 1050-1700 nm, available as Thorlabs LA1002-C. The object 112, in this case a piece of carpet, was illuminated by a laser diode with 30 mW CW-power output at a wavelength of 1550 nm, available as Schäfter+Kirchhoff 55 cm-1550-30-Q04-T12-C-6. The illumination source 136 was placed laterally next to the transfer device and was operated at 367 Hz with a 50:50 rectangle modulation. A second optical sensor 120, in this experimental setup, a Ge photodiode with dimensions of 10 mm×10 mm, available as Thorlabs FDG1010, was arranged directly on the transfer device, and a first optical sensor 118 having a diameter of 5 mm, available as Thorlabs FDG05 was placed with a distance of 0.85 m from the transfer device 128. FIG. 28 shows a dependency of distance d in m, corresponding to the longitudinal coordinate z of the object, of the determined quotient signal Q.

Figure 29:
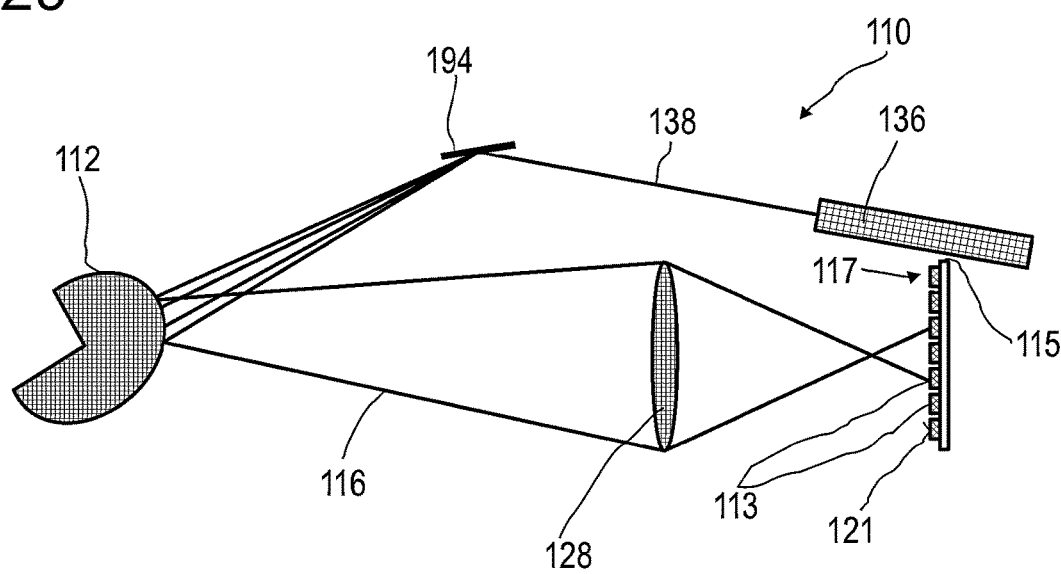
FIG. 29 shows a further exemplary embodiment of a detector according to the present invention.
Figure 30:
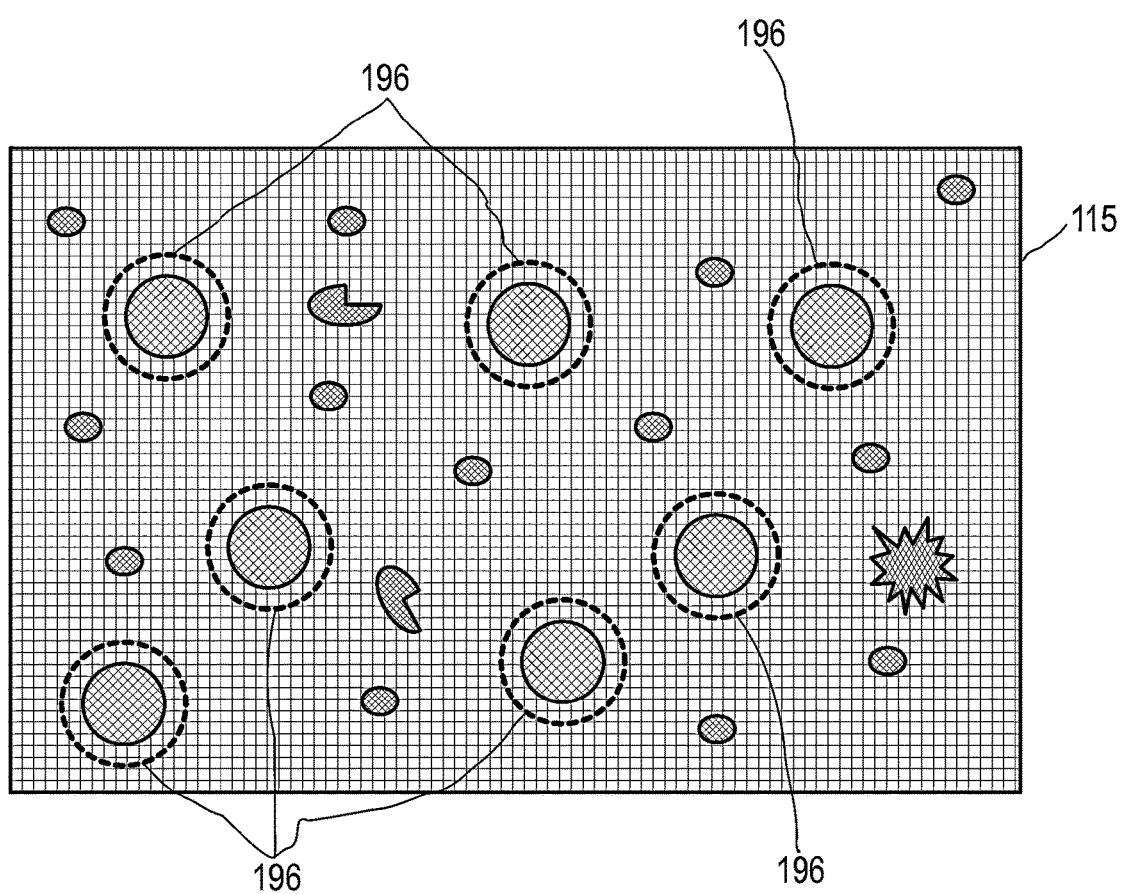
FIG. 30 shows an exemplary cloud of points impinging on a sensor element.

In FIG. 29, a further exemplary embodiment of the detector 110 is depicted. For details of the optical sensor 113 reference is made to FIG. 6 above. As in FIGS. 27A and B, the illumination source 136 may be positioned off-axis. The illumination source 136 may be adapted to generate and/or to project a cloud of points, for example the illumination source 136 may comprise one optical element 194, in particular one or more optical elements selected from the group consisting of at least one digital light processing (DLP) projector, at least one LCoS projector, at least one spatial light modulator; at least one diffractive optical element; at least one array of light emitting diodes; at least one array of laser light sources. The sensor element 115 may comprise a matrix 117 of optical sensors 113, each optical sensor 113 having at least one light-sensitive area 121 facing the object 112. The sensor element 115 may comprise at least one CMOS sensor. In FIG. 30, schematically the cloud of points impinging on the sensor element 115 is depicted. Additionally, disturbances may be present on the matrix 117 such as disturbances due to speckles and/or extraneous light and/or multiple reflections. The evaluation device 132 may be adapted to determine at least one region of interest 196, for example one or more pixels illuminated by the light beam 116 which are used for determination of the longitudinal coordinate of the object 112. In FIG. 30, regions of interest 196 are shown exemplary as circular areas with dashed lines. For example, the evaluation device 132 may be adapted to perform a filtering method, for example, a blob-analysis and/or object recognition method.

FIGS. 31A to O show further exemplary configurations of optical sensors according to the present invention, in particular top view in direction of propagation of the light beam 116. In FIG. 31A, a top view of two rectangular optical sensors 113 is shown, wherein the first optical sensor 118 is a small optical sensor in front of a larger second optical sensor 120. The first optical sensor 118 and the second optical sensor 120 may be arranged with a different offset, in particular in a transversal direction y, from the optical axis 126. In FIGS. 2731B and 31C, top view of a large rectangular optical sensor 120 is shown, wherein the first optical sensor 118 is a small optical sensor in front of a larger second optical sensor 120 having a triangle shaped (FIG. 31B) or star-shaped (FIG. 31C) light-sensitive area 121. In FIGS. 31 M to O, a top view of two rectangular optical sensors 113 is shown, wherein the first optical sensor 118 and the second optical sensor 120 are rectangular sensors with the same size. In FIGS. 31 M to O a mask 119 is arranged in front of the first and second optical sensors 118, 120. The mask 119 may be arranged with a different offset from the optical axis 126. The mask 119 may have an arbitrary size and shape, for example, the mask may be rectangular shaped (FIG. 31M), triangle shaped (FIG. 31N) or star-shaped (FIG. 31O). However, other sizes and shapes are feasible. Mask 119 may be adapted to prevent light impinging on the light sensitive areas of the first and second optical sensors 118, 120. If used in a situation comparable to the situation illustrated in FIG. 19A, the mask may result in a further z-dependent decrease of a decreasing sensor signal, resulting in an increased z-dependency of the resulting quotient signal Q.

The first optical sensor 118 and the second optical sensor 120 may be arranged with a different offset from the optical axis 126. FIG. 31K shows two circular shaped optical sensors 113, wherein the first optical sensor 118 is a small optical sensor in front of the larger second optical sensor 120. In FIG. 31D, the light sensitive area of the first optical sensor 118 is square-shaped, and the light sensitive area of the second optical sensor 120 is rectangular, such that the surface areas in x and y differ. In addition, a center of the first optical sensor 118 and a center of second optical sensor 120 may have different x coordinates such that the optical sensors 118, 120 may have different spatial offset in one or more of x and y direction from the optical axis. In FIG. 31H, both the first optical sensor 118 and the second optical sensor 120 may be rectangular. The first optical sensor 118 and the second optical sensor 120 may be arranged such that the center of the first optical sensor 118 and the center of second optical sensor 120 may have different x coordinates and that the surface areas in x and y differ. The first optical sensor 118 and the second optical sensor 120 may be arranged with a different offset from the optical axis 126. In FIG. 31L, the first optical sensor 118 may have a deviating shape from the shape of the second optical sensor 120 such as a circular or semicircular shape. FIGS. 31 E, F, G, I, J show sensor element 115 having the matrix of pixels 117. In FIGS. 31 E, F, G the sensor element 115 has a rectangular shape, whereas in FIGS. 31 I and J the sensor element 115 has a circular shape. Rows and columns may be arranged equidistant or non-equidistant. In case of equidistant rows and/or columns the sensor element 115 may be arranged with a spatial offset to the optical axis 126.

FIG. 32 shows experimental results of a determination of a longitudinal coordinate z for different object sizes. The experimental setup was comparable to the setup shown in FIG. 19A. In the measurement setup the object 112, a paper target, was illuminated by laser 136 with a wavelength of 905 nm, 1.6 mW and modulated with 23 Hz. Light reflected from the object 112 was led to a quadrant diode 178, available as OSI Optoelectronics, OSI Spot-4D. Between the object 112 and quadrant diode 178 a lens 128 having an aspherical effective focal length of 20.0 mm, a diameter of 25.0 mm was placed, available as Thorlabs AL2520M-B. A distance from quadrant diode 178 to lens 128 was 19.7 mm and the quadrant diode 178 had an offset from the optical axis in y=0.5 mm. Further, different from the situation in FIG. 19A and not shown in FIG. 19A, in the situation of FIG. 32, an iris diaphragm or a further lens was placed in front of the laser 136 between the laser 136 and the object 112, to modify the illumination light beam 138. The iris diaphragm was used to modify the width of the illumination light beam 138. The further lens was used to obtain a diverging illumination light beam 138 with a beam width decreasing with the distance from the laser 136. FIG. 32 shows the quotient Q of two adjacent quadrant currents as a function of the distance, i.e. longitudinal coordinate of the object 112, z in mm. In a first experiment, a diameter of a illumination light beam 138 was varied by an iris diaphragm from 1 mm, solid line, to 3.5 mm, loosely dashed line, and to 5 mm, dash-dot line. In a second experiment, the diameter of the illumination light beam 138 was varied by the further lens such that the beam width of the illumination light beam 138 diverges with increasing distance from the further lens. To characterize the diverging illumination light beam 138, the beam width at 1 m, 2 m, and 3 m from the lens 128 is given. The dashed line shows the quotient Q, wherein the beam width was 10 mm at 1 m distance, 16 mm at 2 m distance and 22 mm at 3 m distance from the lens 128. The dotted line shows the quotient Q, wherein the beam width was 15 mm at 1 m distance, 32 mm at 2 m distance and 49 mm at 3 m distance from the lens 128. Below z=2300 mm all curves show the same dependency of Q from z and deviations below ±5% and thus independence from the beam width. In the situation of FIG. 32 the beam width at the object 112 corresponds to the object size that is measured. The independence of the quotient Q from the beam width and thus from the object size clearly demonstrates the property of object size independence. In an application, the influence of the further lens leading to a diverging illumination light beam may be caused by a liquid drop, or rain, or dirt or the like such as on the laser module. Thus, object size independence is an important property for robust measurements.

Figure 33A:
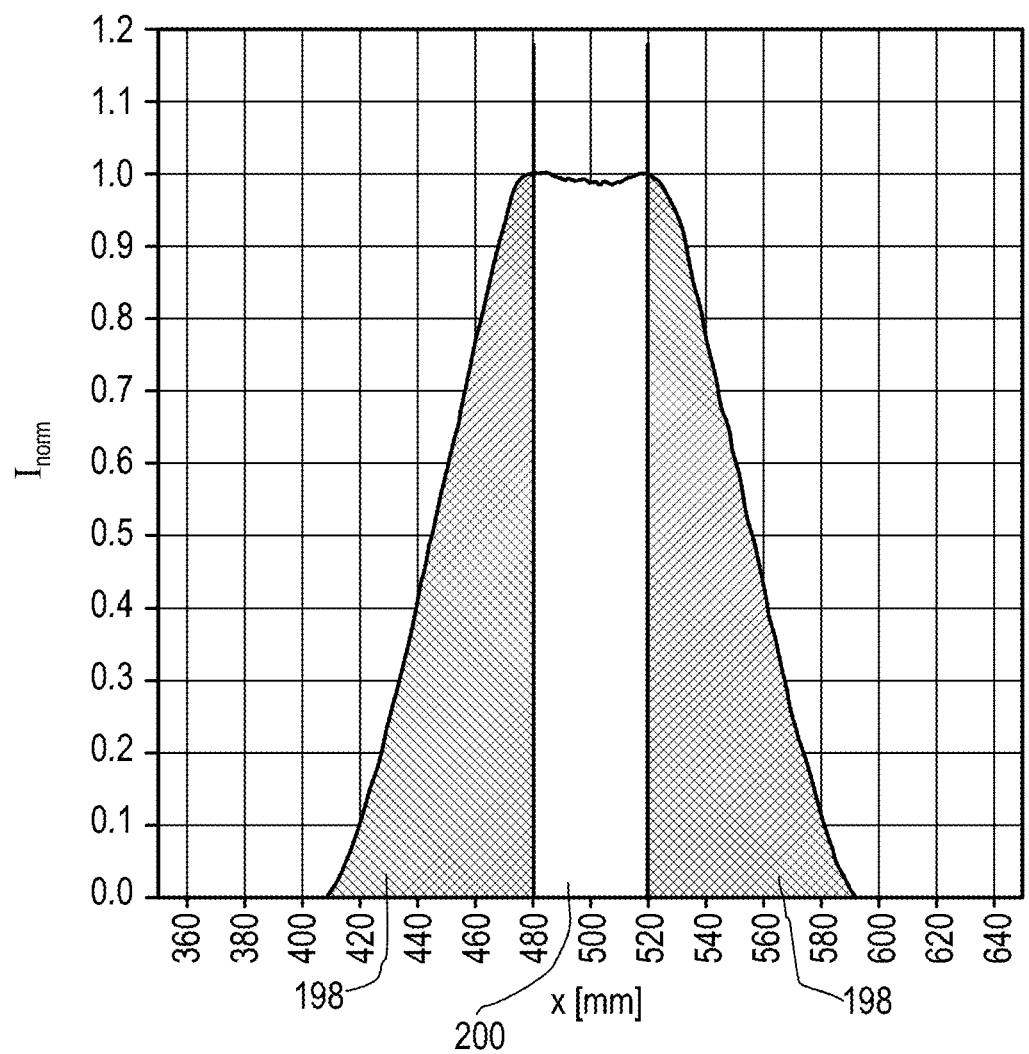
FIGS. 33A and B show an exemplary beam profile and determination of first area and second area of the beam profile.
Figure 33B:
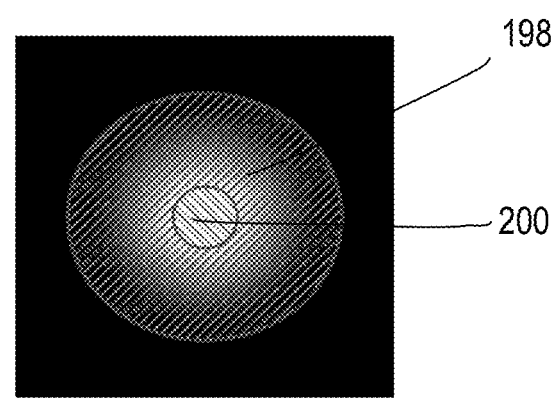

FIGS. 33A and B show an exemplary beam profile and determination of first area 198 and second area 200 of the beam profile. In FIG. 33A normalized intensity $I_{norm}$ as a function of the transversal coordinate x in mm is depicted. The object size was 20 mm and the distance object to sensor was 1200 mm. The first area 198 of the beam profile may comprise essentially edge information of the beam profile and the second area 200 of the beam profile may comprise essentially center information of the beam profile. The beam profile may have a center, a maximum value of the beam profile and/or a center point of a plateau of the beam profile. In FIG. 33A the center of the plateau may be at 500 mm. The beam profile may further comprise falling edges extending from the plateau. The second area 200 may comprise inner regions of the cross section and the first area 198 may comprise outer regions of the cross section. At least one area of the beam profile may be determined and/or selected as first area 198 of the beam profile if it comprises at least parts of the falling edges of the cross section. In FIG. 33A, the first area 198 at both sides from the center is depicted in dark grey. At least one area of the beam profile may be determined and/or selected as second area 200 of the beam profile if it is close or around the center and comprises essentially center information. In FIG. 33A, the second area 200 is depicted in light grey. FIG. 33B shows the corresponding light spot of the intensity distribution as shown in FIG. 33A and the corresponding first area 198, and second area 200.

Figure 34:
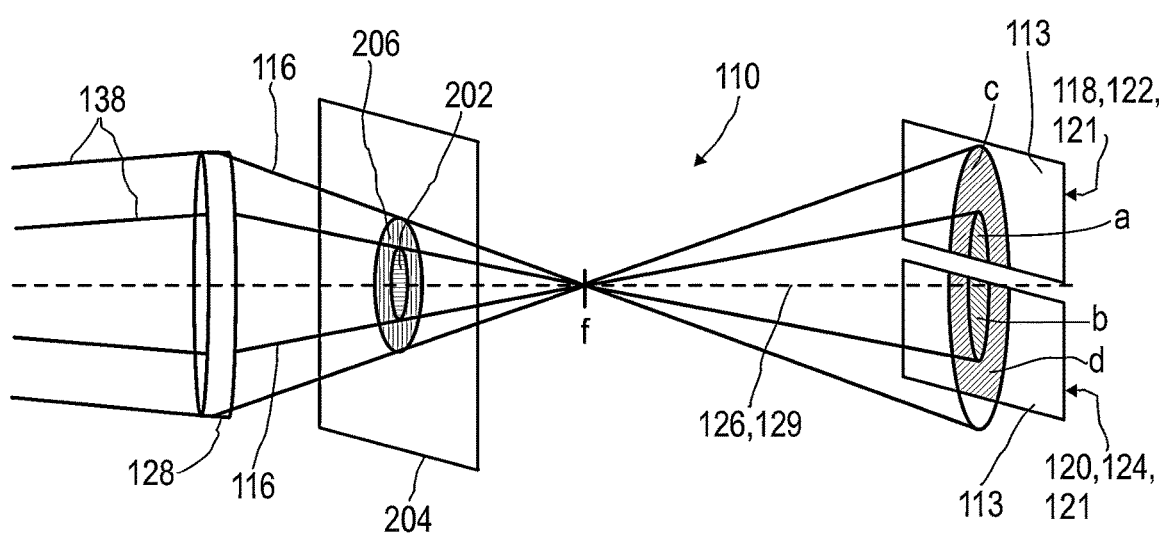
FIG. 34 shows a further exemplary embodiment of the detector.

FIG. 34 shows a further exemplary embodiment of the detector 110. The optical sensors 113 may comprise the first optical sensor 118 having the first light sensitive area 122 and the second optical sensor 120 having the second light sensitive area 124. The first light sensitive area 122 and the second light sensitive area 124 are arranged such that a condition $$\frac{a}{c} \neq \frac{b}{d}$$

is satisfied. "a" is a ratio of photons hitting both an inner region 202 of a plane 204 perpendicular to the optical axis 126 intersecting the optical axis 126 at a distance equal to half of a focal length f of the transfer device 128 and the first light sensitive area 122. "b" is a ratio of photons hitting both the inner region 202 of the plane 204 and the second light sensitive area 124. "c" is a ratio of photons hitting both an outer region 206 of the plane 204 and the first light-sensitive area 122. "d" is a ratio of the photons hitting both the outer region 206 of the plane 204 and the second light sensitive area 124. The inner region 202 may have an area with a geometrical center point on the optical axis 126 and an extension such that half of the photons hit the plane 204 within the inner region 202 and the other half hit the plane outside the inner region 202. The inner region 202 may be designed as a circle with a center point on the optical axis 126 and a radius r which is chosen such that half of the photons hit the plane 204 within the circle and the other half hit the plane outside the circle.

Figure 35:
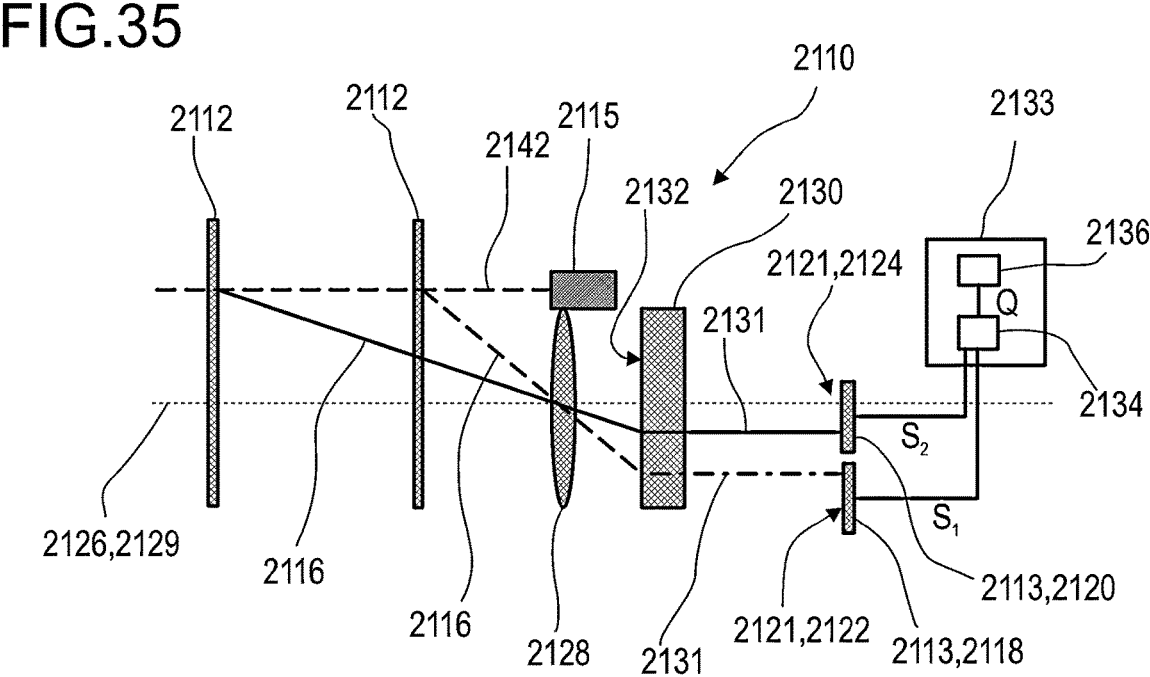
FIG. 35 shows an exemplary embodiment of a detector according to the present invention.

In FIG. 25, a schematic view of an exemplary embodiment of a detector 2110 for determining a position of at least one object 2112 is depicted. In FIG. 35, the object 2112 is depicted for two different object distances. The detector 2110 comprises at least two optical sensors 2113, for example a first optical sensor 2118 and a second optical sensor 2120, each having at least one light-sensitive area 2121. The object 2112 may comprise at least one beacon device 2114, from which a light beam 2116, also denoted as incident light beam, propagates towards the detector 2110. Additionally or alternatively, the detector may comprise at least one illumination source 2115 for illuminating the object 2112. As an example, the illumination source 2115 may be configured for generating an illuminating light beam for illuminating the object 2112. Specifically, the illumination source 2115 may comprise at least one laser and/or laser source. Various types of lasers may be employed, such as semiconductor lasers. Additionally or alternatively, non-laser light sources may be used, such as LEDs and/or light bulbs. The illumination source 2115 may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source 2115 may have a wavelength of 300-500 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used. Further, the illumination source 2115 may be configured for emitting modulated or non-modulated light. In case a plurality of illumination sources 2115 is used, the different illumination sources may have different modulation frequencies which, as outlined in further detail below, later on may be used for distinguishing the light beams.

The first optical sensor 2118 may comprise a first light-sensitive area 2122, and the second optical sensor 2120 may comprise a second light-sensitive area 2124. The light beam 2116, as an example, may propagate along an optical axis 2126 of the detector 2110. Other embodiments, however, are feasible. The first light-sensitive area 2122 and the second light-sensitive area may be oriented towards the object 2112. The optical detector 2110, further, may comprise at least one transfer device 2128, such as at least one lens or a lens system, specifically for beam shaping. The transfer device 2128 may have at least one focal length in response to the incident light beam 2116 propagating from the object 2112 to the detector 2110. The transfer device 2128 may have an optical axis 2129, wherein the transfer device 2128 and the optical detector preferably may have a common optical axis. The transfer device 2128 may constitute a coordinate system. A direction parallel or anti-parallel to the optical axis 2126, 2129 may be defined as a longitudinal direction, whereas directions perpendicular to the optical axis 2126, 2129 may be defined as transversal directions, wherein a longitudinal coordinate I is a coordinate along the optical axis 2126, 2129 and wherein d is a spatial offset from the optical axis 2126, 2129. Consequently, the light beam 2116 is focused, such as in one or more focal points, and a beam width of the light beam 2116 may depend on a longitudinal coordinate z of the object 2112, such as on a distance between the detector 2110 and the beacon device 2114 and/or the object 2112. The optical sensors 2118, 2120 may be positioned off focus. For details of this beam width dependency on the longitudinal coordinate, reference may be made to one or more of the WO 2012/110924 A1 and/or WO 2014/097181 A1.

The detector comprises at least one angle dependent optical element 2130 adapted to generate at least one light beam 2131 having at least one beam profile depending on an angle of incidence of an incident light beam propagating from the object 2112 towards the detector 2110 and illuminating the angle dependent optical element 2130. The angle dependent optical element 2130 may have angle dependent transmission properties such that an electromagnetic wave impinging on a first side 2132, for example a surface and/or an entrance, of the angle dependent optical element 2130 may be partly, depending on the properties of the angle dependent optical element, absorbed and/or reflected and/or transmitted. A degree of transmission may be defined as quotient of transmitted power of the electromagnetic wave, i.e. the power behind the angle dependent optical element 2130, and the incident power of the electromagnetic wave, i.e. the power before impinging on the angle dependent optical element 2130. The angle dependent optical element 2130 may be designed such that the degree of transmission depends on an angle of incidence at which the incident light beam propagating from the object towards the detector 2116 impinges on the angle dependent optical element 2130. The angle of incident may be measured with respect to an optical axis of the angle dependent optical element 2130. The angle dependent optical element 2130 may be arranged in the direction of propagation behind the transfer device 2128. The transfer device may, for example, comprise at least one collimating lens. The angle dependent optical element 2130 may be designed to weaken rays impinging with larger angles compared to rays impinging with a smaller angle. For example, the degree of transmission may be highest for light rays parallel to the optical axis, i.e. at 0°, and may decrease for higher angles. In particular, at at least one cut-off angle the degree of transmission may steeply fall to zero. Thus, light rays having a large angle of incidence may be cut-off.

The angle dependent optical element 2130 may comprise at least one optical element selected from the group consisting of: at least one optical fiber, in particular at least one multifurcated optical fiber, in particular at least one bifurcated optical fiber; at least one diffractive optical element; at least one angle dependent reflective element, at least one diffractive grating element, in particular a blaze grating element; at least one aperture stop; at least one prism; at least one lens; at least one lens array, in particular at least one microlens array; at least one optical filter; at least one polarization filter; at least one bandpass filter; at least one liquid crystal filter, in particular a liquid crystal tunable filter; at least one shortpass filter; at least one long-pass filter; at least one notch filter; at least one interference filter; at least one transmission grating; at least one nonlinear optical element, in particular one birefringent optical element.

The first optical sensor 2118, in response to the illumination by the light beam 2131, may generate a first sensor signal $s_1$, whereas the second optical sensor 2120 may generate a second sensor signal $s_2$. Preferably, the optical sensors 2118, 2120 are linear optical sensors, i.e. the sensor signals $s_1$ and $s_2$ each are solely dependent on the total power of the light beam 131 or of the portion of the light beam 2131 illuminating their respective light-sensitive areas 2122, 2124, whereas these sensor signals $s_1$ and $s_2$ are independent from the actual size of the light spot of illumination.

The sensor signals $s_1$ and $s_2$ are provided to an evaluation device 2133 of the detector 2110. The evaluation device 2133 is embodied to derive a quotient signal Q, as explained above. From the quotient signal Q, derived by dividing the sensor signals $s_1$ and $s_2$ or multiples or linear combinations thereof, may be used for deriving at least one item of information on a longitudinal coordinate z of the object 2112 and/or the beacon device 2114, from which the light beam 2116 propagates towards the detector 2110. The evaluation device 2133 may have at least one divider 2134 for forming the combined signal Q, and, as an example, at least one position evaluation device 2136, for deriving the at least one longitudinal coordinate z from the combined signal Q. It shall be noted that the evaluation device 2133 may fully or partially be embodied in hardware and/or software. Thus, as an example, one or more of components 2134, 2136 may be embodied by appropriate software components.

Figure 36:
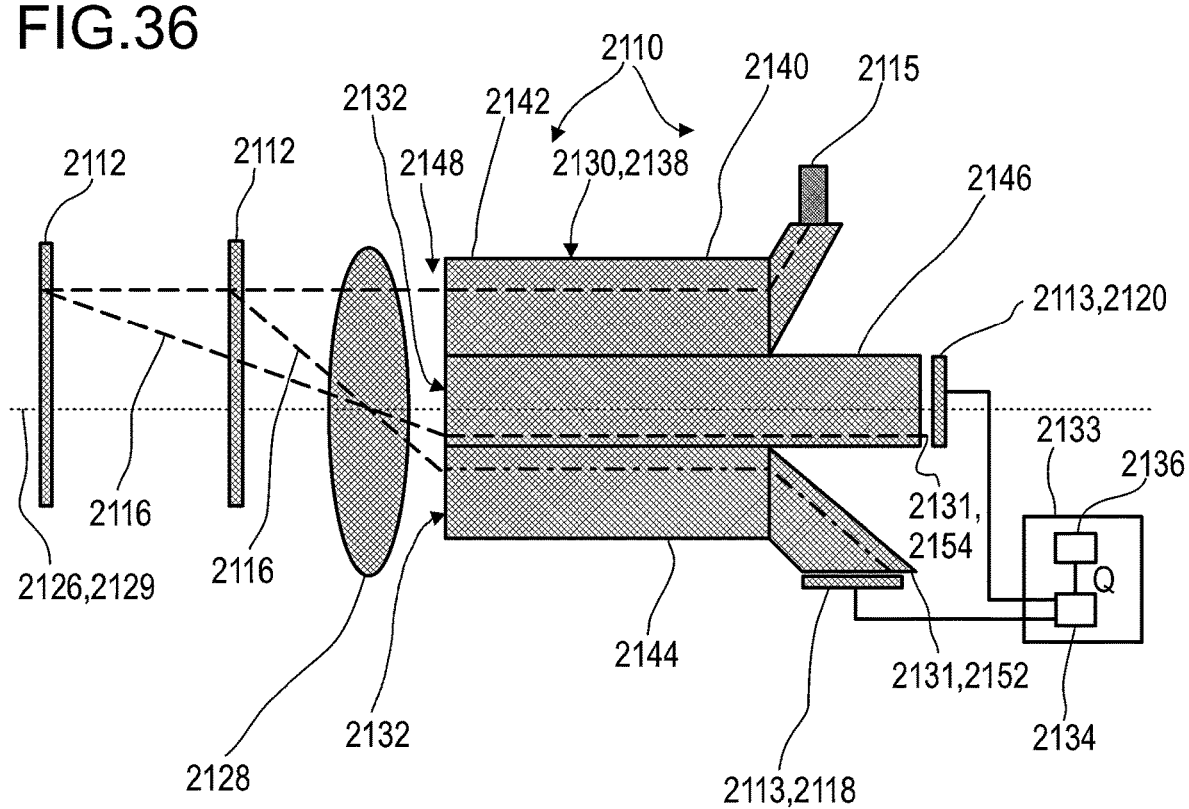
FIG. 36 shows an embodiment with a multifurcated optical fiber.

In FIG. 36, a modification of the embodiment of FIG. 35 is shown, which forms an alternative detector 2110. The alternative embodiment of the detector 2110 widely corresponds to the embodiment shown in FIG. 35. In FIG. 36, the angle dependent optical element 2130 may comprise at least one optical fiber 2138. The optical fiber 2138 may be adapted to transmit at least parts of incident light beam 2116 which are not absorbed and/or reflected, between two ends of the optical fiber. The optical fiber 2138 may have a length and may be adapted to permit transmission over a distance. The optical fiber 2138 may comprise at least one fiber core which is surrounded by at least one fiber cladding having a lower index of refraction as the fiber core. Below the angle of acceptance, the optical fiber 2138 may be adapted to guide the incoming light beam by total internal reflection.

The optical fiber 2138 may be designed such that the degree of transmission may be highest for incoming light rays parallel, i.e. at an angle of 0°, to the optical fiber, neglecting reflection effects. The optical fiber 2130 may be designed such that for higher angles, for example angles from 1° to 10°, the degree of transmission may decrease smoothly to around 80% of the degree of transmission for parallel light rays and may remain at this level constantly up to an acceptance angle of the optical fiber 2138. The optical fiber 2138 may be designed such that above the acceptance angle total reflection within the optical fiber 2138 is not possible such that the light rays are reflected out of the optical fiber 2138. The optical fiber 2138 may be designed that at the acceptance angle, the degree of transmission may steeply fall to zero. Light rays having a large angle of incidence may be cut-off.

As shown in FIG. 36, the illumination source 2115 may be adapted to illuminate the object 2112 through the angle dependent optical element 2130. The optical fiber 2138 may comprise at least one illumination fiber 2140 adapted to transmit the light beam 2142 generated by the illumination source 2115 such that it illuminates the object 2112. The illumination source 2115 may be adapted to couple the at least one light beam 2142 generated by the illumination source 2115 into the illumination fiber 2140.

Figure 37:
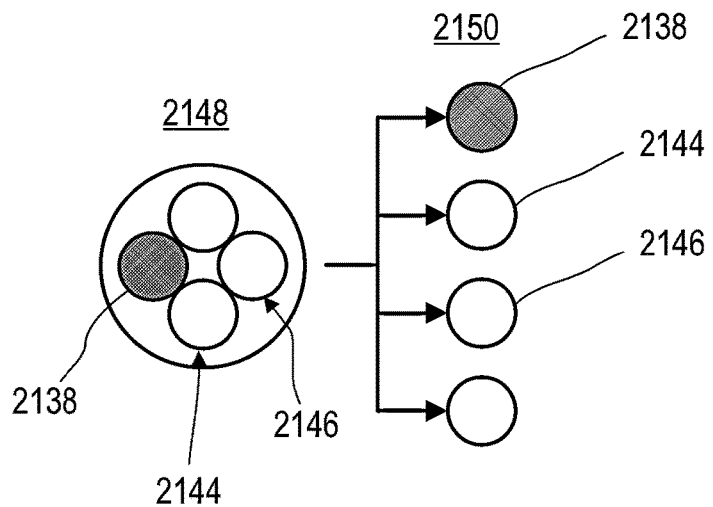
FIG. 37 shows a cut through the optical fiber of FIG. 36.

The optical fiber 2138 may comprise at least two or more fibers. The optical fiber 2138 may be at least one multifurcated optical fiber, in particular at least one bifurcated optical fiber. In the embodiment of FIG. 36, and as shown in the cut through in FIG. 37, the optical fiber 2138 may comprise four fibers. In particular the optical fiber may comprise the illumination fiber 2138 and at least two fibers each for generating at least one light beam 2131, denoted as first fiber 2144 and second fiber 2146. As shown in FIG. 37, the first fiber 2144 and the second fiber 2146 may be arranged close to each other at an entrance end 2148 of the optical fiber 2138 and may split into legs separated by a distance at an exit end 2150 of the optical fiber 2138. The first fiber 2144 and second fiber 2146 may be designed as fibers having identical properties or may be fibers of different type. The first fiber 2144 may be adapted to generate at least one first light beam 2152 and the second fiber 2146 may be adapted to generate at least one second light beam 2154. The optical fiber 138 may be arranged such that the incident light beam 2116 may impinge at a first angle of incidence into the first fiber 2144 and at a second angle of incidence, different from the first angle, into the second fiber 2146, such that the degree of transmission is different for the first light beam 2152 and the second light beam 2154. One of the optical sensors 2113 may be arranged at an exit end of the first fiber 2144 and the other optical sensor 2113 may be arranged at an exit end of the second fiber 2146. The optical fiber may comprise more than three fibers, for example four fibers as depicted in FIG. 37.

It shall further be noted that the embodiments shown in FIGS. 35 and 36 simply provide embodiments for determining the longitudinal coordinate z of the object 2112. It is also feasible, however, to modify the setups of FIGS. 35 and 36 to provide additional information on a transversal coordinate of the object 2112 and/or of parts thereof. As an example, e.g. in between the transfer device 2128 and the optical sensors 2118, 2120, one or more parts of the light beam 2116 may be branched off, and may be guided to a position-sensitive device such as one or more CCD and/or CMOS pixelated sensors and/or quadrant detectors and/or other position sensitive devices, which, from a transversal position of a light spot generated thereon, may derive a transversal coordinate of the object 2112 and/or of parts thereof. The transversal coordinate may be used to verify and/or enhance the quality of the distance information. For further details, as an example, reference may be made to one or more of the above-mentioned prior art documents which provide for potential solutions of transversal sensors.

Figure 38:
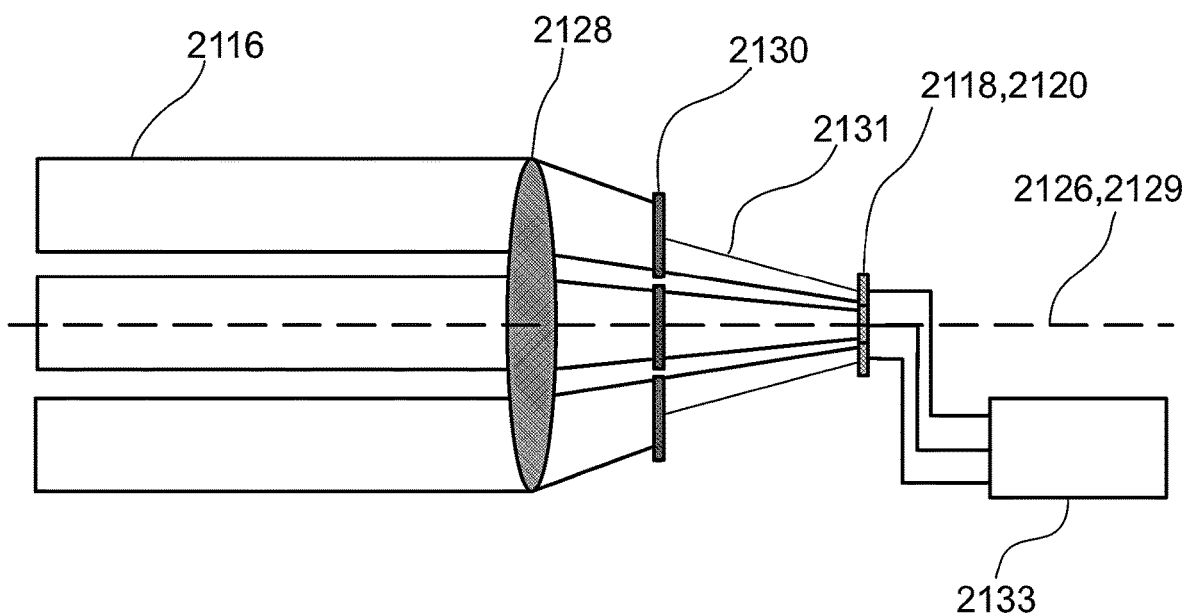
FIG. 38 visualizes angle dependent transmission of an angle dependent optical element.

FIG. 38 visualizes angle dependent transmission of an angle dependent optical element 2130. The angle dependent optical element 2130 may be designed such that the degree of transmission depends on an angle of incidence at which the incident light beam propagating from the object towards the detector 2116 impinges on the angle dependent optical element 2130. The angle dependent optical element 2130 may be designed to weaken rays impinging with larger angles compared to rays impinging with a smaller angle. In particular, at the cutoff angle the degree of transmission may steeply fall to zero and the light rays having a large angle of incidence may be cut-off. As shown in FIG. 38 regions of the incident light beam 2116 are cut-off by the angle dependent optical element 2130 in the generated light beam 2131.

Figure 39:
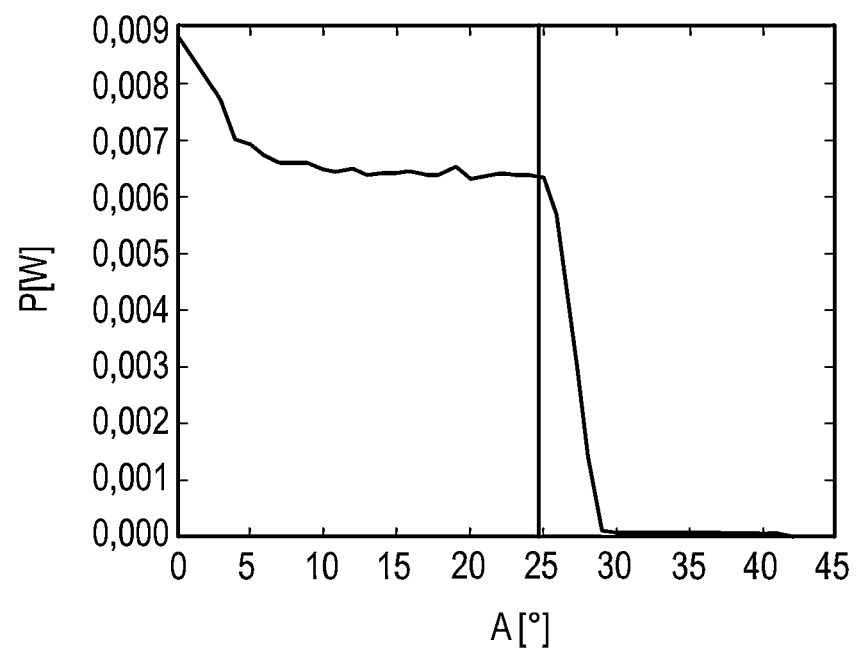
FIG. 39 shows angle dependent transmission power of the optical fiber at constant irradiated power.

FIG. 39 shows a dependency of the transmission power P in W of the optical fiber at constant irradiated power as a function of angle of incidence A in degree. The acceptance angle is shown as vertical line. The degree of transmission may be highest for incoming light rays parallel, i.e. at an angle of 0°, to the optical fiber, neglecting reflection effects. For higher angles, for example angles from 1° to 10°, the degree of transmission may decrease smoothly to around 80% of the degree of transmission for parallel light rays and may remain at this level constantly up to an acceptance angle of the optical fiber 2138. At the acceptance angle, the degree of transmission may steeply fall to zero. Light rays having a large angle of incidence may be cut-off.

Figure 40A:
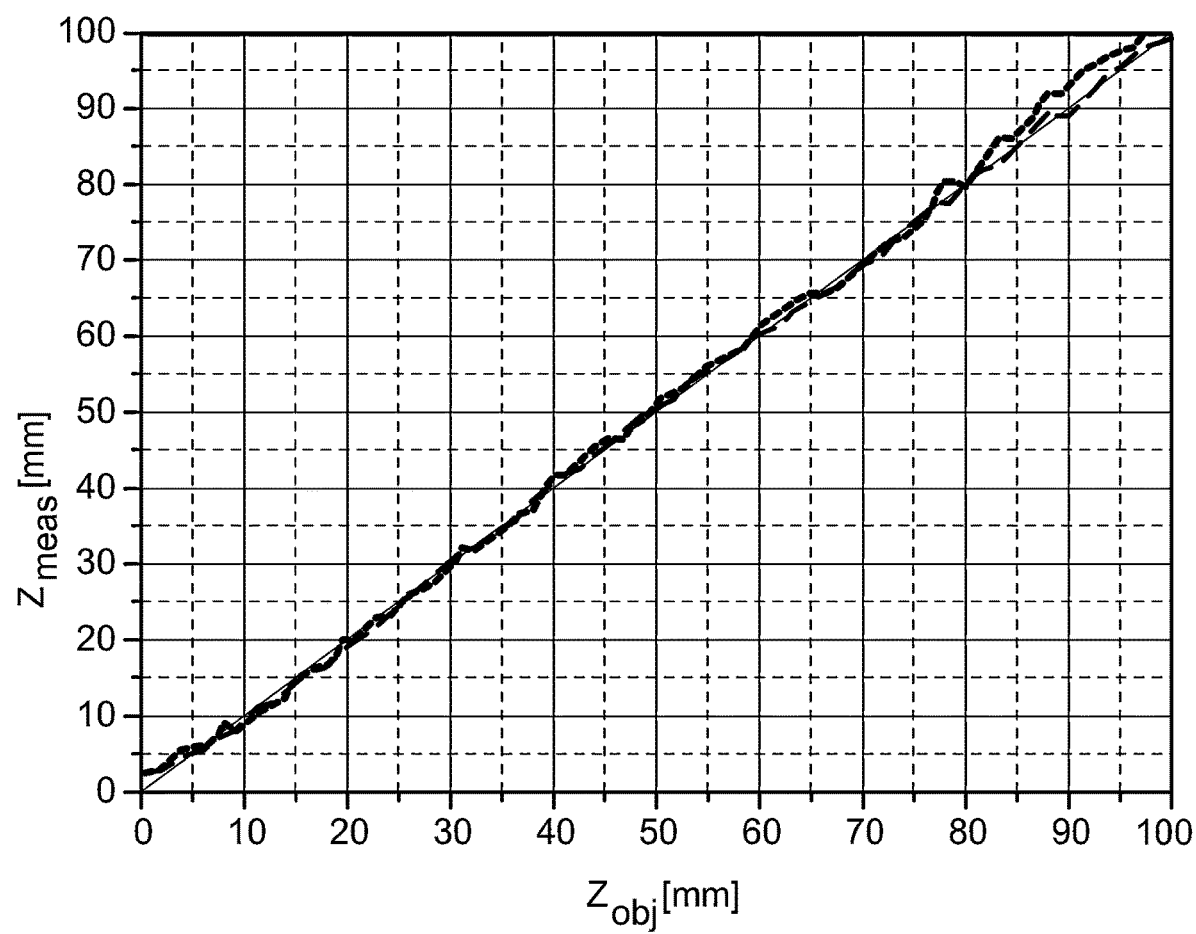
FIGS. 40A and B show experimental results of distance measurement.
Figure 40B:
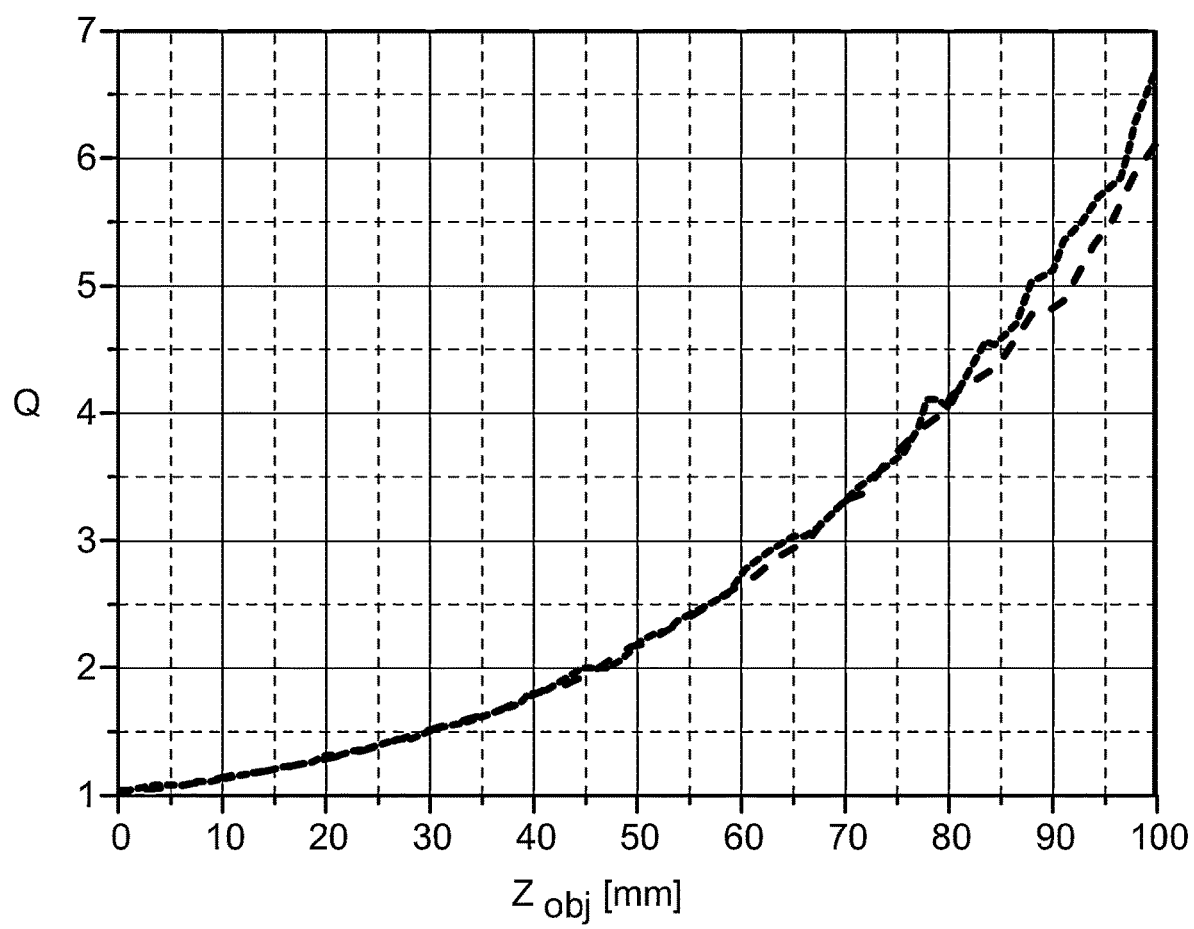

FIGS. 40A and 40B show experimental results of distance measurements. In The determined distance $z_{meas}$ in mm is shown as a function of the object distance $z_{obj}$ in mm. As illumination source 115 a Laser was used having a wavelength of 980 nm and average power of 2.4 mW available under Flexpoint® Laser components module. Two Si-photodetectors were used as optical sensors 113. As optical fiber 2138 and transfer device 2128 available under Thorlabs Fixed Focus Collimation package F220SMA-980 was used. In FIG. 40A, the solid line indicates where $z_{meas}=z_{obj}$. For the measurement the object distance was varied and two different types of object were used, in particular a black paper object, curve 2156 (dotted line), and a white paper object, curve 2158 (dashed line). The determined object distance is in agreement with the real distance within 2% for small and medium distances and within 10% for large distances. In FIG. 40B, the combined signal Q determined by dividing the signals of the two-photodetectors as a function of the distance $z_{obj}$ in mm is shown for the black paper object (dotted line) and the white paper object (dashed line). The determined quotient for both object types is in agreement within 2% for small and medium distances and within 10% for large distances.

Figure 41:
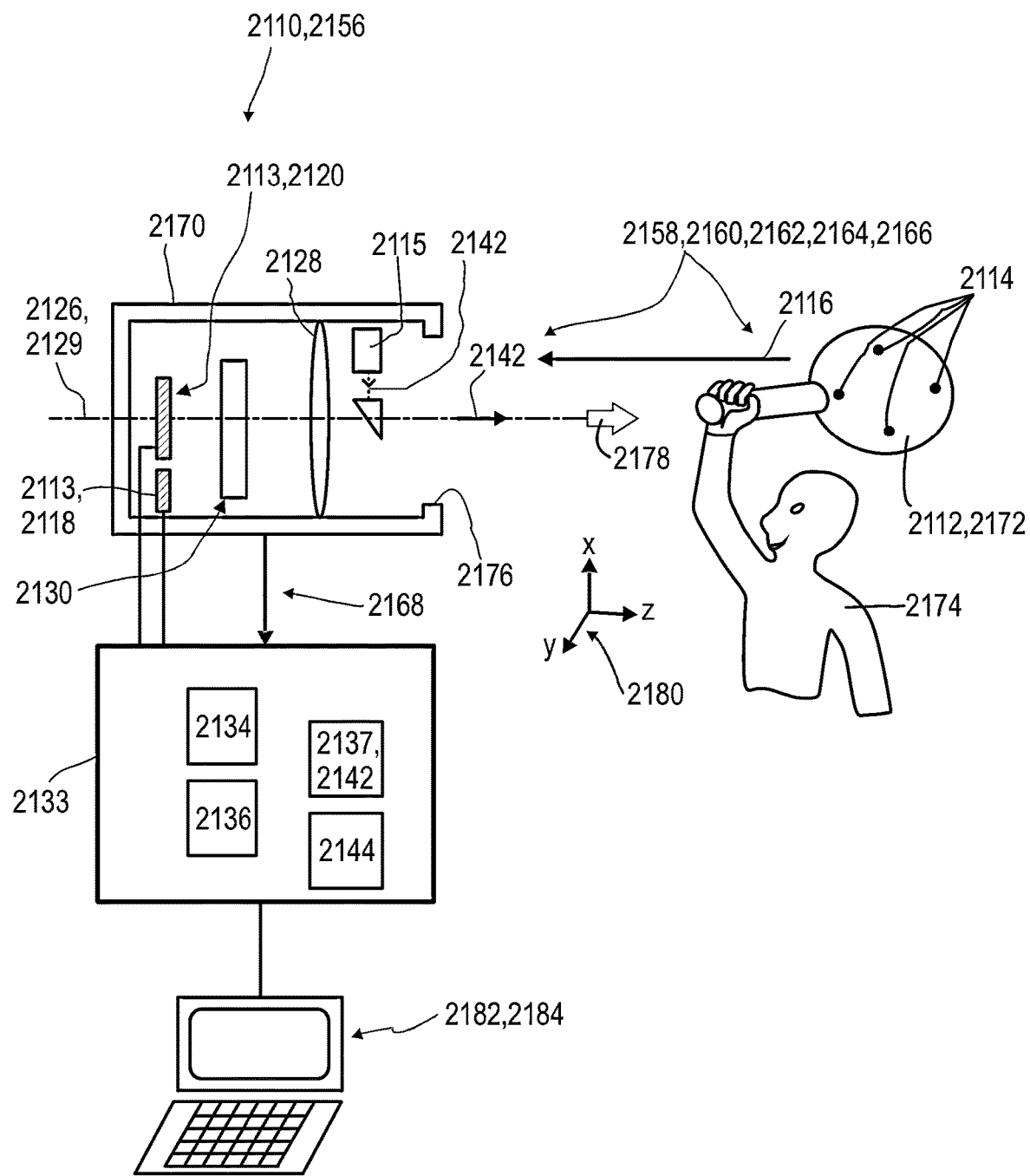
FIG. 41 shows an exemplary embodiment of a detector according to the present invention, a detector system, a human-machine interface, an entertainment device, a tracking system, a scanning system and a camera.

FIG. 41 shows, in a highly schematic illustration, an exemplary embodiment of a detector 2110, for example according to the embodiments shown in FIG. 35 or 36. The detector 2110 specifically may be embodied as a camera 2156 and/or may be part of a camera 2156. The camera 156 may be made for imaging, specifically for 3D imaging, and may be made for acquiring standstill images and/or image sequences such as digital video clips. Other embodiments are feasible.

FIG. 41 further shows an embodiment of a detector system 2158, which, besides the at least one detector 2110, comprises one or more beacon devices 2114, which, in this example, may be attached and/or integrated into an object 2112, the position of which shall be detected by using the detector 2110. FIG. 41 further shows an exemplary embodiment of a human-machine interface 2160, which comprises the at least one detector system 2158 and, further, an entertainment device 2162, which comprises the human-machine interface 2160. The figure further shows an embodiment of a tracking system 2164 for tracking a position of the object 2112, which comprises the detector system 2158. The components of the devices and systems shall be explained in further detail below.

FIG. 41 further shows an exemplary embodiment of a scanning system 2166 for scanning a scenery comprising the object 2112, such as for scanning the object 2112 and/or for determining at least one position of the at least one object 2112. The scanning system 2166 comprises the at least one detector 2110, and, further, optionally, the at least one illumination source 2115 as well as, optionally, at least one further illumination source 2115. The illumination source 2115, generally, is configured to emit at least one illumination light beam 2142, such as for illumination of at least one dot, e.g. a dot located on one or more of the positions of the beacon devices 2114 and/or on a surface of the object 2112. The scanning system 2166 may be designed to generate a profile of the scenery including the object 2112 and/or a profile of the object 2112, and/or may be designed to generate at least one item of information about the distance between the at least one dot and the scanning system 2166, specifically the detector 2110, by using the at least one detector 2110.

As outlined above, an exemplary embodiment of the detector 2110 which may be used in the setup of FIG. 41 is shown in FIGS. 35 and 36. Thus, the detector 2110, besides the optical sensors 2118, 2120, comprises at least one evaluation device 2133, having e.g. the at least one divider 2134 and/or the at least one position evaluation device 2136, as symbolically depicted in FIG. 41. The components of the evaluation device 2133 may fully or partially be integrated into a distinct device and/or may fully or partially be integrated into other components of the detector 2110. Besides the possibility of fully or partially combining two or more components, one or more of the optical sensors 2118, 2120 and one or more of the components of the evaluation device 2133 may be interconnected by one or more connectors 2168 and/or by one or more interfaces, as symbolically depicted in FIG. 41. Further, the one or more connectors 2168 may comprise one or more drivers and/or one or more devices for modifying or preprocessing sensor signals. Further, instead of using the at least one optional connector 2168, the evaluation device 133 may fully or partially be integrated into one or both of the optical sensors 2118, 2120 and/or into a housing 2170 of the detector 2110. Additionally or alternatively, the evaluation device 2133 may fully or partially be designed as a separate device.

In this exemplary embodiment, the object 2112, the position of which may be detected, may be designed as an article of sports equipment and/or may form a control element or a control device 2172, the position of which may be manipulated by a user 2174. As an example, the object 2112 may be or may comprise a bat, a racket, a club or any other article of sports equipment and/or fake sports equipment. Other types of objects 2112 are possible. Further, the user 2174 himself or herself may be considered as the object 2112, the position of which shall be detected.

As outlined above, the detector 2110 comprises at least the optical sensors 2118, 2120. The optical sensors 2118, 2120 may be located inside the housing 2170 of the detector 2110. Further, the at least one transfer device 2128 is comprised, such as one or more optical systems, preferably comprising one or more lenses.

An opening 2176 inside the housing 2170, which, preferably, is located concentrically with regard to the optical axis 2126 of the detector 2110, preferably defines a direction of view 2178 of the detector 2110. A coordinate system 2180 may be defined, in which a direction parallel or anti-parallel to the optical axis 2126 may be defined as a longitudinal direction, whereas directions perpendicular to the optical axis 126 may be defined as transversal directions. In the coordinate system 2180, symbolically depicted in FIG. 41, a longitudinal direction is denoted by z, and transversal directions are denoted by x and y, respectively. Other types of coordinate systems 2180 are feasible, such as non-Cartesian coordinate systems.

The detector 2110 may comprise the optical sensors 2118, 2120 as well as, optionally, further optical sensors. The optical sensors 2118, 2120 may be located in one and the same beam path, for example one behind the other, such that the first optical sensor 2118 covers a portion of the second optical sensor 2120. Alternatively, however, a branched beam path may be possible, for example using a multifurcated optical fiber. The branched beam path may comprise additional optical sensors in one or more additional beam paths, such as by branching off a beam path for at least one transversal detector or transversal sensor for determining transversal coordinates of the object 2112 and/or of parts thereof. Alternatively, however, the optical sensors 2118, 2120 may be located at the same longitudinal coordinate.

One or more light beams 2116 are propagating from the object 2112 and/or from one or more of the beacon devices 2114, towards the detector 2110. The detector 2110 is configured for determining a position of the at least one object 2112. For this purpose, as explained above in the context of FIGS. 35 to 40, the evaluation device 2133 is configured to evaluate sensor signals provided by the optical sensors 2118, 2120. The detector 2110 is adapted to determine a position of the object 2112, and the optical sensors 2118, 2120 are adapted to detect the light beam 2131. In case no illumination source 2115 is used, the beacon devices 2114 and/or at least one of these beacon devices 2114 may be or may comprise active beacon devices with an integrated illumination source such as a light-emitting diode. In case the illumination source 2115 is used, the beacon devices 2114 do not necessarily have to be active beacon devices. Contrarily, a reflective surface of the object 2112 may be used, such as integrated reflected beacon devices 2114 having at least one reflective surface such as a mirror, retro reflector, reflective film, or the like. The light beam 2116, directly and/or after being modified by the transfer device 2128, such as being focused by one or more lenses, impinges on the angle dependent element 2130 which generates the at least one light beam which illuminates the light-sensitive areas 2122, 2124 of the optical sensors 2118, 2120. For details of the evaluation, reference may be made to FIGS. 35 to 40 above.

As outlined above, the determination of the position of the object 2112 and/or a part thereof by using the detector 2110 may be used for providing a human-machine interface 2160, in order to provide at least one item of information to a machine 2182. In the embodiments schematically depicted in FIG. 41, the machine 2182 may be a computer and/or may comprise a computer. Other embodiments are feasible. The evaluation device 2133 may even be fully or partially integrated into the machine 2182, such as into the computer.

As outlined above, FIG. 41 also depicts an example of a tracking system 2164, configured for tracking the position of the at least one object 2112 and/or of parts thereof. The tracking system 2164 comprises the detector 2110 and at least one track controller 2184. The track controller 2184 may be adapted to track a series of positions of the object 2112 at specific points in time. The track controller 2184 may be an independent device and/or may be fully or partially integrated into the machine 2182, specifically the computer, as indicated in FIG. 41 and/or into the evaluation device 2133.

Similarly, as outlined above, the human-machine interface 2160 may form part of an entertainment device 2162. The machine 2182, specifically the computer, may also form part of the entertainment device 2162. Thus, by means of the user 2174 functioning as the object 2112 and/or by means of the user 2174 handling a control device 2172 functioning as the object 2112, the user 2174 may input at least one item of information, such as at least one control command, into the computer, thereby varying the entertainment functions, such as controlling the course of a computer.

Figure 42:
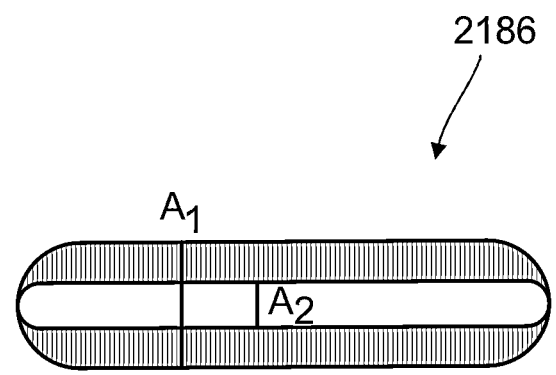
FIG. 42 shows an embodiment of determining a longitudinal coordinate z using a line pattern.

Referring to FIG. 42, the detector 110, 1110, 2110, such as the detector as described with respect to FIGS. 1 to 41 may be adapted to determine depth information, in particular absolute depth information, from a radiance ratio of at least two asymmetric regions of a light beam profile on the at least two optical sensors 113, 1118, 1120, 2113. For example, the detector 110, 1110, 2110 may comprise a plurality of optical sensors arranged in the matrix 117. The detector 110, 1110, 2110 may be adapted to determine depth information from a radiance ratio of at least two asymmetric regions within an enclosed, in particular, defocused beam profile captured by a single matrix of optical sensors such as a CMOS detector. In particular, the detector 110, 1110, 2110 may be adapted to determine the depth information using the radiance ratio independent of a certain object size range. As outlined above, this principle is called Distance by Photon Ratio (DPR). In one embodiment, the light beam 116, 1116 may illuminate the sensor element with at least one pattern comprising at least one feature point. The feature point may be selected from the group consisting of: at least one point, at least one line, at least one edge. The pattern may be generated by the object, for example, in response to an illumination by the at least one light source with an illumination pattern comprising the at least one pattern. The evaluation device 132 may be configured for deriving the quotient signal Q by $$Q(z_O) = \frac{\int\int_{A_1} E(x, y; z_O)dxdy}{\int\int_{A_2} E(x, y; z_O)dxdy}$$

wherein x and y are transversal coordinates, A1 and A2 are areas of the beam profile at the sensor position, and E(x,y,zo) denotes the beam profile given at the object distance zo. A1 may correspond to a full or complete area of a feature point on the optical sensors. A2 may be a central area of the feature point on the optical sensors. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

In the embodiment shown in FIG. 42, the light beam 116, 1116 propagating from the object 112, 1112 to the detector 110, 1110, 2110 may illuminate the matrix 117 with at least one line pattern 2186. The line pattern 2186 may be generated by the object 112, 1112, for example in response to an illumination by the at least one illumination source 136 with an illumination pattern comprising at least one illumination line pattern. A1 may correspond to an area with a full line width of the line pattern 2186 in the matrix 117. The line pattern 2186 in the matrix 117 may be widened and/or displaced compared to the line pattern of the illumination pattern such that a line width in the matrix 117 is increased. In particular, the line width of the line pattern 2186 in the matrix 117 may change from one column to another column. A2 may be a central area of the line pattern 2186 in the matrix 117. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern 2186 may be segmented in the matrix 117. Each of the columns may comprise center information of intensity in the central area of the line pattern 2186 and edge information of intensity from regions extending further outwards from the central area to edge regions of the line pattern 2186.

Figure 43:
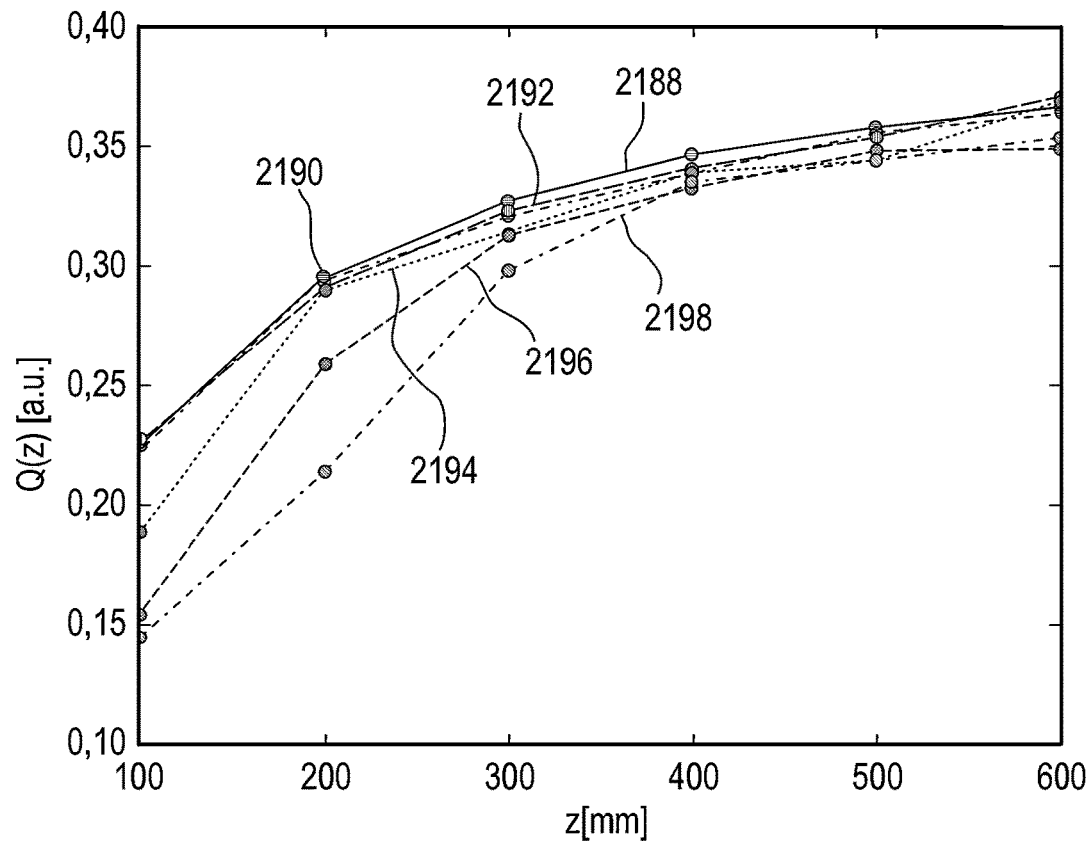
FIG. 43 shows a simulation testing of object size independence for a one-dimensional case using computational ray tracing.

FIG. 43 shows a simulation testing of object size independence for a one-dimensional case using computational ray tracing. In a simulation testing, an aspheric lens with f=10 mm, 10 mm pupil diameter in a distance range of 100 mm to 600 mm was used. Using this specification, object size independence of about 10 mm was obtained, such that the spot size was varied from 1 mm to 25 mm. In FIG. 43, the quotient $Q_y(z)$ over the longitudinal coordinate z is shown for 1 mm variation (curve 2188), 2 mm variation (curve 2190), 5 mm variation (curve 2192), 15 mm variation (curve 2194), 20 mm variation (curve 2196) and 25 mm variation (curve 2198). It can be seen that the quotient for object sizes above 10 mm deviates, whereas that of object sizes smaller than 10 mm yield identical ratios. This feature reduces calibration efforts for targets of varying size and is inherent to DPR analysis.

Figure 44A:
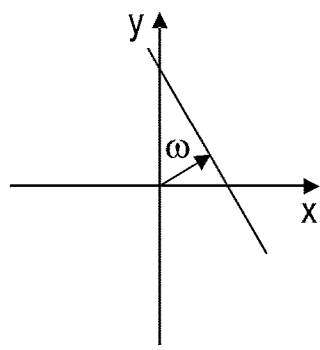
FIGS. 44A and B show a defocused beam profile subdivided into cross-sections along lines of a certain angle θ and with a distance co from the origin of ordinates and Radon transformation different image regions on a matrix of optical sensors.
Figure 44B:
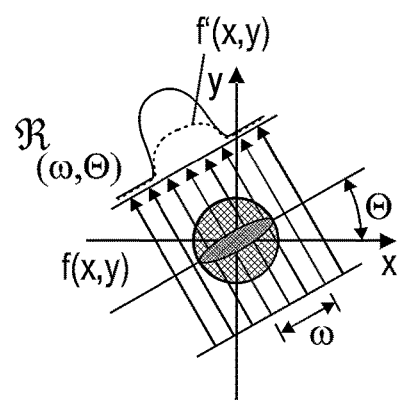

Referring to FIGS. 44A and B, as outlined above, the detector 110. 1110, 2110 may comprise the at least one matrix 117 of optical sensors 113, 1118, 1120, 2113. With the aid of such a pixelated imaging device, a defocused beam profile may be subdivided into cross-sections along lines of a certain angle θ and with a distance w from the origin of ordinates as shown in FIG. 44A. Accordingly, the parameterization of a single line would be given by ω=x cos(θ)+y sin(θ). The integration of the intensity along parallel lines can be mathematically described by an integral projection $\Re\{\cdot\}$ of the well-known Radon transform which reads $$\Re_{(\omega,\theta)}\{f(x, y)\} = \int\int_{-\infty}^{\infty} f(x, y)\delta(x\cos(\theta) + y\sin(\theta) - \omega)dxdy$$

where δ denotes the Dirac delta function and f(x,y) is the intensity of an enclosed defocused beam profile. The photon ratio R for a given angle θ and projection width ω is then given by $$R = \frac{\Re_{(\omega,\theta)}\{f'(x, y)\}}{\Re_{(\omega,\theta)}\{f(x, y)\}}$$

with f'(x,y) as the overshined image region highlighted in FIG. 44B. It is expected that the variation of θ yields different ratios R for skewed object surfaces. It may be sufficient to let θ vary in the following interval {θ∈ $\mathbb{R}_+$, θ<π}.

Figure 45A:
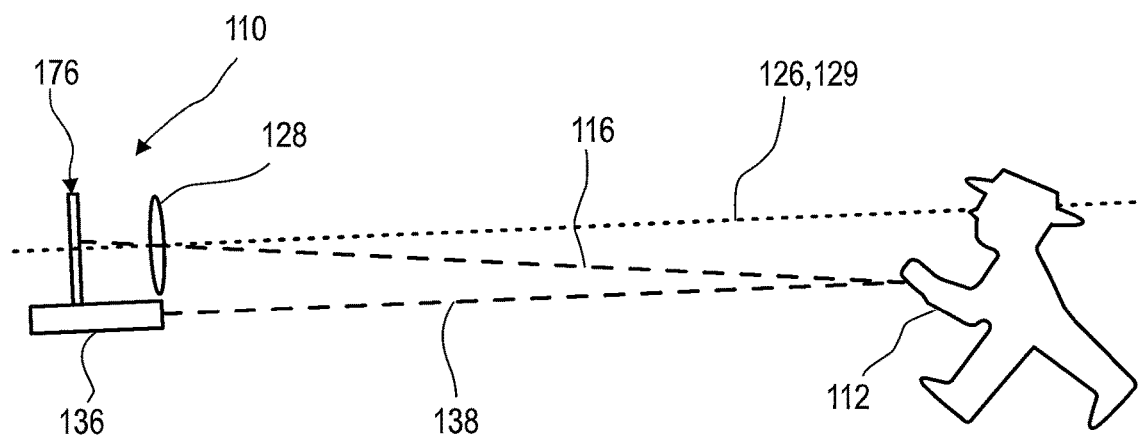
FIGS. 45A and B show further embodiments of the detector according to the present invention comprising at least one bi-cell.
Figure 45B:
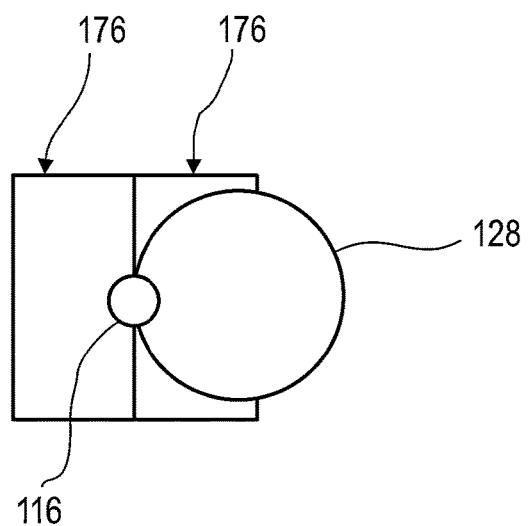

FIGS. 45A and B show further embodiments of the detector 110 according to the present invention comprising at least one bi-cell. The illumination source 136, such as a laser source, may generate the light beam 138 illuminating object 112. The reflected light beam 116 may propagate from the object 112 to the transfer device 128 and may impinge on the bi-cell of optical sensors 176. In FIG. 45A a side view is shown and in FIG. 45B a front view is shown. The detector 110 may comprise at least one FiP sensor adapted for generating the so called FiP effect as described in WO 2015/024871 or WO2016/120392. For example, the bi-cell in FIGS. 45A and B may be adapted to generate a so called FiP signal. As outlined e.g. in WO 2015/024871 or WO2016/120392, the FiP signal can be used to determine depth information over a wide distance range. The FiP sensor may be adapted to exhibit a positive and/or a negative FiP effect. The negative FiP effect may be used to tune small image effects at high distances. Image changes such as position, size, shape, sharpness, etc. may vanish at high distances while the negative FiP effect increases. Furthermore, no luminance dependence may be introduced since both cells are at the same longitudinal position and thus receive identical photon density.

Figure 46:
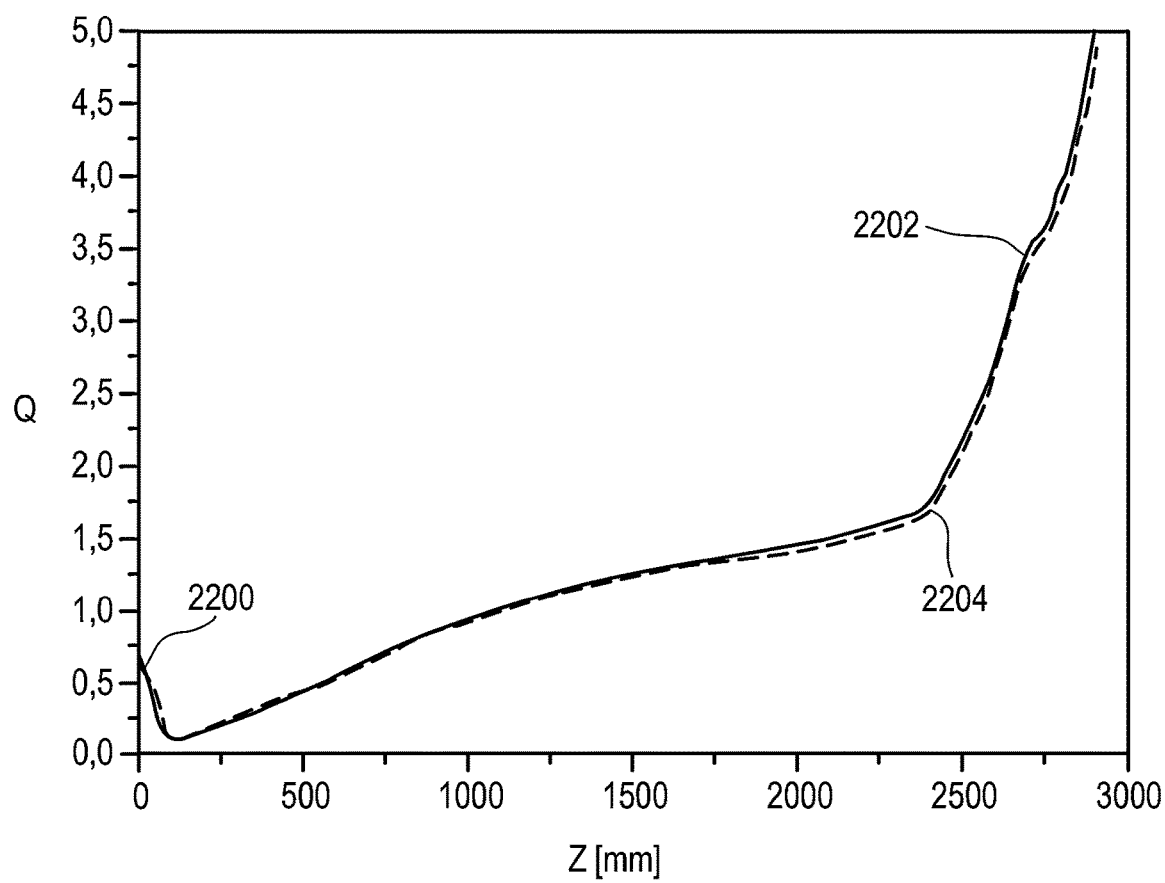
FIG. 46 shows spot diameter independence of the combined sensor signal.

FIG. 46 shows experimental results, in particular spot diameter independence and luminance independence of the combined sensor signal, determined using the detector setup shown in FIG. 46. In particular, the bi-cell was a PbS—Bi-cell and a 1550 nm laser was used with a laser spot size of 4 mm. The baseline was 12.5 mm. The transfer device was a Thorlabs Asphere lens with focal length of f=20 mm and diameter of D=25 mm. FIG. 46 shows quotient Q over the longitudinal coordinate z for different luminance and spot diameter, in particular for luminance of 2.6 mW and spot diameter of 12 mm (curve 2200), 2.4 mW and 6 mm (curve 2202) and 1.2 mW and spot diameter of 3 mm (curve 2204). All curves show identical curve shape and thus, spot diameter independence.

Figure 47A:
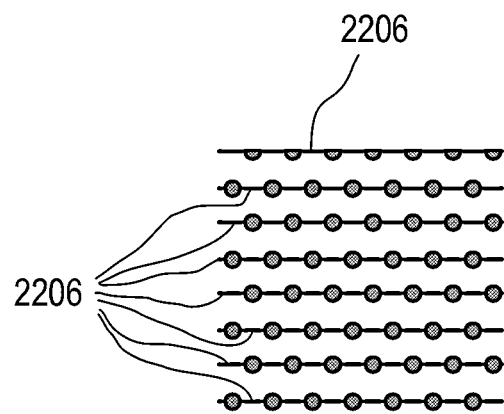
FIGS. 47A to C show three embodiments of a hexagonal illumination pattern.
Figure 47B:
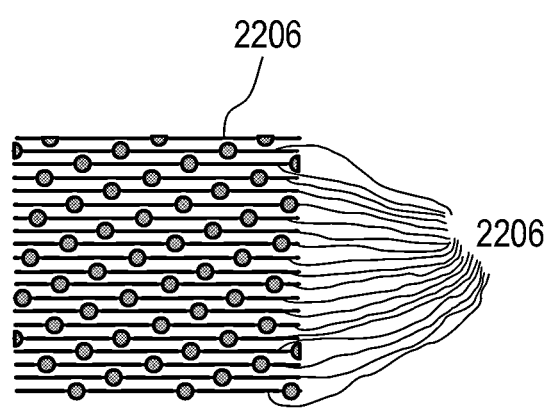
Figure 47C:
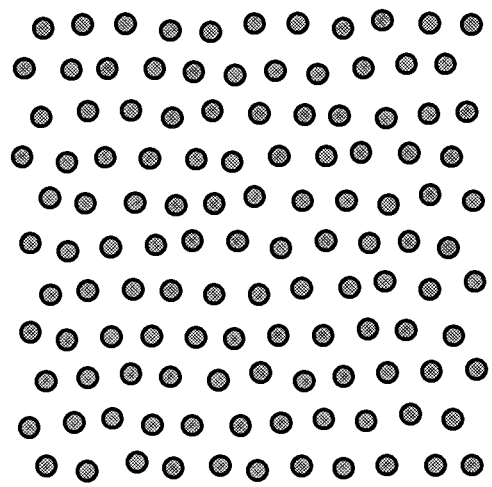

FIGS. 47A to C show three embodiments of a hexagonal illumination pattern. The illumination source 136 may be adapted to generate at least one illumination pattern for illuminating the object 112. Additionally or alternatively, the illumination pattern may be generated by at least one ambient light source. Specifically, the illumination source 136 may comprise at least one laser and/or laser source. Various types of lasers may be employed, such as semiconductor lasers. Additionally or alternatively, non-laser light sources may be used, such as LEDs and/or light bulbs. The illumination pattern may comprise at least one feature such as a point or symbol. The illumination pattern may comprise a plurality of features. The illumination pattern may comprise an arrangement of periodic or non-periodic features. The illumination pattern may be generated by ambient light, such as by at least one ambient light source, or by the at least one illumination source. The illumination pattern may comprise at least one pattern selected from the group consisting of: at least one point pattern, in particular a pseudo-random point pattern, a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the illumination source may be adapted to generate and/or to project a cloud of points. The illumination pattern may comprise regular and/or constant and/or periodic pattern such as a triangular pattern, a rectangular pattern, a hexagonal pattern, or a pattern comprising further convex tilings. The illumination pattern may comprise as much as possible features per area such that hexagonal pattern may be preferred. A distance between two features of the illumination pattern and/or an area of the at least one illumination feature may depend on the circle of confusion in the image.

The illumination features of the illumination pattern may be arranged such that only few reference features are positioned on an epipolar line. As shown in FIG. 47A, the illumination pattern may comprise at least one hexagonal pattern, wherein the individual points are positioned on epipolar lines 2206. As shown in FIG. 47B, the illumination pattern may comprise at least one hexagonal pattern, wherein the pattern is rotated relative to the baseline. Such a positioning of the illumination features allows enhancing distance between the individual points on each epipolar line. For example as shown in FIG. 47C, the illumination pattern may comprise at least one displaced hexagonal pattern, wherein individual points of the hexagonal pattern are displaced by a random distance from the regular position, for example orthogonal to the epipolar line of the point. The displacement of the individual points may be smaller than half of the distance between two parallel epipolar lines, preferably smaller than one fourth of the distance between two parallel epipolar lines. The displacement of the individual points may be as such that two points are not displaced above each other. Such a positioning allows to enhance the number of possible features per area.

Figure 48:
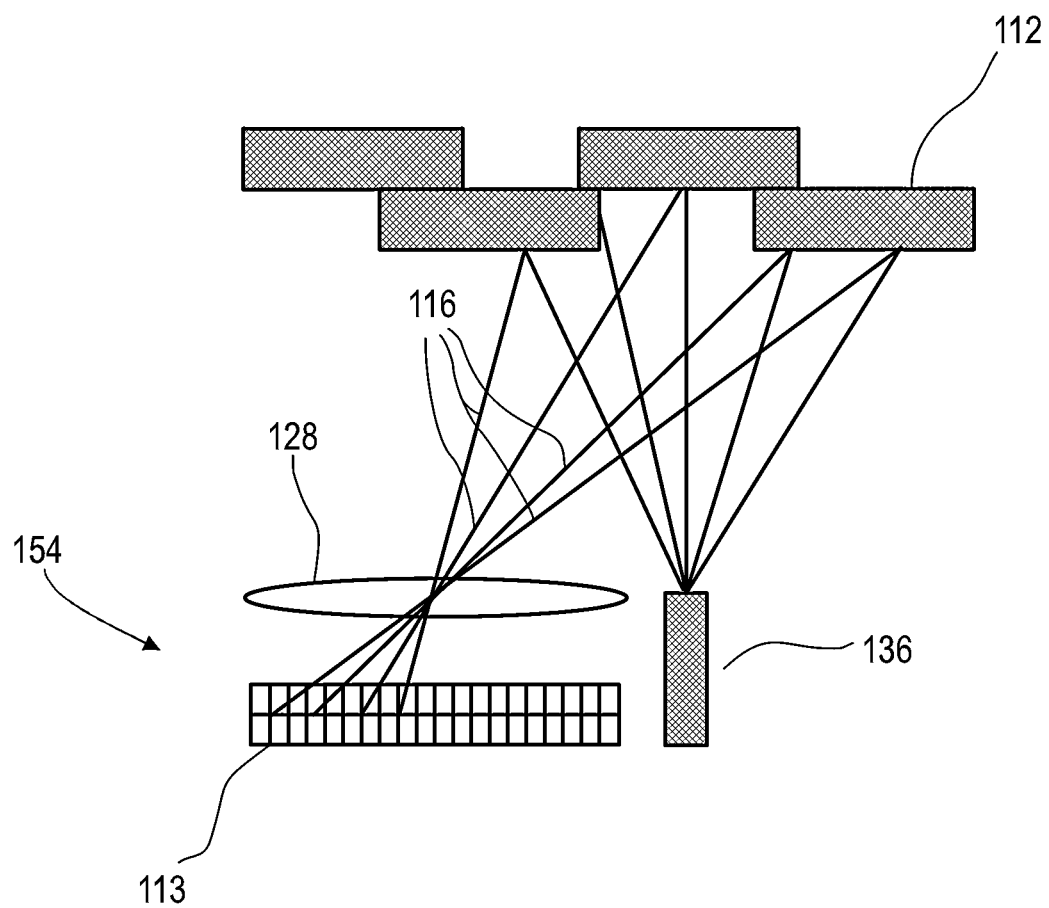
FIG. 48 shows an embodiment of a scanning device.

FIG. 48 shows an embodiment of a scanning device 154. The scanning device may be adapted as a line scanning device. In particular, the scanning device 154 may comprise at least one sensor line or row of optical sensors 113. Furthermore, the scanning device may comprise the at least one transfer device 128 and the at least one illumination source 136. Triangulation systems require a sufficient baseline, however due to the baseline in the near filed no detection may be possible. Near field detection may be possible if the light spot is tilted in direction of the transfer device. However, the tilting leads to that the light spot will move out of the field of view which limits detection in far field regions. Thus, in triangulation systems, the non-zero baseline will always lead to a substantial reduction in the measurement range, in the near field, and/or in the far field. Reducing the baseline as possible with the detector according to the present invention will thus always increase the measurement range. Further, these near field and far field problems can be overcome by using the scanning device 154 of FIG. 48. The scanning device 154 may be adapted to detect a plurality of light beams 116 propagating from the object 112 to the scanning device 154 on the CMOS line. The light beams 116 may be generated at different position on the object 112 or by movement of the object 112. The scanning device 154 may be adapted to determine at least one longitudinal coordinate for each of the light points by determining the quotient signal Q as described above.

| List of reference numbers | |
|---|---|
| 110 | detector |
| 112 | object |
| 113 | optical sensors |
| 114 | beacon device |
| 115 | sensor element |
| 116 | light beam |
| 117 | matrix |
| 118 | first optical sensor |
| 119 | mask |
| 120 | second optical sensor |
| 121 | light-sensitive area |
| 122 | first light-sensitive area |
| 124 | second light-sensitive area |
| 126 | optical axis of the detector |
| 128 | transfer device |
| 129 | optical axis of the transfer device |
| 130 | focal point |
| 131 | light spot |
| 132 | evaluation device |
| 133 | center detector |
| 134 | detector system |
| 135 | summing device |
| 136 | illumination source |
| 137 | combining device |
| 138 | illumination light beam |
| 140 | reflective element |
| 142 | divider |
| 144 | position evaluation device |
| 146 | camera |
| 148 | human-machine interface |
| 150 | entertainment device |
| 152 | tracking system |
| 154 | scanning system |
| 156 | connector |
| 158 | housing |
| 160 | control device |
| 162 | user |
| 164 | opening |
| 166 | direction of view |

-continued

| List of reference numbers | |
|---|---|
| 168 | coordinate system |
| 170 | machine |
| 172 | track controller |
| 174 | array |
| 176 | optical sensor |
| 178 | quadrant photodiode |
| 180 | geometrical center of every |
| 182 | geometrical center of first optical sensor |
| 184 | geometrical center of second optical sensor |
| 186 | light spot |
| 188 | actuator |
| 190 | diaphragm |
| 192 | readout device for optical storage media |
| 194 | optical element |
| 196 | region of interest |
| 198 | first area |
| 200 | second area |
| 202 | inner region |
| 204 | plane |
| 206 | outer region |
| 208 | direction of movement |
| 210 | direction of movement |
| 212 | curve |
| 214 | curve |
| 216 | set of curves |
| 218 | set of curves |
| 1110 | detector |
| 1112 | object |
| 1114 | beacon device |
| 1116 | light beam |
| 1118 | first optical sensor |
| 1120 | second optical sensor |
| 1122 | first light-sensitive area |
| 1124 | second light-sensitive area |
| 1126 | optical axis |
| 1128 | transfer device |
| 1130 | focal point |
| 1132 | evaluation device |
| 1134 | detector system |
| 1136 | illumination source |
| 1138 | illumination light beam |
| 1140 | reflective element |
| 1142 | divider |
| 1144 | position evaluation device |
| 1146 | camera |
| 1148 | human-machine interface |
| 1150 | entertainment device |
| 1152 | tracking system |
| 1154 | scanning system |
| 1156 | connector |
| 1158 | housing |
| 1160 | control device |
| 1162 | user |
| 1164 | opening |
| 1166 | direction of view |
| 1168 | coordinate system |
| 1170 | machine |
| 1172 | track controller |
| 1174 | fluorescent waveguiding sheet |
| 1176 | waveguiding |
| 1178 | matrix material |
| 1180 | fluorescent material |
| 1182 | photosensitive element |
| 1184 | photosensitive element |
| 1186 | photosensitive element |
| 1188 | photosensitive element |
| 1190 | edge |
| 1192 | edge |
| 1194 | edge |
| 1196 | edge |
| 1198 | optical filter element |
| 1200 | reference photosensitive element |
| 1202 | small light spot |
| 1204 | large light spot |
| 1206 | shadow |
| 1208 | summing device |
| 1210 | subtracting device |

-continued

| List of reference numbers | |
|---|---|
| 1212 | photosensitive element |
| 1214 | corner |
| 1216 | optical coupling element |
| 2110 | detector |
| 2112 | object |
| 2113 | optical sensors |
| 2114 | beacon device |
| 2115 | Illumination source |
| 2116 | light beam |
| 2118 | first optical sensor |
| 2120 | second optical sensor |
| 2121 | light-sensitive area |
| 2122 | first light-sensitive area |
| 2124 | second light-sensitive area |
| 2126 | optical axis of the detector |
| 2128 | transfer device |
| 2129 | optical axis of the transfer device |
| 2130 | angle dependent optical element |
| 2131 | light beam |
| 2132 | first side |
| 2133 | evaluation device |
| 2134 | divider |
| 2136 | position evaluation device |
| 2138 | Optical fiber |
| 2140 | Illumination fiber |
| 2142 | Light beam |
| 2144 | First fiber |
| 2146 | Second fiber |
| 2148 | entrance end |
| 2150 | exit end |
| 2152 | first light beam |
| 2154 | Second light beam |
| 2156 | camera |
| 2158 | Detector system |
| 2160 | Human-machine interface |
| 2162 | Entertainment device |
| 2164 | Tracking system |
| 2166 | Scanning system |
| 2168 | connector |
| 2170 | housing |
| 2172 | Control device |
| 2174 | user |
| 2176 | opening |
| 2178 | Direction of view |
| 2180 | Coordinate system |
| 2182 | machine |
| 2184 | Track controller |
| 2186 | Line pattern |
| 2188 | curve |
| 2190 | curve |
| 2192 | curve |
| 2194 | curve |
| 2196 | curve |
| 2198 | curve |
| 2200 | curve |
| 2202 | curve |
| 2204 | curve |
| 2206 | Epipolar line |

The invention claimed is:

1. A detector for determining a position of at least one object, the detector having
at least one sensor element having a matrix of optical sensors, the optical sensors each having a light-sensitive area, wherein each optical sensor is configured to generate at least one sensor signal in response to an illumination of the light-sensitive area by at least one light beam propagating from the object to the detector; and
at least one evaluation device configured for evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal;
wherein the detector is configured to be used for an application selected from the group consisting of mobile phone applications, facial recognition application, automotive applications, tablet applications, laptop applications, cleaning robot applications, smart panel applications, medical applications, endoscope applications, crop applications, quality inspection applications, and combinations thereof.

2. The detector according to claim 1, wherein the center signal is selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; and an integral of a group of sensor signals being above a predetermined threshold.

3. The detector according to claim 1, wherein the detector is configured for transforming the sensor signals of the optical sensor, thereby generating secondary optical sensor signals, wherein the evaluation device is configured for performing steps a)-d) by using the secondary optical sensor signals.

4. The detector according to claim 3, wherein the transforming of the sensor signals comprises at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue, saturation, and brightness channels, a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; and creating a binary image.

5. The detector according to claim 1, wherein the evaluation device comprises at least one center detector for detecting the at least one highest sensor signal and/or for forming the center signal.

6. The detector according to claim 5, wherein the center detector is fully or partially integrated into the sensor element.

7. The detector according to claim 5, wherein the center detector is fully or partially embodied in one or both of software or hardware.

8. The detector according to claim 1, wherein the sum signal is selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; and an integral of sensor signals above a certain threshold of optical sensors being located within a predetermined range from the optical sensor having the highest sensor signal.

9. The detector according to claim 8, wherein the evaluation device comprises at least one summing device for forming the sum signal.

10. The detector according to claim 9, wherein the summing device is fully or partially integrated into the sensor element.

11. The detector according to claim 9, wherein the summing device is fully or partially embodied in one or both of software or hardware.

12. The detector according to claim 1, wherein the combined signal is a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; and forming a quotient of a first linear combination of the center signal and the sum signal and a second linear combination of the center signal and the sum signal.

13. The detector according to claim 12, wherein the evaluation device is configured for using at least one predetermined relationship between the quotient signal Q and the longitudinal coordinate for determining the longitudinal coordinate.

14. The detector according to claim 13, wherein the predetermined relationship is one or more relationship selected from the group consisting of an empiric relationship, a semi-empiric relationship, and an analytically derived relationship.

15. The detector according to claim 13, wherein the evaluation device comprises at least one data storage device for storing the predetermined relationship.

16. The detector according to claim 12, wherein the evaluation device comprises at least one divider, wherein the divider is configured for deriving the quotient signal.

17. The detector according to claim 16, wherein the divider is fully or partially embodied as one or both of a software divider or a hardware divider.

18. The detector according to claim 16, wherein the divider is fully or partially integrated into the sensor element.

19. The detector according to claim 1, wherein the optical sensors are selected from the group consisting of photodetectors, inorganic photodetectors, inorganic semiconductor photodetectors, and silicon photodetectors.

20. The detector according to claim 1, wherein the optical sensors are sensitive in the infrared spectral range.

21. The detector according to claim 1, wherein the matrix comprises one or more detector selected from the group consisting of a CCD detector, a CCD detector chip, a CMOS detector, and a CMOS detector chip.

22. The detector according to claim 1, wherein the matrix is a rectangular matrix having at least one row and a plurality of columns.

23. The detector according to claim 22, wherein the rows and columns are oriented essentially perpendicular.

24. The detector according to claim 22, wherein the matrix has at least 10 rows.

25. The detector according to claim 22, wherein the matrix has at least 10 columns.

26. The detector according to claim 22, wherein the ratio of the number of rows and the number of columns is close to 1.

27. The detector according to claim 1, wherein the matrix comprises at least 50 optical sensors.

28. The detector according to claim 1, wherein the sensor element is oriented essentially perpendicular to an optical axis of the detector.

29. The detector according to claim 1, wherein the optical sensors each have, at least within a range of measurement, a linear signal characteristic such that the respective sensor signals are dependent on the total power of illumination of the respective optical sensor.

30. The detector according to claim 1, wherein the detector further comprises an illumination source for illuminating the object.

31. The detector according to claim 30, wherein the illumination source is configured for generating an illuminating light beam for illuminating the object, wherein the detector is configured such that the illuminating light beam propagates from the detector towards the object along an optical axis of the detector.

32. The detector according to claim 31, wherein the detector comprises at least one reflective element for deflecting the illuminating light beam onto the optical axis.

33. The detector according to claim 30, wherein the illumination source is adapted to generate at least one illumination pattern for illumination of the object, wherein the illumination pattern comprises at least one pattern selected from the group consisting of: at least one point pattern, a pseudo-random point pattern, a random point pattern; at least one Sobol pattern; at least one quasiperiodic pattern; at least one pattern comprising at least one pre-known feature; at least one regular pattern; at least one triangular pattern; at least one hexagonal pattern, a rotated hexagonal pattern and/or a displaced hexagonal pattern; at least one rectangular pattern at least one pattern comprising convex uniform tilings; at least one fringe pattern; at least one line pattern comprising at least one line; at least one line pattern comprising at least two lines, at least one line pattern comprising at least two parallel lines, and at least one line pattern comprising at least two crossing lines.

34. The detector according to claim 33, wherein the optical sensors are adapted to determine at least one reflection pattern, wherein the evaluation device is adapted to select at least one feature of the reflection pattern and to determine the longitudinal coordinate z of the selected feature of the reflection pattern by evaluating the quotient signal Q.

35. The detector according to claim 1, wherein the detector further comprises at least one transfer device, the transfer device being adapted to guide the light beam onto the optical sensors.

36. The detector according to claim 35, wherein the transfer device comprises one or more component selected from the group consisting of: at least one lens, at least one focus-tunable lens; at least one aspheric lens; at least one spheric lens; at least one Fresnel lens; at least one diffractive optical element; at least one concave mirror; at least one beam deflection element, at least one mirror; at least one beam splitting element, at least one beam splitting cube, at least one beam splitting mirror; and at least one multi-lens system.

37. The detector according to claim 1, wherein the evaluation device is further configured for determining at least one transversal coordinate of the object by evaluating a transversal position of the at least one optical sensor having the highest sensor signal.

38. The detector according to claim 1, wherein the evaluation device is configured for distinguishing different light beams having different modulations.

39. A detector according to claim 1, wherein the detector is configured to be used for an application selected from the group consisting of mobile phone applications, facial recognition application, automotive applications, and combinations thereof.

40. A method of using a detector, the method comprising the following steps:
   illuminating at least one sensor element of the detector with at least one light beam propagating from the object to the detector, the detector having a matrix of optical sensors, the optical sensors each having a light-sensitive area, wherein each optical sensor generates at least one sensor signal in response to the illumination;
   evaluating the sensor signals, by
   a) determining at least one optical sensor having the highest sensor signal and forming at least one center signal;
   b) evaluating the sensor signals of the optical sensors of the matrix and forming at least one sum signal;
   c) determining at least one combined signal by combining the center signal and the sum signal; and
   d) determining at least one longitudinal coordinate z of the object by evaluating the combined signal; and
   using the detector for an application selected from the group consisting of mobile phone applications, facial recognition application, automotive applications, tablet applications, laptop applications, cleaning robot applications, smart panel applications, medical applications, endoscope applications, crop applications, quality inspection applications, and combinations thereof.

41. The method according to claim 40, wherein the combined signal is a quotient signal Q, derived by one or more technique selected from the group consisting of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; and forming a quotient of a first linear combination of the center signal and the sum signal and a second linear combination of the center signal and the sum signal.

42. The method according to claim 41, wherein determining the longitudinal coordinate comprises evaluating the quotient signal Q, wherein evaluating the quotient signal comprises using at least one predetermined relationship between the quotient signal Q and the longitudinal coordinate for determining the longitudinal coordinate.

43. The method according to claim 40, wherein the method comprises using the detector as a detector.

44. The method of claim 40, further comprising using the detector for an application selected from the group consisting of mobile phone applications, facial recognition application, automotive applications, and combinations thereof.

* * * * *